United States Patent
Holenstein et al.

(10) Patent No.: US 7,962,458 B2
(45) Date of Patent: Jun. 14, 2011

(54) METHOD FOR REPLICATING EXPLICIT LOCKS IN A DATA REPLICATION ENGINE

(75) Inventors: Bruce D. Holenstein, Media, PA (US); Paul J. Holenstein, Downingtown, PA (US); John R. Hoffmann, Kennett Square, PA (US); Wilbur H. Highleyman, Blairstown, NJ (US); Gary E. Strickler, Pottstown, PA (US)

(73) Assignee: Gravic, Inc., Malvern, PA (US)

( * ) Notice: Subject to any disclaimer, the term of this patent is extended or adjusted under 35 U.S.C. 154(b) by 0 days.

(21) Appl. No.: 12/707,322

(22) Filed: Feb. 17, 2010

(65) Prior Publication Data

US 2010/0191884 A1  Jul. 29, 2010

Related U.S. Application Data

(63) Continuation-in-part of application No. 12/483,849, filed on Jun. 12, 2009.

(60) Provisional application No. 61/061,040, filed on Jun. 12, 2008, provisional application No. 61/098,509, filed on Sep. 19, 2008, provisional application No. 61/208,273, filed on Feb. 20, 2009.

(51) Int. Cl.
   *G06F 17/30* (2006.01)
(52) U.S. Cl. .................. 707/704; 707/638; 707/655
(58) Field of Classification Search .................. 707/613, 707/638, 656, 658, 704, 655
   See application file for complete search history.

(56) References Cited

U.S. PATENT DOCUMENTS

| | | | |
|---|---|---|---|
| 5,724,556 A | | 3/1998 | Souder et al. |
| 5,781,912 A | * | 7/1998 | Demers et al. ................ 707/704 |
| 5,870,759 A | * | 2/1999 | Bauer et al. ................... 707/713 |
| 5,937,414 A | * | 8/1999 | Souder et al. ................. 707/616 |
| 6,078,932 A | * | 6/2000 | Haye et al. .................... 707/640 |
| 6,363,401 B2 | * | 3/2002 | Yahya et al. ................... 707/704 |
| 6,502,205 B1 | * | 12/2002 | Yanai et al. ................... 714/6.32 |
| 6,513,084 B1 | * | 1/2003 | Berkowitz et al. ............ 710/242 |
| 6,532,479 B2 | | 3/2003 | Souder et al. |
| 6,662,196 B2 | | 12/2003 | Holenstein et al. |
| 7,103,586 B2 | | 9/2006 | Holenstein et al. |

(Continued)

OTHER PUBLICATIONS

W. H. Highleyman et al. "Breaking the Availability Barrier: Survivable Systems for Enterprise Computing," Chapter 9, "Data Conflict Rates," AuthorHouse; 2004, 37 pages.

B. D. Holenstein et al. "Breaking the Availability Barrier II—Achieving Century Uptimes with Active/Active Systems," Chapter 6, "Distributed Databases," AuthorHouse, 2007, 32 pages.

*Primary Examiner* — Shahid A Alam

(74) *Attorney, Agent, or Firm* — Panitch Schwarze Belisario & Nadel LLP

(57) ABSTRACT

An automated method is provided of replicating a locking protocol in a database environment for performing I/O operations wherein the database environment includes a plurality of databases. A locking protocol is performed that includes one or more explicit locking operations on objects in a first database of the database environment. The one or more explicit locking operations are replicated in one or more other databases in the database environment. At least some of the explicit locking operations are performed asynchronously with respect to the explicit locking operations performed in the first database. I/O operations are performed at the first database of the database environment that are associated with the one or more explicit locking operations implemented in the first database.

58 Claims, 85 Drawing Sheets

Coordinated Commit Replication

U.S. PATENT DOCUMENTS

| | | | |
|---|---|---|---|
| 7,177,866 B2 * | 2/2007 | Holenstein et al. | 707/615 |
| 7,403,945 B2 * | 7/2008 | Lin et al. | 707/704 |
| 7,769,722 B1 * | 8/2010 | Bergant et al. | 707/681 |
| 2003/0088806 A1 * | 5/2003 | Dahlen et al. | 714/6 |
| 2007/0268844 A1 * | 11/2007 | Elko et al. | 370/276 |
| 2008/0126693 A1 * | 5/2008 | Cometto et al. | 711/108 |
| 2008/0288811 A1 * | 11/2008 | Sudhakar | 714/4 |
| 2009/0276754 A1 * | 11/2009 | Lind et al. | 717/106 |

* cited by examiner

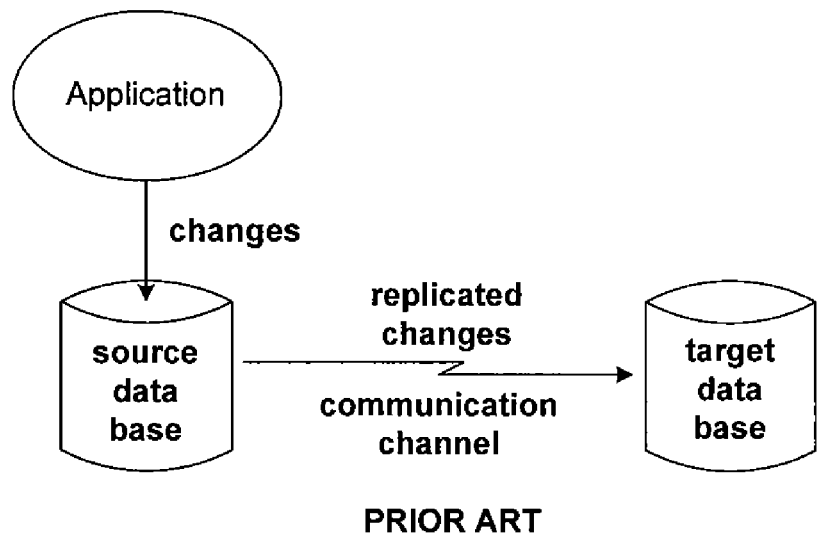
PRIOR ART
Figure 1- Data Replication
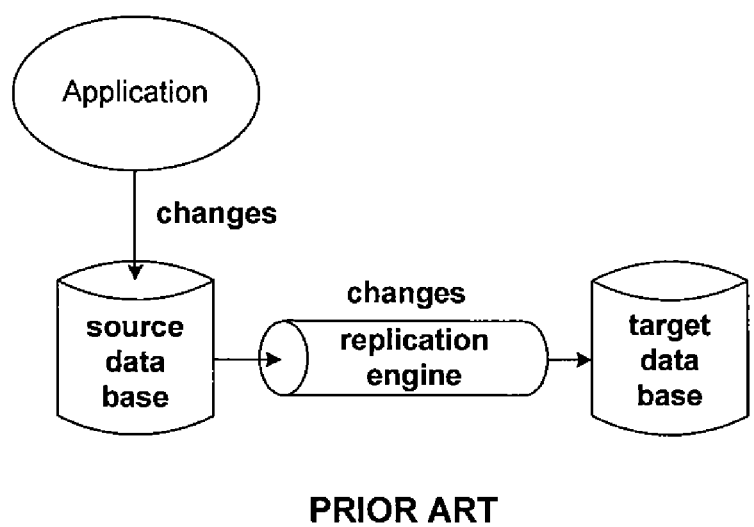
PRIOR ART
Figure 2- Data Replication Engine

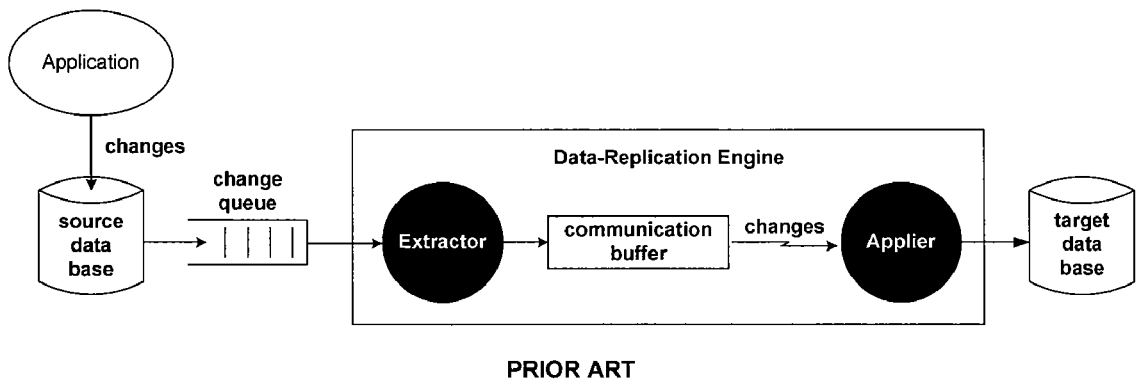
PRIOR ART
Figure 3- Asynchronous Data Replication
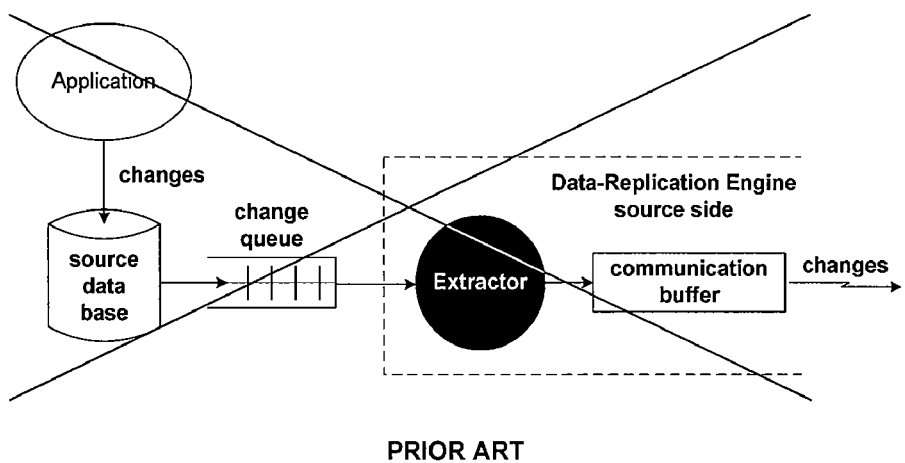
PRIOR ART
Figure 4- Asynchronous Data Loss Following Source Node Failure

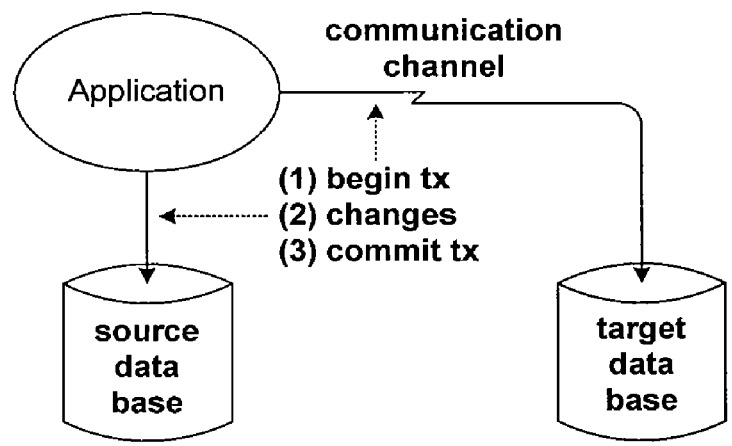
PRIOR ART
Figure 5- Transactions
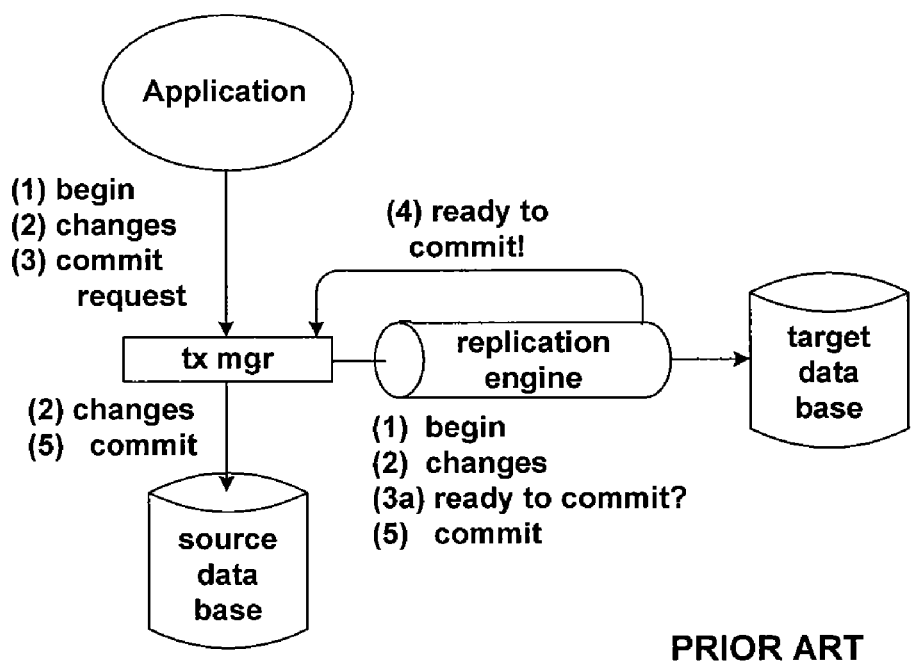
PRIOR ART
Figure 6- Coordinated Commits

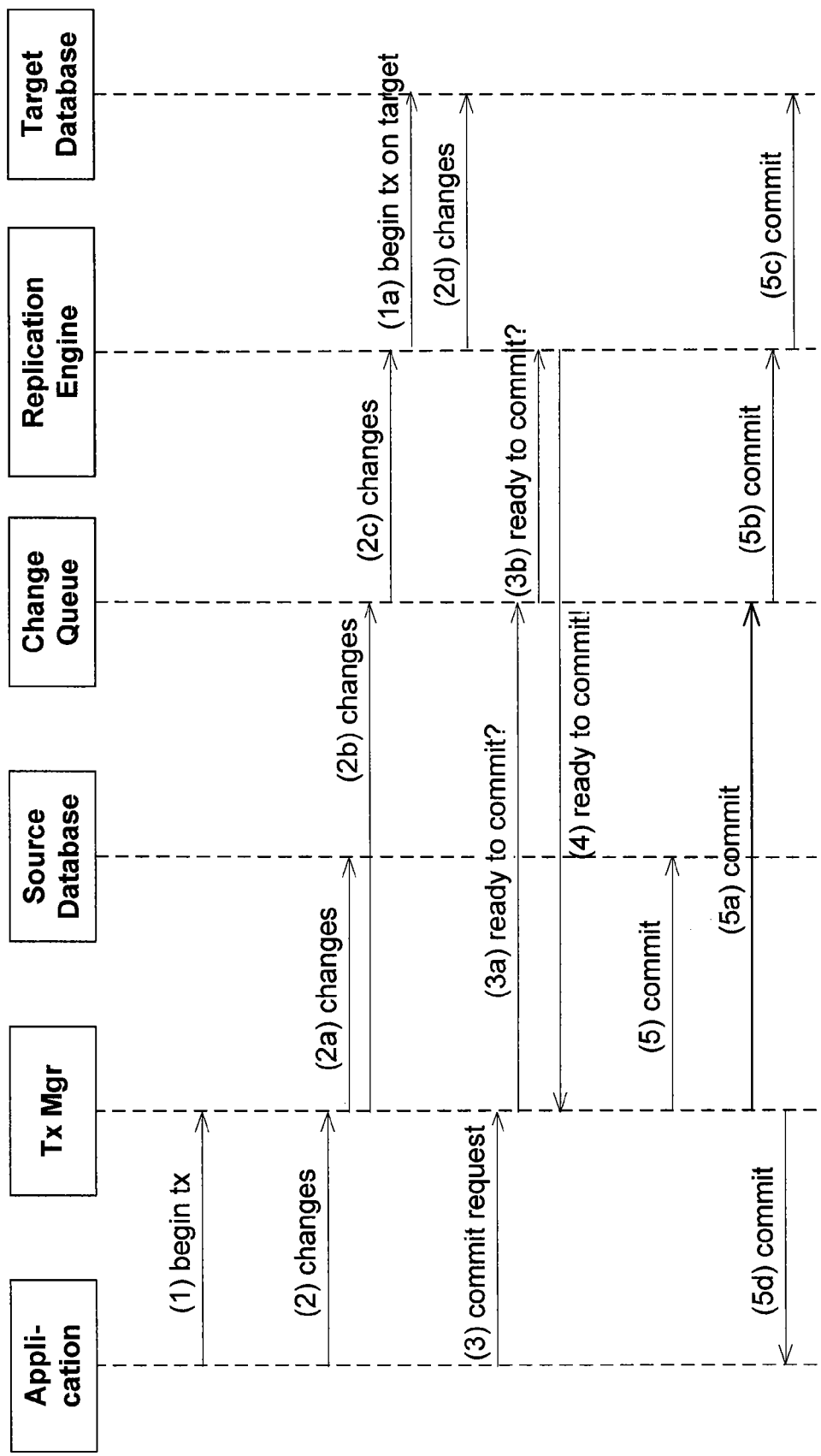
PRIOR ART
Figure 7 - Coordinated Commit Sequence Diagram

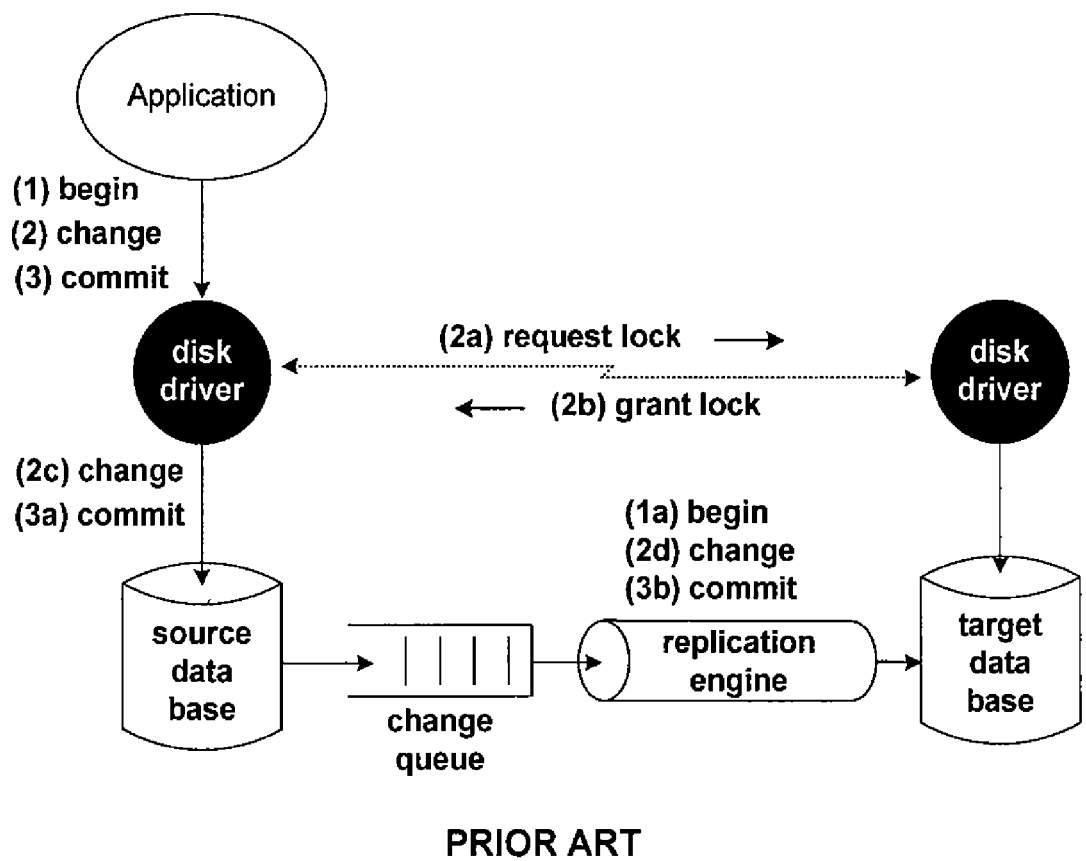
Figure 8- Distributed Lock Management

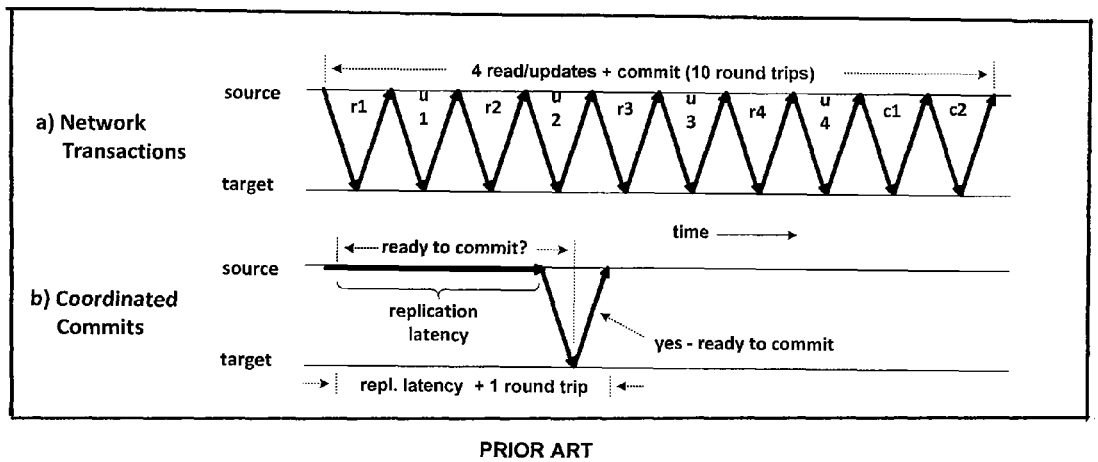
PRIOR ART
Figure 9- Application Latency

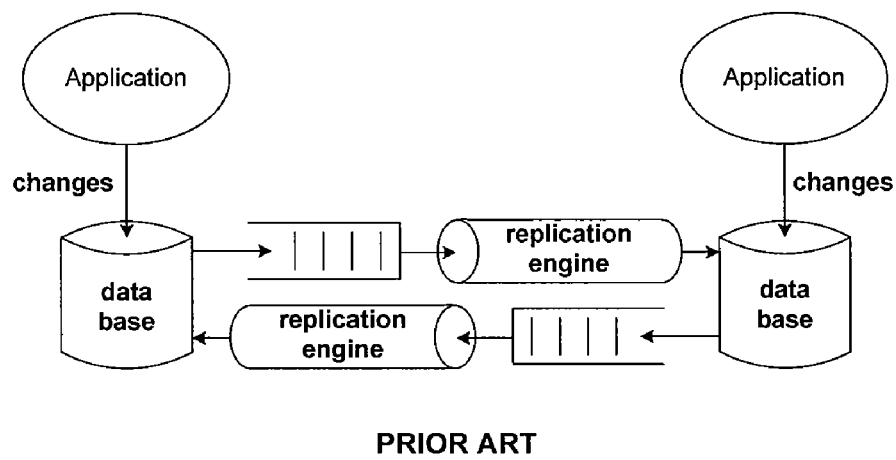
PRIOR ART
Figure 10- Bidirectional Replication
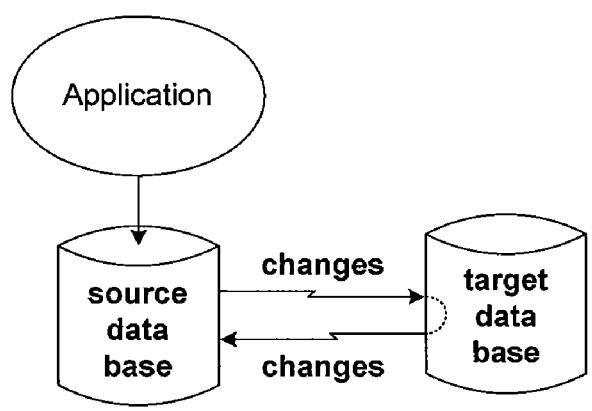
PRIOR ART
Figure 11- Ping-Ponging

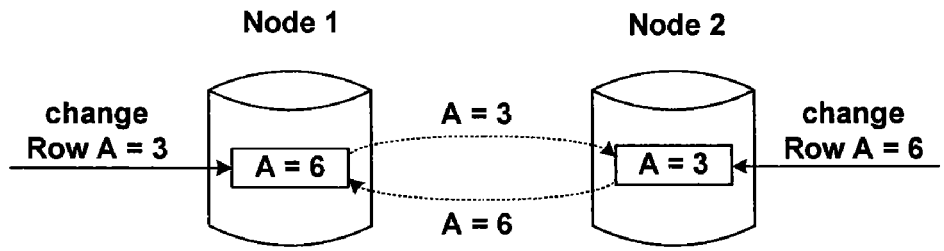
PRIOR ART
Figure 12- Data Collisions
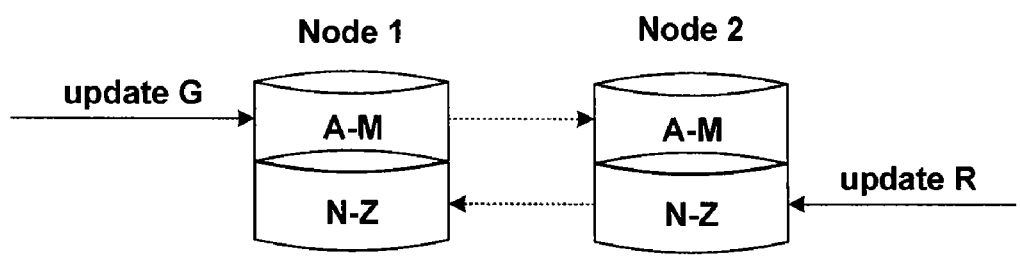
PRIOR ART
Figure 13- Partitioning

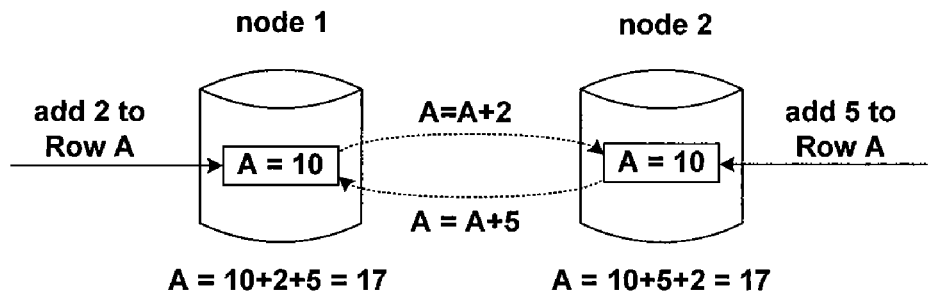
PRIOR ART
Figure 14- Relative Replication
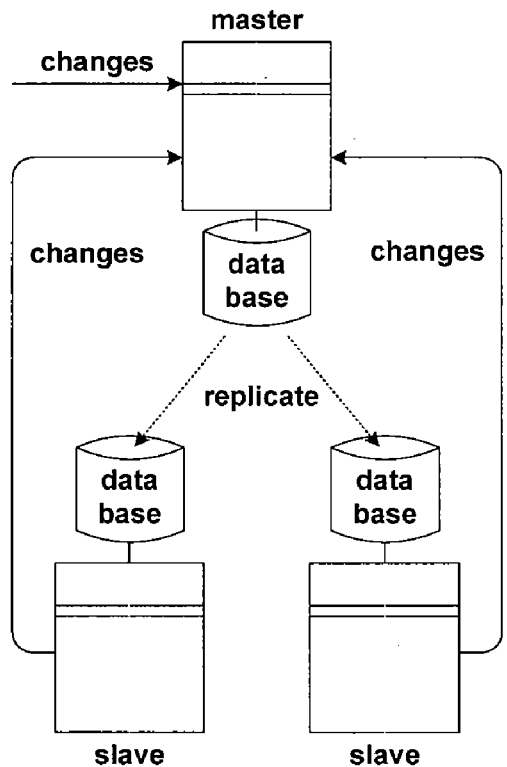
PRIOR ART
Figure 15- Master/Slave

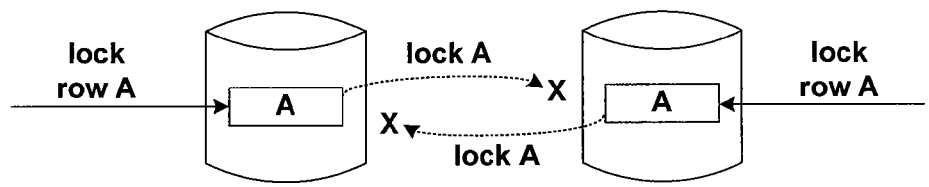
PRIOR ART
Figure 16- Distributed Deadlocks
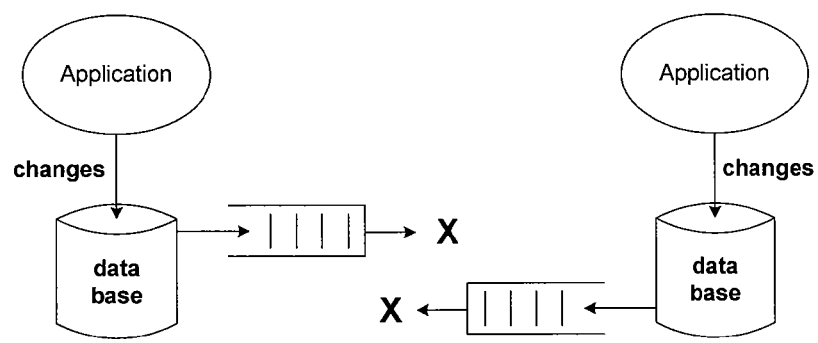
PRIOR ART
Figure 17- Split-Brain Mode

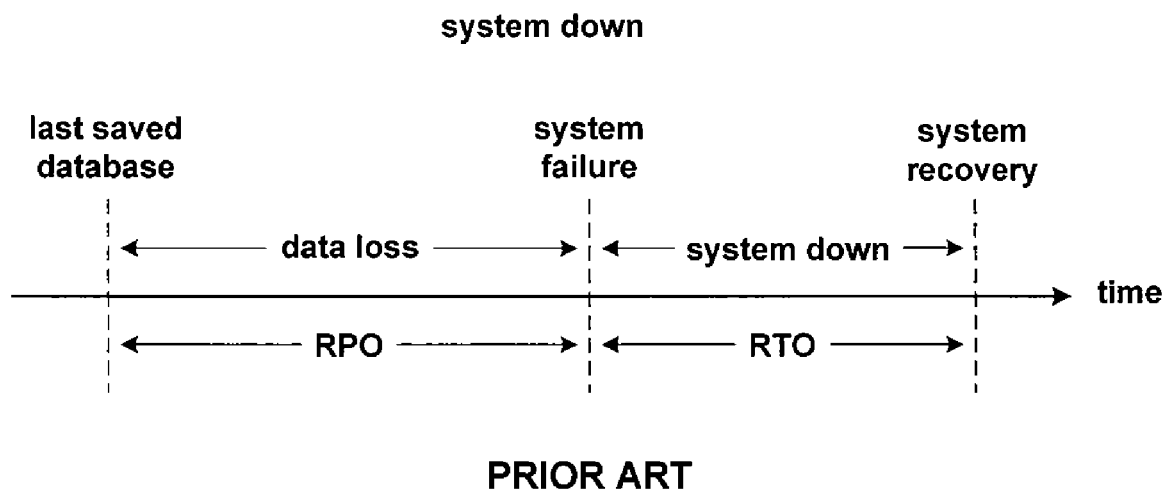
PRIOR ART
Figure 18- The RPO/RTO Relationship
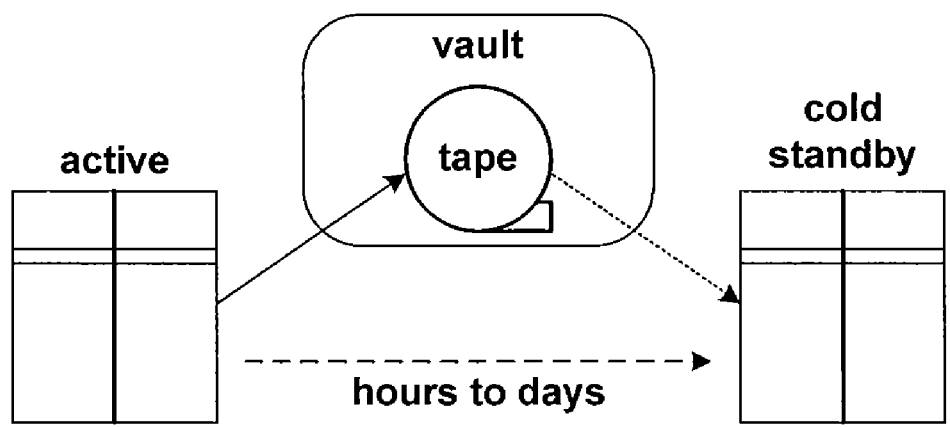
PRIOR ART
Figure 19- Magnetic Tape

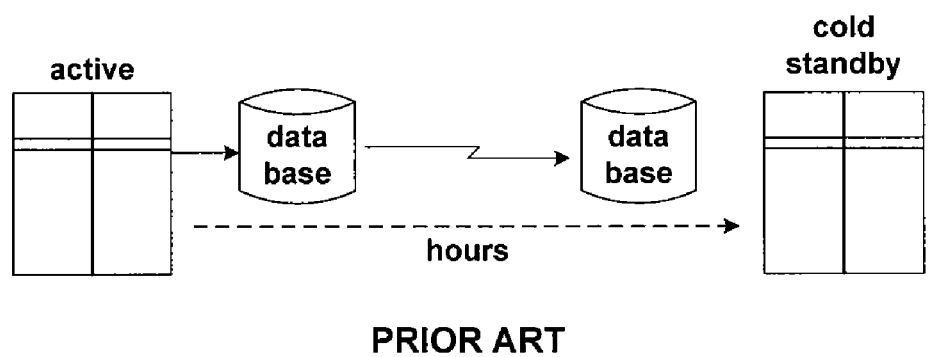
PRIOR ART
Figure 20- Virtual Tape
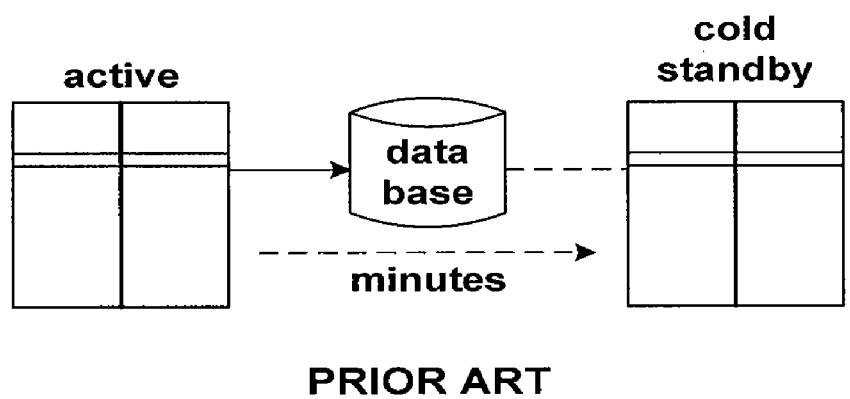
PRIOR ART
Figure 21- Cluster

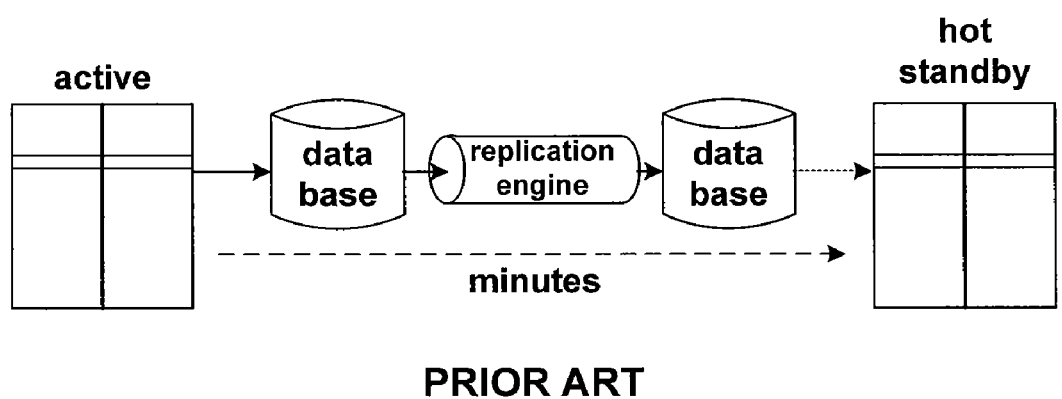
Figure 22- Unidirectional Replication

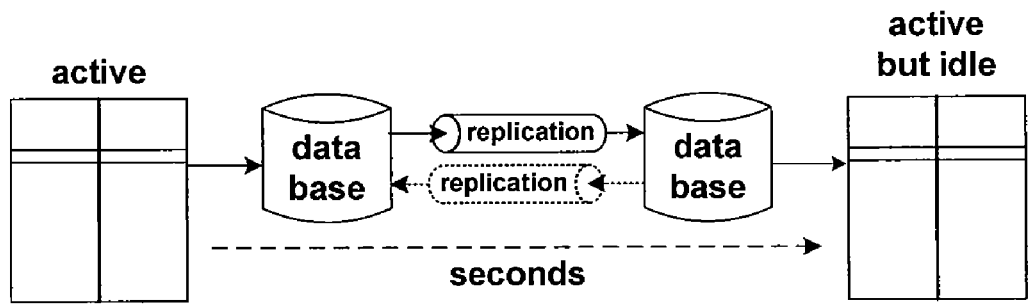
PRIOR ART
Figure 23- Sizzling-Hot Standby
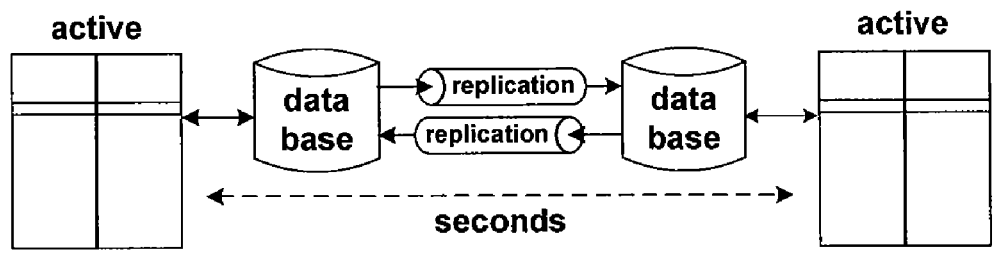
PRIOR ART
Figure 24- Active/Active

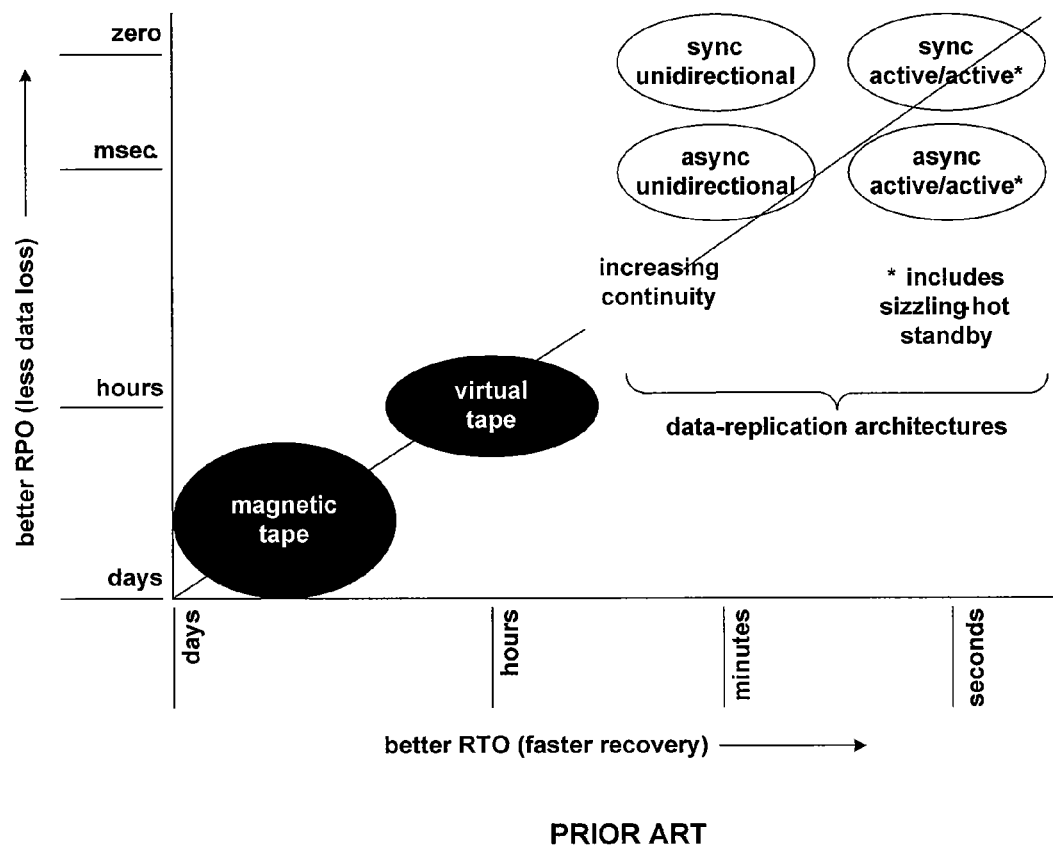
PRIOR ART
Figure 25- Business Continuity Continuum

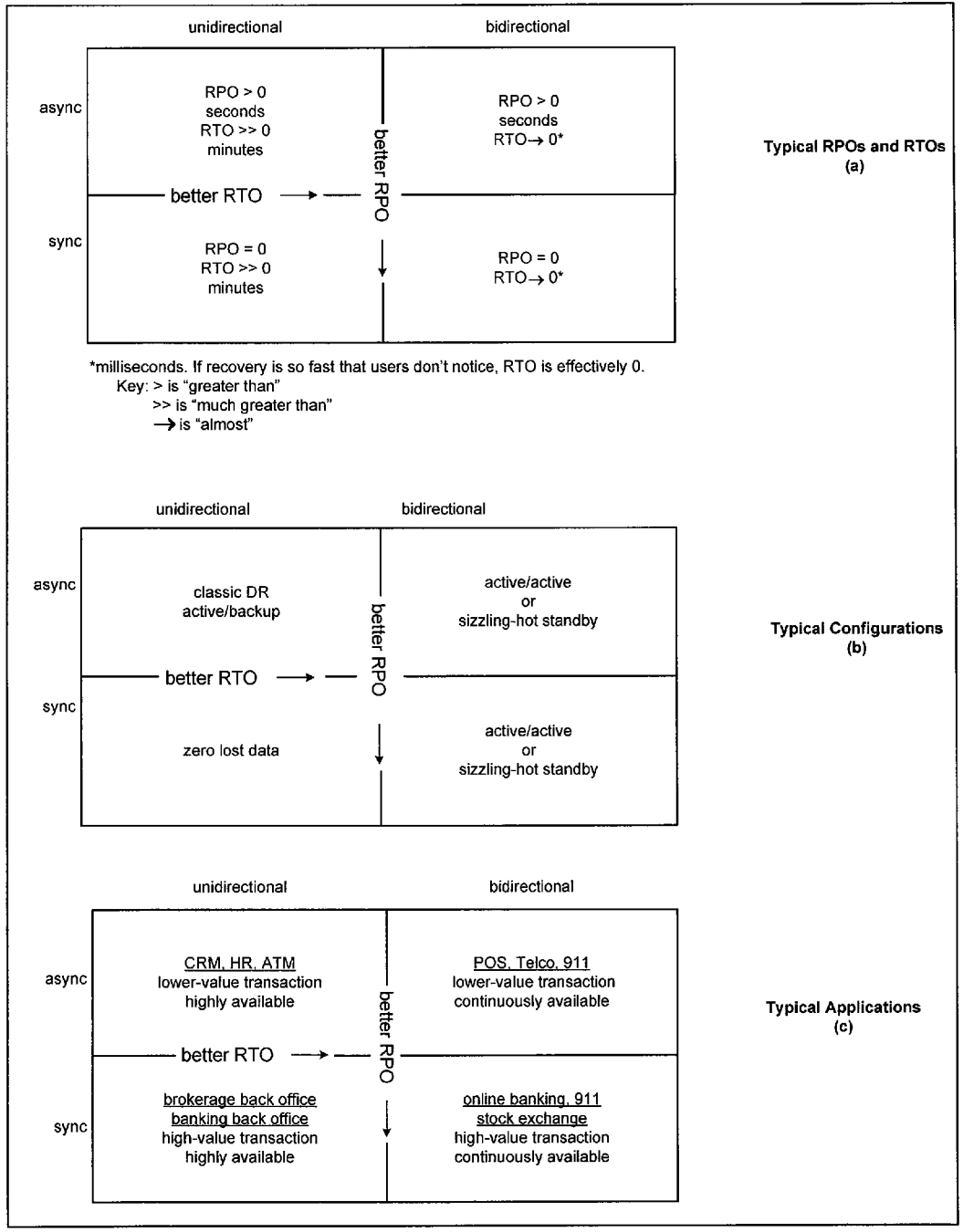
Figure 26 – Typical RTOs, RPOs, Configurations, and Applications

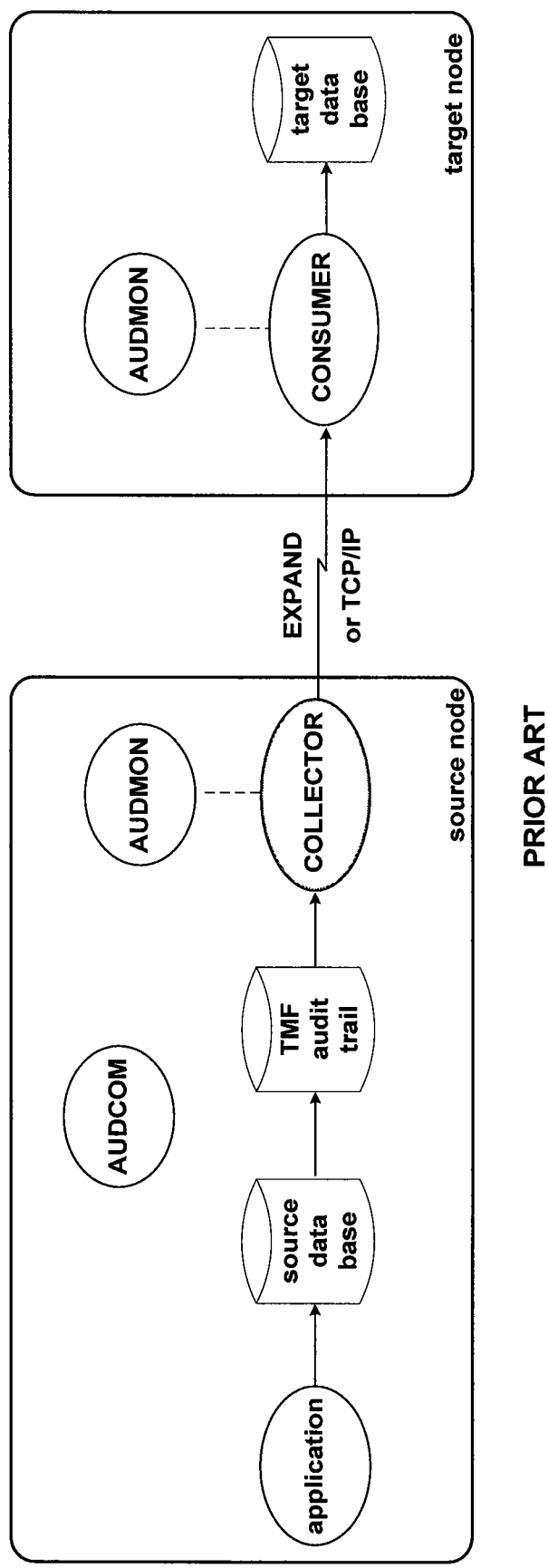
Figure 27 - Shadowbase Unidirectional Replication

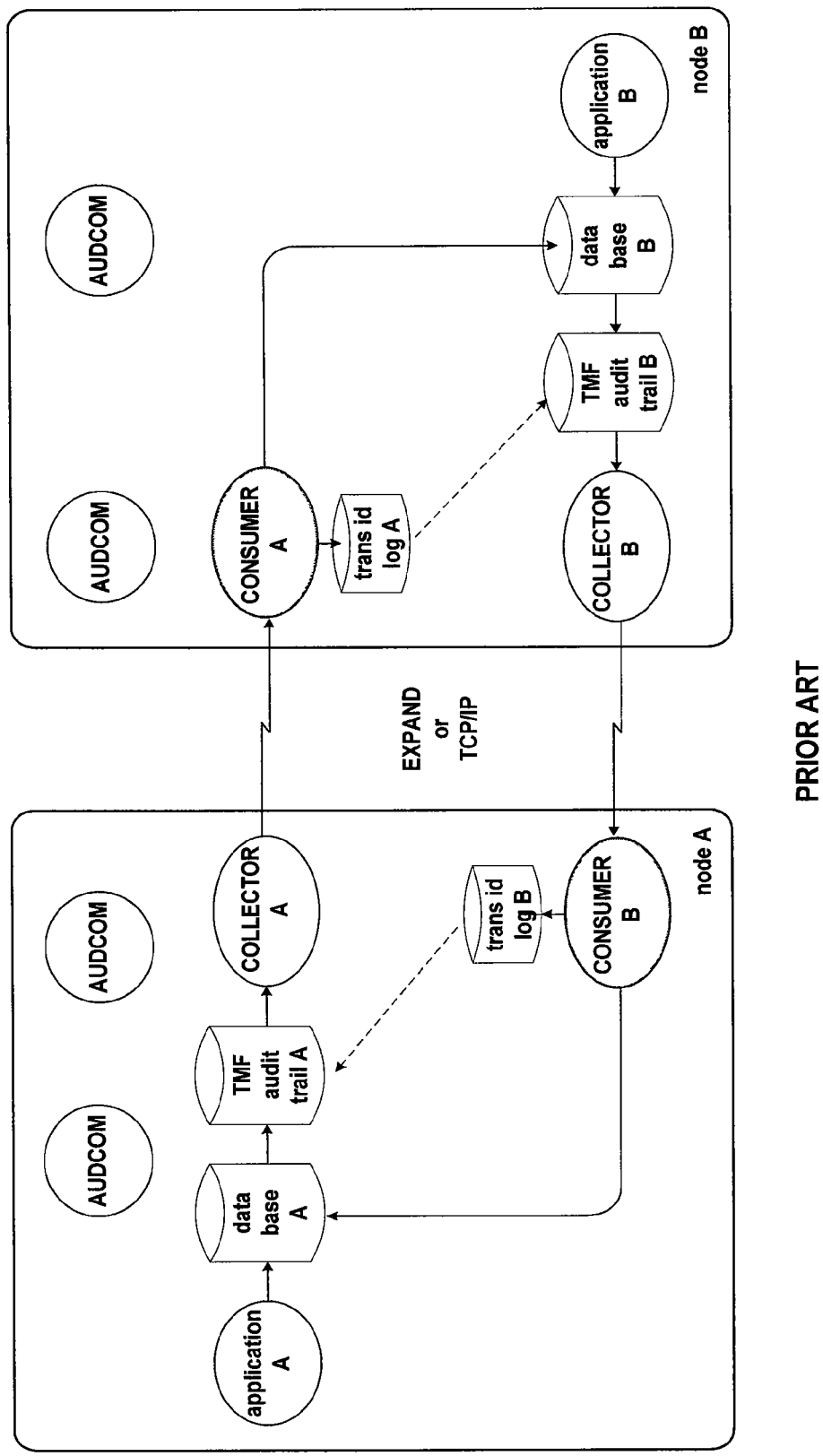
Figure 28- Shadowbase Bidirectional Replication
PRIOR ART

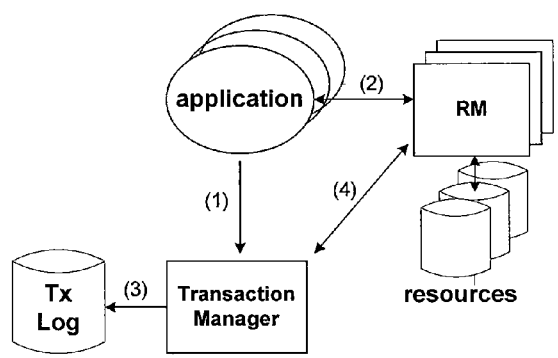
PRIOR ART
Figure 29- The X/Open Distributed Transaction Processing Model
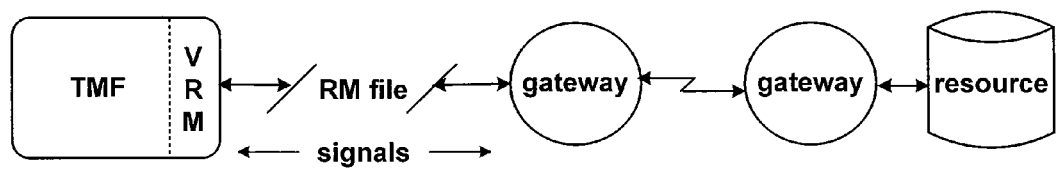
PRIOR ART
Figure 30- TMF/Gateway Communications

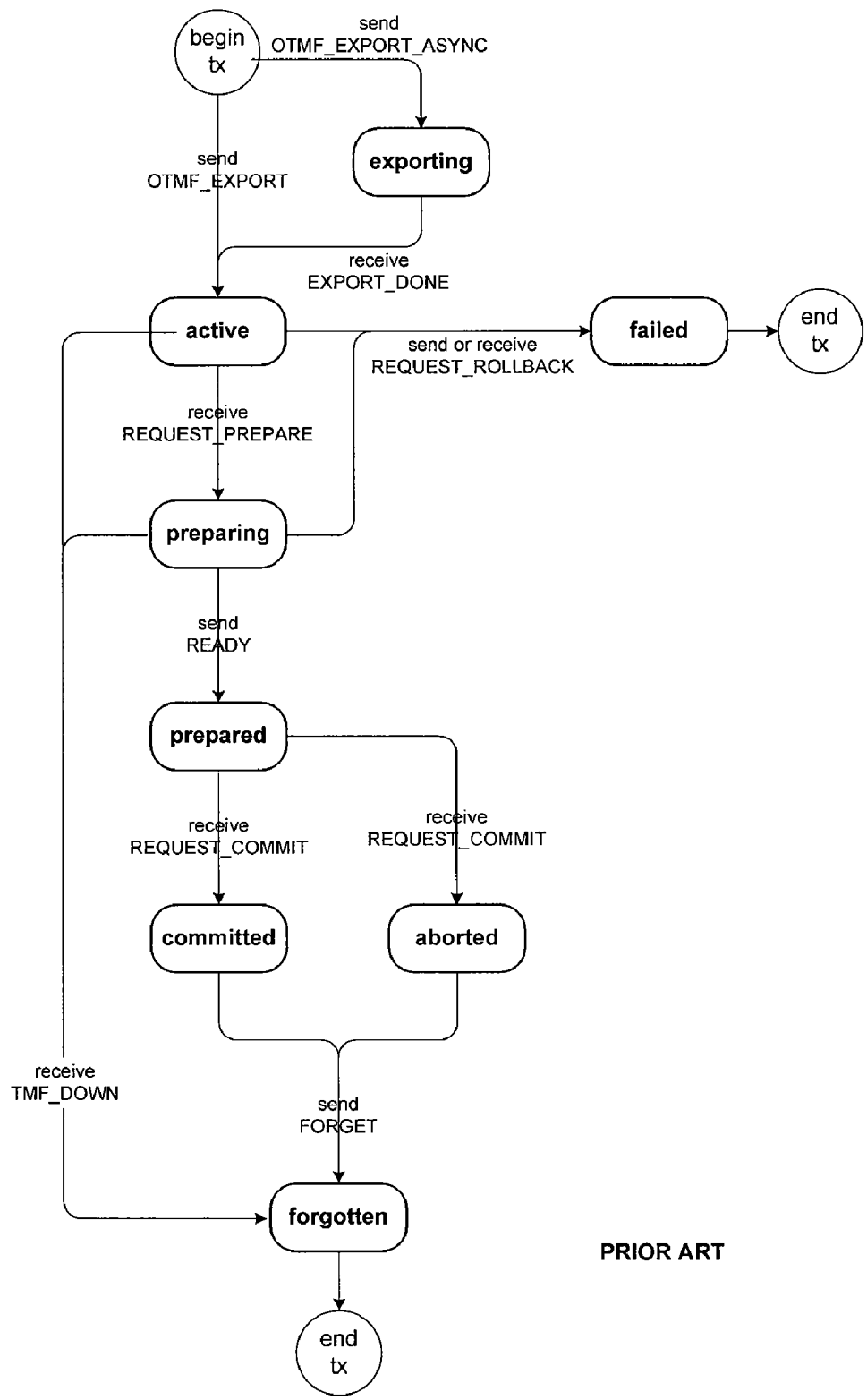
Figure 31- Transaction State Transitions for Volatile Resource Manager

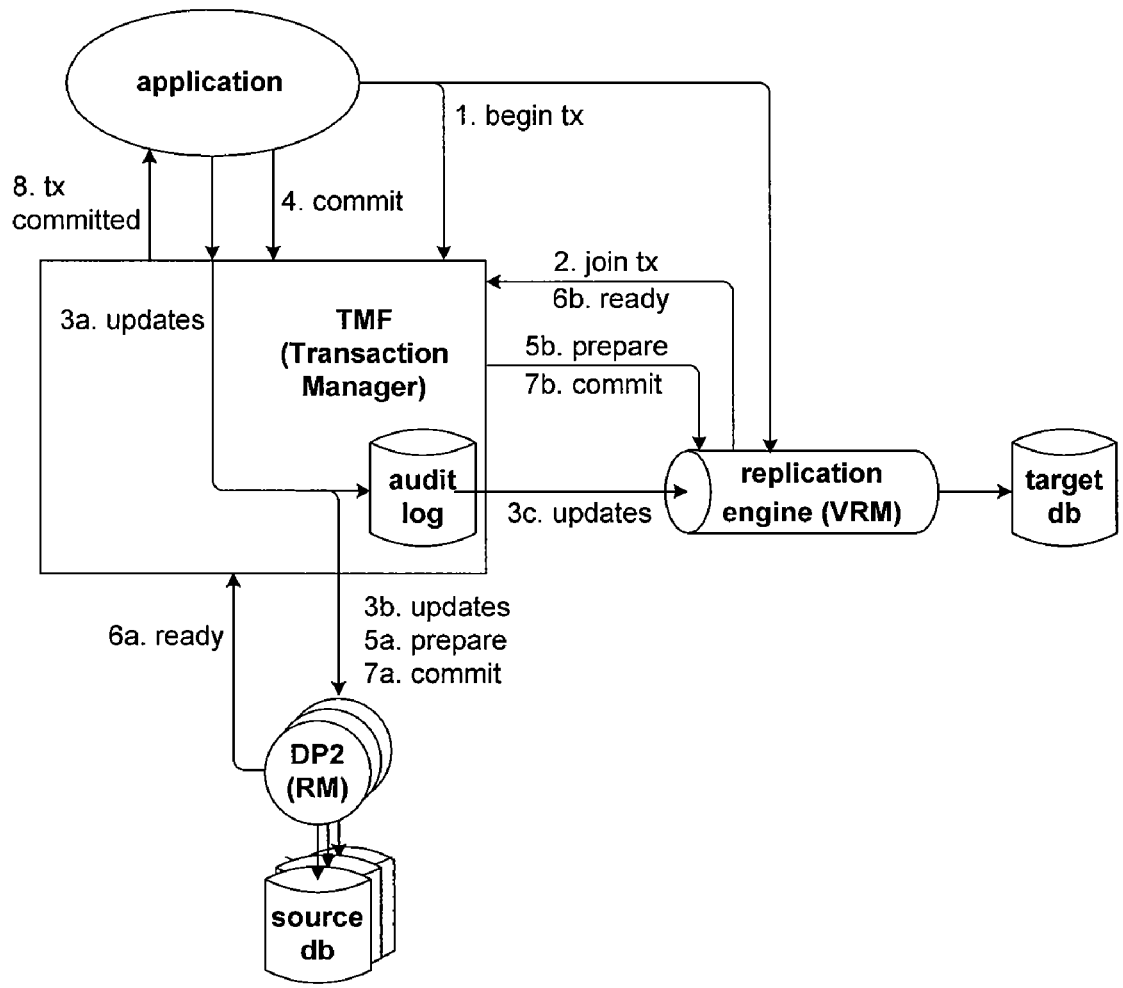
Figure 32- Coordinated Commit Replication

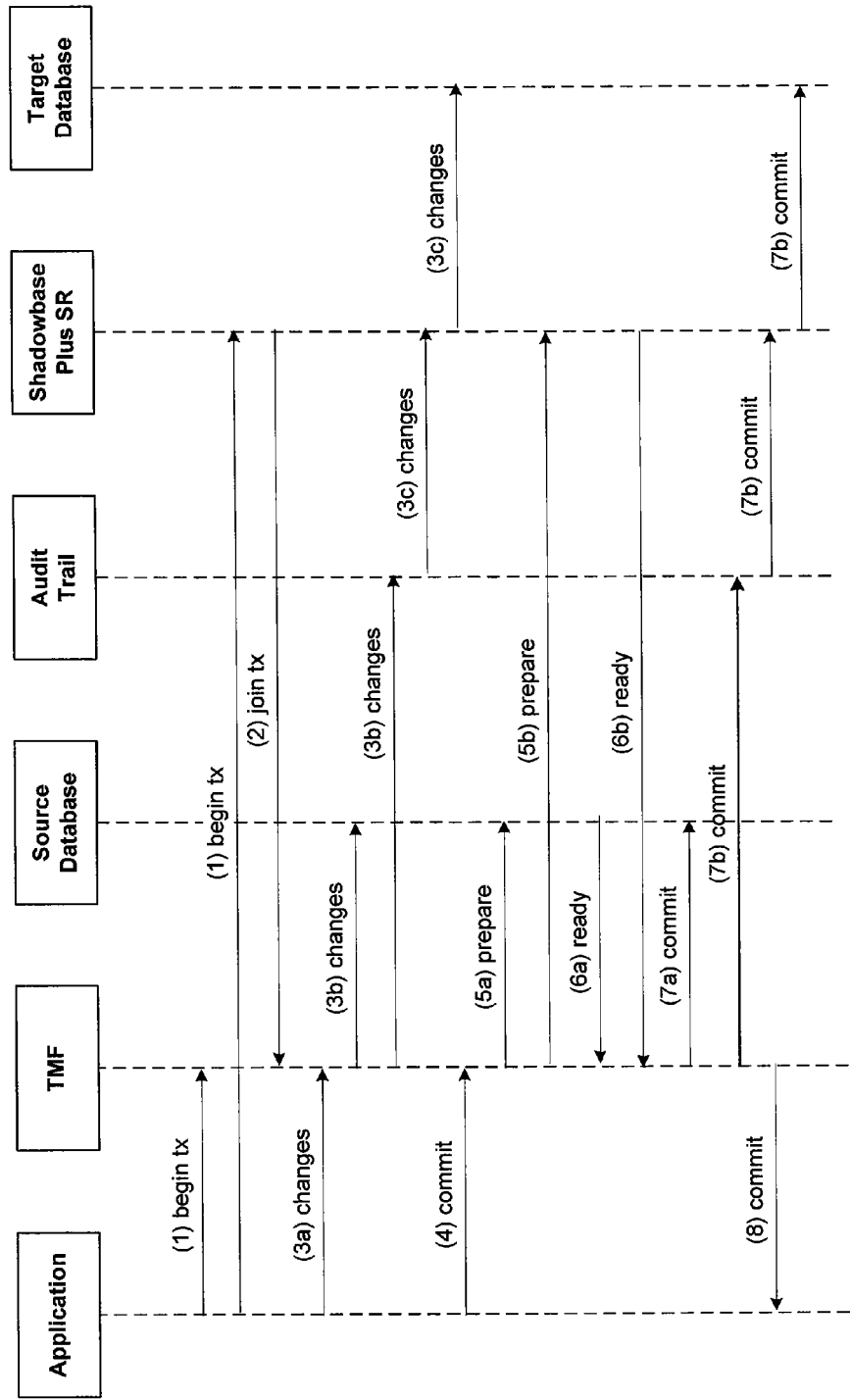
Figure 33- Coordinated Commit Replication Sequence Diagram

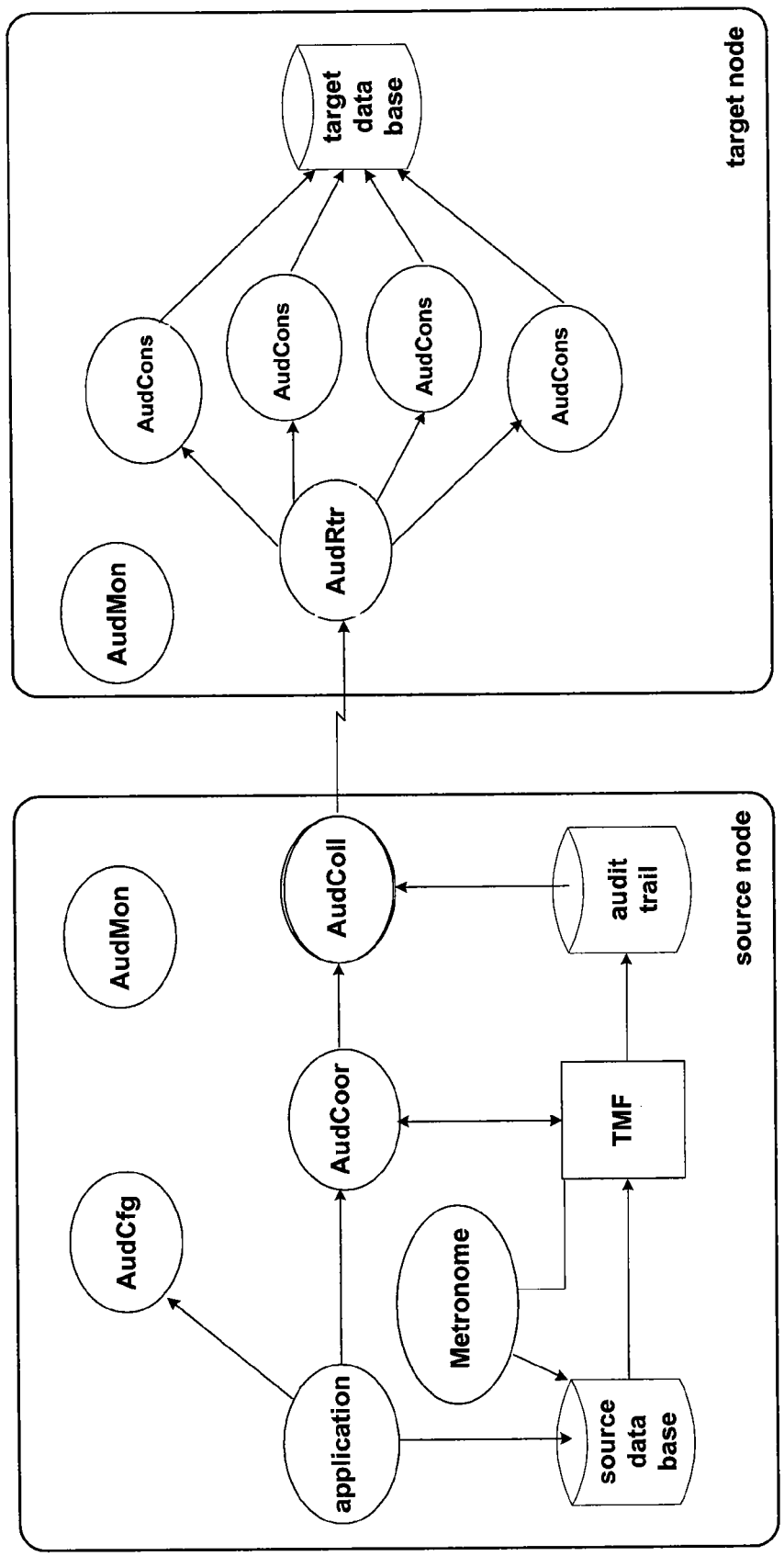
Figure 34 – Shadowbase Plus SR

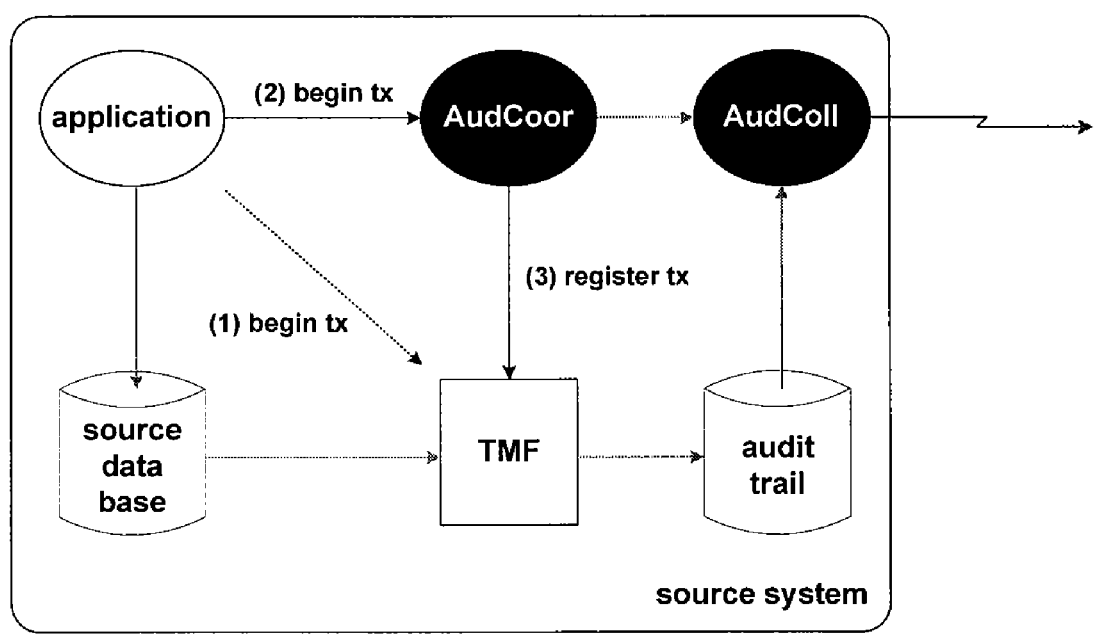
Figure 35- Beginning a Transaction

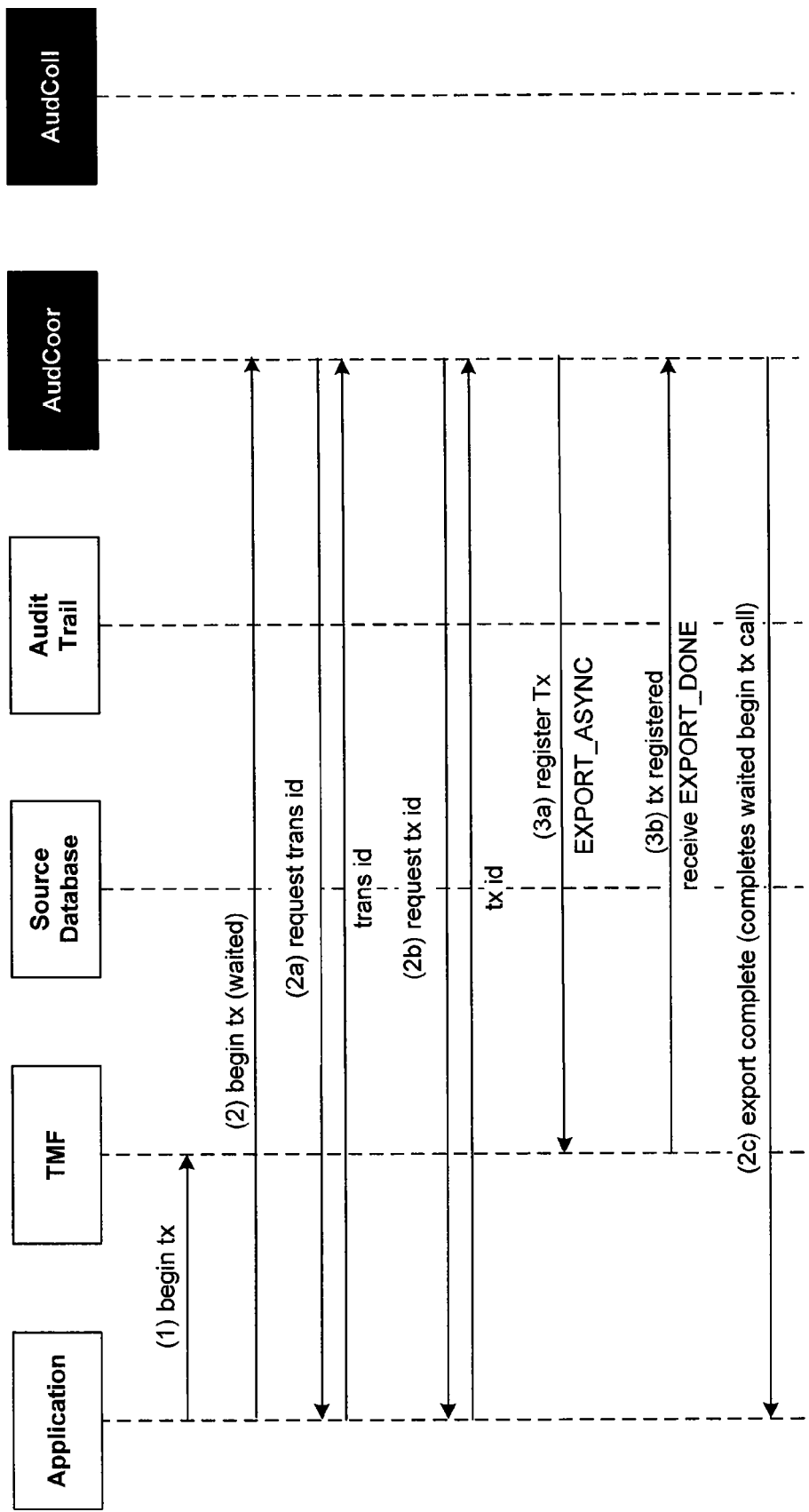
Figure 36-Beginning a Transaction

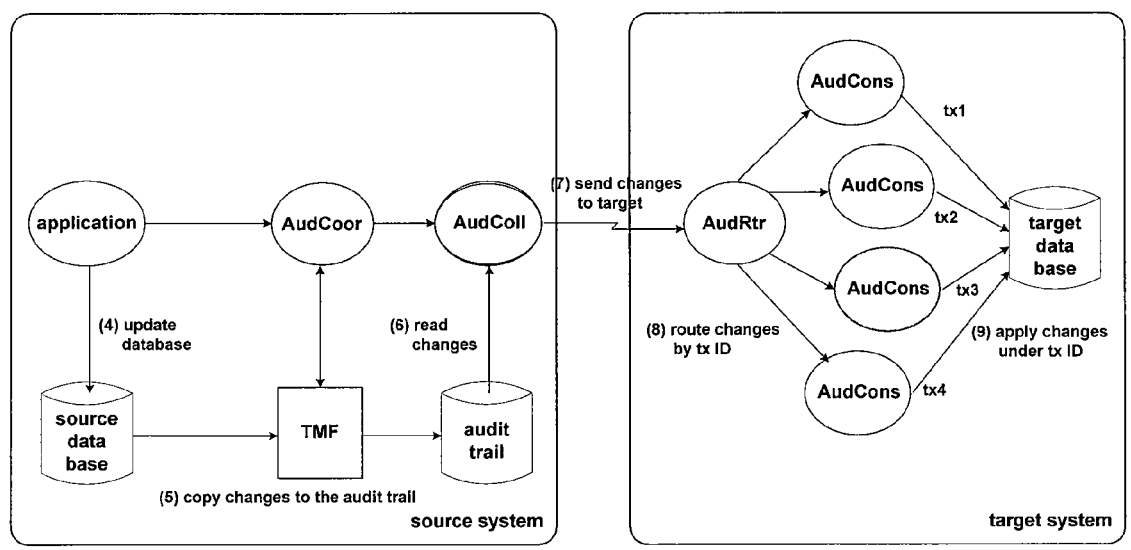
Figure 37- Replicate Changes

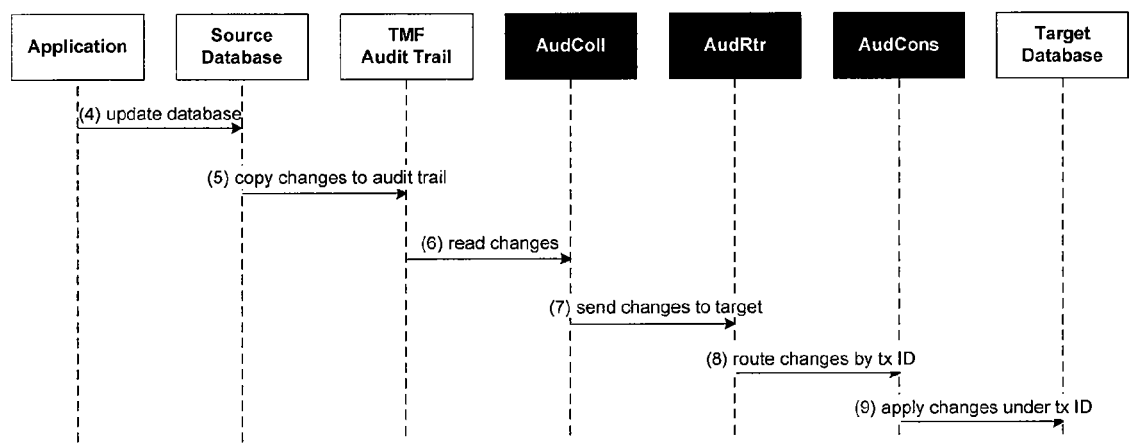
Figure 38- Replicate Changes

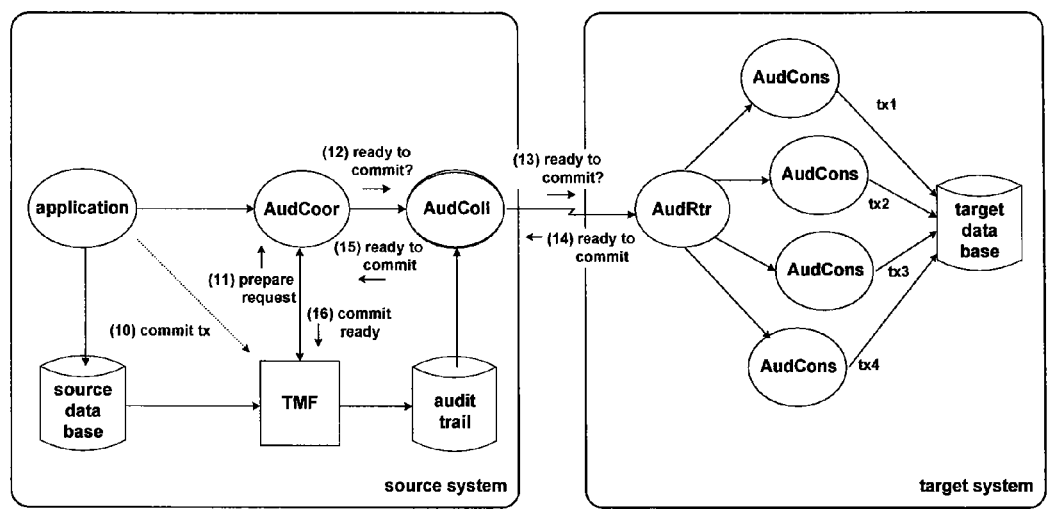
Figure 39- Committing a Transaction- Phase 1

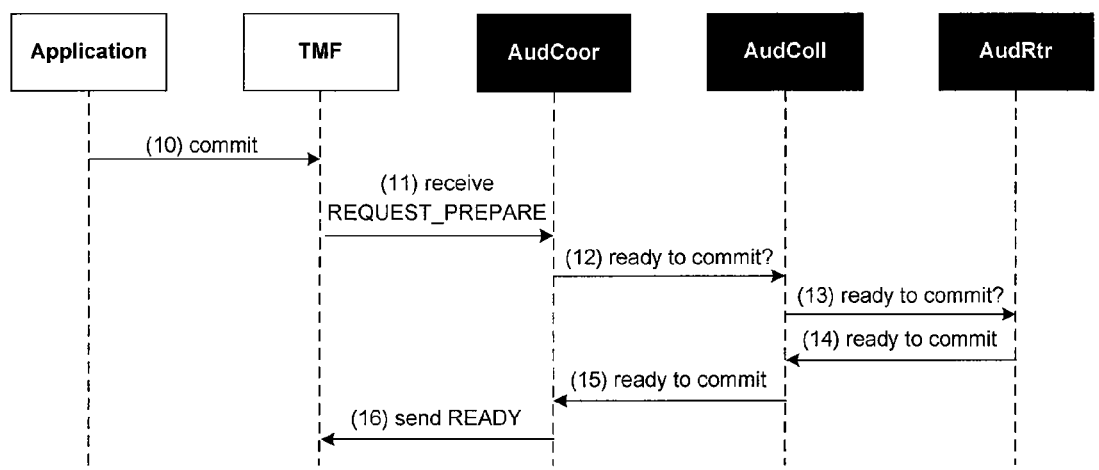
Figure 40- Committing a Transaction- Phase 1

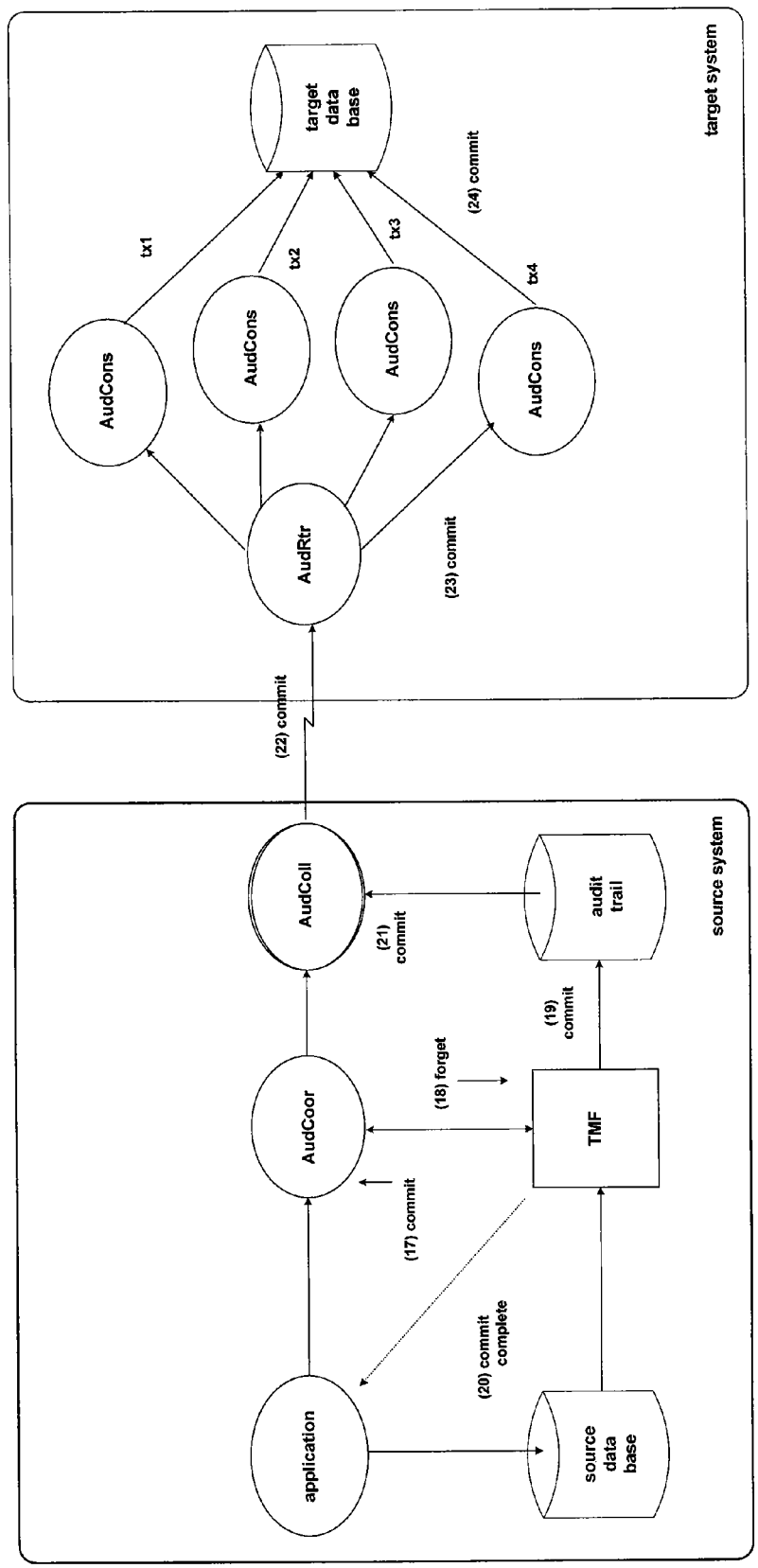
Figure 41- Committing a Transaction- Phase 2

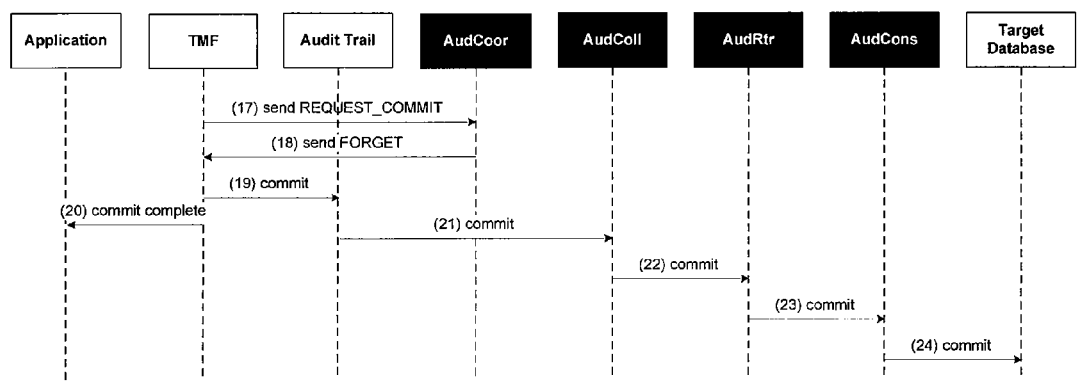
Figure 42- Committing a Transaction- Phase 2

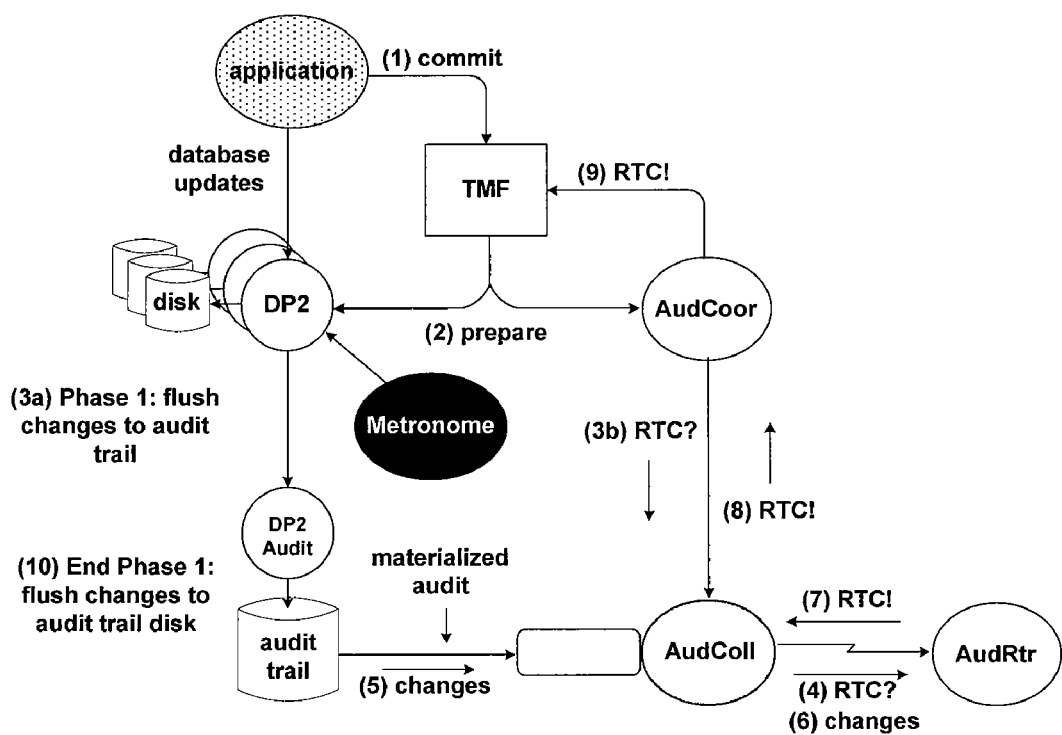
Figure 43- Shadowbase Plus SR Transaction Voting

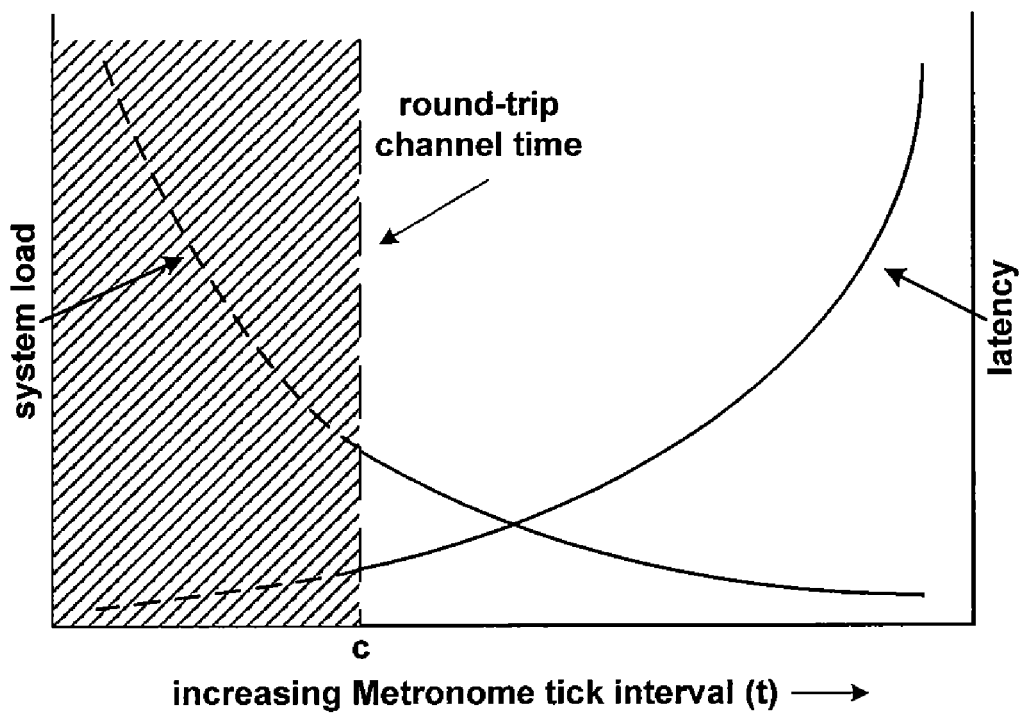
Figure 44- Metronome load/latency Tradeoff

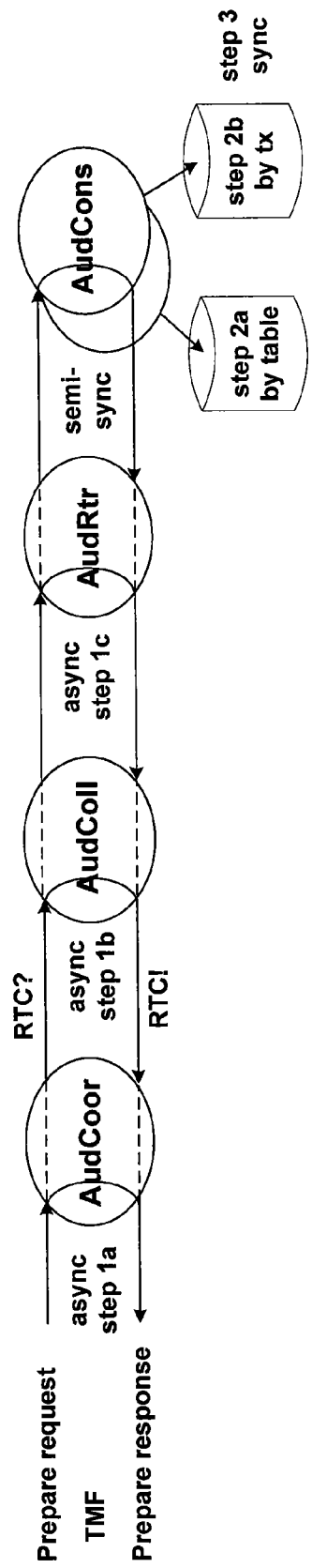
Figure 45- Replication Recovery Modes

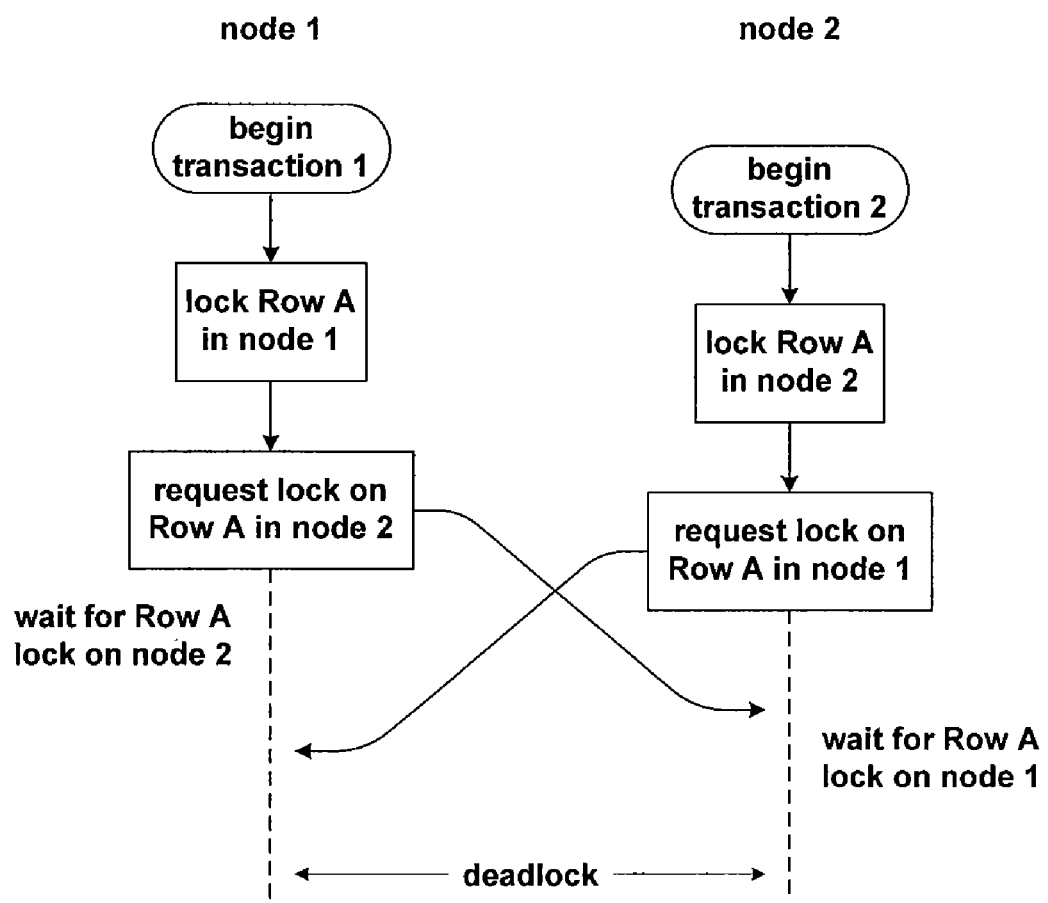
Figure 46- Distributed Deadlock

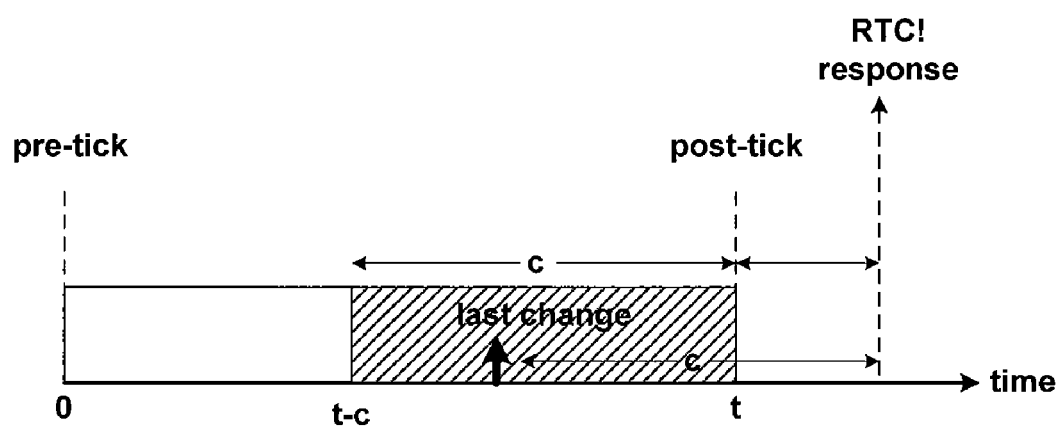
Figure 47- Application Latency (1) for t > c

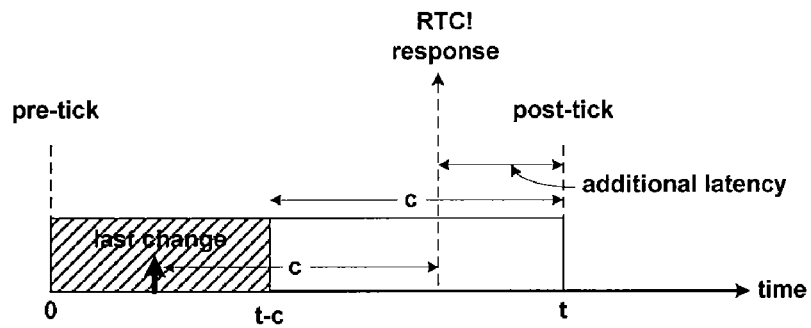
Figure 48- Application Latency (2) for t > c
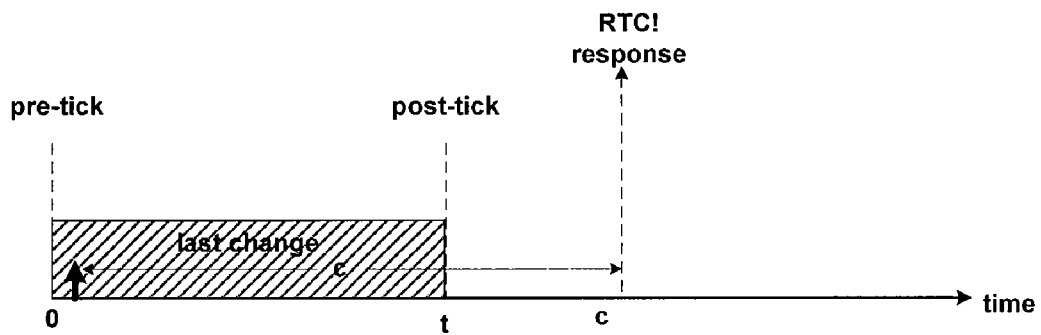
Figure 49- Application Latency for t < c

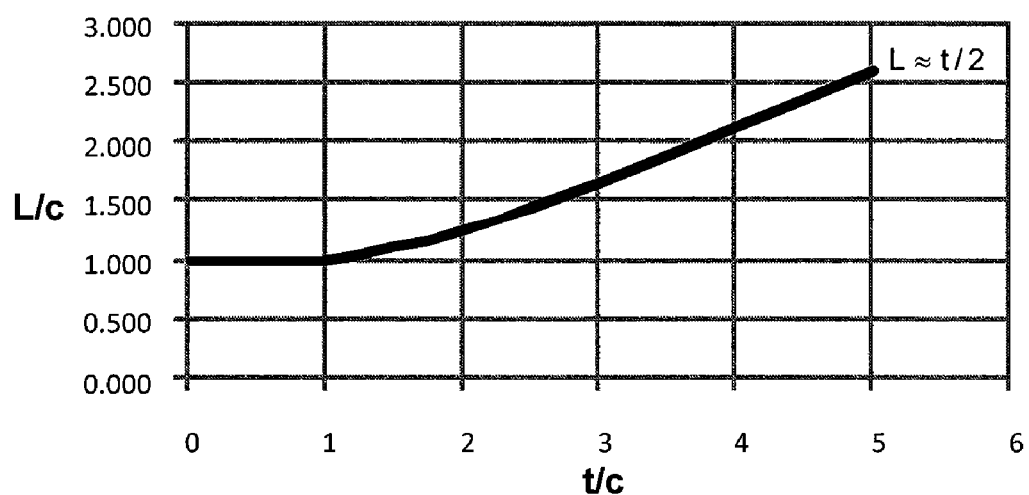
Figure 50- Application Latency L as a Function of Round Trip Time t

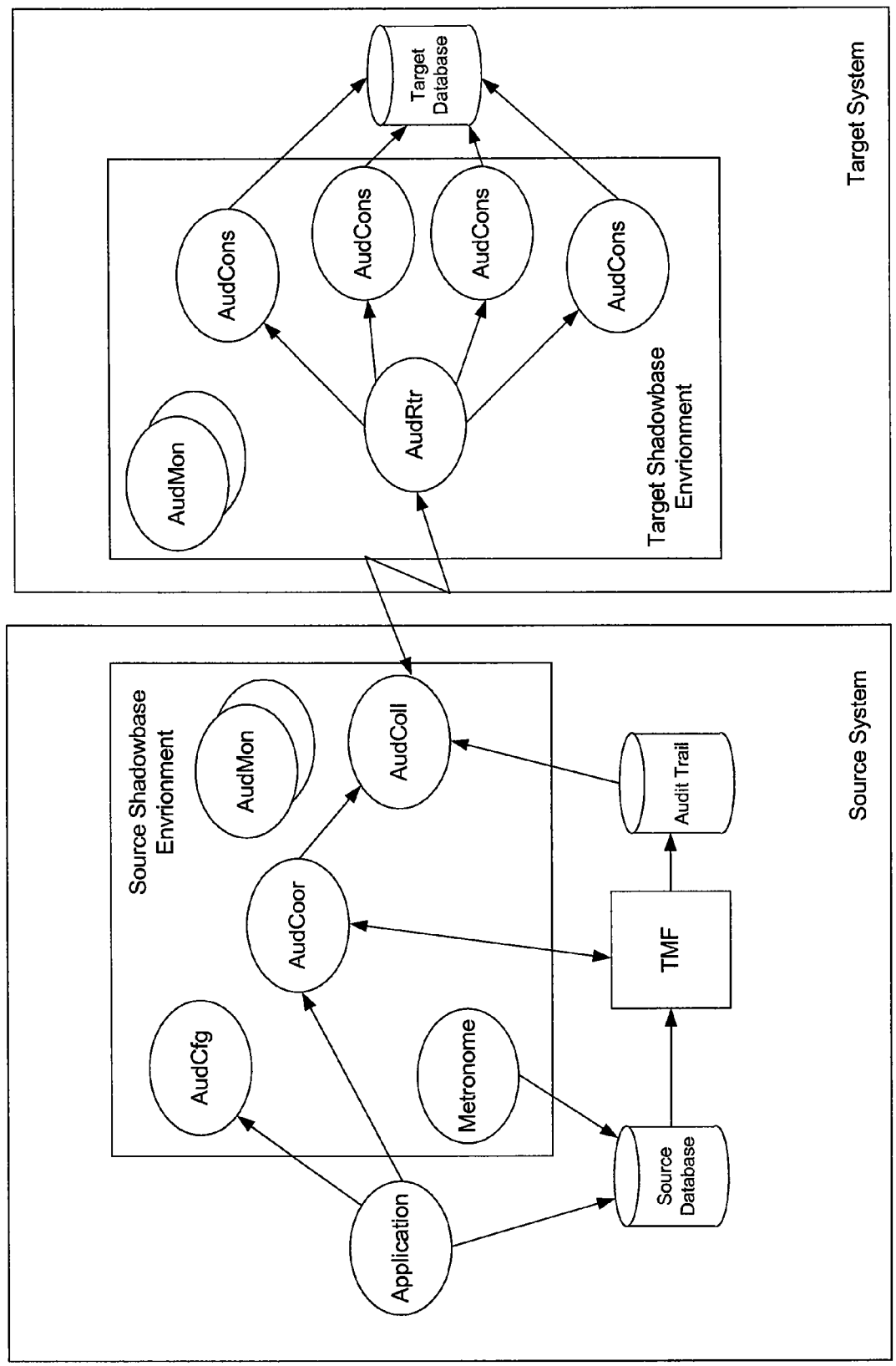
Figure 51- High Level Architecture

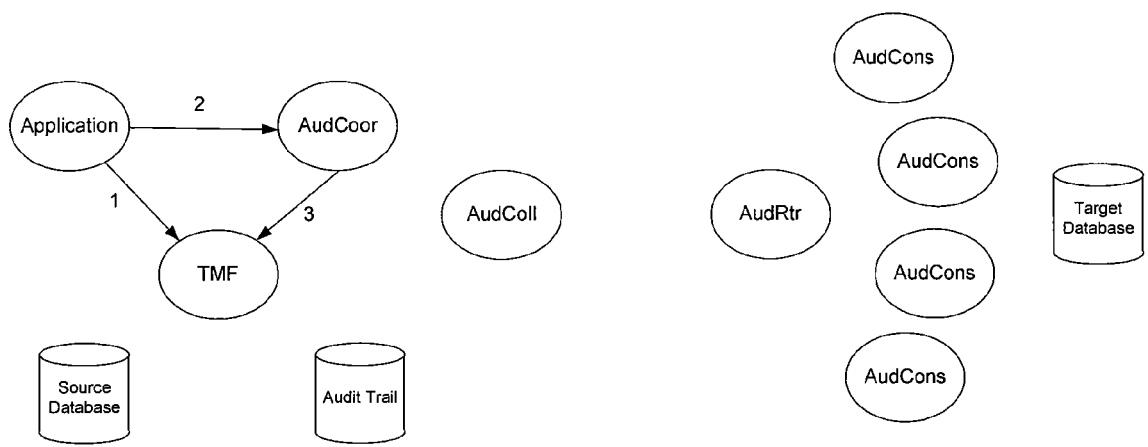
Figure 52- Begin Transaction Processing

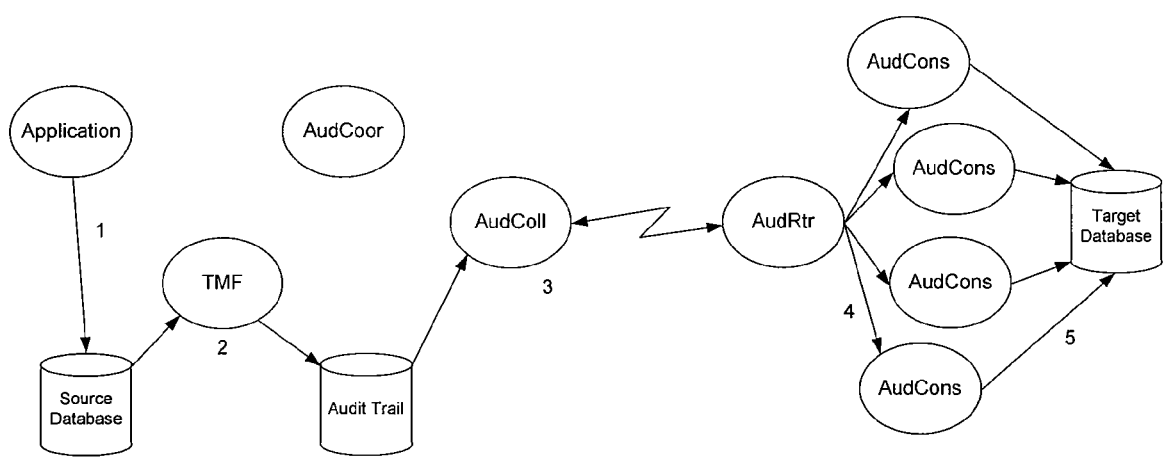
Figure 53- Data Replication

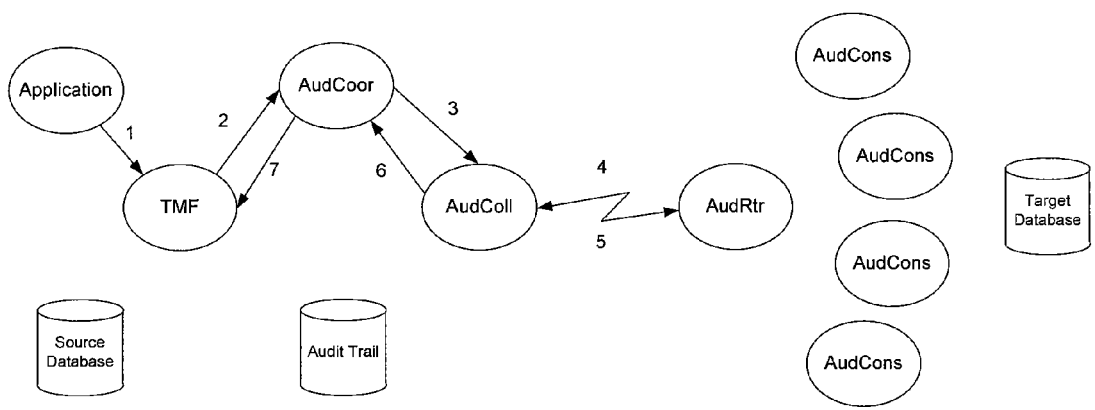
Figure 54- Commit Request Processing

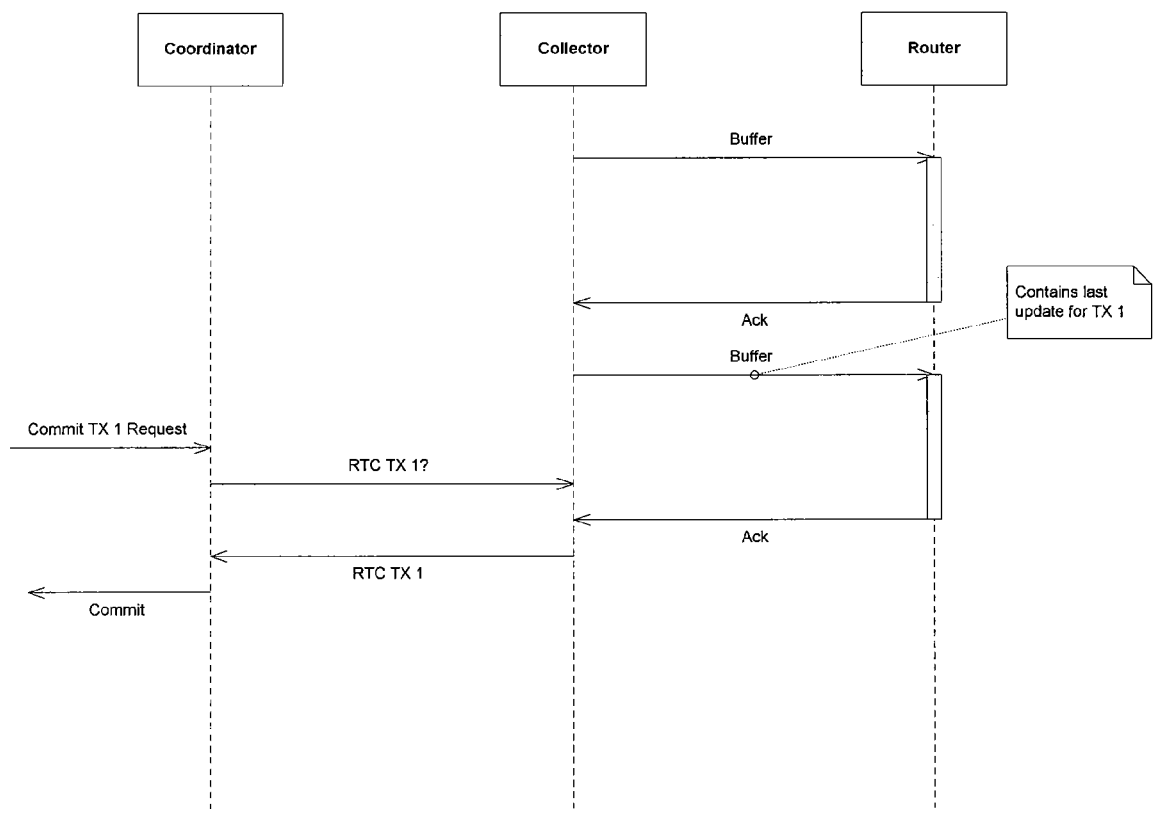
Figure 55- Commit Request Processing Using Buffer ACKs

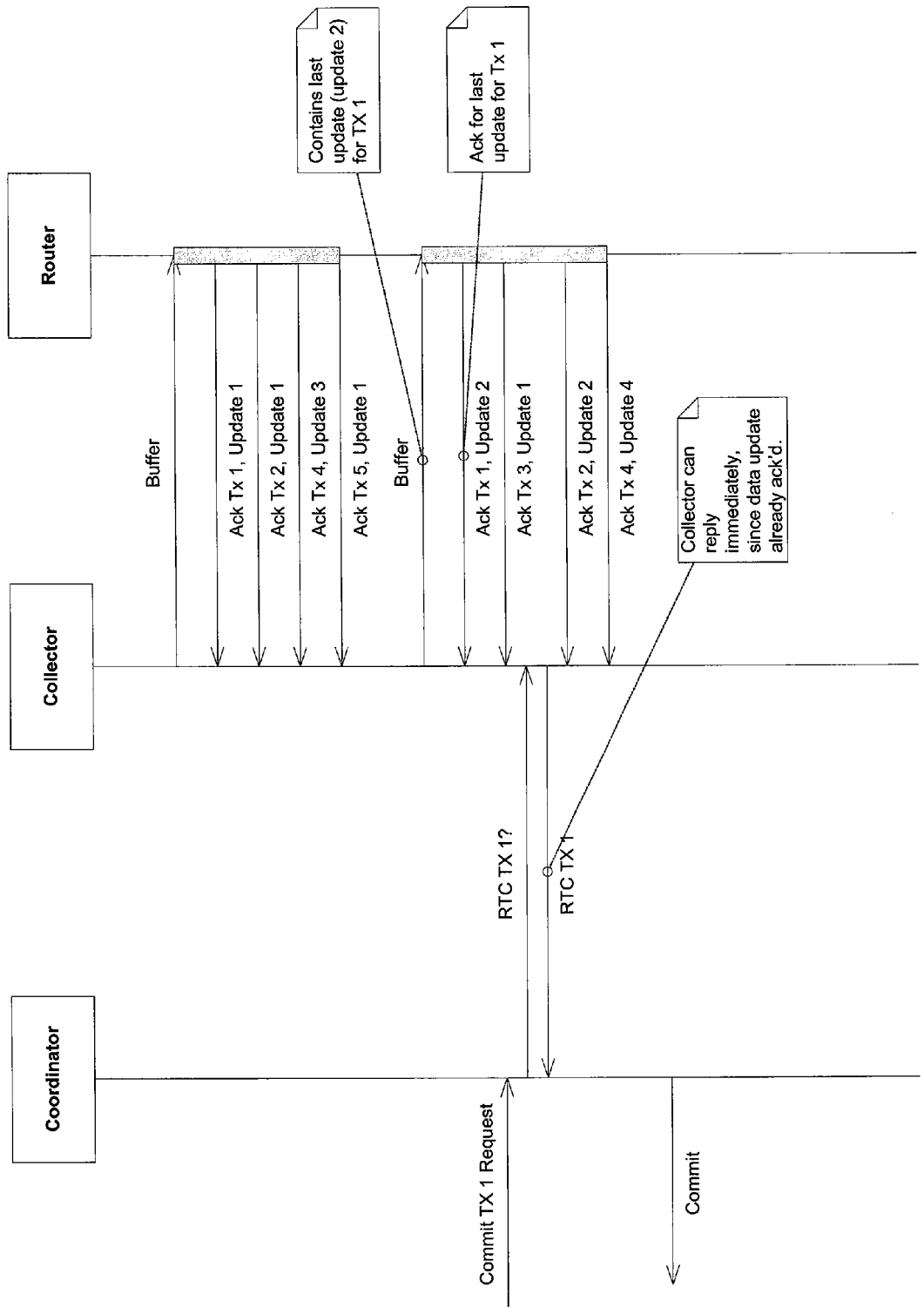
Figure 56- Commit Request Processing Using Data Update ACKs

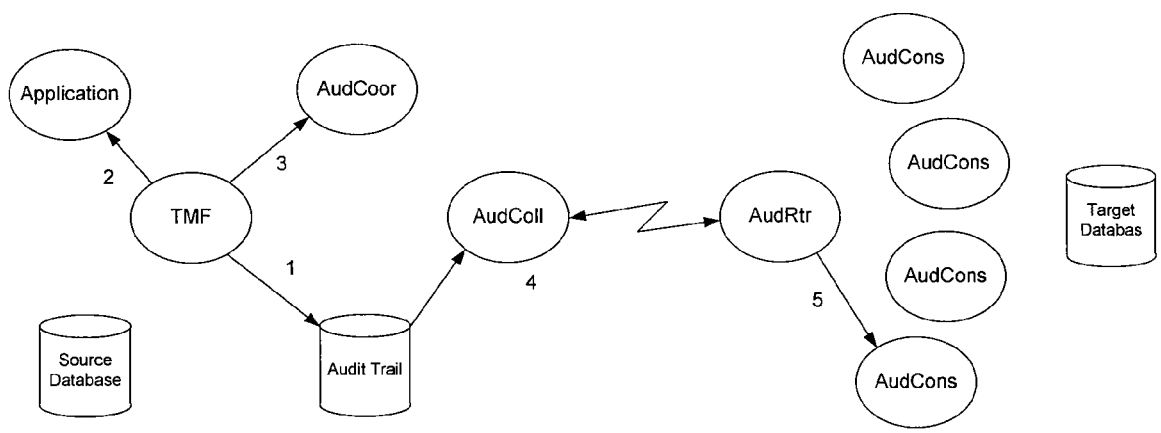
Figure 57- Commit Processing

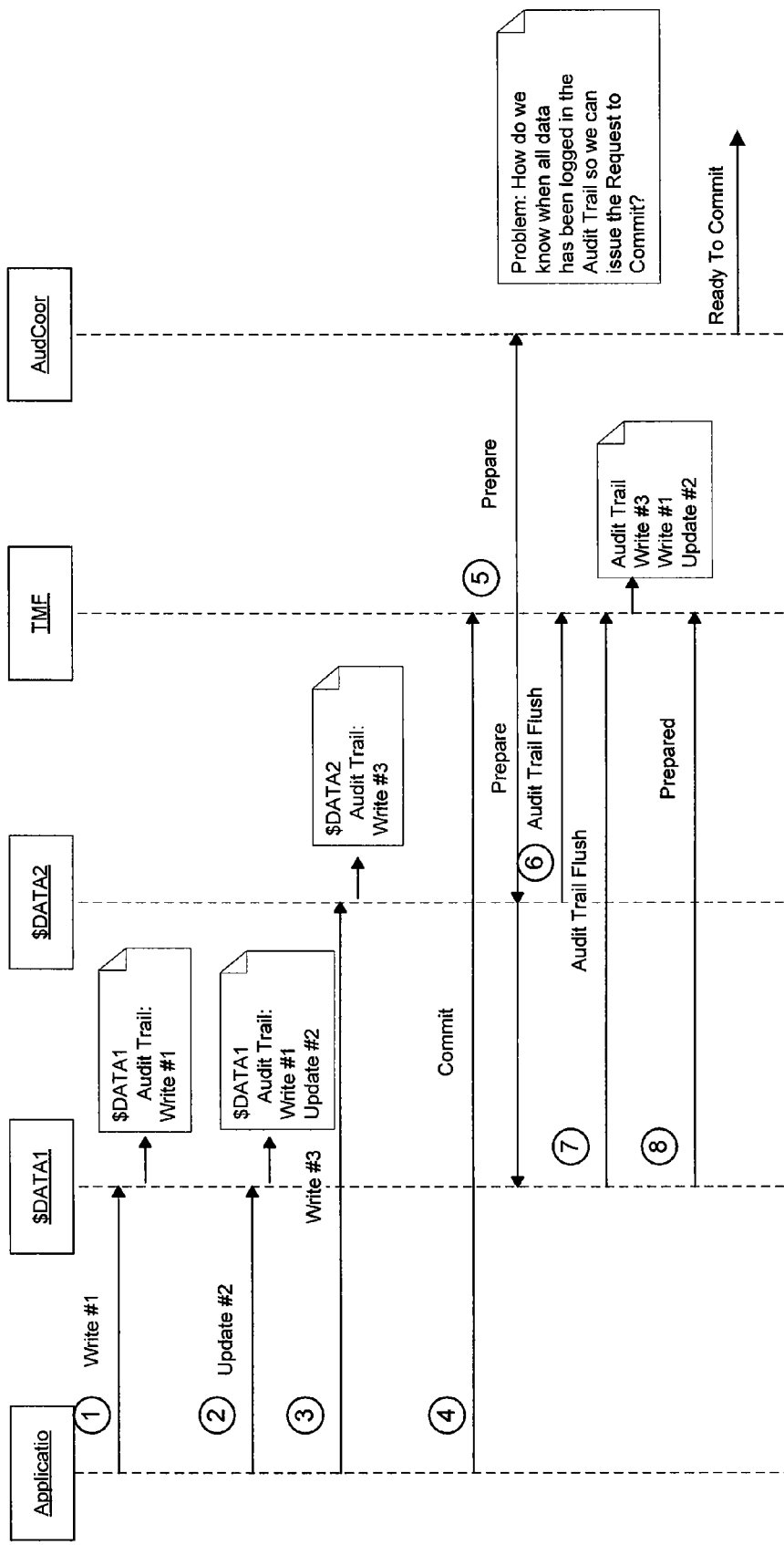
Figure 58- Synchronizing the RTC

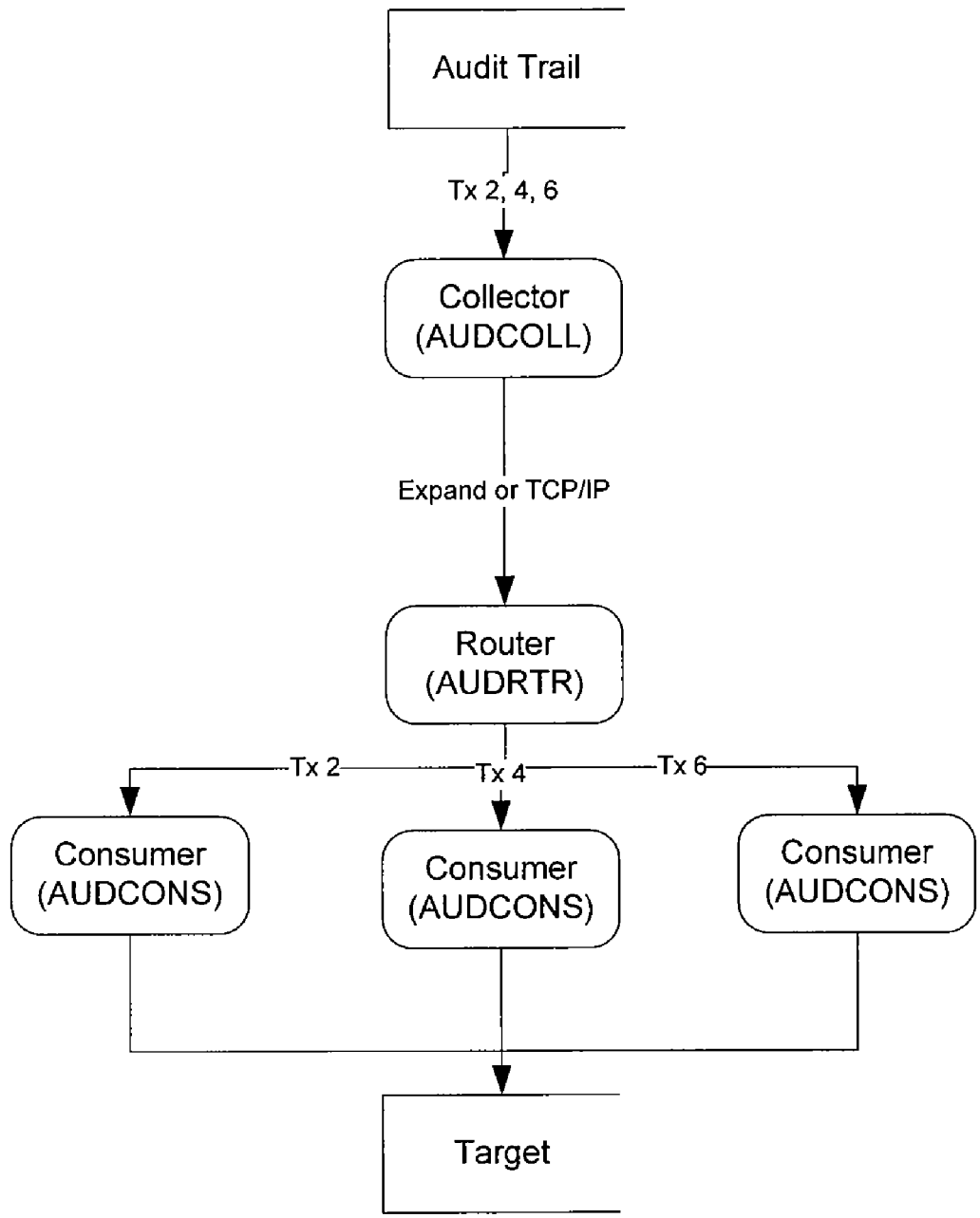
Figure 59- Source and Destination Routing

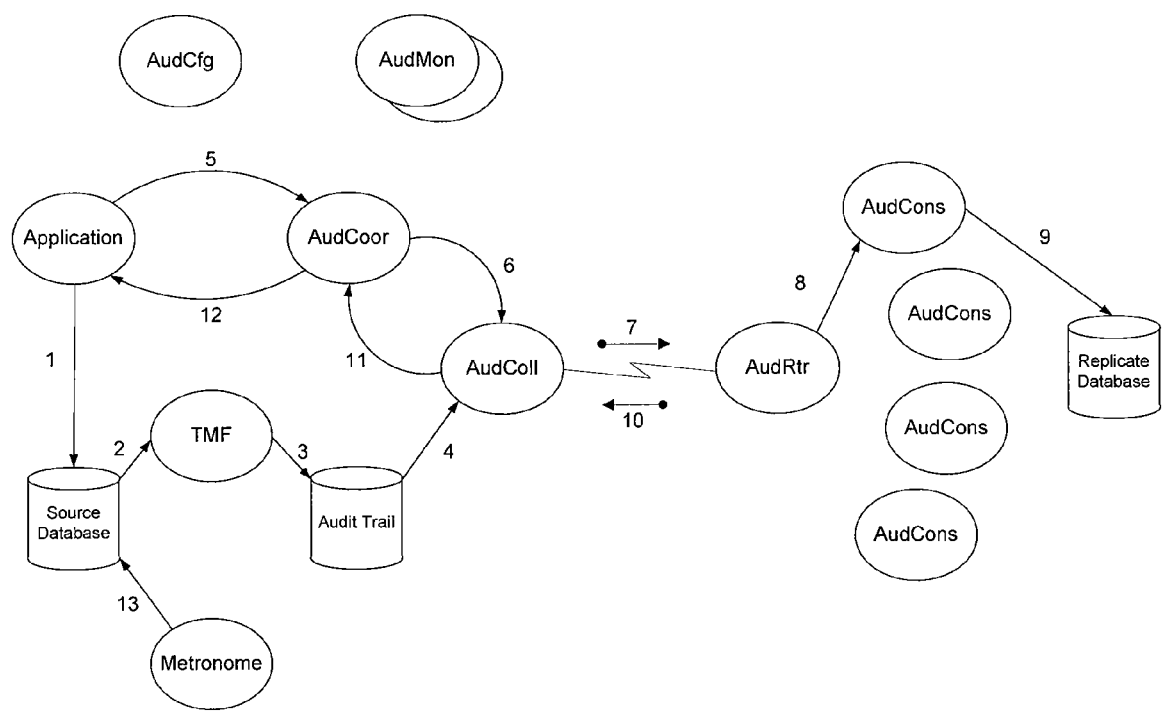
Figure 60- Application Generated RTS

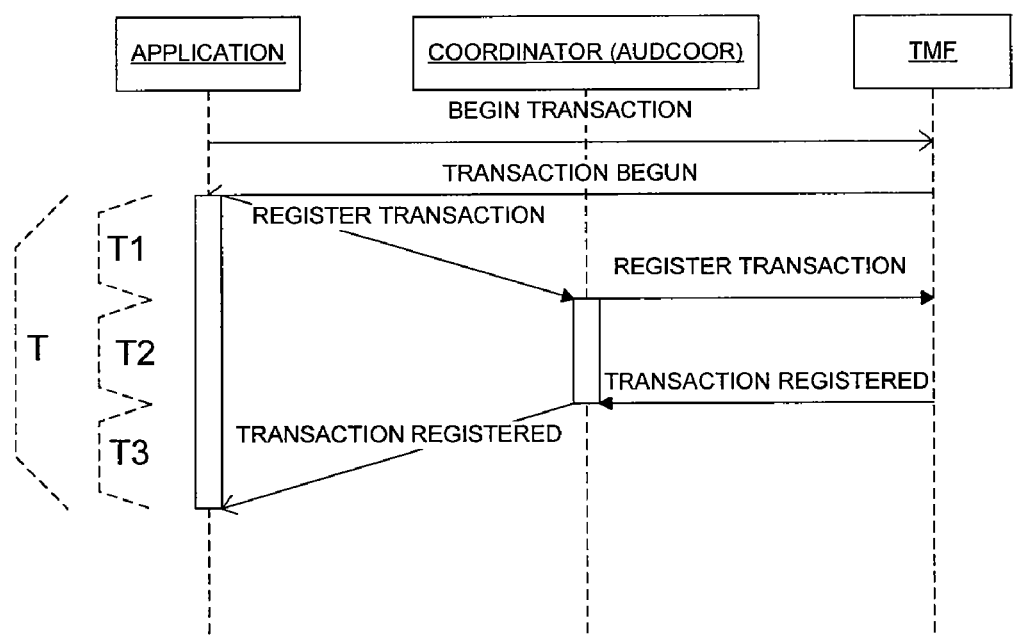
Figure 61- Transaction Registration Latency

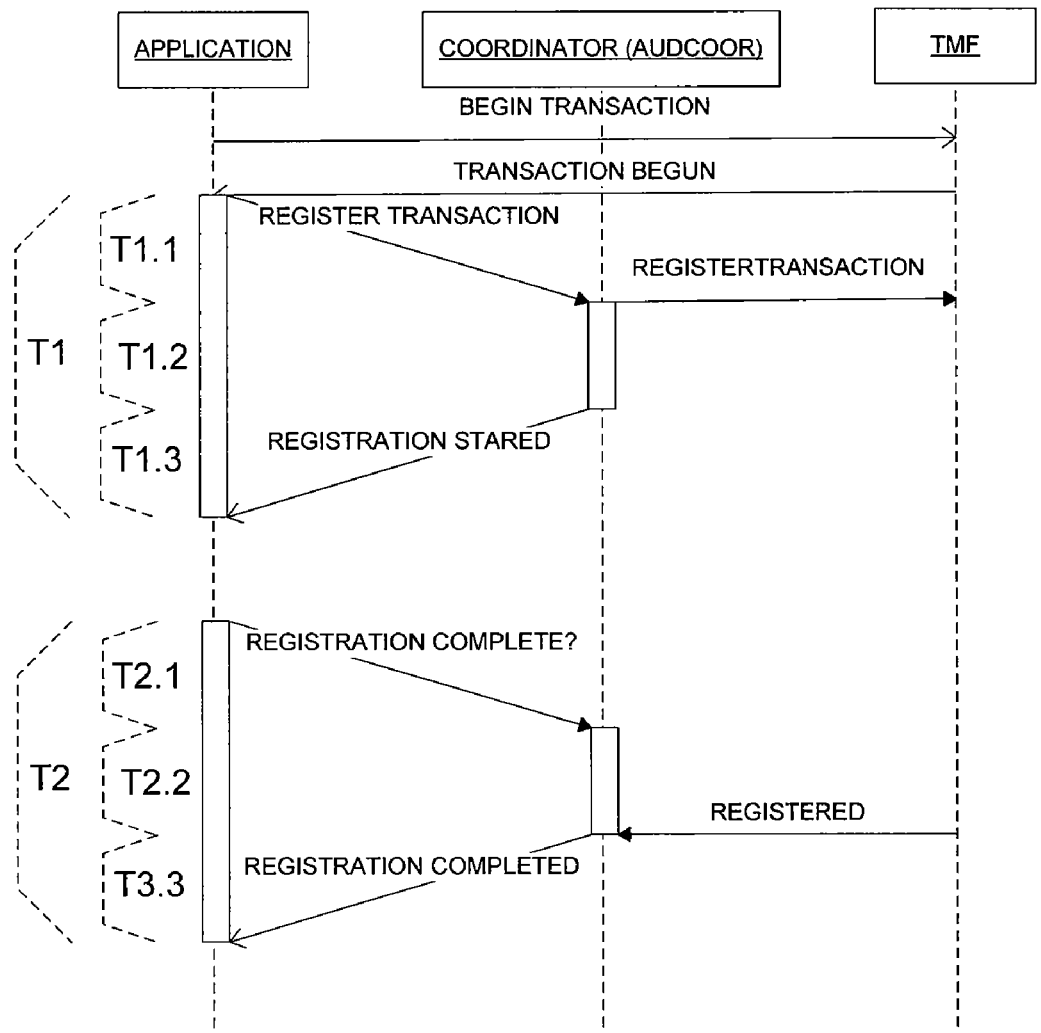
Figure 62- Asynchronous Registration Latency

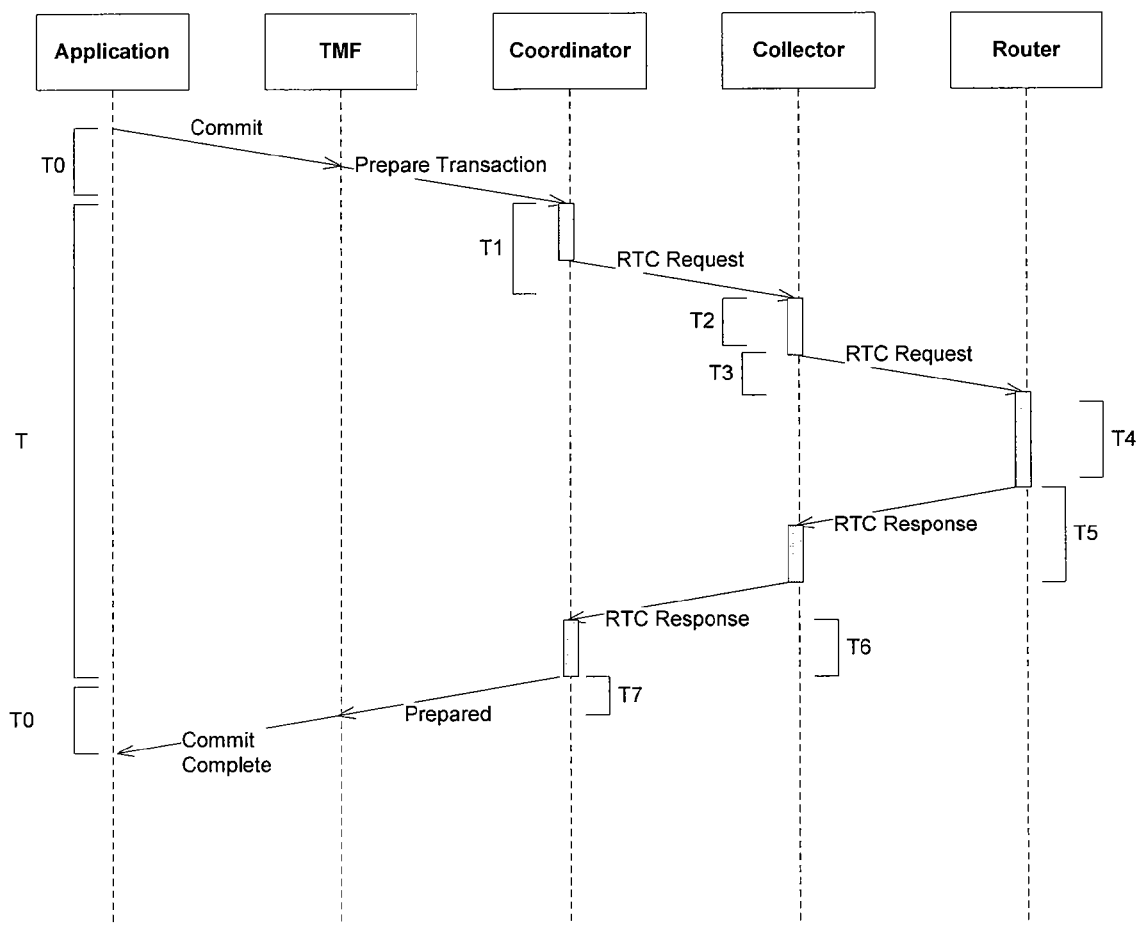
Figure 63- Commit Latency

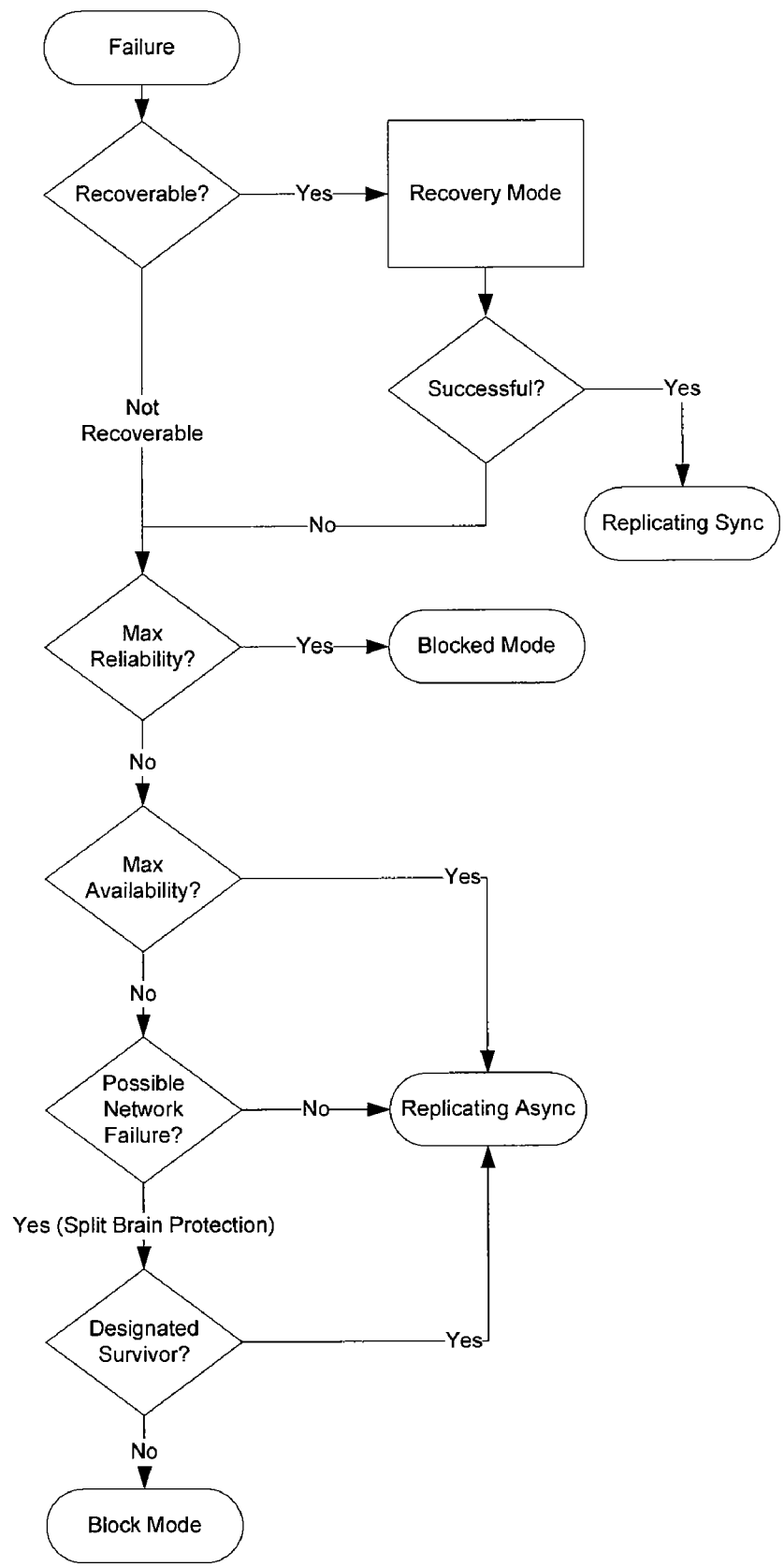
Figure 64- Failure Flow Chart

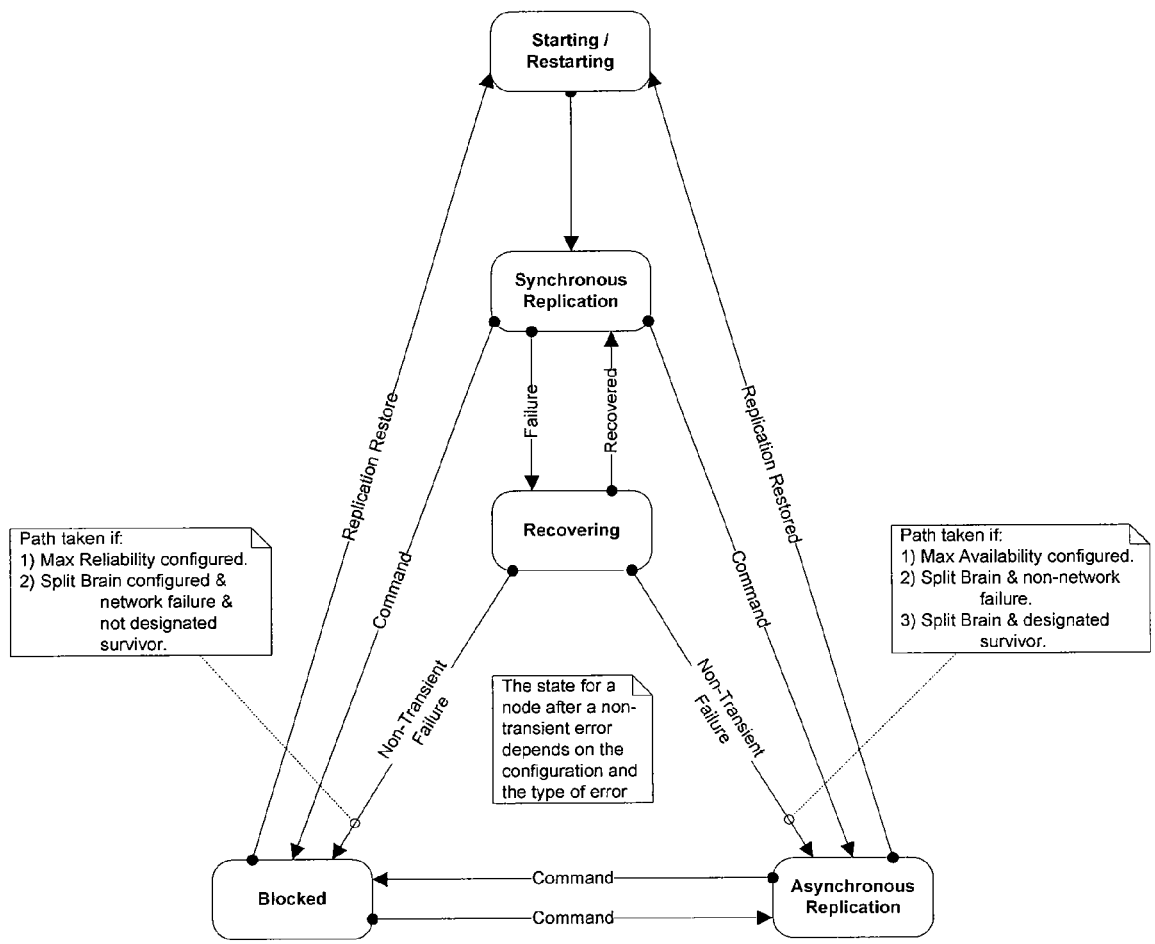
Figure 65- Synchronous Replication State Diagram

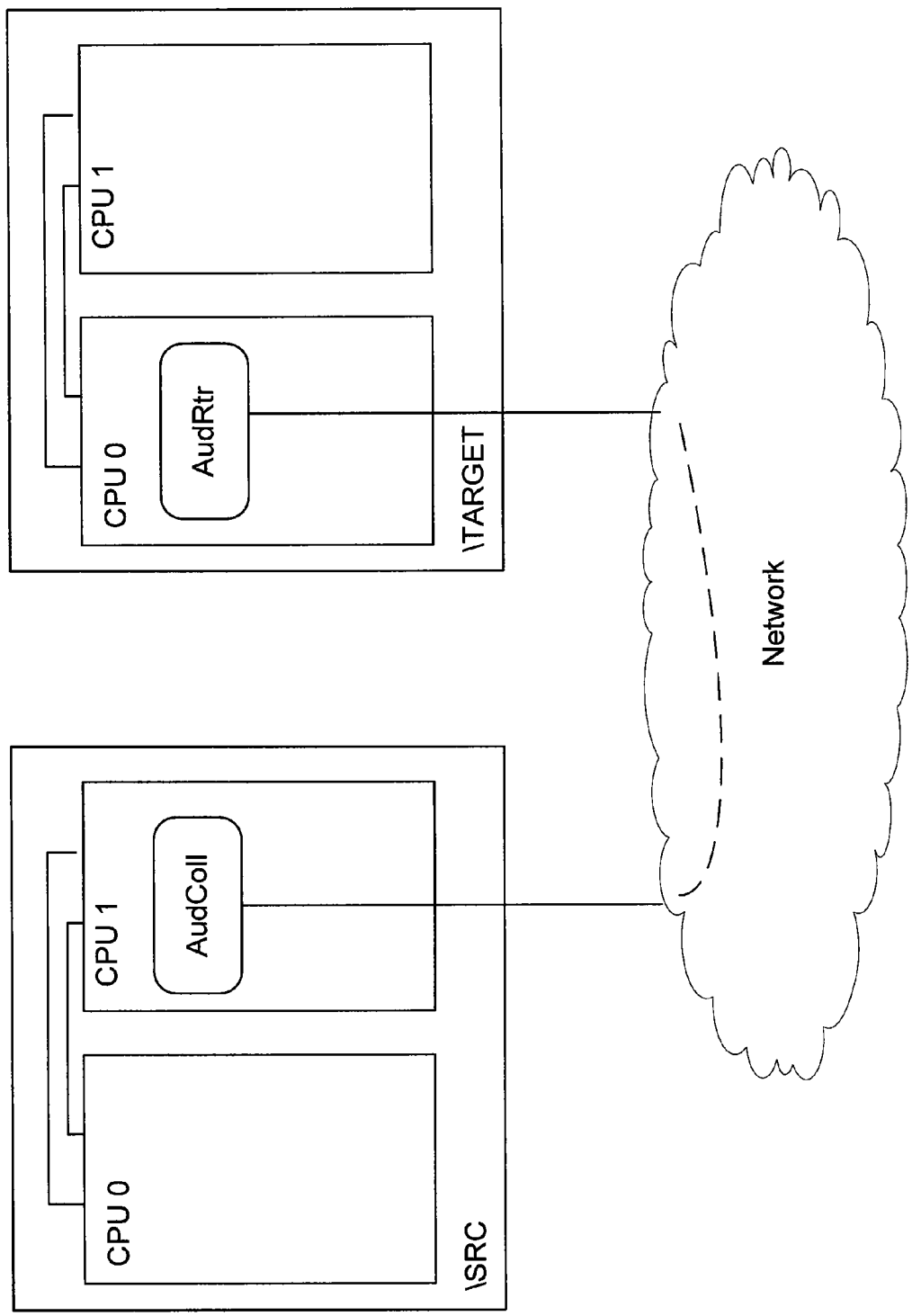
Figure 66- AUDCOLL/AUDRTR Connection

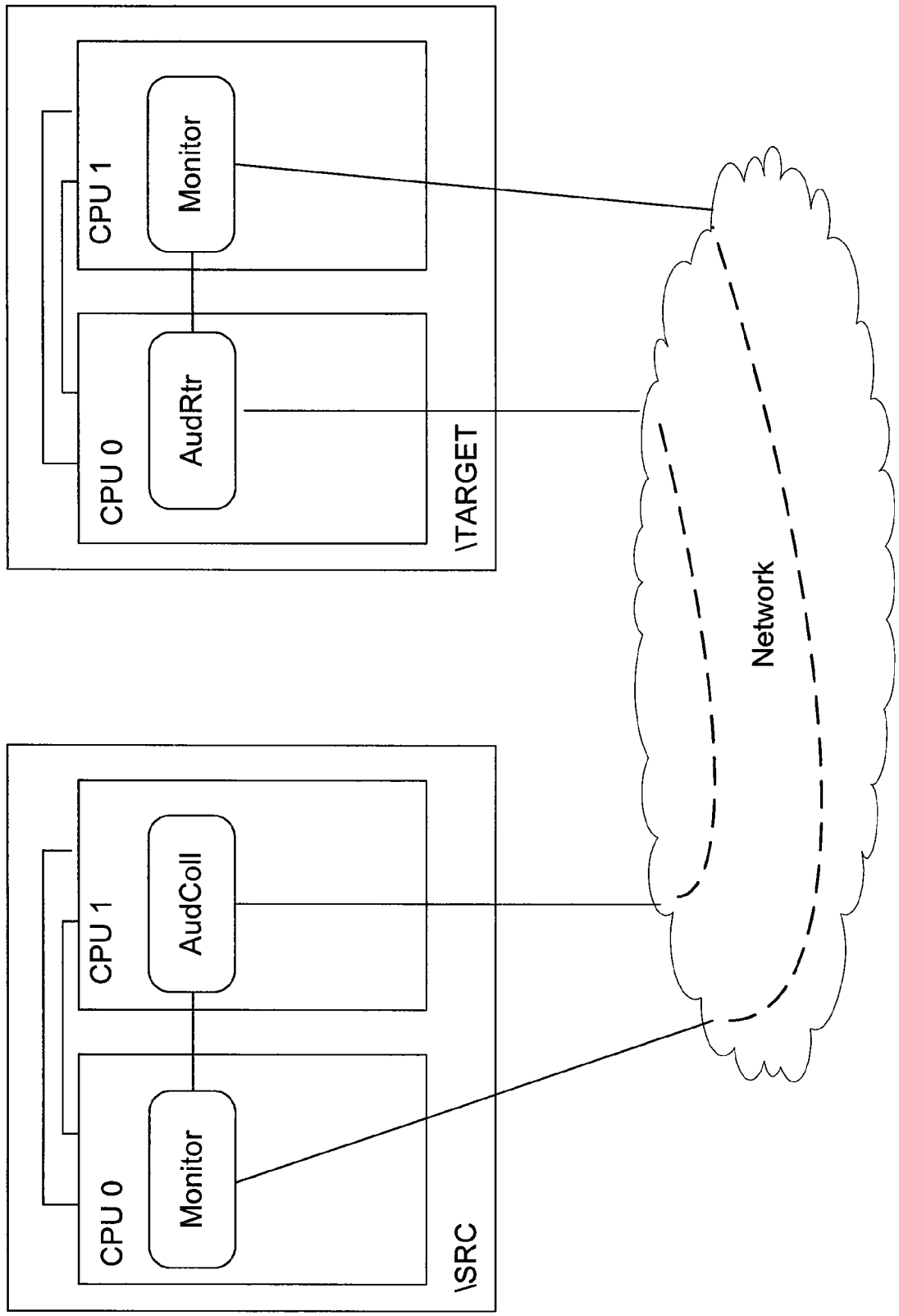

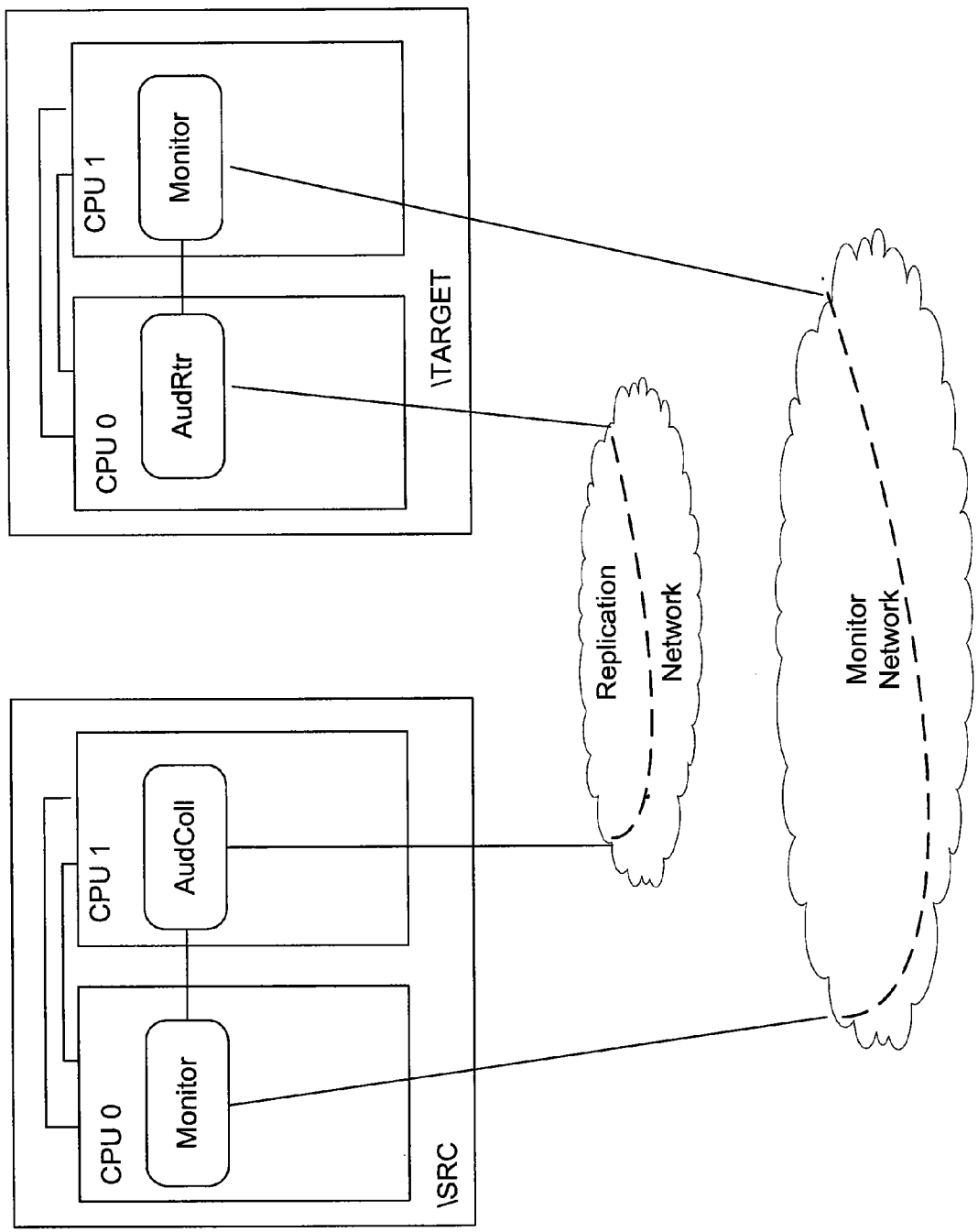
Figure 68- AUDCOLL/AUDRER Connection with Two Networks

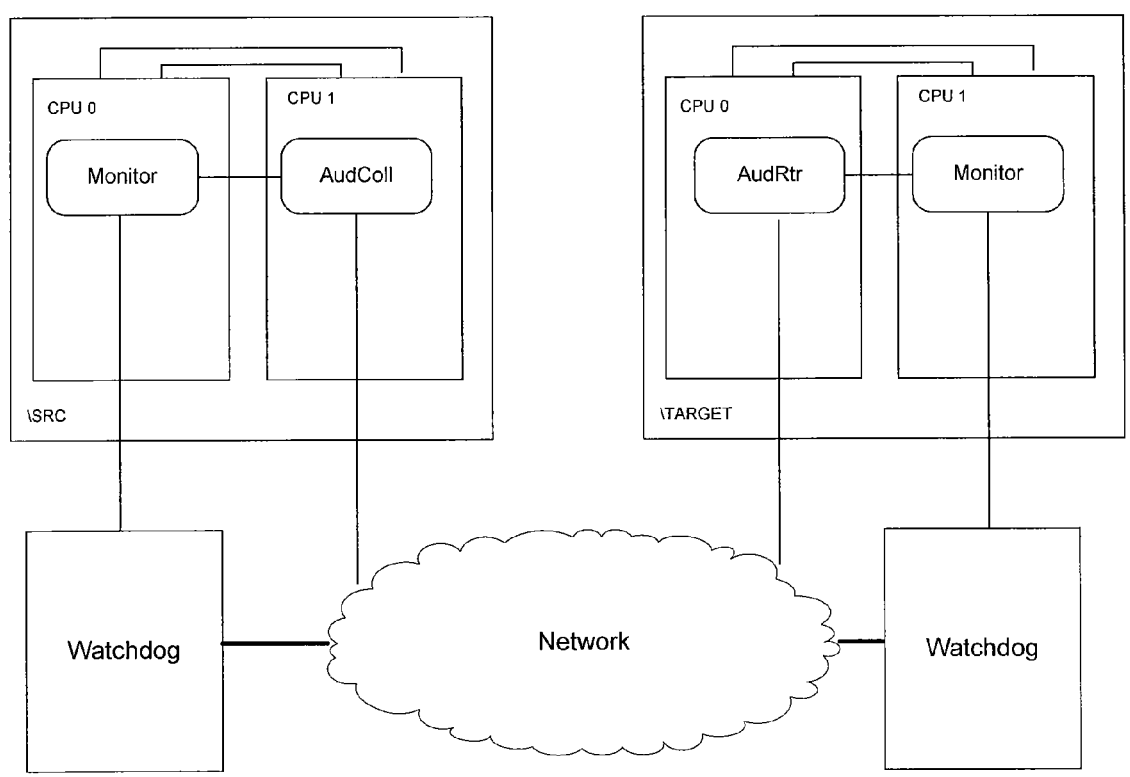
Figure 69- AUDCOLL/AUDRTR Connection with Watchdogs

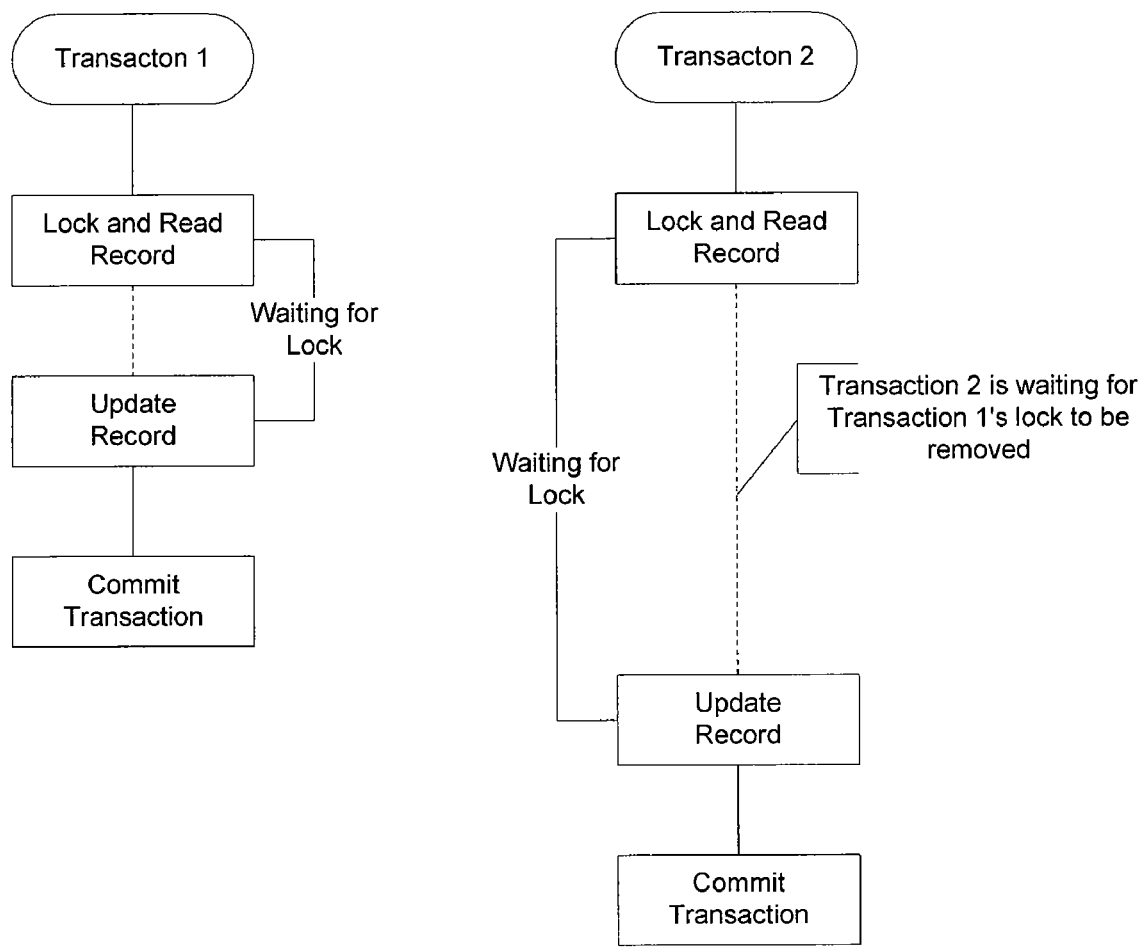
Figure 70- Locking Without Replication

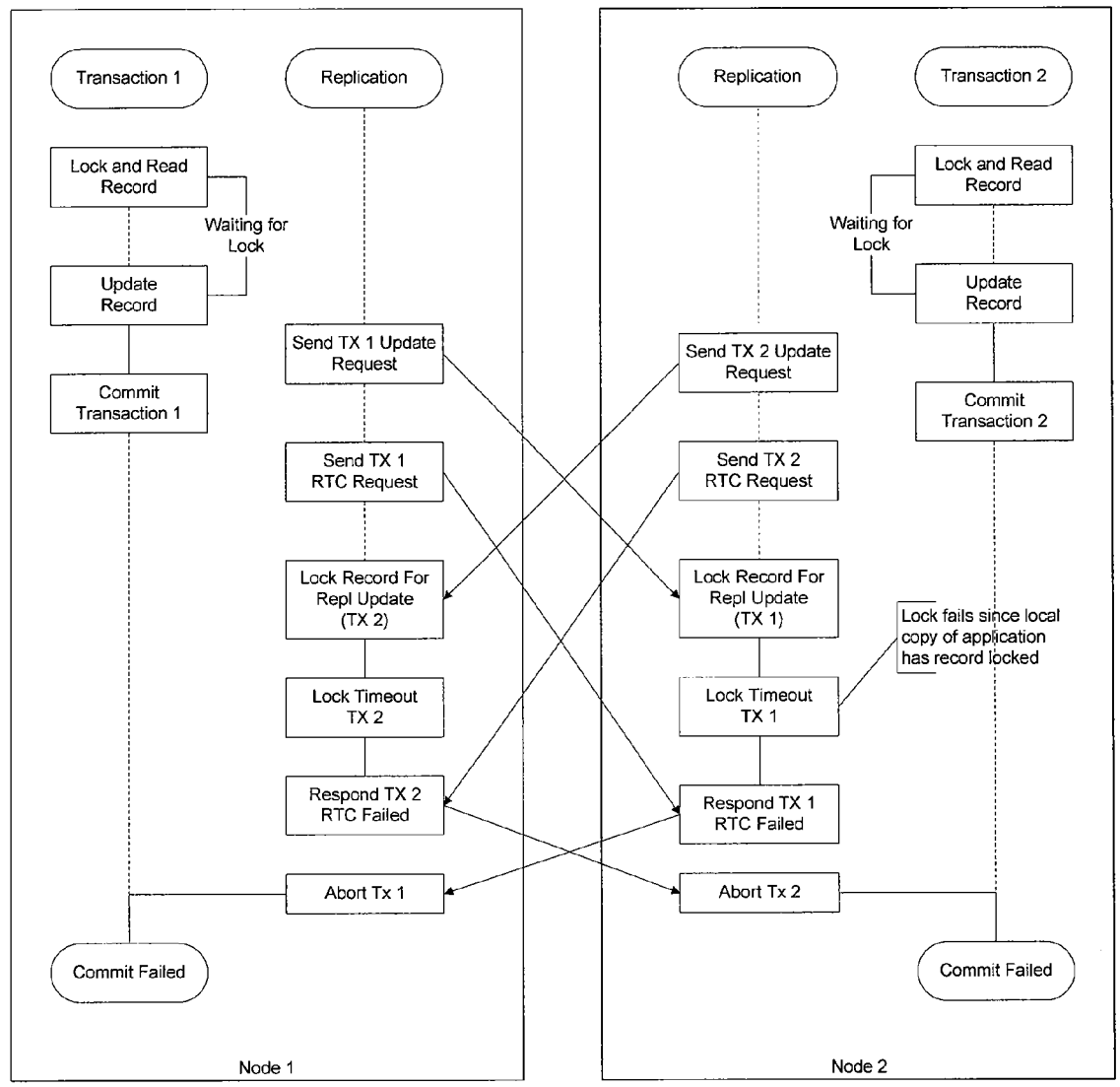
Figure 71- Synchronous Replication Deadlocks

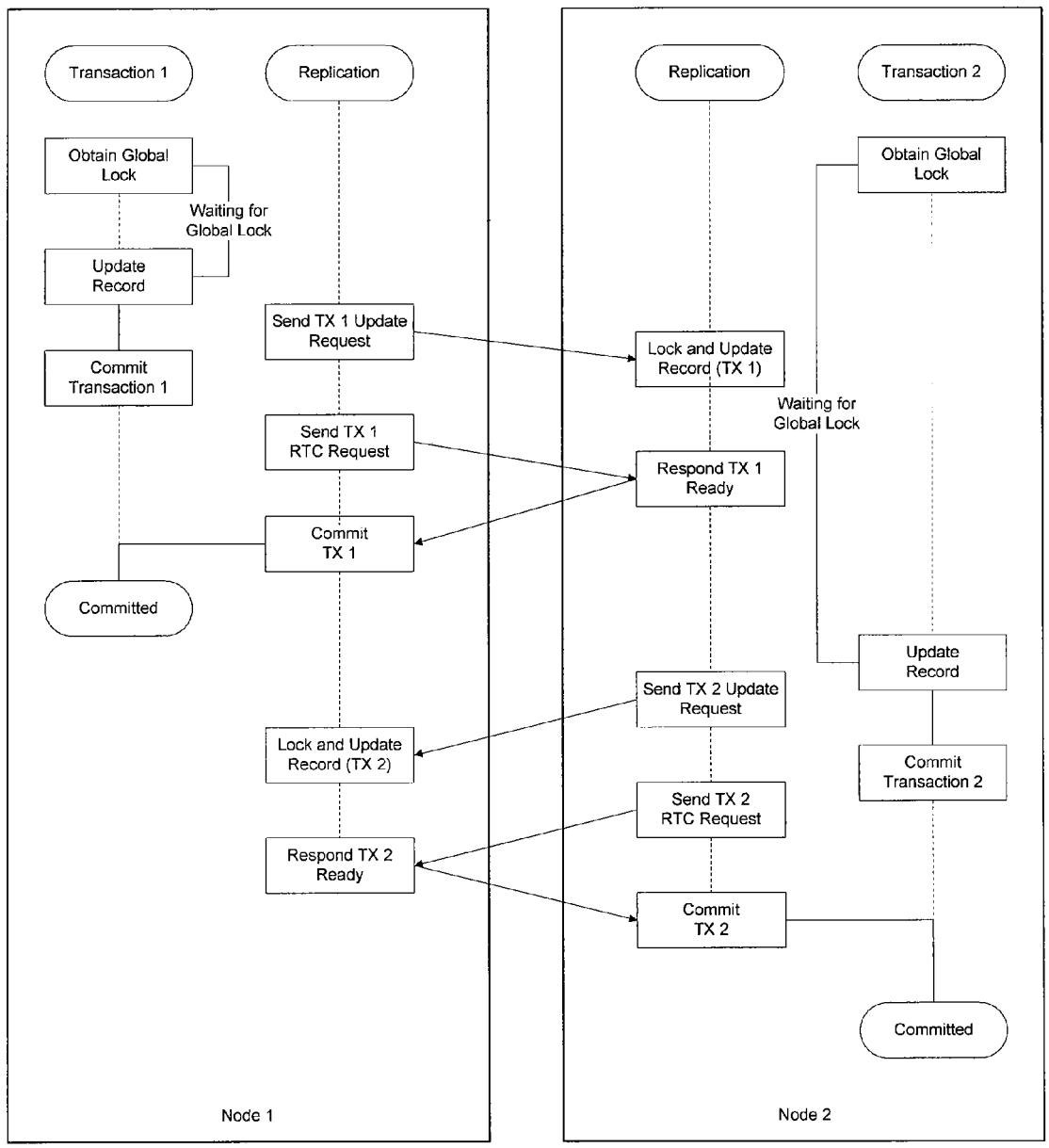
Figure 72- Global Lock

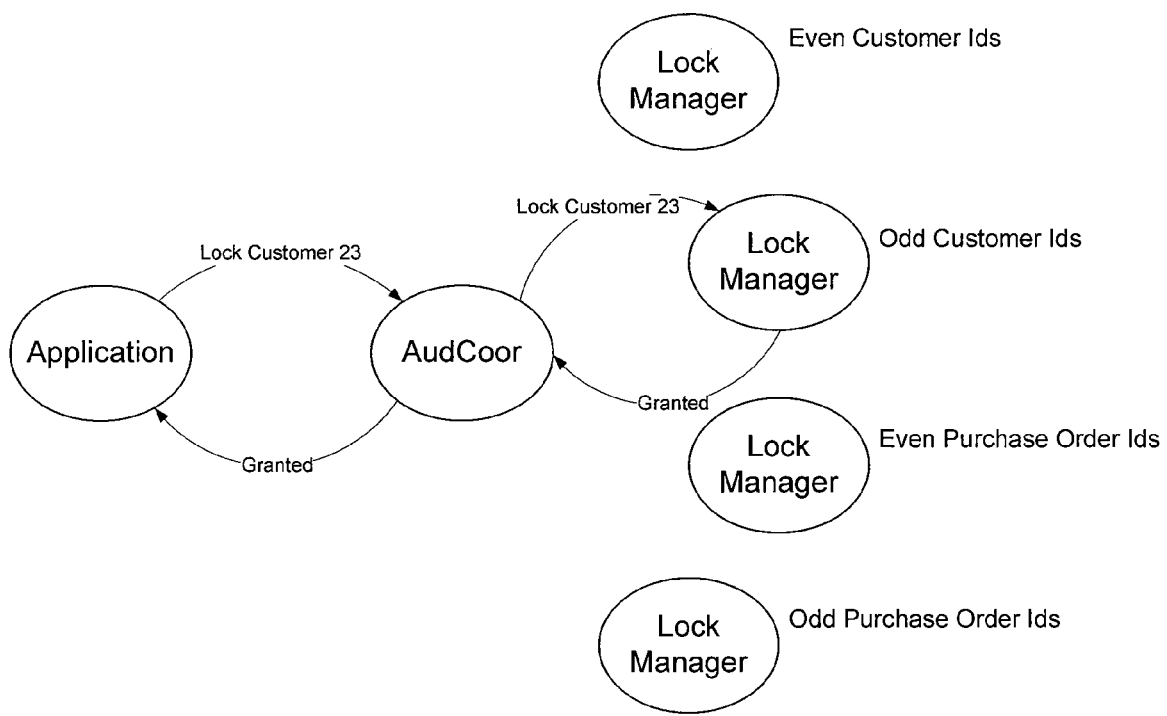
Figure 73- Global Lock Manager

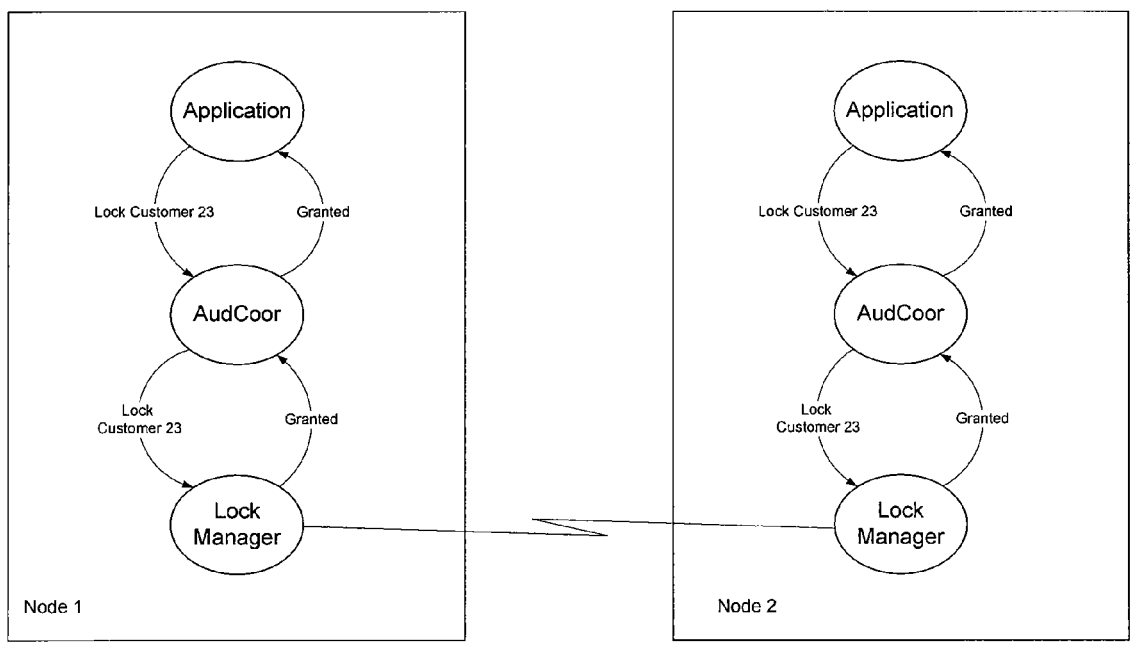
Figure 74- Distributed Lock Manager

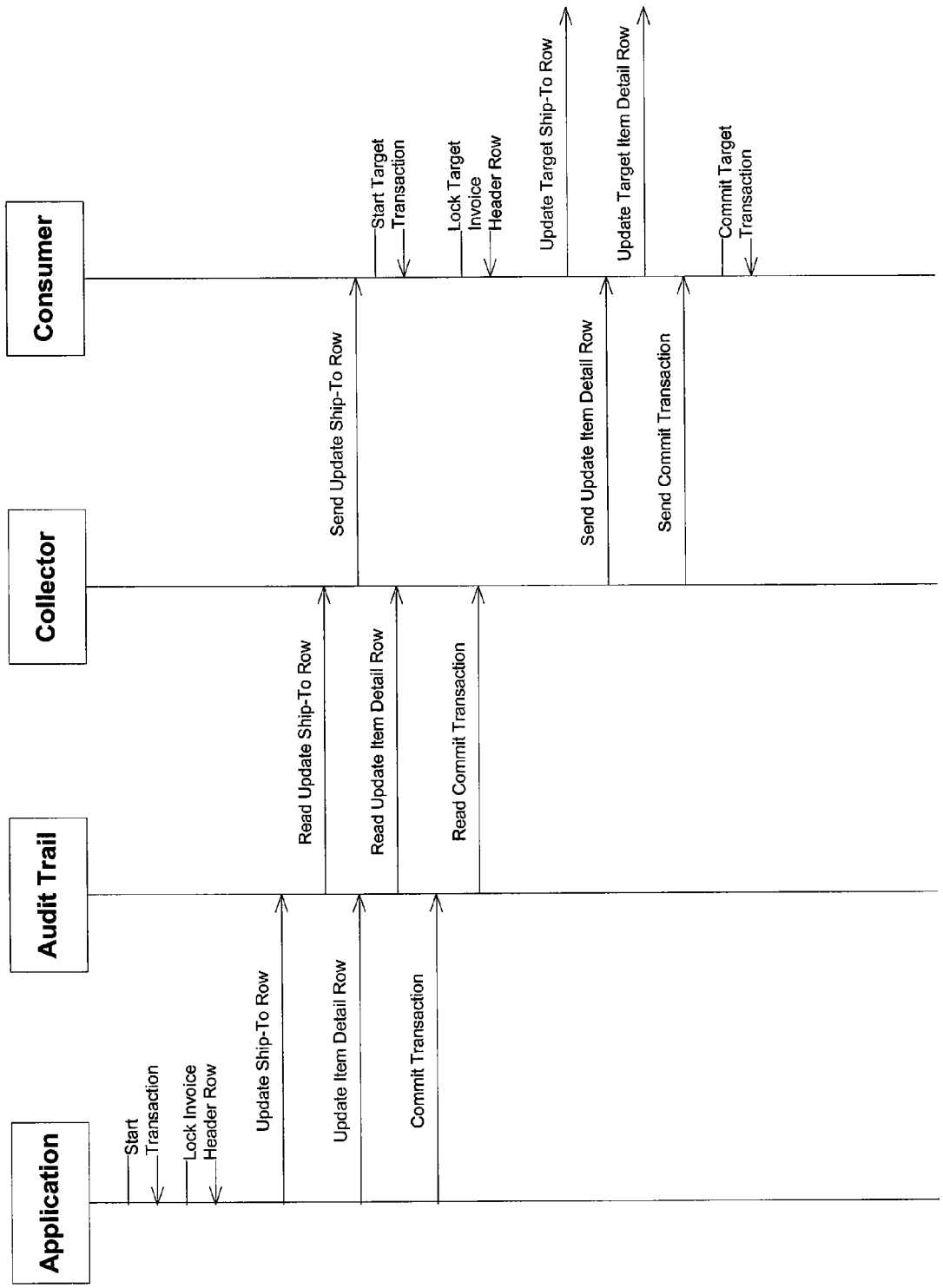
Figure 75- Replicating an Intelligent Locking Protocol

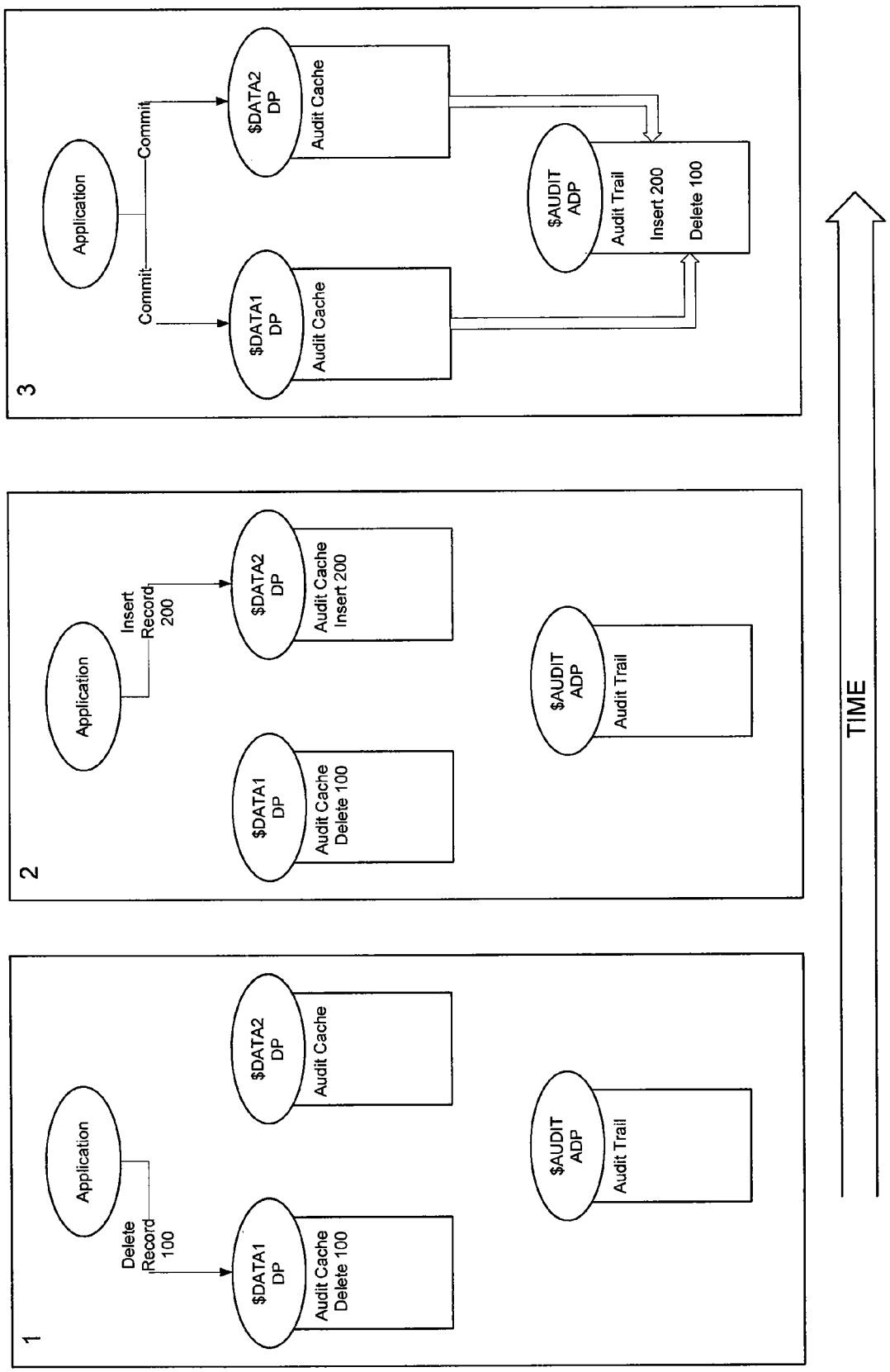
Figure 76- Nondeterministic I/O Ordering (PRIOR ART)

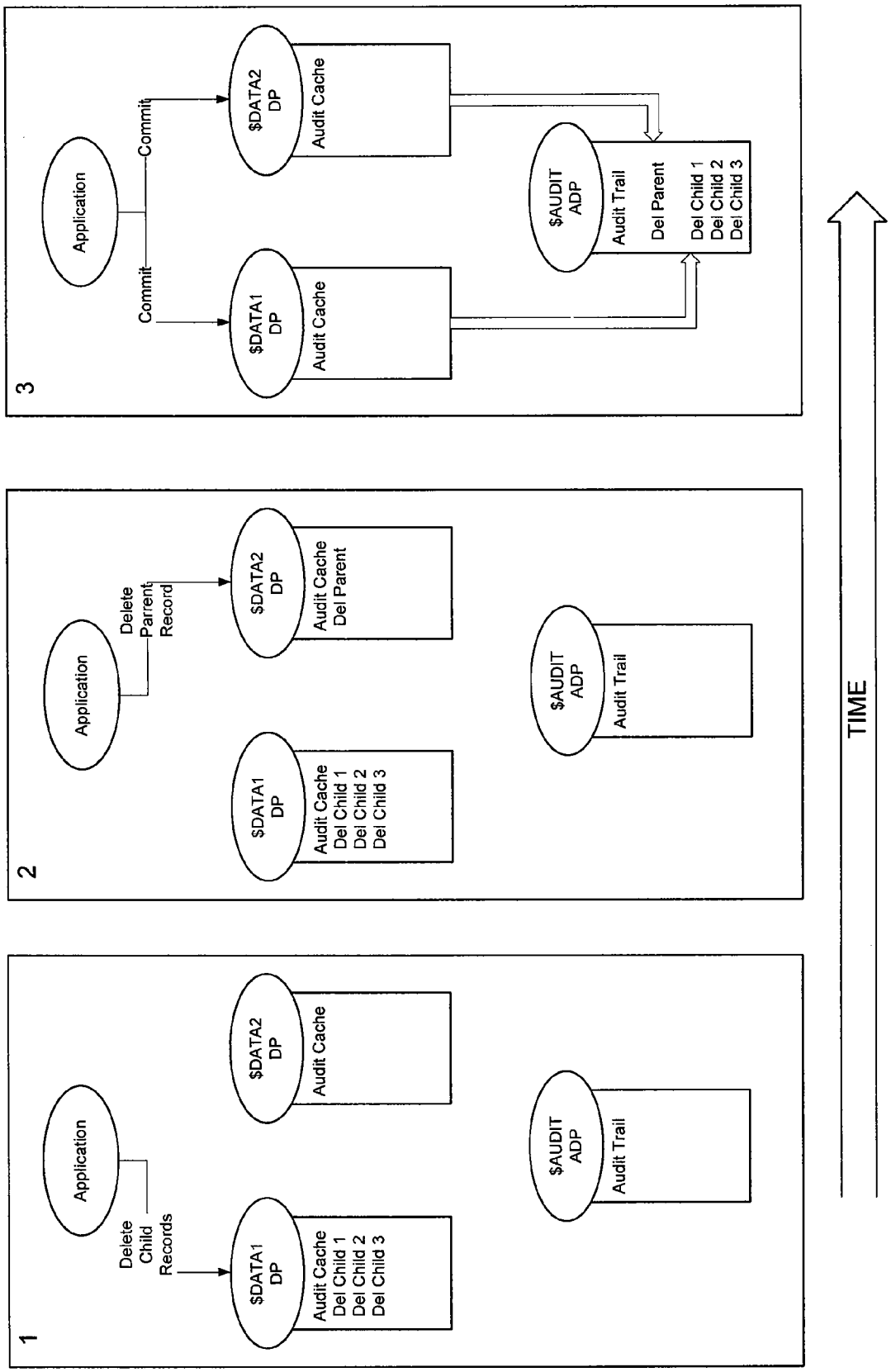
Figure 77 - Parent/Child Ordering (PRIOR ART)

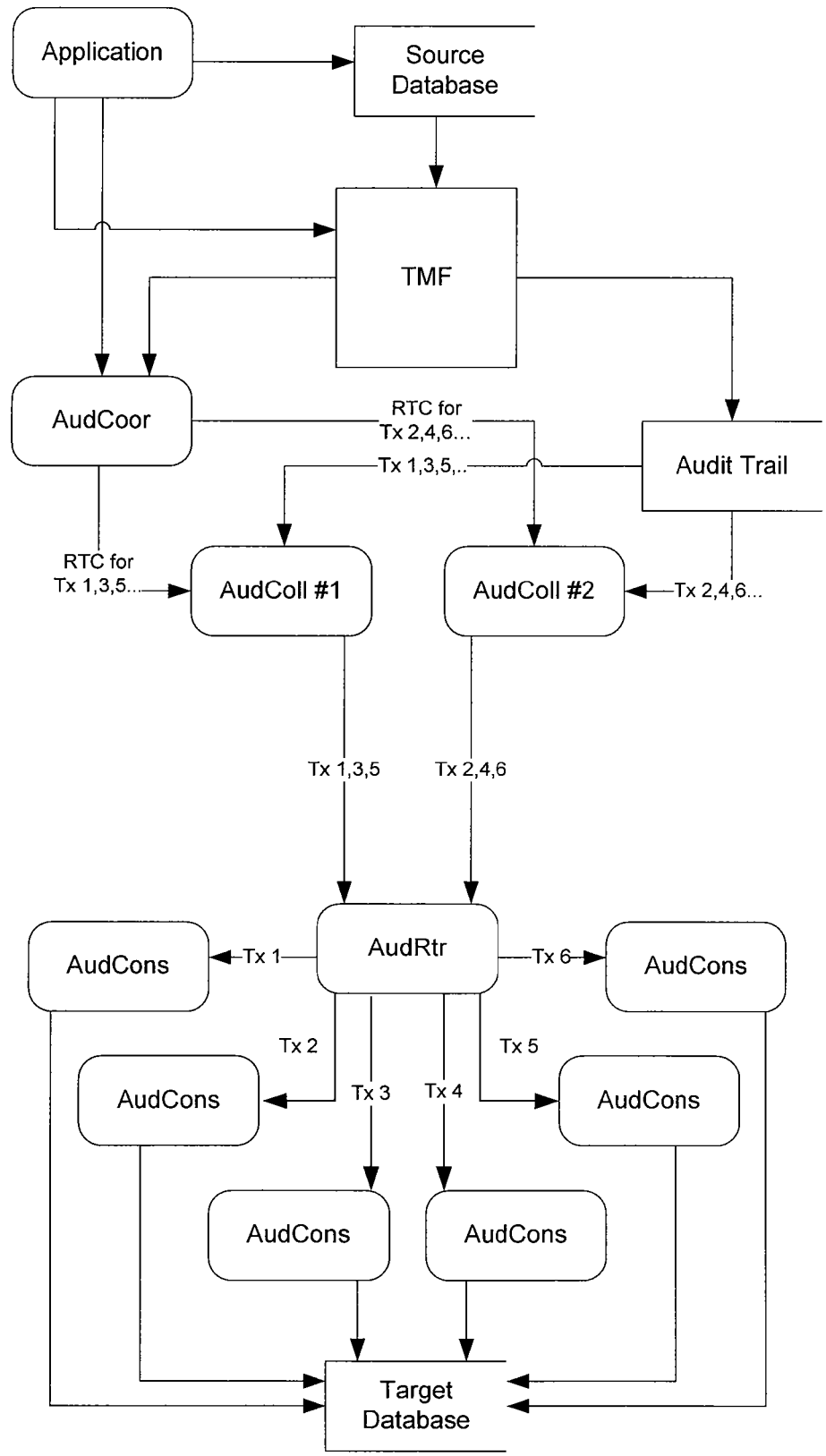
Figure 78- Multiple Collectors

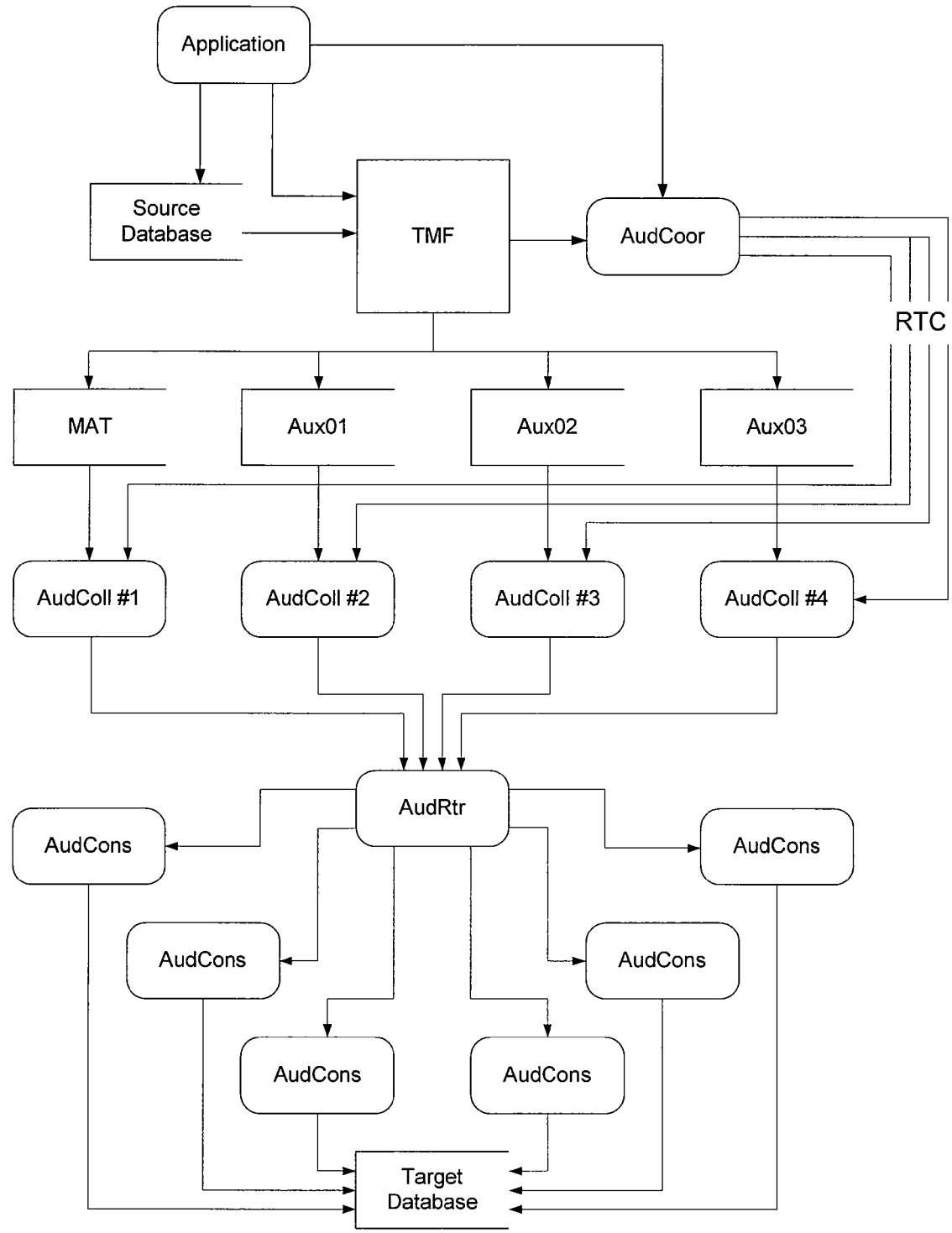
Figure 79- One Trail per Audit Collector

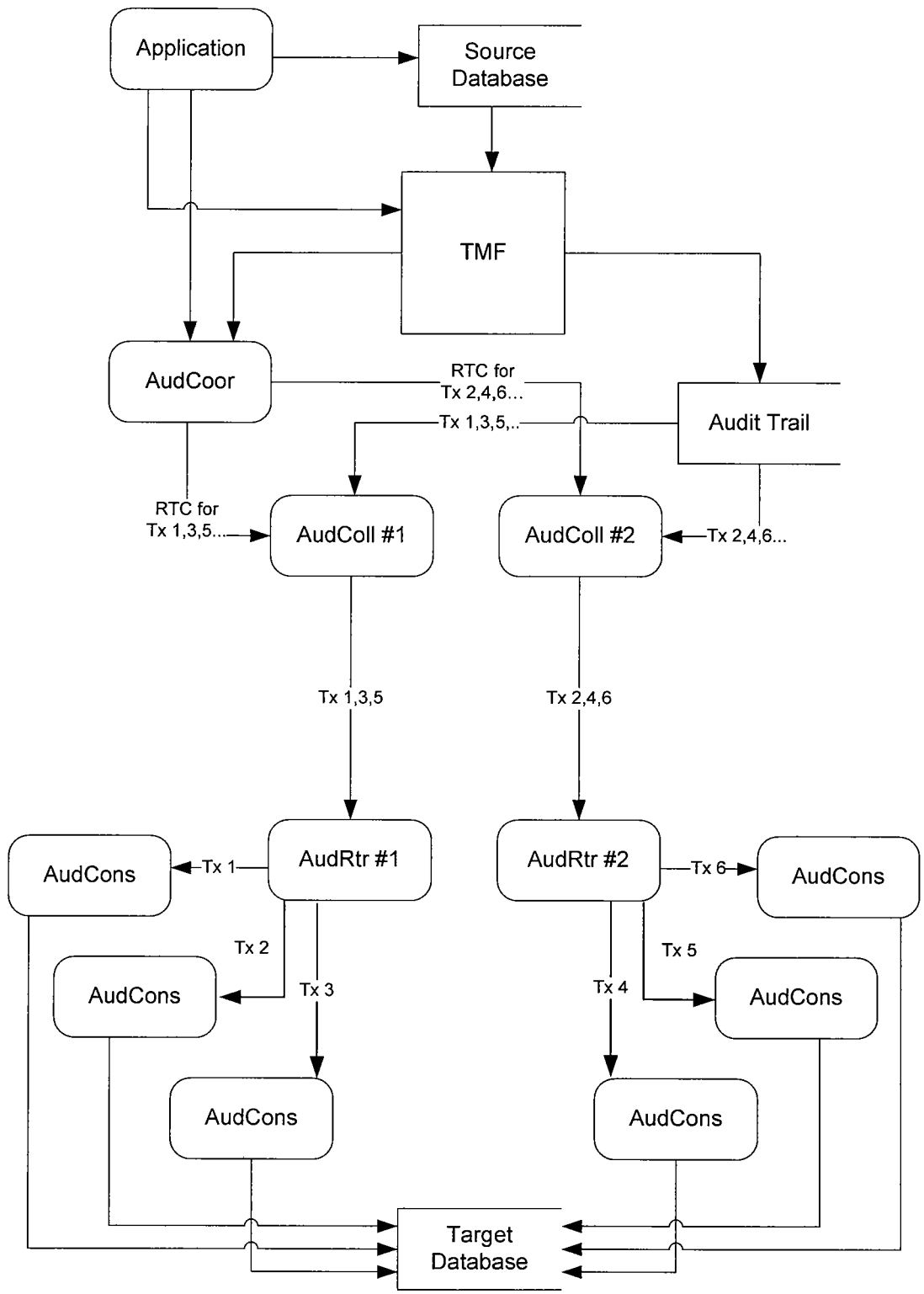
Figure 80- Multiple Routers

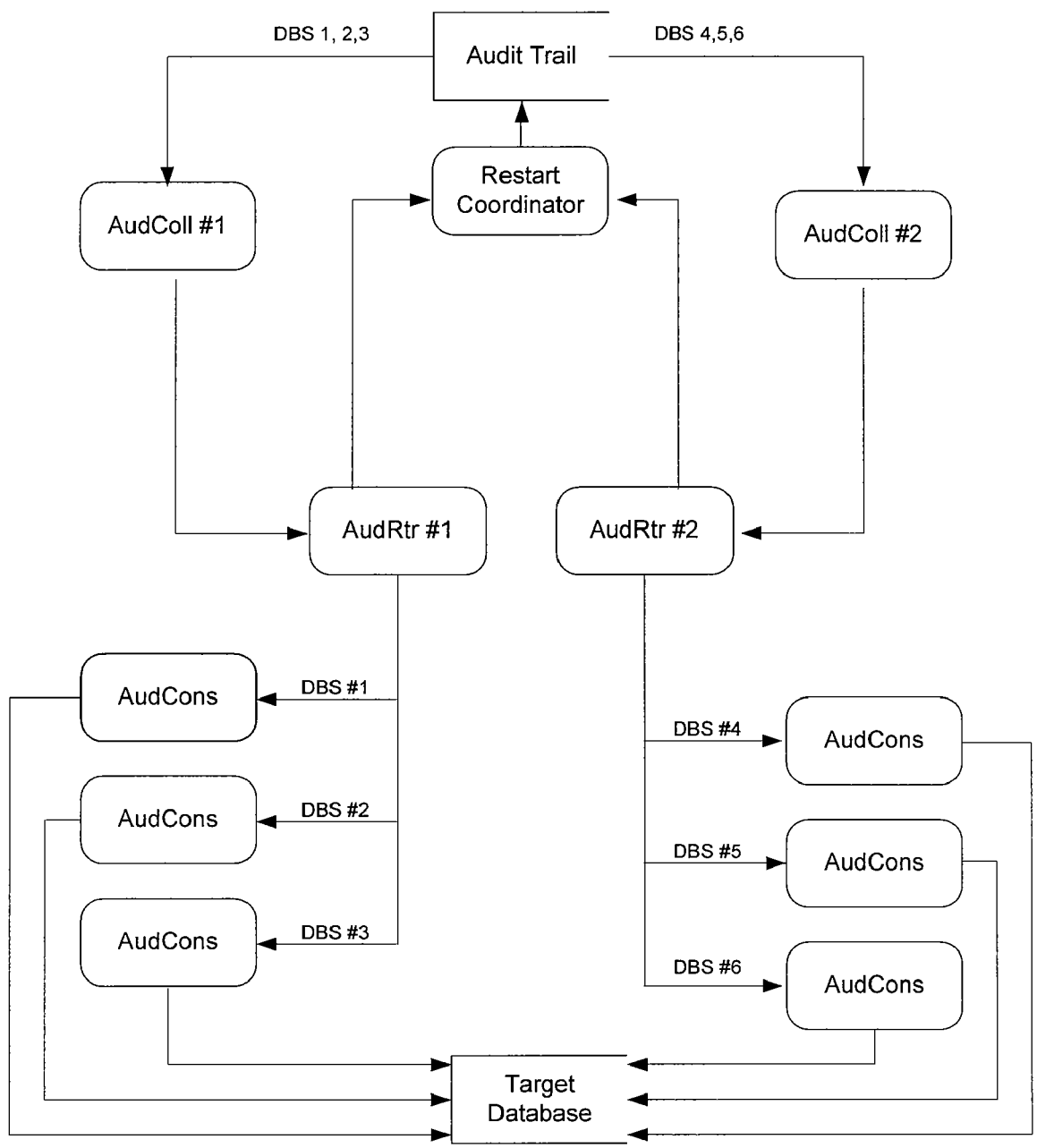
Figure 81- Restart with Multiple Routers

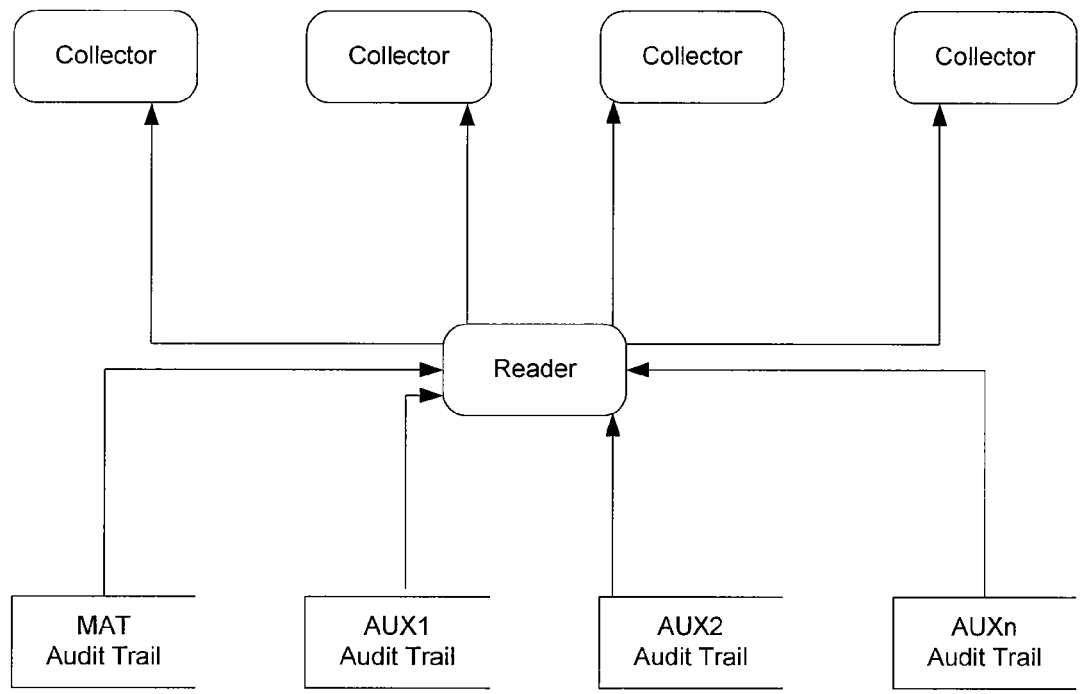
Figure 82- One Reader
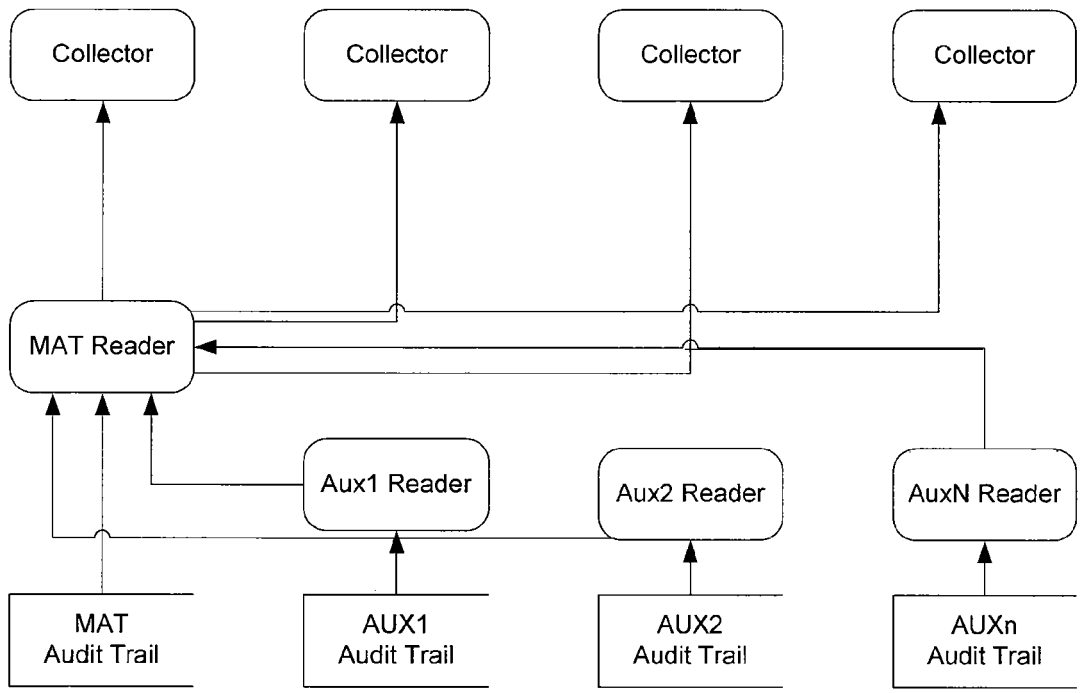
Figure 83- Dedicated Readers, MAT Assembles

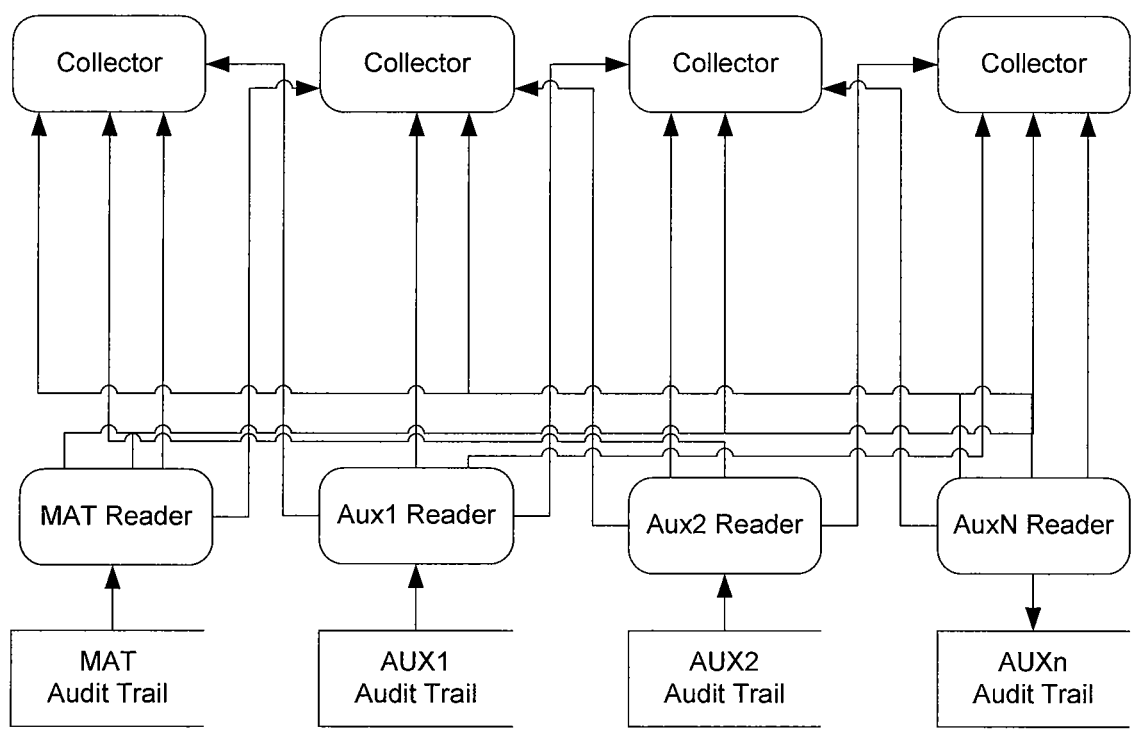
Figure 84- Dedicated Readers, Collector Assembles

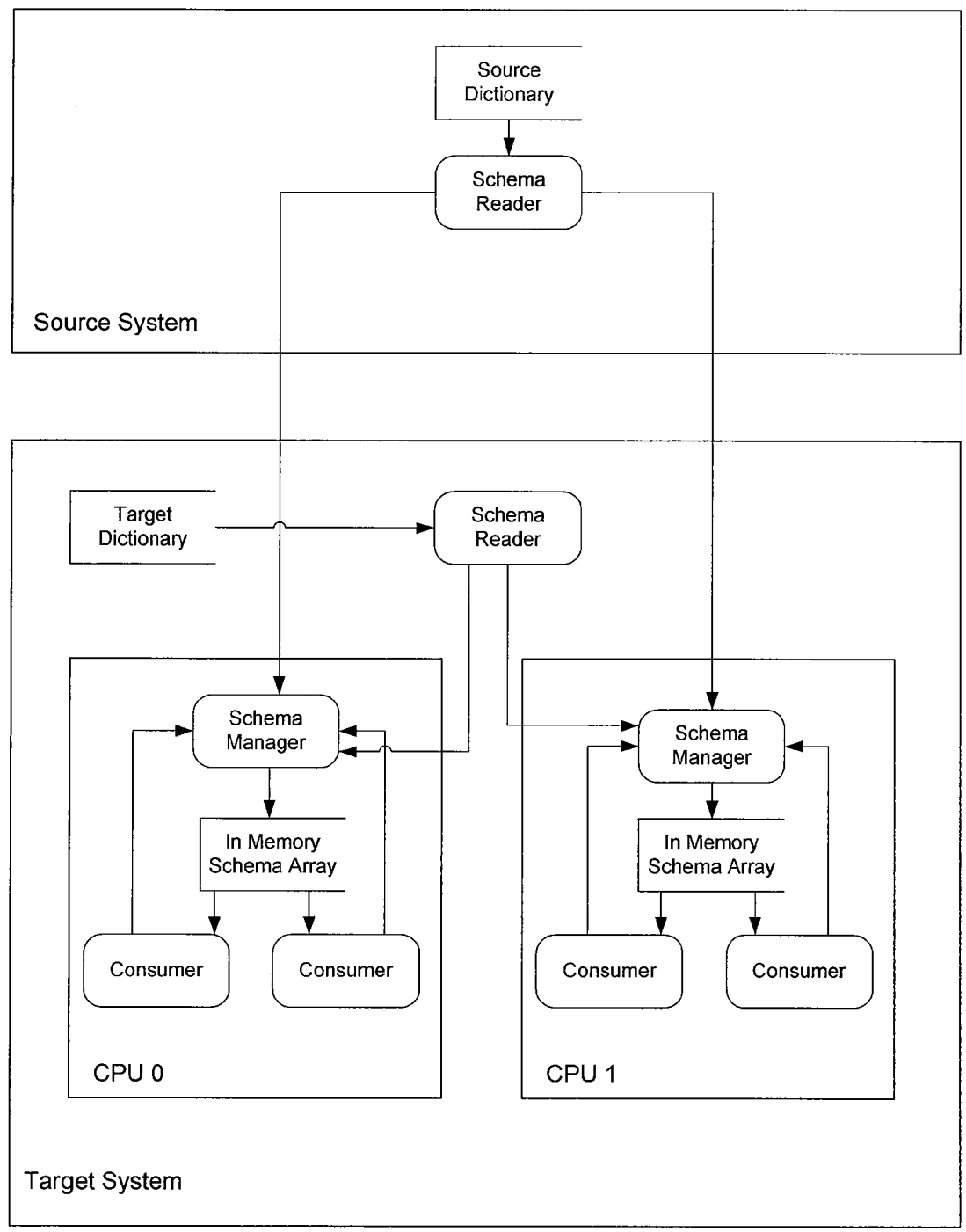
Figure 85- Schema Management Architecture

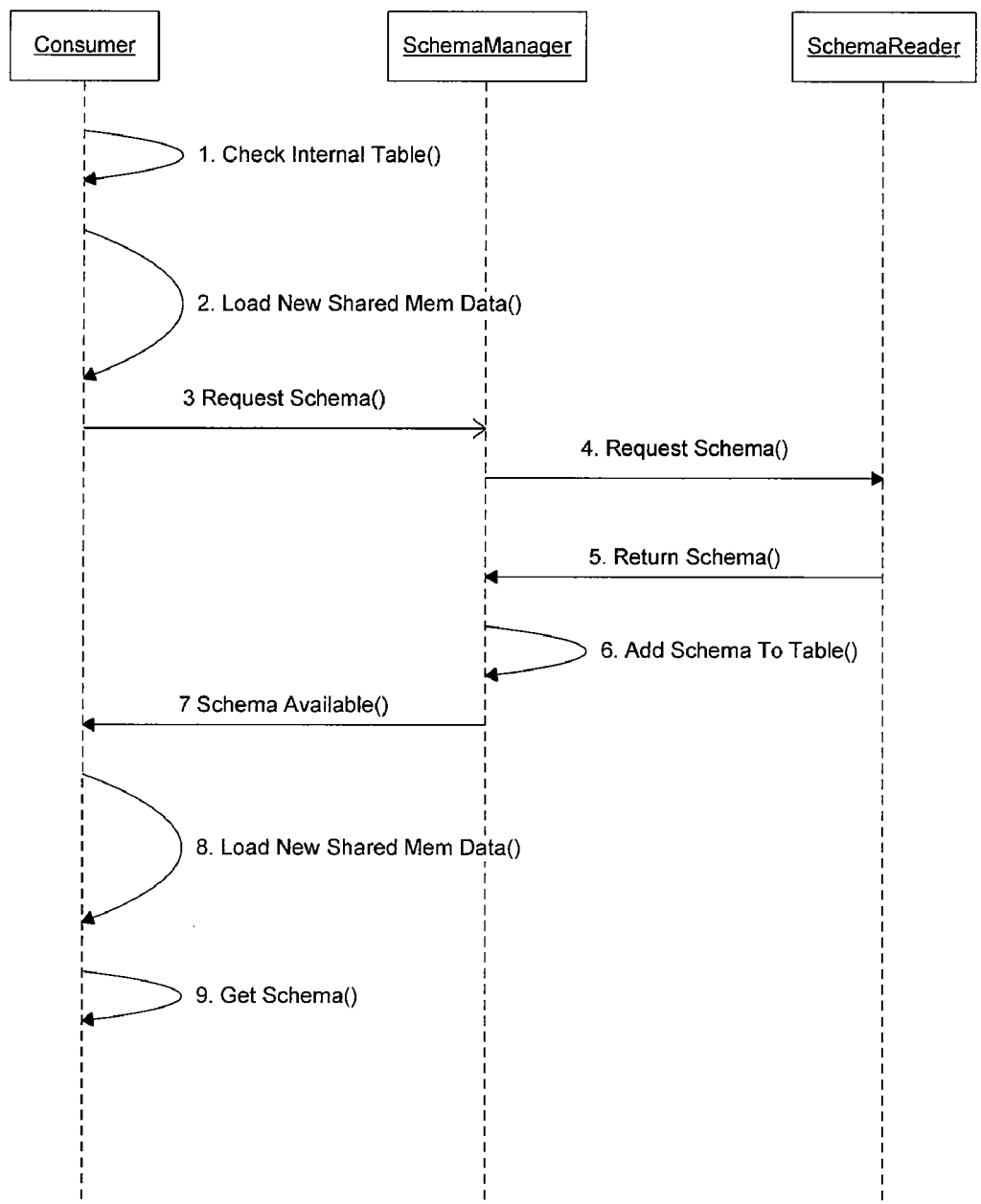
Figure 86- Retrieving Schemas

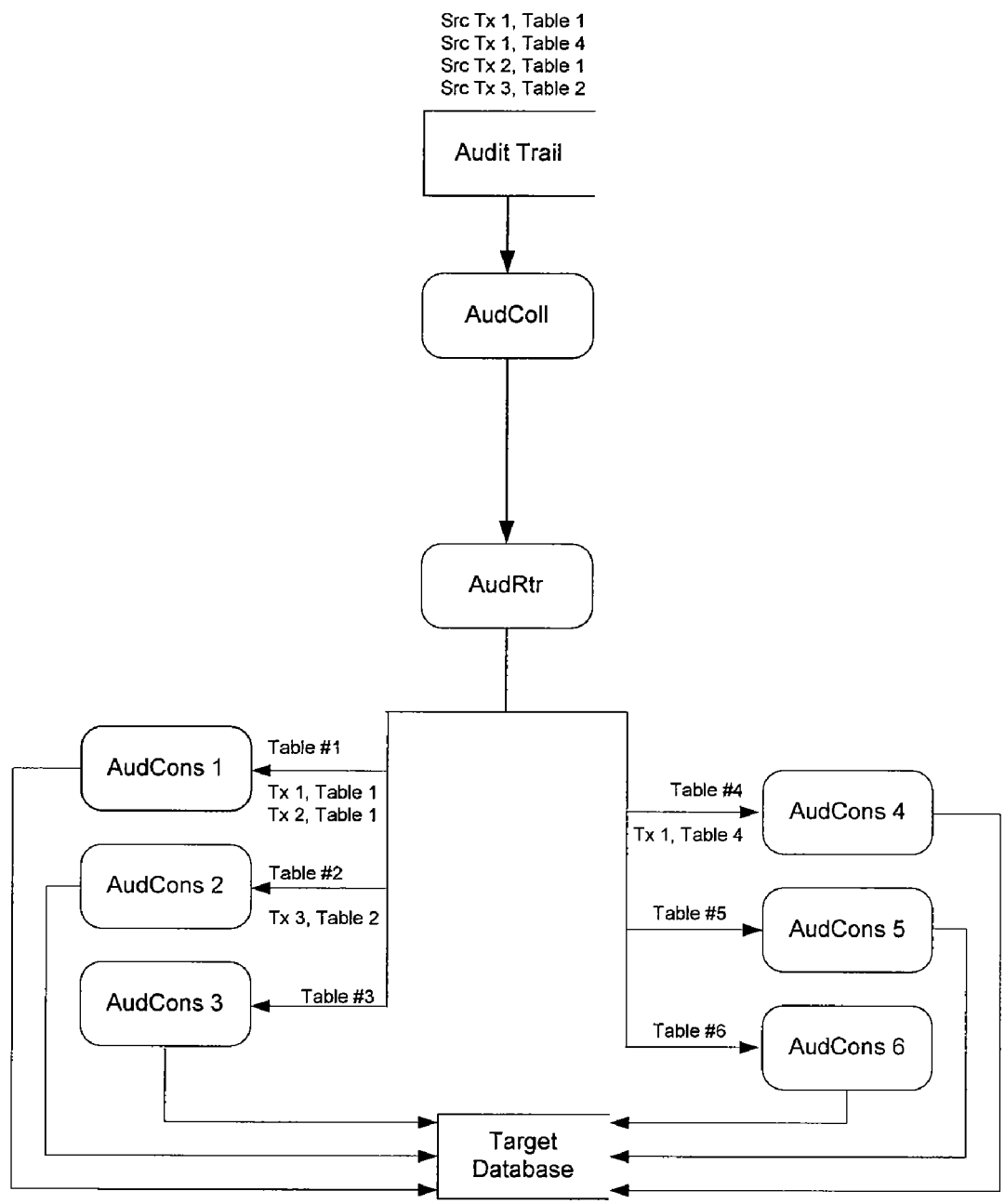
Figure 87- Single Target Transaction Architecture

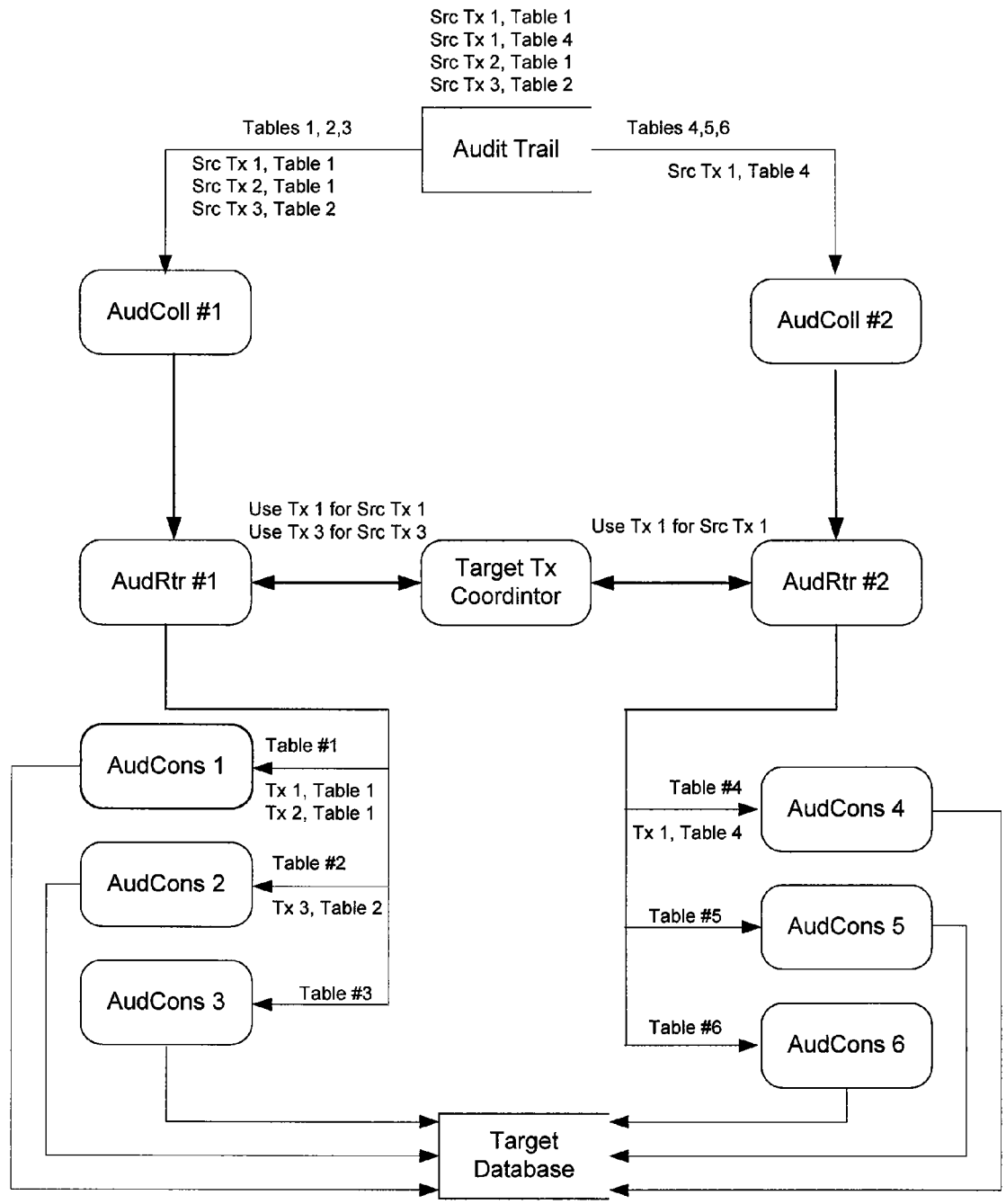
Figure 88- Scaling Single Target Transaction Architecture

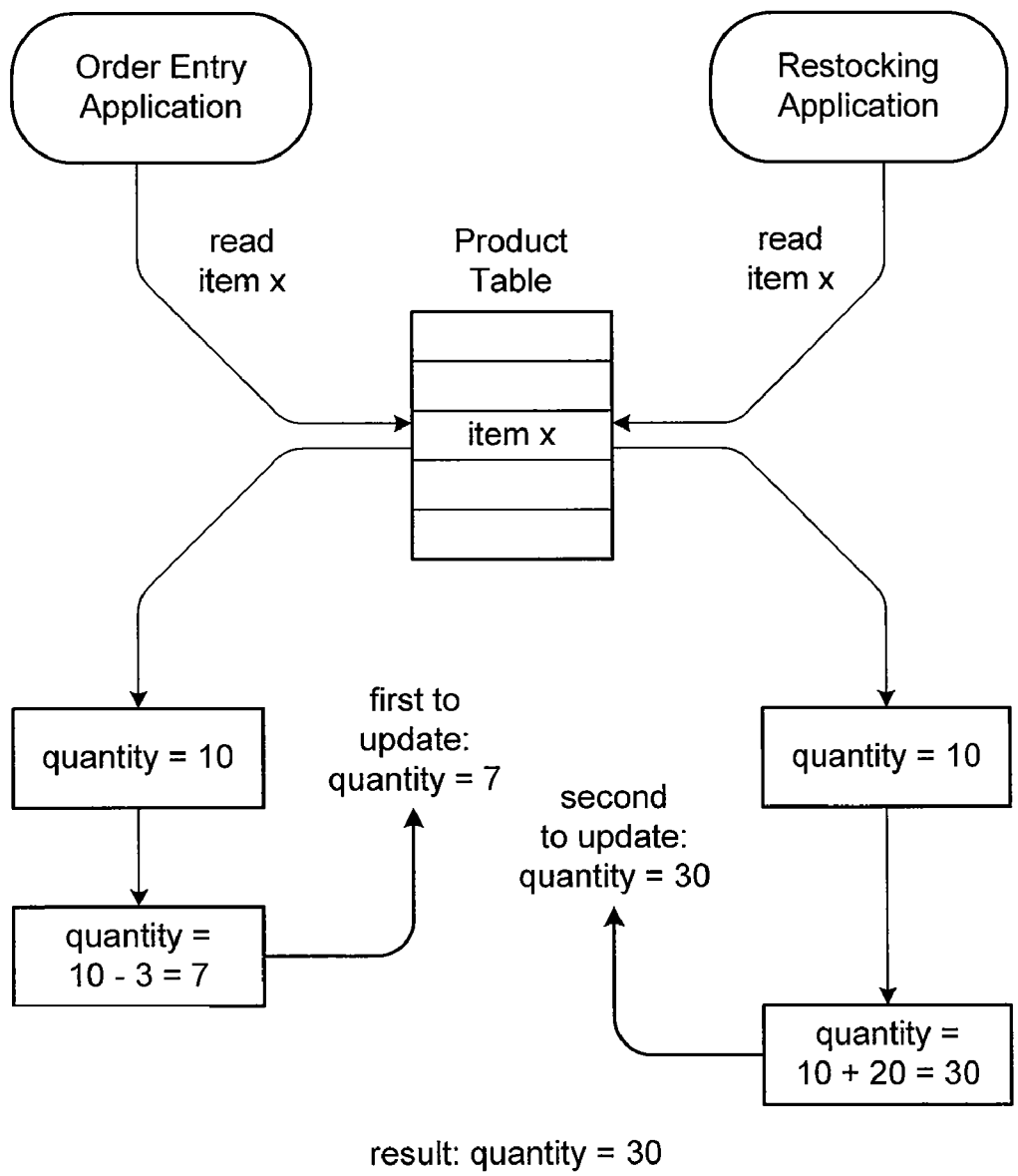
Figure 89– Data Corruption without Locking

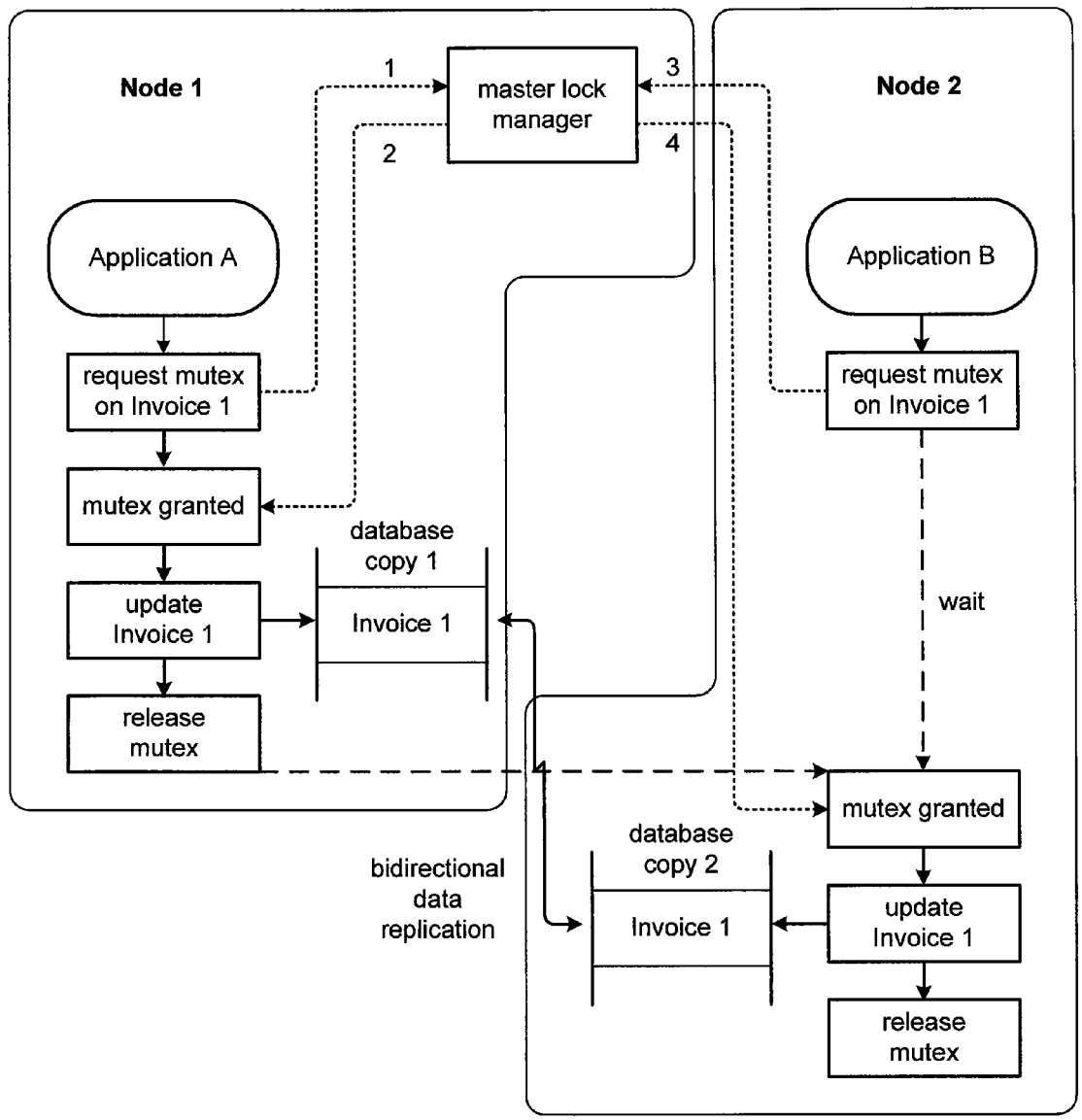
PRIOR ART
Figure 90- Distributed Locking with a Global Mutex

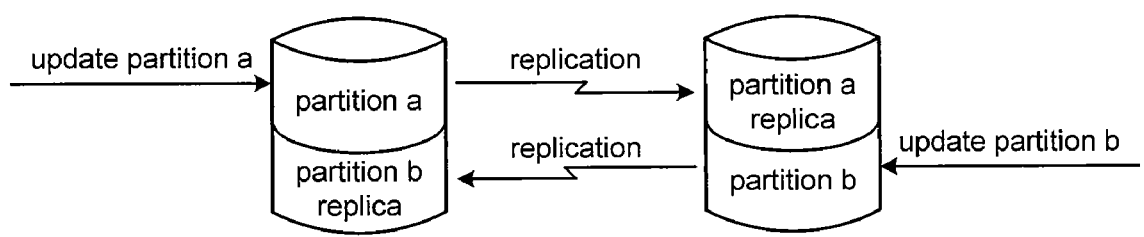
PRIOR ART
Figure 91- Avoiding Data Collisions via Database Partitioning

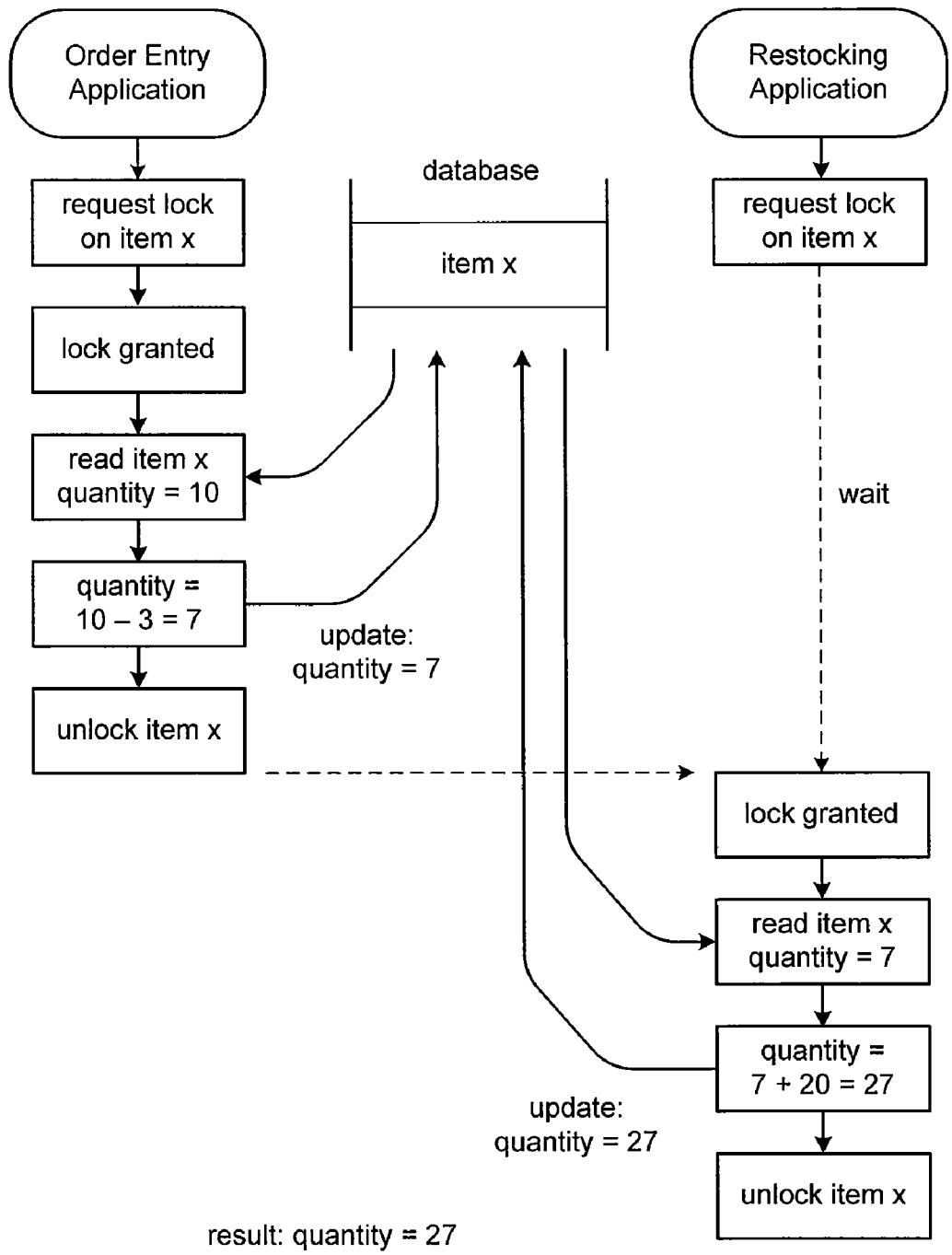
PRIOR ART
Figure 92– Avoiding Data Corruption with Locking

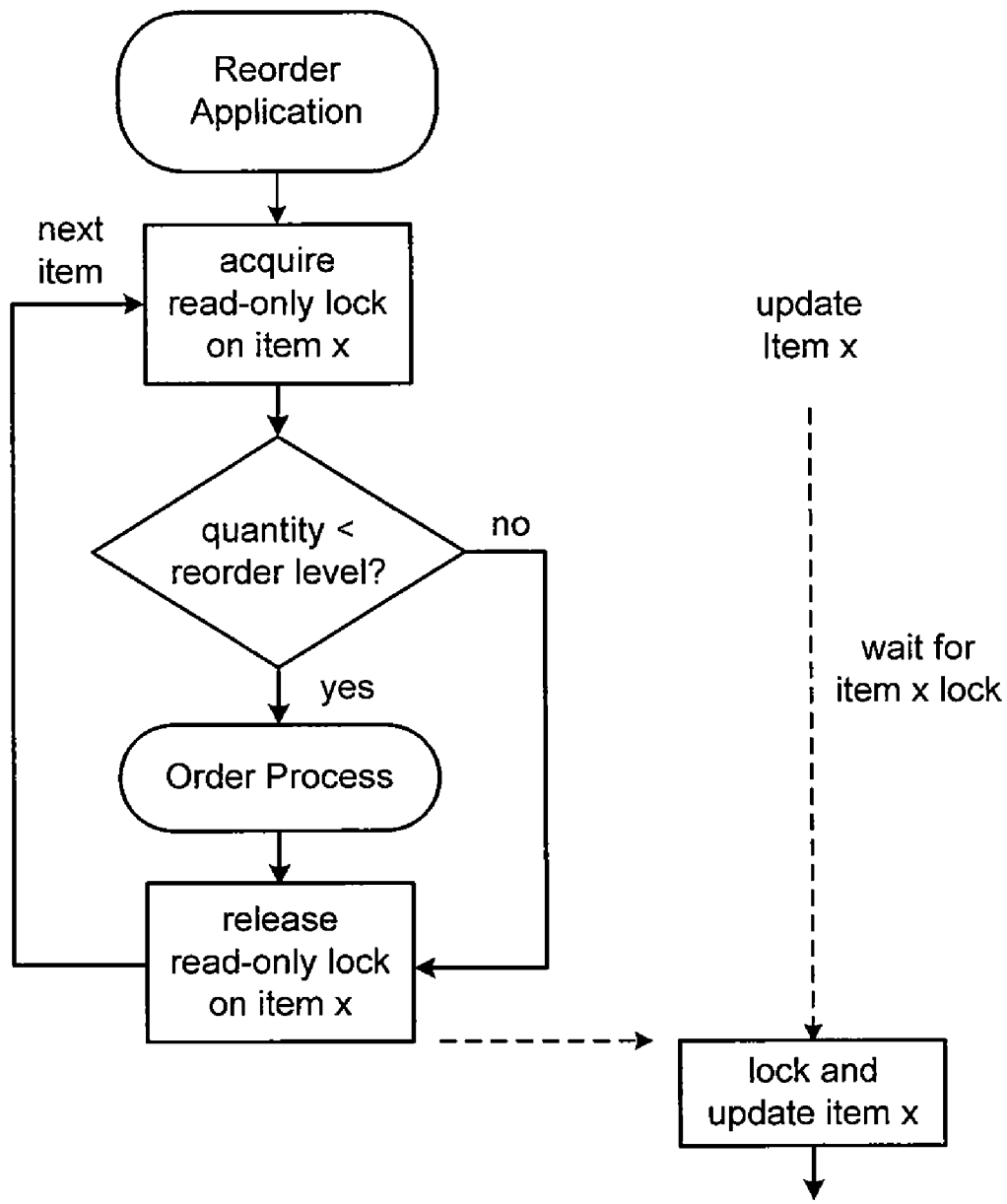
Figure 93– Using a Read Lock to Provide Consistent Data

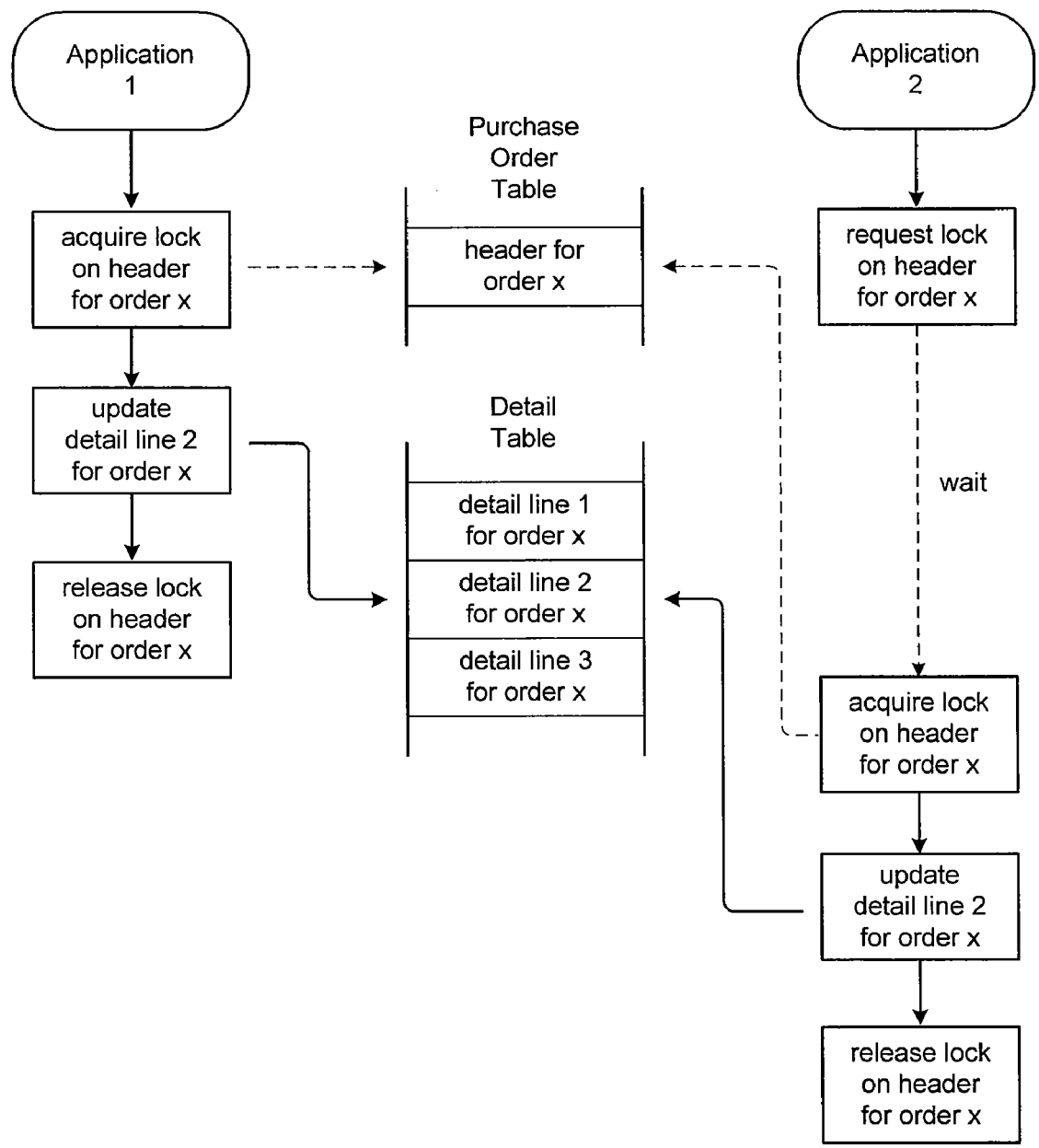
Figure 94– Using a Read Lock to Prevent a Distributed Deadlock

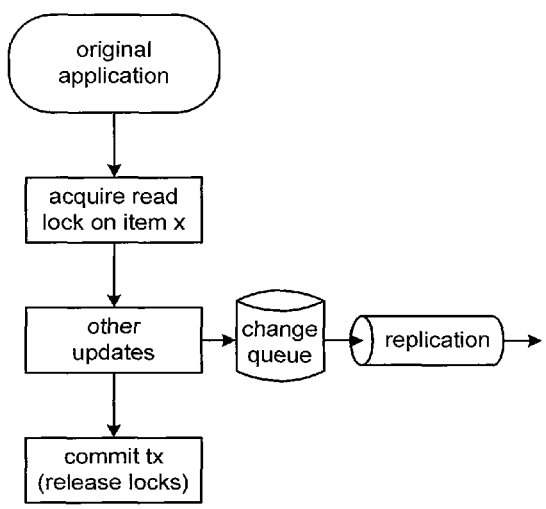
Figure 95a - Original Application
Modify Application to Send Null Update
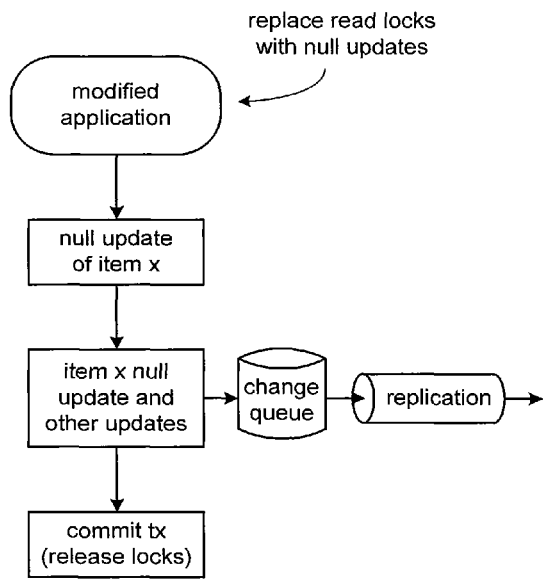
Figure 95b - Replace Read Locks with
Null Updates by Program Modification
Modify Application to Send Null Update
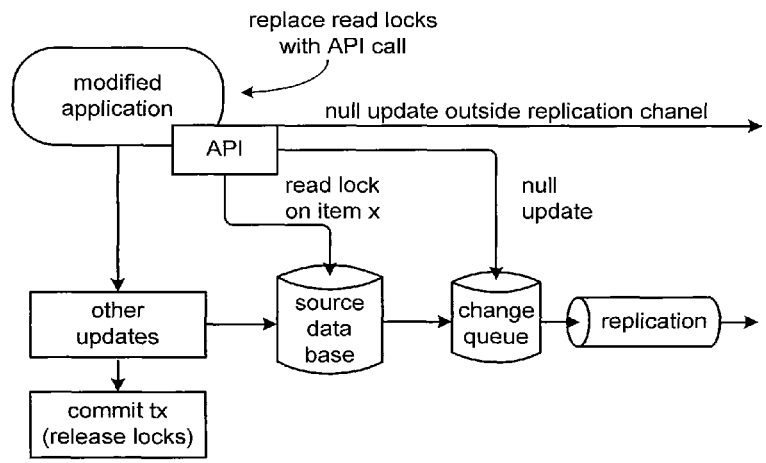
Figure 95c - Replace Read Locks with Null Updates by an
Application Programming Interface (API)
Modify Application to Send Null Update

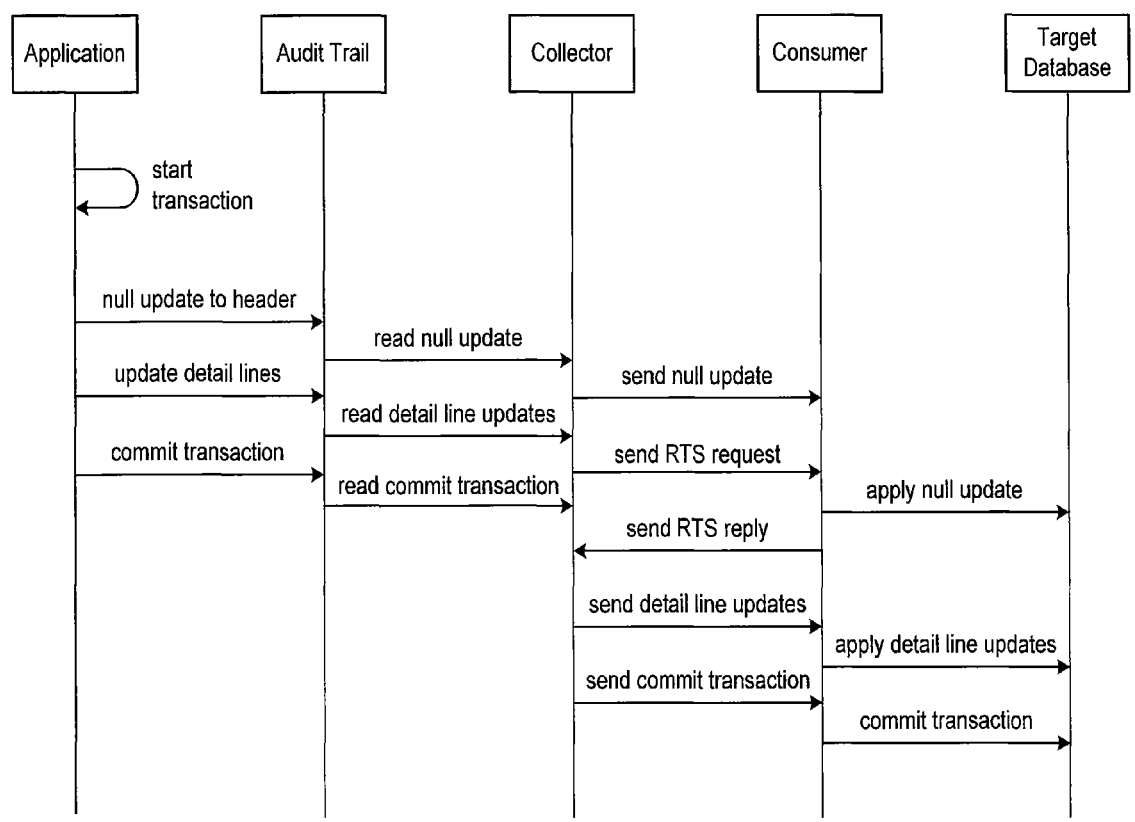
Figure 96– Use of RTS to Synchronize Operations

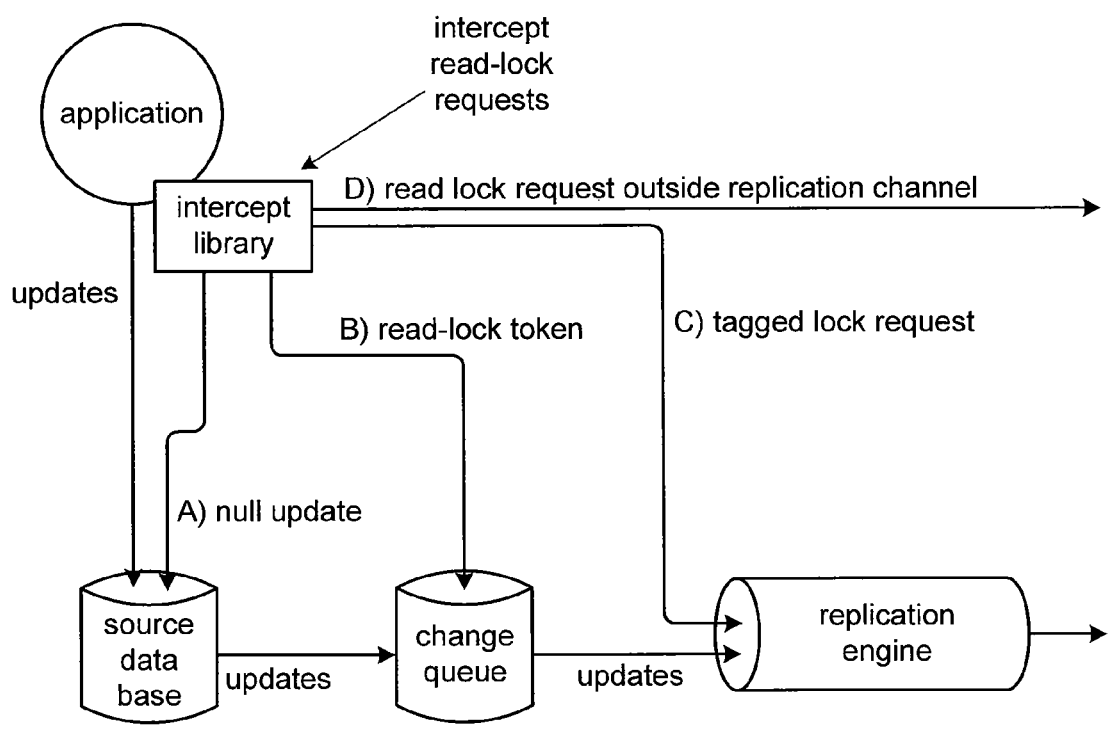
Figure 97– Using an Intercept Library to Send Read-Lock Requests

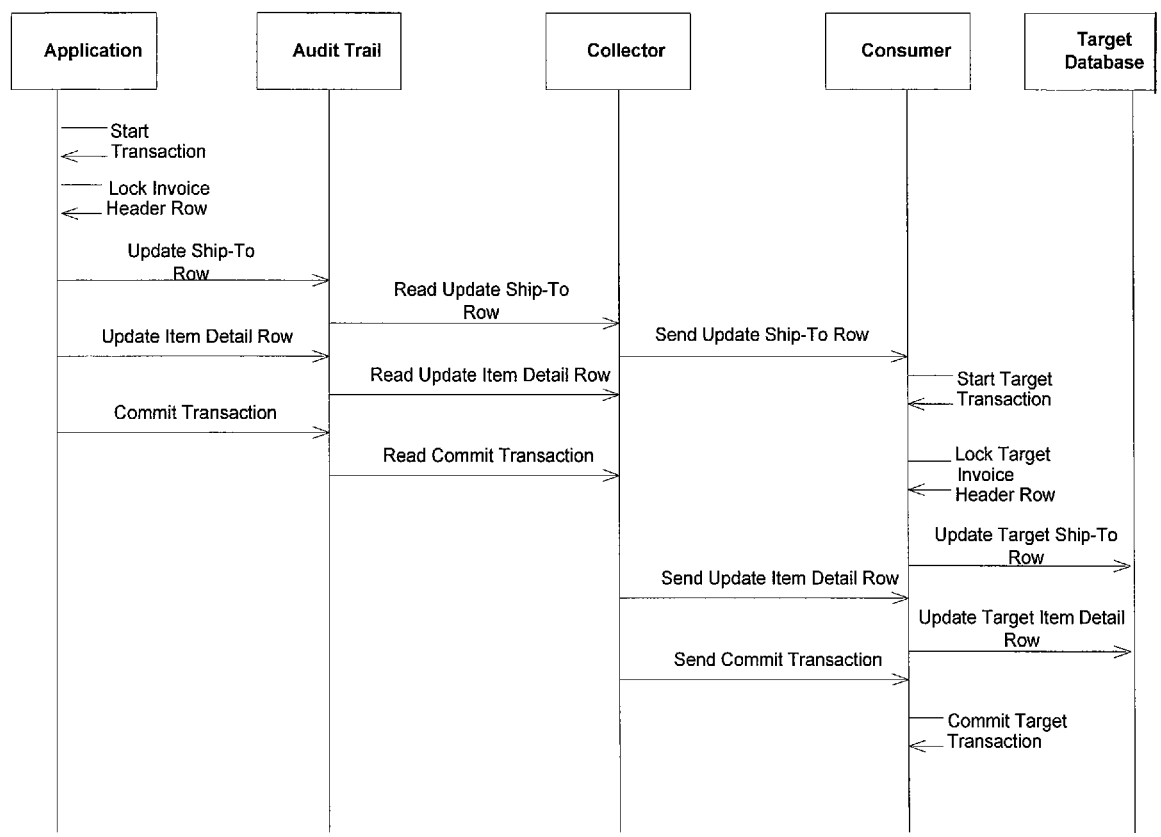
Figure 98– Replicating Read Locks via Replication Engine Intelligence

METHOD FOR REPLICATING EXPLICIT LOCKS IN A DATA REPLICATION ENGINE

CROSS-REFERENCE TO RELATED APPLICATIONS

This application is a continuation-in-part of U.S. application Ser. No. 12/483,849 filed Jun. 12, 2009, which is incorporated by reference herein.

This application claims the benefit of U.S. Provisional Application Nos. 61/061,040 filed Jun. 12, 2008, 61/098,509 filed Sep. 19, 2008 and 61/208,273 filed Feb. 20, 2009.

BACKGROUND OF THE INVENTION

An enterprise's data is its lifeblood. Lose its data, and the enterprise is likely to fail. Therefore, it is imperative for a company to maintain a copy of its data at some remote site that is impervious to a catastrophe that might cause the primary copy of the data to be lost.

A major decision that a company must make is how much data loss it can tolerate following not only a catastrophe, but also following an ordinary failure of its primary processing facility. This is known as the company's Recovery Point Objective, or RPO. Classic backup techniques support RPOs measured in hours or days—this is the amount of data that might be lost following the failure of the processing system. Data replication technology can reduce this to seconds (asynchronous replication) or even to zero (synchronous replication).

However, simply being able to recover most or all of a company's data does it no good if it cannot continue to provide application services to its users. The amount of time that a company can afford to deny service to its users is its Recovery Time Objective, or RTO. Again, classic techniques provide recovery times measured in hours or days. Clusters and unidirectional data replication can reduce recovery time to several minutes.

If an application cannot be down at all or needs to come back online quickly (for the users attached to the failed node) without causing undue hardship, active/active systems can provide recovery times measured in seconds or subseconds. In an active/active system, multiple geographically-distributed nodes cooperate in a common application, executing transactions against local copies of the application database. Should a node fail, it is only necessary to reroute users or transactions to one or more surviving nodes. This can be accomplished in seconds or subseconds. It is important that the database copies be kept in close or exact synchronism. This can only be done by replicating in real time changes made to one database copy to the other database copies in the application network.

Consequently, data replication plays an important role if RPOs and RTOs are to be measured in seconds. The advantage of synchronous replication is that it avoids any data loss following a node failure and therefore supports zero RPOs. Active/active systems can reduce RTO to near zero, or make it so fast that the users don't even notice.

However, synchronous replication brings with it one serious issue; and that is application latency. The transaction response times of applications are extended because an application must wait for its transaction data to be committed (or at least safe stored) across the network. As the distance between nodes becomes greater, communication latency (the round trip time of the communication channel) can add greatly to transaction response time.

This is particularly true for applications that replicate synchronously using network transactions or distributed lock management since each individual operation must flow across the communication network before the next operation is issued. Transaction response time becomes dependent not only upon the distance separating the nodes but also on the size of the transactions. As a consequence, such systems must limit the distance between processing nodes in order to achieve acceptable performance. These systems are typically limited to campus environments or perhaps metropolitan environments. As a result, their abilities to withstand broader disasters such as earthquakes, hurricanes, floods, or terrorist attacks are severely compromised.

The use of coordinated commit technology discussed in U.S. Pat. No. 6,662,196 (Holenstein et al.) and U.S. Pat. No. 7,103,586 (Holenstein et al.), both of which are incorporated by reference in their entirety herein, solves the latency problem. An application waits only one replication channel latency time to ensure that all remote nodes are prepared to commit the transaction. Therefore, application latency is not affected by transaction size and is only marginally affected by internodal distances. Nodes handling large transactions can be thousands of miles apart and can still provide good response times in a synchronous distributed environment.

There are prior art replication systems that operate in an asynchronous mode, and replication systems that operate in a synchronous mode. Also, as discussed in U.S. Pat. No. 5,724,556 (Souder et al.), U.S. Pat. No. 5,937,414 (Souder et al.), and U.S. Pat. No. 6,532,479 (Souder et al.), there are replication systems that can switch between the two, for example when synchronous replication cannot occur due to a network fault. However, these replication systems do not operate in both asynchronous and synchronous replication modes at the same time in the same direction (i.e., from originating to target node). Instead, they force an all-or-nothing switch from one mode to the other.

Additionally, there are various approaches for allocating transactions and their underlying transaction steps or operations when operating in either the asynchronous or synchronous replication modes. These approaches include allocation on an object-by-object basis for asynchronous replication and allocation on a transaction-by-transaction basis for synchronous replication. The two approaches are not used at the same time, and object-by-object allocation is generally not used with synchronous replication, and transaction-by-transaction allocation is generally not used with asynchronous replication.

As mentioned above, switching from one replication mode to another with prior art data replication engines is on an all-or-nothing basis, which usually requires quiescing (from making database changes) the application and denying service to its users while the transition occurs. What is needed are methods that allow the replication engine to switch from one mode to the other and from one allocation approach to the other without dramatically affecting the application and denying service to its users, thereby maintaining desirable availability, latency, and recoverability properties. Additionally, by allowing the replication modes and allocation approaches to be combined and used at the same time, the replication system can provide additional capabilities for data management and transaction replay not available in the current methods.

BRIEF SUMMARY OF THE INVENTION

One preferred embodiment of the present invention provides an automated method of replicating a locking protocol in a database environment for performing I/O operations wherein the database environment includes a plurality of databases. A locking protocol is performed that includes one or more explicit locking operations on objects in a first database of the database environment. The one or more explicit locking operations are replicated in one or more other databases in the database environment. At least some of the explicit locking operations are performed asynchronously with respect to the explicit locking operations performed in the first database. I/O operations are performed at the first database of the database environment that are associated with the one or more explicit locking operations implemented in the first database.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIG. 1—Data Replication, shows a prior art replication system.

FIG. 2—Data Replication Engine, shows a prior art replication engine.

FIG. 3—Asynchronous Data Replication, shows a prior art asynchronous replication system.

FIG. 4—Asynchronous Data Loss Following Source Node Failure, depicts the classic prior art data loss problem for an asynchronous data replication system when the source node fails.

FIG. 5—Transactions, shows the prior art sequencing and flow of transaction steps or operations in a data replication system.

FIG. 6—Coordinated Commits, shows the prior art architecture of the coordinated commits approach to synchronous replication.

FIG. 7—Coordinated Commit Sequence Diagram, shows the prior art sequence diagram of the coordinated commits approach to synchronous replication.

FIG. 8—Distributed Management, shows the prior art architecture for the distributed lock management form of synchronous replication.

FIG. 9—Application Latency, depicts the application latency imposed by the prior art network transactions and coordinated commits approaches to synchronous replication.

FIG. 10—Bidirectional Replication, depicts the classic prior art architecture for bidirectional replication.

FIG. 11—Ping-Ponging, depicts the classic prior art problem inherent with classic bidirectional replication that must be overcome by a replication engine to work successfully in a bidirectional mode.

FIG. 12—Data Collisions, depicts the classic prior art problem that can occur in bidirectional replication when the application on two or more nodes updates the same data item at the same time, causing a data collision.

FIG. 13—Partitioning, depicts the prior art approach to avoid data collisions in a bidirectional replication system by dividing the work load or transaction load into discreet sets that do not overlap, and assigning the workload to specific nodes for processing, to avoid data collisions.

FIG. 14—Relative Replication, depicts the prior art approach for performing relative replication (i.e., a method to resolve data collisions when numerical fields or values are updated on more than one node at the same time).

FIG. 15—Master/Slave, depicts the prior art architecture and approach of a master/slave replication system for resolving data collisions.

FIG. 16—Distributed Deadlocks, depicts the prior art problem that can occur in a bidirectional synchronous replication system whereby the same data item is locked on more than one database at a time, with each side being granted its local lock but then deadlocking on the request to be granted the lock on the remote copy of that data item.

FIG. 17—Split-Brain Mode, depicts the prior art problem that can occur in a synchronous bidirectional replication system that is running an active/active architecture when the interconnecting network fails or is otherwise unavailable. In this case, neither side can complete its synchronous replication work, and if allowed to run in the asynchronous mode, with an update anywhere (non-partitioned) algorithm, data collisions can occur (i.e., neither side knows what the other side is doing).

FIG. 18—The RPO/RTO Relationship, depicts the prior art relationship between the business continuity recovery point objective, which is a measure of data loss at a failure, with the recovery time objective, which is a measure of the speed of recovery of the replication system (and/or application services) to users when a failure occurs.

FIG. 19—Magnetic Tape, depicts the classic prior art architecture for recovering from a failure using magnetic tape as the recovery media, and shows that the recovery time is generally many hours to days.

FIG. 20—Virtual Tape, depicts the classic prior art architecture for recovering from a failure using virtual tape (i.e., tape drive media emulated in a disk environment) as the recovery media, and shows that recovery time is generally hours.

FIG. 21—Cluster, depicts the classic prior art architecture used in a high availability cluster failover approach, and shows that the recovery time is generally minutes.

FIG. 22—Unidirectional Replication, depicts the prior art active/passive architecture of a unidirectional replication system, and shows that the recovery time is generally minutes or less.

FIG. 23—Sizzling-Hot Standby, depicts the prior art active/"almost active" architecture of a bidirectional replication system configured in the sizzling hot standby (or takeover) mode, and shows that the recovery time is generally seconds or less.

FIG. 24—Active/Active, depicts the prior art architecture of a bidirectional active/active replication system and shows that the recovery time is generally seconds or less.

FIG. 25—Business Continuity Continuum, is a prior art depiction of where the various prior art technologies fall in the RPO vs RTO continuum.

FIG. 26—Typical RTOs, RPOs, Configurations, and Applications, depicts the prior art matrix of how asynchronous and synchronous replication impacts RTO and RPO, typical architectures and configurations, and typical applications.

FIG. 27—Shadowbase Unidirectional Replication, depicts the prior art Shadowbase asynchronous replication engine when configured in a unidirectional mode.

FIG. 28—Shadowbase Bidirectional Replication, depicts the prior art Shadowbase asynchronous replication engine when configured in a bidirectional mode.

FIG. 29—The X/Open Distributed Transaction Processing Model, depicts the prior art X/Open transaction processing architecture.

FIG. 30—TMF/Gateway Communications, depicts the prior art transaction monitoring facility and gateway communications, available from HP.

FIG. 31—Transaction State Transitions for Volatile Resource Manager, depicts the prior art state transition table for a volatile resource manager in a TMF environment.

FIG. 32—Coordinated Commit Replication, depicts a preferred embodiment architecture (detailed) of the coordinated commit synchronous replication approach implemented via a volatile resource manager in the TMF environment.

FIG. 33—Coordinated Commit Replication Sequence Diagram, depicts a preferred embodiment sequence diagram of the coordinated commit synchronous replication sequence implemented via a volatile resource manager in the TMF environment.

FIG. 34—Shadowbase Plus SR, depicts the process architecture of a preferred embodiment of the invention.

FIG. 35—Beginning a Transaction, depicts a process architecture of how to being and register a transaction in a preferred embodiment of the present invention.

FIG. 36—Begining a Transaction, depicts a sequence diagram of how to register a transaction in a preferred embodiment of the present invention.

FIG. 37—Replicate Changes, depicts a process architecture of how to replicate database transactions and changes in a preferred embodiment of the present invention.

FIG. 38—Replicate Changes, depicts a sequence diagram of how to replicate database transactions and changes in a preferred embodiment of the present invention.

FIG. 39—Committing a Transaction—Phase 1, depicts a process architecture of how the Phase 1 sequence of the 2-phase commit protocol occurs in a preferred embodiment of the present invention.

FIG. 40—Committing a Transaction—Phase 1, depicts a sequence diagram of how the Phase 1 sequence of the 2-phase commit protocol occurs in a preferred embodiment of the present invention.

FIG. 41—Committing a Transaction—Phase 2, depicts a process architecture of how the Phase 2 sequence of the 2-phase commit protocol occurs in a preferred embodiment of the present invention.

FIG. 42—Committing a Transaction—Phase 2, depicts a sequence diagram of how the Phase 2 sequence of the 2-phase commit protocol occurs in a preferred embodiment of the present invention.

FIG. 43—Shadowbase Plus SR Transaction Voting, depicts the transaction voting message paths in a preferred embodiment of the present invention.

FIG. 44—Metronome load/latency Tradeoff, depicts the relationship between system load and replication latency for using a Metronome of various tick intervals.

FIG. 45—Replication Recovery Modes, depicts replication recovery modes for recovering from an outage (as well as initial startup), in a preferred embodiment of the present invention.

FIG. 46—Distributed Deadlock, depicts the distributed deadlock problem that can occur in an update anywhere synchronous replication architecture.

FIG. 47—Application Latency (1) for $t>c$, depicts the application latency equation for a preferred embodiment of the present invention when $t>c$.

FIG. 48—Latency (2) for $t>c$, is a continuation of FIG. 47, depicting the application latency equation for a preferred embodiment of the present invention when $t>c$.

FIG. 49—Application Latency for $t<c$, depicts the application latency equation for a preferred embodiment of the present invention when $t<c$.

FIG. 50—Application Latency L as a Function of Round Trip Time t, depicts the application latency as a function of the replication round trip time, for a preferred embodiment of the present invention.

FIG. 51—High Level Architecture, depicts the high level process architecture of a preferred embodiment of the present invention.

FIG. 52—Begin Transaction Processing, depicts the high level process architecture for initiating transaction processing in a preferred embodiment of the present invention.

FIG. 53—Data Replication, depicts replicating data in a preferred embodiment of the present invention.

FIG. 54—Commit Request Processing, depicts a process architecture and message flow for commit request processing in a preferred embodiment of the present invention.

FIG. 55—Commit Request Processing Using Buffer ACKs, depicts a sequence diagram of message flows using buffer acks for commit request processing in a preferred embodiment of the present invention.

FIG. 56—Commit Request Processing Using Data Update ACKs, depicts a sequence diagram of message flows using data update acks for commit request processing in a preferred embodiment of the present invention.

FIG. 57—Commit Processing, depicts a process architecture and message flow for commit processing in a preferred embodiment of the present invention.

FIG. 58—Synchronizing the RTC, depicts a sequence diagram for synchronizing the RTC for an example transaction, in a preferred embodiment of the present invention.

FIG. 59—Source and Destination Routing, depicts routing transaction steps and/or transaction operations in a preferred embodiment of the present invention.

FIG. 60—Application Generated RTS, depicts a process architecture and message flow for an application generated RTS (request to send or ready to send), in a preferred embodiment of the present invention.

FIG. 61—Transaction Registration Latency, depicts the components of the latency that occurs in transaction registration in a preferred embodiment of the present invention.

FIG. 62—Asynchronous Registration Latency, depicts the components of the latency that occurs in asynchronous transaction registration in a preferred embodiment of the present invention.

FIG. 63—Commit Latency, depicts a sequence diagram of commit latency in a preferred embodiment of the present invention.

FIG. 64—Failure Flow Chart, depicts a flow chart of the recovery decision paths when a failure occurs in a preferred embodiment of the present invention.

FIG. 65—Synchronous Replication State Diagram, depicts a state diagram showing the state transitions for various events that occur during processing in a preferred embodiment of the present invention.

FIG. 66—AUDCOLL/AUDRTR Connection, depicts the connection interface across a network for the AUDCOLL and AUDRTR messaging traffic in a preferred embodiment of the present invention.

FIG. 67—AUDCOLL/AUDRTR Connection with Monitor, depicts the connection interface across a common network for the AUDCOLL and AUDRTR messaging traffic and the interaction each side has with the monitor in a preferred embodiment of the present invention.

FIG. 68—AUDCOLL/AUDRER Connection with Two Networks, depicts the connection interface across separate networks for the AUDCOLL and AUDRTR messaging traffic and the interaction each side has with the monitor in a preferred embodiment of the present invention.

FIG. 69—AUDCOLL/AUDRTR Connection with Watchdogs, depicts the connection interface between the AUDCOLL and AUDRTR and the interaction of the monitor when using a watchdog, or quorum, system for monitoring and decision making support.

FIG. 70—Locking Without Replication, depicts the access to a particular record is managed via locking the record before updating it. The diagram shows how one request (the first one) is granted, and the other request (the second one) is delayed until the first one completes.

FIG. 71—Synchronous Replication Deadlocks, extends the discussion from FIG. 70 into a synchronous replication environment, depicting how local locks can escalate into network deadlocks in a synchronous replication environment in the absence of a lock arbitration approach, such as a global lock manager.

FIG. 72—Global Lock, depicts how a global lock approach can be used to mitigate the deadlock issues that can otherwise occur in a synchronous replication environment.

FIG. 73—Global Lock Manager, depicts a process and message flow diagram showing how a global lock manager can be implemented to mitigate the deadlocks that can otherwise occur in a synchronous replication environment in a preferred embodiment of the present invention.

FIG. 74—Distributed Lock Manager, depicts a process and message flow diagram showing how a distributed lock manager can be implemented to mitigate the deadlocks that can otherwise occur in a synchronous replication environment in a preferred embodiment of the present invention.

FIG. 75—Replicating an Intelligent Locking Protocol, depicts a sequence diagram showing how replication can be used to implement an intelligent locking protocol.

FIG. 76—Nondeterministic I/O Ordering, depicts the prior art data consistency and referential integrity problem imposed by non-deterministic I/O ordering in a NonStop audit trail.

FIG. 77—Parent/Child Ordering, depicts the prior art data consistency and referential integrity problem imposed by non-deterministic I/O ordering in a NonStop audit trail using a parent/child relationship example.

FIG. 78—Multiple Collectors, depicts how to scale the audit trail reading to handle higher loads in a preferred embodiment of the present invention by using multiple Collectors, each reading all of the audit trail data (but filtering off the part they are not supposed to replicate).

FIG. 79—One Trail per Audit Collector, depicts how to scale the audit trail reading to handle higher loads in a preferred embodiment of the present invention using one Collector per audit trail.

FIG. 80—Multiple Routers, depicts how to scale the routers to handle higher load and add in additional sparing in a preferred embodiment of the present invention.

FIG. 81—Restart with Multiple Routers, depicts how to restart the replication system and shows DBS allocations when there are multiple routers in a preferred embodiment of the present invention.

FIG. 82—One Reader, depicts an alternate architecture designed for scaling and load for audit trail reading.

FIG. 83—Dedicated Readers, MAT Assembles, depicts an alternate architecture designed for scaling and load for audit trail reading.

FIG. 84—Dedicated Readers, Collector Assembles, depicts an alternate architecture designed for scaling and load for audit trail reading.

FIG. 85—Schema Management Architecture, depicts a process architecture showing message flows for managing file and table schemas in a preferred embodiment of the present invention.

FIG. 86—Retrieving Schemas, depicts a sequence chart showing message flows for managing file and table schemas in a preferred embodiment of the present invention.

FIG. 87—Single Target Transaction Architecture, depicts allocating transactions across multiple consumers in a preferred embodiment of the present invention.

FIG. 88—Scaling Single Target Transaction Architecture, depicts scaling for allocating transactions across multiple consumers in a preferred embodiment of the present invention.

FIG. 89—Data Corruption without Locking, depicts data corruption if locks do not protect a data object from simultaneous updates.

FIG. 90—Distributed Locking with a Global Mutex, depicts the use of a global mutex to avoid collisions in a distributed network.

FIG. 91—Avoiding Data Collisions via Database Partitioning, depicts the use of database partitioning to avoid data collisions.

FIG. 92—Avoiding Data Corruption with Locking, depicts the use of locks to prevent data corruption from simultaneous updates.

FIG. 93—Using a Read Lock to Provide Consistent Data, depicts the use of locks to ensure consistent reading of data.

FIG. 94—Using a Read Lock to Prevent a Distributed Deadlock, depicts the use of locking to prevent two applications running in different systems from deadlocking.

FIG. 95—Modifying Applications to Send Null Updates, depicts one method for replicating read locks by converting them to null updates.

FIG. 96—Use of RTS to Synchronize Operations, depicts the use of a Request to Synchronize query to ensure that a distributed ILP lock is granted before replicating database updates.

FIG. 97—Using an Intercept Library to Send Read-Lock Requests, depicts another method for replicating read locks by intercepting them and generating null updates or replicating lock request tokens.

FIG. 98—Replicating Read Locks via Replication Engine Intelligence, depicts another method for replicating read locks by binding user-defined rules into the replication engine.

DETAILED DESCRIPTION OF THE INVENTION

To better explain the background of the invention, to provide an overview of the invention, and to provide an overview of the issues that the invention addresses, the disclosure of material is broken out into four parts:

Part 1—Data Replication—An Overview

Part 2—Synchronous Replication via one Preferred Embodiment Overview

Part 3—Synchronous Replication Issues and Concerns Overview

Part 4—Preferred Embodiment Detailed Description

Certain terminology is used herein for convenience only and is not to be taken as a limitation on the present invention. The table of contents for the detailed disclosure follows.

1 Part 1: Data Replication—An Overview
  1.1 Data Replication—A Review
  1.2 What is Data Replication?
  1.3 Asynchronous Replication
    1.3.1 The Asynchronous Data Replication Engine
    1.3.2 Asynchronous Replication Issues
  1.4 Synchronous Replication
    1.4.1 Methods for Synchronous Replication
    1.4.2 Synchronous Replication Issues
  1.5 Unidirectional Replication
  1.6 Bidirectional Replication
    1.6.1 Ping-Ponging
    1.6.2 Data Conflicts
    1.6.3 Split Brain
  1.7 Active/Active Systems
  1.8 Business Continuity
    1.8.1 Recovery Point Objective
    1.8.2 Recovery Time Objective
    1.8.3 The RPO/RTO Relationship
    1.8.4 Disaster Recovery
    1.8.5 Disaster Tolerance
    1.8.6 The Business Continuity Continuum
2 Part 2: Synchronous Replication via one Preferred Embodiment Overview
  2.1 Synchronous Replication with Shadowbase® Plus SR™
  2.2 The Shadowbase Replication Suite
  2.3 Shadowbase Asynchronous Replication Architecture
    2.3.1 Shadowbase Asynchronous Unidirectional Replication
    2.3.2 Shadowbase Asynchronous Bidirectional Replication
  2.4 Shadowbase Plus SR Synchronous Replication
    2.4.1 Attributes
    2.4.2 The Two-Phase Commit Protocol
    2.4.3 The HP Synchronous Replication Gateway
    2.4.4 Shadowbase Plus SR Replication Architecture
    2.4.5 Application Latency
    2.4.6 Scalability
    2.4.7 Audit Trail Synchronization
    2.4.8 Node Failure and Recovery
    2.4.9 Replication Engine Failure and Recovery
    2.4.10 Transaction Failures
    2.4.11 Replicating Events for Transactions Synchronously vs Asynchronously
    2.4.12 Insuring Synchronous Replication for Key Data via Shadowbase Plus SR
3 Part 3: Synchronous Replication Issues and Concerns Overview
  3.1 Synchronous Replication Issues and Concerns
  3.2 Other Synchronous Replication Issues
    3.2.1 Application Latency
    3.2.2 Communication Channel Latency
    3.2.3 Throughput
    3.2.4 Application Scalability
    3.2.5 Simultaneous Transactions
    3.2.6 Longer Lock Life and Data "Hot Spots"
    3.2.7 Referential Integrity and Data Consistency
    3.2.8 Additional Aborts
    3.2.9 Issues with NonStop AutoTMF
    3.2.10 Network Requirements
    3.2.11 Performance
    3.2.12 Application Modifications
  3.3 Failure Management and Recovery
    3.3.1 TMF Configuration
  3.4 Bidirectional Issues
    3.4.1 Distributed Deadlocks
    3.4.2 Unique Alternate Keys
    3.4.3 Split-Brain Mode
    3.4.4 Active/Active Application Issues
    3.4.5 Replicating Read-Only Lock Operations
    3.4.6 Eliminating Planned Downtime
  3.5 Shadowbase Plus SR Application Latency
4 Part 4: Preferred Embodiment Detailed Description
  4.1 Preferred Embodiment Requirements
  4.2 Preferred Embodiment Goals
  4.3 Overall Architecture of one Preferred Embodiment
    4.3.1 Components
    4.3.2 The Transaction Lifecycle
  4.4 Ready to Commit (RTC) Synchronization in one Preferred Embodiment
    4.4.1 Audit Based Ready to Commit Tokens
    4.4.2 Time Based Delay
    4.4.3 Metronome Process
    4.4.4 ATP Flush Indication
    4.4.5 Ready to Commit (RTC) Path
  4.5 Minimizing Impact on Non-Replicated Transactions in one Preferred Embodiment
  4.6 Registering a Transaction in one Preferred Embodiment
  4.7 Transaction Based Routing in one Preferred Embodiment
    4.7.1 Overview
    4.7.2 Options
    4.7.3 Eliminating Ping Ponging
  4.8 Asynchronous/Synchronous Transaction Mix in one Preferred Embodiment
    4.8.1 Background
    4.8.2 Detection of Asynchronous Transactions
    4.8.3 Processing of Asynchronous Transactions
    4.8.4 Transaction Sequencing
    4.8.5 Multiple Routers and Asynchronous Transactions
    4.8.6 Mostly Asynchronous Transaction Processing
  4.9 Request to Sync (RTS)/Partial Commits in one Preferred Embodiment
    4.9.1 Overview
    4.9.2 Shadowbase Plus SR Implementation
    4.9.3 Replicated Locks
  4.10 Application Library in one Preferred Embodiment
    4.10.1 Design Restrictions
    4.10.2 Initialization
    4.10.3 Verifying Library Usage
  4.11 Latency Tracking in one Preferred Embodiment
    4.11.1 Latency while Registering the Transaction
    4.11.2 Latency while Committing
  4.12 Configuration of one Preferred Embodiment
    4.12.1 Connection Configuration
    4.12.2 Failure Processing Configuration
    4.12.3 RTC Processing Configuration
    4.12.4 Metronome Configuration
    4.12.5 Consumer Pool Configuration
  4.13 Fault Tolerance and Failure Analysis in one Preferred Embodiment
    4.13.1 Recovery Modes
    4.13.2 Failure Determination
    4.13.3 Source Transaction Failure
    4.13.4 Target Transaction Aborts
    4.13.5 Process Failures
    4.13.6 Processor failure
    4.13.7 Node Failure
    4.13.8 Network Failure 4.14 Deadlock Issues in one Preferred Embodiment
    4.14.1 Synchronous Replication Deadlocks
    4.14.2 Database Partitioning
    4.14.3 Global Locks
    4.14.4 Designated Winner
    4.14.5 Replicating Read Locks
4.15 NonStop Replication Issues with one Preferred Embodiment
    4.15.1 Issues with Unique Alternate Keys
    4.15.2 Nondeterministic Transaction Ordering
    4.15.3 Network Transactions
    4.15.4 Integration with AutoTMF
4.16 Restart Processing in one Preferred Embodiment
    4.16.1 Backlog Processing
    4.16.2 Switching Modes
    4.16.3 Commit Processing During Restart
    4.16.4 Status Checking During Restart
4.17 Startup Processing in one Preferred Embodiment
    4.17.1 Target Database Synchronization
    4.17.2 Replication Startup
    4.17.3 Application Startup
4.18 Recovery Processing in one Preferred Embodiment
4.19 Data Loading in one Preferred Embodiment
    4.19.1 Autoloader Integration
    4.19.2 SOLV Integration
4.20 Transactions without Log Records in one Preferred Embodiment
4.21 Implicit Transactions in one Preferred Embodiment
    4.21.1 Intercept the Generated Code
    4.21.2 Make the Transaction Explicit
    4.21.3 Register the Transaction via a Database Trigger
4.22 Scalability and Performance in one Preferred Embodiment
    4.22.1 Overview
    4.22.2 Application
    4.22.3 AUDCOOR
    4.22.4 AUDCONS
    4.22.5 AUDCOLL
    4.22.6 AUDRTR
    4.22.7 Restarting With Multiple Collectors and Routers
    4.22.8 Database Specification Considerations
4.23 Router (AUDRTR) Algorithms in one Preferred Embodiment
    4.23.1 Allocating Transactions
    4.23.2 Transmitting Buffers
4.24 Future Changes in one Preferred Embodiment
    4.24.1 Audit Readers
    4.24.2 Expedited Transactions
    4.24.3 Schema Management
    4.24.4 DBS Based Replication with a Single Target Transaction
1 Part 1: Data Replication—An Overview
1.1 Data Replication—A Review Part 1 of this overview describes the various data replication techniques in use today. It starts with a high-level view of data replication and notes that there are two important types—asynchronous replication and synchronous replication. Both can be used to maintain geographically-separated database copies in synchronism, thus allowing the configuration of systems that will tolerate site disasters with little or no data loss and with near instant recovery.

Asynchronous replication is discussed first. Its primary advantage is that it is noninvasive to the applications, requiring no modifications and imposing no performance penalties. However, there may be some loss of data following a node failure.

The problem of data loss is solved by synchronous replication, which ensures that either all database changes are made to all database copies across the network or that none are. Therefore, synchronous replication guarantees an RPO (Recovery Point Objective) of zero. However, synchronous replication has its own issue, which is that transactions are delayed while transaction completion is assured across the network. This delay increases transaction response times. Furthermore, synchronous replication is invasive to the application, the extent of which depends upon the method of synchronous replication used.

Both asynchronous and synchronous data replication can be used bidirectionally to keep multiple active databases in synchronism with each other. This leads to active/active systems, in which two or more geographically-distributed processing nodes cooperate in the same application. Should a node fail, all that is required is to redirect users or transactions to surviving nodes, resulting in recovery times measured in seconds or less. Thus, RTO (Recovery Time Objective) can be reduced to near zero.

However, bidirectional replication adds a new problem; and this is data conflicts. A data conflict occurs when two nodes attempt to modify the same data item at the same time. Methods to avoid or to resolve data conflicts are presented.

Finally, Part 1 compares the various technologies used today to provide backup data processing facilities to ensure business continuity in the face of a disaster. These technologies are compared graphically on a business continuity continuum.

1.2 What is Data Replication?

As shown in FIG. 1, data replication is a technique for keeping multiple database copies in synchronism. The source database is hosted by the source node (also called the originating node) and the target database is hosted by the target node (also called the destination node). In some cases, the source and target nodes can be the same node. Note that there can be more than one target node, and a target node can also be a source node (as is the case in bidirectional replication), but for simplicity case, only two nodes are discussed in this description.

The two nodes comprise the data processing system. The two nodes can be local to each other, or remote from each other (when used for business continuity/disaster tolerance purposes, the two nodes are generally remote from each other). In some special cases, the two nodes are actually physically resident on the same node.

As changes (inserts, updates, and deletes) are made by an application to its local database (the source database), those changes are sent immediately over a communication channel to the target database copy, which is typically on another independent node that can be hundreds or thousands of miles away.

In many cases, the application is distinct from the replication system. In others, the replication system (or parts thereof) are embedded into the application (the application provides some of the services, or steps, that the replication system needs, such as the gathering of the transaction steps or operations that need to be replicated).

Properly done, the target database is a current and consistent copy of the source database and can even be used by applications running on the target node. In fact, the target database can also be a source database being changed by its local applications, with these changes being replicated to other database copies.

A common technique for data replication is to use a data replication engine, as shown in FIG. 2. Many off-the-shelf data replication engines are available today to replicate data between any two databases, even if they are different.

Multiple databases in the application network can be kept in synchronism by simply configuring a replication engine between each pair.

The term "database synchronization" must be qualified. Without further explanation, one would assume that the database copies are perfectly synchronized and are exact copies of each other at any point in time. This, in fact, can be accomplished with a technique known as synchronous replication. However, with synchronous replication, the modifying application must wait for all of the remote copies of the database to confirm that they have successfully made a change in order to ensure that the database copies are, indeed, kept in synchronism. This has the effect of delaying the completion of transactions, thus slowing transaction response time. The delay is known as application latency.

The problem of application latency is solved by another replication technique known as asynchronous replication. With asynchronous replication, changes are replicated after they have been made to the source database and without any interaction with the application. Asynchronous replication comes with its own set of issues, primarily the fact that the database copies are not exactly in synchronism. The target database copies can lag the source database copies by times measured anywhere from milliseconds to seconds. This delay is known as replication latency. Replication latency can lead to data loss following a node failure and to database corruption due to changes being made simultaneously to different database copies within the application network.

Asynchronous replication and synchronous replication and their advantages and issues are now discussed.

1.3 Asynchronous Replication 1.3.1 The Asynchronous Data Replication Engine 1.3.1.1 Architecture An asynchronous data replication engine is completely transparent to (decoupled from) the applications running in the source node. It does not interact with the applications at all. Rather, as shown in FIG. 3, an Extractor picks up changes made to the source database from a change queue and sends them after-the-fact to the Applier at the target database. Changes are made to the target database copy by the Applier somewhat later than they were made to the source database. The result is that the databases are kept in synchronism, but the target database copy lags the source database by a short interval, that is, the replication latency of the data replication engine.

To maximize the efficiency of the communication channel, the Extractor can be configured to buffer many changes before transmitting them as a large block to the Applier in the target node. In this way, many fewer messages need to be transmitted as compared to having to transmit each change one at a time as a small message.

Note that the source database and the target database can be resident on the same node, or can each be resident on a different node. Typically, for disaster tolerance, the target node/database is remote from the source (or originating) node/database by a distance far enough to negate or minimize the effects of regional disasters (e.g., hurricanes, tornados, power outages in the power grid, etc).

1.3.1.2 The Change Queue

The data replication engine must be given the changes made to the source database. This is done via a change queue, which as its name implies holds a queue of changes that have been made to the source database. The replication engine reads the changes from the change queue via its Extractor process, which sends them over the communication channel to the target database. There the changes are received by the replication engine's Applier process, which applies them to the target database copy.

The change queue should be a persistent queue to protect the replication engine from hardware and software faults. If a failure of some sort should cause replication to fail, changes that have not yet been sent must still be available when replication is restored. For this reason, the change queue is usually disk-resident so that change entries survive despite a failure of any kind.

Depending upon the system characteristics, the change queue can be implemented in many ways:

1. The application may already write its changes to a change log for auditing or for other purposes.
2. An intercept library bound into the application can intercept database calls and can forward them to the database subsystem as well as to the change queue. In some implementations, the intercept library can forward the changes to the target environment directly and apply them directly into the target database.
3. Database triggers can be invoked to write changes to the change queue.
4. Transaction managers maintain a record in a transaction log of the changes being made by each transaction (in HP NonStop systems, this is the audit trail).

In any of these cases, no modifications are required to be made to the applications; and the applications are unaware that replication is even taking place. Therefore, the use of an asynchronous replication engine is totally noninvasive to the applications that it is serving.

1.3.1.3 Heterogeneity

Asynchronous replication can be heterogeneous with today's replication engine products. They can replicate between diverse databases whether they be different versions from the same vendor, databases from different vendors, or even databases with different structures, such as from HP's NonStop Enscribe file system to an Oracle relational database. Required format changes from one database structure to another are provided by rules that can be established within the replication engines themselves.

1.3.2 Asynchronous Replication Issues 1.3.2.1 Replication Latency

A very important characteristic of asynchronous replication is that there is a delay from the time that a change is made to the source database to the time that it is made to the target database. Depending upon the replication engine, this replication latency can range from milliseconds to seconds or beyond.

Replication latency causes several problems that may have to be dealt with, as described later. The shorter the replication latency, the less severe are these problems. Therefore, it is important to select a replication engine that is very fast—fast enough to meet the requirements of the application. Replication latency is controlled by several factors, some within the control of the replication engine and some not. The delay factors in replication latency include:

1. the time that it takes to get a change into the change queue (this delay is generally out of the control of the replication engine).
2. the time that it takes the replication engine to read a change from the change queue.
3. the time that a change sits in the communication buffer before it is sent to the target node.
4. the time that it takes to propagate the change over the communication channel (about 1 millisecond per hundred miles—out of the control of the replication engine).

5. the time that it takes to apply the change to the target database.

With today's systems, processing delay in the replication engine's components is not a significant factor. However, any additional disk queuing points in the replication engine will also add to the replication latency. The faster replication engines are process-to-process and have no disk queuing points except for the change queue.

1.3.2.2 Data Loss on Source Node Failure

One impact of replication latency is data loss following a failure of the source node. Any changes that were in the replication pipeline and that have not made it to the Applier in the target node will be lost. As shown in FIG. 4, they include changes that at the time of failure have not yet made it to the change queue, those that are still in the change queue, and those that have been read from the change queue but are still waiting in the communication buffer for transmission to the target node.

Depending upon the communication protocol used, changes that are in transit over the communication channel or changes that have not yet been applied to the target database may also be lost.

This data loss is related to RPO, the Recovery Point Objective. RPO is a measure of an application's tolerance to data loss. For instance, a company may decide that it can lose up to an hour's worth of data. Alternatively, it may decide that it can only lose one second's worth of data or that the application must lose no data at all. The amount of data loss that is tolerable is the RPO for that application.

If the RPO is specified to be in seconds or milliseconds, replication latency becomes quite important. The replication latency of the replication channel must be less than the RPO requirement for the application. Today's asynchronous replication engines can achieve replication latencies measured in the tens of milliseconds. If RPO is zero (such as in a stock trading system), this cannot be achieved via asynchronous replication. This is the realm of synchronous replication, described later.

Of course, if the failed node is revived promptly, all of the lost changes are still in its change queue; and these can be recovered.

1.3.2.3 Target Node Failure

When a target node fails, changes that are directed to it simply accumulate in the source node's change queue. When the target node returns to service, the accumulated changes are sent to it by the replication engine followed by new changes, as usual.

1.3.2.4 Referential Integrity

Referential integrity refers to the correctness of the database. To satisfy referential integrity, every child row (like an invoice detail line) must have its parent (like the invoice header) resident in the database. Most relational databases provide referential integrity checking. If a database change violates referential integrity, it can be rejected.

Therefore, replicated changes must be applied in such an order so as to satisfy referential integrity. Providing that the source database satisfies referential integrity, most replication engines will apply all changes in the same order to the target database as they were applied to the source database. Therefore, referential integrity is preserved.

Some high-performance replication engines can provide multiple replication threads to increase capacity. In such cases, changes are not necessarily guaranteed to arrive at the target in the proper order. These replication engines may have special features that allow them to reorder the changes so that they are applied properly.

Note that the multiple replication threads can be implemented thru a variety of methods, and several methods can be in use at the same time. In some cases, there are a number (typically more than one) of appliers (the processes that apply the database changes to the database). These appliers can be resident at the target node, the source node, or a combination thereof.

Having one or more than one applier is often referred to as a "plurality of appliers", and each often represents a separate replication "thread". The appliers can be implemented as separate processes (separate instances of processes), each typically with one execution thread.

Note that the appliers can be resident at the target node, as well as at the source, or originating, node, or both. The appliers are generally located at the target to improve the efficiency of their target database interaction.

Sometimes the multiple replication threads can be implemented as one or more execution "threads" in each process (this is sometimes referred to as a multi-threaded process). The replication engine can thus consist of a single multi-threaded process, a number of processes each with one or more execution threads, or any combination thereof.

The events that are replicated by the replication engine are usually data manipulation language (DML) I/O events (such as insert, update, and delete operations), or data definition language (DDL) events (such as create table, drop table, alter table, and schema change operations, etc).

In some databases, the events are grouped into logical entities called "transactions". The events inside a transaction are often referred to as "transaction steps" or "transaction operations". The events are sometimes called steps when they affect zero or one record or row in the database (e.g., delete the account record for account ID 12345). In other cases, the events are called "operations" or "statements" when they affect zero, 1, or more than one record or row (e.g., delete all of the account records with a negative balance).

Transactions usually adhere to the ACID properties (atomic, consistent, isolated, durable), and are applied as a single unit of work (either all changes/events in the transaction are applied, or none are). Transactions hence can consist of individual transaction steps, transaction operations, or a combination thereof.

1.3.2.5 Disaster Tolerance

The real strength that asynchronous replication brings is disaster tolerance. Since the target node can be any distance—even thousands of miles—from the source node, redundant data centers can be established well beyond the distance that would be impacted by any single disaster such as an earthquake, hurricane, flood, or terrorist attack. The only penalty as distance becomes greater is an increase in replication latency due to communication channel transit time.

1.4 Synchronous Replication

Synchronous replication solves the asynchronous replication problem of data loss following a node failure. With synchronous replication, no change is made to any database copy unless that change can be applied to all database copies. Therefore, should a node or the network fail, no data is lost. Synchronous replication can satisfy RPOs (Recovery Point Objectives) of zero.

A synchronous replication engine first acquires locks on all copies of a data item to be changed. Only after it has acquired all locks will it authorize the change. At that time, each database copy will commit the change and will release the lock on its local copy of the data item.

Though individual changes can be synchronously replicated, synchronous replication is usually done at the transaction level. A transaction is first started on each database copy.

As each change in the transaction is submitted to the source node, its transaction manager requests a lock on that data item from each of the target databases involved in the transaction. It can do this either with a specific lock request or by sending the change to each target database, which will acquire the lock and which may or may not apply the change pending a commit directive.

When the source node issues a transaction commit, the source transaction manager asks each database copy if it is ready to commit all of the changes making up the transaction. This is the first phase of a two-phase commit process. If a database copy is holding locks on all of the data items, it replies positively. Should the source transaction manager receive positive responses from all of the database copies, it issues a commit directive (phase 2 of the commit process); and all database copies commit their changes and release their locks. Should any database copy indicate that it cannot commit the transaction, the transaction is aborted. Pending changes, if any, are rolled back; and all locks are released in all database copies.

Thus, the transaction is either applied to all database copies, or it is applied to none of them. Consequently, should a system fail, no data is lost except transactions that were in progress at the time of the failure and had not yet been committed. Their associated changes will appear in none of the database copies.

1.4.1 Methods for Synchronous Replication

There are three major methods for implementing synchronous transaction replication—network transactions (sometimes referred to as "dual writes" or "multi writes" when there are more than 2 nodes being replicated to synchronously), coordinated commits, and distributed lock management. Though the focus is on coordinated commits in this overview, a review of all of these synchronous replication techniques is provided for completeness and comparison. Although coordinated commits are one preferred embodiment, any of these synchronous replication approaches can be used in the present invention.

1.4.1.1 Network Transactions

Network transactions are the easiest to understand. All of the copies of the data items to be changed are simply included in the scope of the transaction, as shown in FIG. 5. The application first begins a transaction on each database copy to be included in the transaction (1). It then identifies and captures and sends the transaction changes to each database copy (2) followed by a commit command to each copy (3). Although there are several approaches to gathering the data to be replicated, a common one is for the application to use an intercept library to capture the transaction steps or operations to be replicated. The transaction managers in the database copies will cooperate to either commit the transaction across all database copies or to abort it.

Network transactions have several issues:

1. Each data item change must be sent across the network (hence the "dual" aspect to "dual writes"—you are doing each write twice, once locally and once remotely (actually, once remotely per target node database being written to)). Since the next change is generally not sent until the prior one has completed, the application must wait until each operation completes across the network. This means that each operation is synchronously processed locally and remotely at the same time, and the operation does not complete until both the local and remote changes have each completed. Even worse, updates, which will change a row's contents, generally require two operations across the network—a read followed by a write. Thus, several communication channel round-trip times are added to the application's transaction response time.
2. Since each change is sent across the communication channel as an independent small message, the communication channel is not being used efficiently. At high transaction rates, network transactions can impose a significant load on the communication channel.
3. Network transactions are invasive to the application. The application must be modified to include all database copies in the scope of the transaction (in some cases, an intercept library can be bound into the application to gather the database changes either before or after they are made). There are some products that use network transactions to provide synchronous replication. OpenVMS split-site clusters are one example. However, these products typically require that applications run under a particular operating system or support a certain set of technology (such as interpose libraries on an HP Non-Stop system).
4. Recovery from a node failure is complex. If one of the nodes fails, how does synchronous replication continue? One solution is to remove the failed node from the scope of further transactions—a capability that must be built into the application. In addition, some procedure must be created to return a failed node to service.

1.4.1.2 Coordinated Commits

Coordinated commits use an asynchronous replication engine to move changes from the source node to the target node. A simplified view of the coordinated commit process is shown in FIG. 6. Working with the transaction manager, the asynchronous replication engine joins each transaction as it is begun (1). The begin directive can either be sent directly to the target database over the replication channel, or it can be implicit in the first change received by the target database for that transaction. In either case, a new transaction is initiated at the target database and is independent of the source's transaction.

Changes issued by the application are asynchronously replicated to the target database as they are applied to the source database (2). Thus, until commit time, the application is unaware that replication is taking place. However, at commit time (3), the replication engine is asked to vote as to whether or not it is ready to commit the transaction at the target database via a ready to commit query (RTC?) sent to it over the replication channel (3a). If it is, it returns a positive RTC acknowledgement (RTC!) (4); and the transaction is committed at both the source and the target databases (5). Otherwise, the transaction is aborted.

This process is shown in more detail in the Unified Modeling Language (UML) Sequence Diagram of FIG. 7. A transaction is begun by the application sending a begin transaction request to the transaction manager (1). The begin transaction directive is implicitly delivered to the target node via that transaction's first change received by the target node (1a).

As the application changes the database as part of this transaction (2), the changes are made to the source database by the transaction manager (2a). The transaction manager also puts the changes into the change queue (2b), from where they are replicated to the target database via the replication engine (2c). At the target node, locks are acquired on the data items to be changed; and the changes are either held or are tentatively applied pending a commit directive (2d).

When the application commits the transaction (3), a "ready to commit?" query is sent down the replication channel by the transaction manager (3a, 3b). By sending this query via the replication channel, it is guaranteed that it will arrive at the target after all changes have been received by the target database.

The replication engine checks to ensure that locks are being held on all data items to be changed, and if so it returns a "ready to commit" response to the transaction manager on the source node (4). If the response is affirmative, the source transaction manager issues a commit directive to the source database (5). It also inserts a commit directive into the change queue (5a), from where it is replicated to the target database (5b). At the target database, the changes are made permanently; and the locks are released (5c). Also at this time, the transaction manager informs the application that the transaction has committed (5d).

If the database copy indicates that it cannot complete the transaction (for instance, perhaps it could not acquire all of the necessary locks), the transaction is aborted. All pending changes are rolled back on all of the database copies, and the transaction has no effect.

It is important to note that the transactions at the source node and at the target node are different. This allows the target transaction to proceed independently of that at the source node without affecting the source node until commit time. At that time, the coordinated commit facility ensures that both transactions can commit successfully before committing either of them. If one transaction cannot compete successfully, then both are aborted.

Furthermore, if the target system should fail during a transaction, the transaction can still complete on the source system. Transaction processing can continue in the presence of the failed system by simply excluding it from commit voting. This is in contrast to network transactions, in which a single transaction spans multiple nodes. If a node fails, transaction processing cannot continue without reconfiguring the applications to exclude the failed node from further transactions.

Compared to network transactions, coordinated commits have the following characteristics:
1. A network round trip is not required for each change. Rather, changes are buffered and are sent asynchronously to the target with no impact on the application. However, at commit time, a replication interval plus a round-trip channel delay are incurred as the application waits for the "ready to commit" response from the target node.
2. Since changes are sent in large blocks, the use of the communication channel is much more efficient.
3. Since the synchronous replication engine is simply an extension to an asynchronous replication engine, coordinated commits are noninvasive to the application. No application changes are required.
4. Recovery from a node failure is straightforward and is a function provided by the replication engine. Should a node fail, it is removed from the scope of future transactions. Changes destined for the downed node are queued in the change queue. When the failed node is returned to service, the queue of changes that have accumulated during its down time is drained to it. The recovered node can then be returned to synchronous service.

1.4.1.3 Distributed Lock Management

Distributed lock management (DLM) is a synchronous replication technique that is a cross between network transactions and coordinated commits (FIG. 8). When a transaction is started, DLM begins a transaction (1) that is replicated to the database copy (1a). As each change request is received (2), DLM reaches across the network to obtain locks on the copies of the data items to be changed (2a, 2b). Only if it is successful in acquiring the locks is the transaction allowed to proceed (2c). Therefore, locks are held on all data items across the network before those data items are changed.

The actual change data is sent to the target node via asynchronous replication (2d) so that the propagation of the data changes across the network is transparent to the application. Likewise, when the application commits the transaction (3, 3a), the commit can be immediately replicated to the target database (3b) because DLM knows that the target database is holding all required locks.

Distributed lock management has substantially the same application-delay characteristics as network transactions since each lock requires a network round-trip time to acquire a lock. Therefore, it is just as sensitive to communication latency as are network transactions.

DLM's use of the communication channel has similarities to both network transactions and coordinated commits Like network transactions, many small messages must be sent as each lock is individually requested. This leads to network inefficiencies. However, like coordinated commits, DLM makes more efficient use of the communication channel when propagating data to the target node since it uses asynchronous replication for this purpose. A large number of changes can be buffered and sent in a single communication block.

Distributed lock management can, in principle, be implemented with no application modifications. However, as a general rule, the disk drivers (or database management system) must support distributed locks, as described above.

Recovery from a node failure is substantially the same as that for coordinated commits.

1.4.2 Synchronous Replication Issues

Synchronous replication solves the asynchronous problem of data loss following a source node failure. A transaction is either committed across all nodes in the application network, or it affects none of them.

However, it comes with its own set of issues that are dependent in some cases on the implementation method for synchronous replication.

1.4.2.1 Application Latency

An application using synchronous replication is delayed as it is ensured that the transaction will commit on all remote databases. Using some synchronous replication techniques, the transaction is also delayed as each change is applied to all of the remote databases. These delays increase transaction response time. This delay is known as application latency. The effects of application latency are different for different synchronous replication techniques. As discussed below, the result is that network transactions or distributed lock management might be better for campus networks and small transactions; but coordinated commits are decidedly better for longer-distance networks and/or large transactions.

1.4.2.2 Network Transactions

A network transaction requires two communication channel round trips for each update—one to read the row prior to modifying it and one to rewrite the modified row. In addition, the two-phase commit process requires an additional two round trips. The begin transaction command may require an extra round trip if it is not implicit in the first update.

FIG. 9, part a) illustrates the network transaction application latency for a transaction that has four updates plus a commit. Ten communication round trips are required to execute this transaction.

1.4.2.3 Coordinated Commits

The application latency for coordinated commits is quite different, as shown in FIG. 9, part b. The number of updates in the transaction does not matter since they are replicated asynchronously and have no impact on the application. It is only at commit time that the application must wait to determine that all nodes that have joined the transaction are ready to commit.

To do this, a "ready to commit?" query is sent to the target node via the replication channel. This query must be replicated rather than being sent directly to the target node over the communication channel to ensure that it arrives at the target node after the last update has arrived. Therefore, it will take a time equal to the replication latency interval plus a one-way trip over the communication channel for the target node to receive the query.

If the target node is ready to commit the transaction (that is, it has acquired locks on all data items to be updated and has safe-stored or tentatively applied the updates), it replies in the affirmative with a "ready to commit" response. At this time, the source node can issue the commit directive and can inform the application that the transaction has been committed.

Therefore, the application must wait for a time equal to the replication latency of the replication engine plus one communication channel round trip before the commit directive is issued. This is the application latency associated with coordinated commits.

1.4.2.4 Distributed Lock Management (DLM)

The application latency associated with DLM is a combination of that associated with both network transactions and coordinated commits. The application must wait for one communication channel round trip for each update in order to acquire the locks on the data items to be updated. It then must wait a replication latency time plus another channel round-trip time to determine that the target is ready to commit.

Thus, DLM's application latency is a replication latency interval plus a number of communication channel round trips equal to the number of updates plus one. Its application latency may or may not be greater than that for network transactions, but it will always be greater than the coordinated commit application latency.

1.4.2.5 An Example

Consider two cases so that typical application latencies can be compared. In Case 1, there are two nodes separated by 100 miles. The round-trip communication latency is two milliseconds. In Case 2, the two nodes are on the opposite coasts of the United States, separated by 2,500 miles. The round-trip communication latency for this case is 50 milliseconds.

In either case, the replication latency of the data replication engine is 40 milliseconds.

Table 1 shows the application latency for network transactions, coordinated commits, and distributed lock management for each of these cases using a transaction comprising four updates.

For the shorter distance of 100 miles, network transactions impose an application latency of 20 msec. compared to 42 milliseconds for coordinated commits. Therefore, for shorter distances and small transactions, network transactions may be the preferred synchronous replication technique.

TABLE 1

Application Latency

|  | Case 1 | Case 2 |
| --- | --- | --- |
| Separation | 100 miles | 2,500 miles |
| Round-trip Communication Time (C) | 2 msec. | 50 msec. |
| Replication Latency (L) | 40 msec. | 40 msec. |
| Updates | 4 | 4 |
| Network Transactions (10C) | 20 msec. | 500 msec. |
| Coordinated Commits (L + C) | 42 msec. | 90 msec. |
| Distributed Lock Management (L + 5C) | 50 msec. | 290 msec. |

However, as the distance between the nodes increases, this situation changes rapidly. For the continental distance of 2,500 miles, coordinated commits impose an application latency of only 90 milliseconds compared to 500 milliseconds for network transactions. Thus, coordinated commits outperform network transactions for longer distances. By the same token, coordinated commits will outperform network transactions for large transactions since application latency is independent of transaction length.

In neither case is distributed lock management superior.

1.4.2.6 Throughput

Even though synchronous replication increases the transaction response times of the applications using it, this does not affect the throughput of the system. Each transaction thread is putting less of a load on the system since it is taking longer to execute. Therefore, to achieve equivalent throughput, all that needs to be done is to run additional transaction processing threads.

In HP NonStop servers, this means running additional Pathway processes as transaction servers. Alternatively, multithreaded processes using no-waited I/O can be used.

1.4.2.7 Node Failure and Recovery

The tolerance to node failure is the same for synchronous replication as it is for asynchronous replication. The system is down only if all of its spare nodes plus one more have failed.

However, when a node fails, the situation is a little more complex. That node must be removed from the scope of all future transactions until the node has been returned to service. Otherwise, no synchronous transaction can complete. That node's database must then be resynchronized before it can rejoin application transactions. The recovery process is complex enough that it should be done transparently by the replication engine and not left as an operator procedure.

1.4.2.8 Disaster Tolerance

The achievement of disaster tolerance depends upon separating the nodes of an application network by distances that will ensure that no single disaster will take down more than one node. Disasters include natural disasters such as earthquakes, hurricanes, and floods as well as man-made disasters such as civil unrest and terrorist attacks. Application latency can limit the distance that nodes can be separated, thus compromising their tolerance to disasters. This is especially true if network transactions or distributed lock management is used.

With these latter techniques, long distances can add seconds to large transactions. Therefore, the distances are limited to campus or perhaps metropolitan networks in many applications. This severely limits the disaster tolerance that can be achieved.

With coordinated commits, however, application latency is impacted much less severely since it is affected only by a single communication channel round-trip delay. Therefore, with coordinated commit synchronous replication, nodes can be separated by arbitrarily large distances—up to thousands of miles—and still provide acceptable transaction response times. Consequently, coordinated commits provide much better disaster tolerance In one preferred embodiment, synchronous replication is performed using the coordinated commit approach. However, each of the other synchronous replication approaches, techniques, or architectures (e.g., dual writes or distributed lock management) can also be used when the replication engine runs in synchronous mode.

1.5 Unidirectional Replication

So far, asynchronous and synchronous data replication techniques have been described as being useful for keeping a target database in synchronism with a source database. Data replication is a very useful technique to keep an active system and its backup system synchronized so that the backup system can continue to provide data processing services should the active system fail. Such replication is called unidirectional replication since replication is done only in one direction—from the active system to the standby system.

1.6 Bidirectional Replication

However, there are significant advantages to being able to replicate in both directions, a technique known as bidirectional replication. In this case, the nodes are peers; and both (or all) may be actively processing transactions or queries. This leads to the concept of active/active systems or sizzling-hot standby systems, topics which are discussed later.

Bidirectional replication and some significant issues that must be understood before using this technology are discussed next.

There are many cases in which it is desirable to replicate data in both directions. This is bidirectional replication (FIG. 10). An important example of bidirectional replication is an active/active system in which an application is running on multiple nodes in an application network. Each node has its own copy of the application database, and these database copies must be kept in synchronism. When a change is made to one database copy, that change must immediately be reflected in all database copies. This synchronization may be accomplished with either asynchronous or synchronous replication.

A key advantage of active/active systems is that recovery from a node failure can be accomplished in seconds or less, meaning that very fast RTOs (Recovery Time Objectives) can be met. Active/active systems can satisfy RTOs of near zero. In addition, if synchronous replication is used, an RPO of zero can be satisfied, This is accomplished by bidirectional data replication. With bidirectional data replication, each node in the application network can be making changes to its local copy of the database. When a change is made to one database copy, it is replicated to all other database copies in the application network. Bidirectional replication is generally implemented by configuring a separate replication engine for each direction, as shown in FIG. 10.

Bidirectional replication brings with it its own set of issues. These include ping-ponging and data conflicts.

1.6.1 Ping-Ponging

Changes made to a source database are entered into a change queue for forwarding to the remote target database. If provisions are not otherwise made, changes replicated to the target database will likewise be entered into its change queue and will be sent back to the source database, as shown in FIG. 11. Changes will circulate endlessly between the two databases, a situation known as "ping-ponging."

Any replication engine that is to be used in a bidirectional mode must protect itself against data oscillation (data ping-ponging).

1.6.2 Data Conflicts

In a bidirectional system, applications at different nodes are independently and simultaneously updating the database. Since it takes some time, though brief, for each node to know what the other node is doing, it is quite possible that two applications running on different nodes in an application network may try to change the same data item at roughly the same time. This is a data conflict.

The impact of a data conflict is different for asynchronous replication and synchronous replication. In asynchronous replication, data collisions are the result. In synchronous replication, data conflicts lead to distributed deadlocks.

1.6.2.1 Asynchronous Replication

1.6.2.1.1 Data Collisions

Under asynchronous replication, if two applications on different nodes attempt to change the same row within the replication latency of the data replication engine, they will both succeed, not knowing that the application on the other node is also doing so. Each will then replicate its change to the other node, overwriting the change to the data item originally made at that node. Now both databases are different, and both are wrong. This is known as a data collision.

In the example of FIG. 12, the application running in Node 1 is trying to change Row A to a value of 3. The application in Node 2 is trying at the same time to change the value of Row A in its database copy to a value of 6. Node 1's replication engine dutifully replicates the value of 3 to Node 2, where the change overwrites the original change to a value of 6 made by Node 2's application. Simultaneously, Node 2's replication engine replicates the change made by Node 2's application to Node 1, changing its value from 3 to 6. Row A in Node 1 now reflects the value written by the Node 2 application, and vice versa. Both databases are different, and both are wrong.

In fact, there is no correct answer in this case. Either data collisions must be avoided or one of the changes must be rejected

1.6.2.1.2 Avoiding Data Collisions

If the application permits, it can be architected to avoid data collisions. One technique is to use partitioning. The database is partitioned so that each partition is owned by a specific node in the application network. Only the owning node can change its partition. Its changes are replicated to all of the other nodes so that each node has a complete and current copy of the database, but data collisions cannot occur.

There are many ways that the database can be partitioned. For instance, as shown in FIG. 13, all customers whose names start with A through M are in one partition; and all customers whose names begin with N through Z are in another partition. Node 1 owns the A-M partition, and only it can apply changes to that partition. All other changes are made by Node 2, which owns the N-Z partition. If one node receives a change for a partition that it does not own, that change must be sent to the owning node.

Another collision avoidance technique is to use relative replication. Rather than replicating row images, only the operation on the row is replicated. For instance, as shown in FIG. 14, Row A begins with a value of 10. Node 1 adds 2 to Row A, and the operation "+2" is replicated to Node 2. At the same time, Node 2 adds 5 to Row A; and the operation "+5" is replicated to Node 1. Both nodes apply both operations, leaving the value of Row A at 17, which is correct.

1.6.2.1.3 Resolving Data Collisions

If data collisions cannot be avoided in an application, those that occur must be detected and resolved. This means accepting one of the changes and rejecting the other. The rejected change is typically logged for later review.

A data collision can be detected by comparing the before-images of the source database and the target database. Using this method, each replicated change is accompanied by the source node's before-image of the row that is being changed. If this before-image does not match that of the target node, a collision has occurred. Row versions or time stamps may also be used to accomplish the same result.

One way to resolve data collisions is by data content. For instance, the later change may be accepted and the earlier change rejected.

Another technique is to designate one node in the application network as the master node and the others as slaves, as shown in FIG. 15. All changes are made by the master node and replicated to the slave nodes. If a slave change collides with a master change, the master wins. If two slave changes collide, the master decides the winner, perhaps by using data content. In any event, only the single winning change is replicated to the slaves.

Alternatively, slave nodes can apply their changes locally and can replicate them to the master. The master resolves any data collisions and replicates the resulting changes to all slaves, including the slave that originated the change. In this way, all changes are made locally at a node, improving performance. However, this is at the expense of doubling the replication latency between nodes as a change propagates from one slave to the master and then back all slaves. The result is a tradeoff between performance and the rate of data collisions.

Should the master fail, one of the slaves can be promoted to be the new master.

A variation of the master/slave technique is a hierarchical configuration in which each node is assigned a priority. In the event of a collision, the node with the higher priority wins.

Many asynchronous replication engines can be configured to resolve data collisions via embedded rules. If a collision cannot be automatically resolved, it may be reviewed and then corrected manually.

1.6.2.2 Synchronous Replication

Data collisions can be avoided by using synchronous replication since a data item can only be modified by one node at a time. This is because a node must acquire locks on all copies of the data item across the application network either before it can modify the data item or as it is modifying the data item.

However, the data conflicts that cause data collisions under asynchronous replication have another impact under synchronous replication. They become distributed deadlocks instead.

1.6.2.2.1 Deadlocks

In any application in which multiple threads may be making simultaneous changes to a common database, deadlocks are always a problem. In order to properly synchronize changes, an application thread must first acquire a lock on a data item that it wants to change. The lock prevents another application thread from trying to modify the same data item at the same time, which would lead to an indeterminate result. Once the application thread has made its change, it then releases the lock so that other application threads have access to that data item.

Deadlocks can occur if care is not taken in how locks are acquired. For instance, consider two application threads that need to lock rows A and B. Thread 1 is designed to lock row A first, followed by row B. Thread 2 locks these same two data items but in the opposite order. If both threads want to change these rows at the same time, Thread 1 will lock row A while Thread 2 will lock row B. Thread 1 cannot now acquire a lock on row B, and Thread 2 cannot acquire a lock on row A. A deadlock has occurred. A standard way to resolve such deadlocks is for one or both threads to time out, release their locks, and try again later at a random time.

In a single system, deadlocks can be avoided by always locking rows in the same order. Using an algorithm for locking order or locking sequence is known in the art as a "locking protocol", referred to in this document as an "intelligent locking protocol", or ILP.

1.6.2.2.2 Distributed Deadlocks

However, data conflicts in a distributed system create a new deadlock problem, even if an ILP is used. This problem is caused by the fact that it takes a brief period of time for a lock granted by one database copy to propagate to the other database copies in the application network. This lock delay time is known as lock latency. For network transactions and distributed lock management, the lock latency time is the one-way communication channel propagation time. For coordinated commits, the lock latency time is the one-way communication time plus the replication latency of the replication engine.

The lock latency problem is illustrated in FIG. 16. Assume that applications running in each node are using an ILP, and both applications want to lock row A nearly simultaneously (within the lock-latency interval). They will each be successful in acquiring the lock on their local copies of row A. However, when they attempt to acquire a lock on the remote copy of that row, they cannot. The two applications are now deadlocked since neither can get the lock on its remote copy.

1.6.2.2.3 Avoiding Distributed Deadlocks

Note that data collisions under asynchronous replication become distributed deadlocks under synchronous replication. Consequently, distributed deadlocks can be avoided by using the same techniques that are applicable to avoiding data collisions, as described above.

Specifically, if the database can be partitioned with each partition being owned by one node in the application network (as shown in FIG. 13), and if only the partition owner can change that partition's data, distributed deadlocks cannot occur. This is because two different nodes will never be attempting to lock the same data item.

Another technique for avoiding distributed deadlocks is to use an ILP with a global mutex. In this case, one node in the application network is designated the lock master. The lock master holds locks that must be acquired by any application in the network according to an ILP before that application can proceed. For instance, a lock master may hold locks on invoice headers. Before modifying an invoice, an application must obtain a lock on that invoice header from the lock master. Only then can it modify the invoice's detail lines. Should the lock master fail, one of the other nodes must be promoted to lock master.

1.6.2.2.4 Resolving Distributed Deadlocks

If distributed deadlocks cannot be avoided, they must be resolved. As in a single system, a distributed deadlock can be resolved by one or both applications releasing their locks and trying again later at a random time.

1.6.3 Split Brain

Bidirectional replication assumes that all nodes in the application network are operational and are communicating with each other. But what happens if a network failure isolates some nodes from the other nodes so that changes cannot be replicated between the isolated groups?

One solution is to run in split-brain mode (FIG. 17). Each set of nodes is allowed to continue processing independently from the other set. Changes are queued; and when the network is restored, the change queues are drained to update the split databases. In this case, data collisions are bound to occur unless the database is partitioned. They must be identified and resolved when the network is restored and replication is resumed. Data collision identification and resolution have been described earlier in the subsection entitled Data Conflicts.

Another solution is to take one of the isolated groups out of service. This may be done automatically using quorum techniques developed for clusters, or it may be done manually. Typically, if there are multiple nodes in the network, the larger group is kept in service; and the smaller group is taken down. Either some noncritical load must be shed, or there must be enough processing capacity in the surviving group to handle the transaction load.

If data collisions are unacceptable, and if provisions are not made to avoid collisions, split-brain mode must be avoided. One of the isolated sets of nodes must be taken out of service until the network is restored.

1.7 Active/Active Systems

Bidirectional replication leads to a particularly powerful system configuration—an active/active system. An active/active system is a geographically-dispersed network of independent processing nodes cooperating in a common application. Should a node fail, all that needs to be done is to switch over that node's users to a surviving node. Recovery is in subseconds to seconds.

In order for the nodes in an active/active system to be all cooperating in a common application, they must each have a local copy of the application database. Bidirectional replication provides the mechanism to keep these local copies synchronized. As shown earlier in FIG. 10, whenever one node makes a change to its local database, that change is replicated to all of the remote database copies. Therefore, the application running in each node of the active/active system has immediate access to an up-to-date (or nearly up-to-date) local copy of the application database.

Active/active systems provide many advantages over active/backup systems:
1. Failure intervals measured in centuries.
2. Nearly zero failover time.
3. Nearly zero (or zero if synchronous replication is used) loss of data following a node failure.
4. Elimination of planned downtime via the use of rolling upgrades.
5. Inherent disaster tolerance.

Active/active systems are described in more detail later.

1.8 Business Continuity

Ever since the early days of computing, the protection of a company's data has been of paramount importance. Without its strategic and operational data, a company may cease to function. Equally important is being able to recover to a backup computing system so that IT services can continue should the company's primary system fail or be destroyed.

This has lead to the concept of Recovery Point Objective (RPO) and Recovery Time Objective (RTO), which is casually referred to earlier and which is defined next. The technology of data replication has allowed enterprises to achieve new frontiers in both RPO and RTO.

1.8.1 Recovery Point Objective

The amount of data loss that a company can tolerate is its Recovery Point Objective (RPO). Following a failure, the company's goal is to be able to recover enough of its data so that no more data than that specified by the RPO is lost.

RPO is expressed in terms of time and may vary with the application. In some cases, a company may be able to tolerate the loss of days of data for a particular application. More likely is that the loss of more than a few hours of data represents an extreme hardship. In more critical applications, it may be required that data loss be limited to minutes or even seconds. In very critical applications such as security trading systems, no loss of data can be tolerated.

Certainly, as the RPO tightens, the systems become more complex. RPO and system cost are important tradeoffs in a company's IT operations.

1.8.2 Recovery Time Objective

Like RPO, the Recovery Time Objective (RTO) is expressed in terms of time. RTO is the amount of time that a company can afford to go without data processing services.

Again, RTO varies by application. Some noncritical applications may be able to be down for days without seriously affecting a company's operations. Typical applications can withstand a few hours of downtime. Critical applications may have to be restored in minutes or seconds. Applications that affect life or property may be required to never be down (at least, hardly ever).

As with RPO, system cost escalates as RTO is reduced. If recovery times are to be measured in seconds, minutes or even perhaps hours, redundant systems are required. This multiplies overall costs significantly.

1.8.3 The RPO/RTO Relationship

FIG. 18 shows the relationship between RPO and RTO. Consider a system in which backup copies of an application's database are made periodically. Backups might be made by quiescing the system and dumping the database, by online dumps, or by using audit trail rollups. Should the primary system fail, the last database backup can be loaded onto a backup system; and processing can continue. The amount of application data lost is that new data generated from the time of the last database backup point to the time of failure. This is the maximum amount of data that can be lost and yet still achieve the RPO goal.

Following a failure, steps are taken to recover processing. This may entail repairing the downed system, or it may entail switching over to a backup system. The time from the point of failure to the time of recovery must be less than the RTO specified for the application.

Thus, RPO specifies the maximum amount of time between a backup of the database (full or incremental) and the point of failure. RTO specifies the maximum amount of time from a system failure to its recovery. For instance, if RPO is four hours, database backups must be taken more frequently than every four hours. If RTO is ten minutes, a second backup system ready to go is certainly needed.

Data replication technology allows systems to be configured to meet any required RPO and RTO, as is evidenced by active/active configurations described earlier. Certainly, as these times get shorter, system costs may escalate (though not always, as more sophisticated configurations may be able to achieve shorter RPOs and RTOs with the same equipment). These additional system costs must be weighed against the costs of lost data and downtime, which in many critical applications may be quite significant or which, in some industries, may violate governmental regulations.

Database backup techniques bear directly on both RPO and RTO. Look at classic database backup methodologies and how these paradigms have shifted toward data replication for increased business continuity.

1.8.4 Disaster Recovery

Disaster recovery is the ability to recover from a disaster. Disaster tolerance is the ability to be unaffected by a disaster. A system can be configured to meet either standard. Disaster recovery configurations will be discussed first.

1.8.4.1 Magnetic Tape Backup

From the earliest days of commercial computing, magnetic tape has been used as a backup medium. Typically, full database backups are followed by periodic incremental backups (FIG. 19). A full backup copies the full database to magnetic tape. An incremental backup copies only the changes to the database that have occurred since the last full or incremental backup.

It is good practice to store the magnetic tapes offsite for security purposes. Should the active system fail, the backup tapes must be retrieved from the storage vault and brought to the standby site. There, the last full backup must be read from tape and loaded onto the backup system, followed in sequence by each of the later incremental backups. (In this case, the backup system is called a cold standby since it has no applications loaded nor does it have a database mounted.)

Following a successful load of the database, applications must be started and must mount the newly-restored database. The system must be tested to ensure that it is operating properly. At this point, it can be put into service.

Some applications are very large, requiring hundreds of tapes to load. Provision must be made for lost or unreadable tapes. Recovery using magnetic tape can take hours to days.

Magnetic tape is suitable if hours or days of data can be lost (RPO of hours to days) and if recovery time measured in hours to days is satisfactory (RTO of hours to days).

1.8.4.2 Virtual Tape

Virtual tape replaces magnetic tape with disk images (FIG. 20). Rather than having to mount and catalog hundreds of tapes, virtual tape maintains a backup image of the application database on disk at the backup site. Full and incremental backups of the database are still taken; but instead of writing these backups to magnetic tape, they are sent via a communication facility to disk storage at the backup site.

Furthermore, since there is no extensive tape handling, incremental backups can be taken more frequently, reducing the interval during which data may be lost.

Consequently, should the active system fail, there is no concern about having to retrieve tapes from storage and having to load them onto the system, a process that can take days. Rather, the application database can be loaded directly from the backup and incremental copies on disk, a much faster process.

Following the loading of the database, applications must still be started and the system tested before it can be put into service. RPOs and RTOs measured in hours can be satisfied with virtual tape.

1.8.4.3 Clusters

Clusters represent a formalized methodology to provide redundancy. They are supported by a plethora of off-the-shelf products available today.

Basically, a cluster comprises two or more processing nodes, each with a physical connection to a redundant storage subsystem such as a RAID array (FIG. 21). An application can run on any one node in the cluster, and that node can be backed up by one or more other nodes in the cluster.

There is only a single active copy of the application database in the cluster. Though two or more nodes may have a physical connection to an application's database, only one application may have it mounted at any given time.

Should a node fail, the applications running in that node are migrated to their backup and mount their databases. At this point, they can be brought into operation. Recovery times (RTO) for clusters are measured typically in minutes.

Assuming no database corruption, there is no data loss (RPO is zero).

However, both RTO and RPO can be compromised if database corruption occurs during a node failure. Database corruption may occur if the failure interrupts a sequence of write operations that taken together comprise a logical operation. Block splits and index updates are examples of such operations. Immediately upon takeover, the cluster must check the database for such corruption. If corruption is found, some data may have been lost, violating a zero RPO. Furthermore, the repair of the database may take a significant amount of time, resulting in a recovery time that may exceed the RTO.

One limitation of clusters is that the nodes must all be collocated. Therefore, a cluster is not inherently disaster tolerant. It can be taken down by a site disaster and is therefore not suitable for business continuity. To provide disaster recovery, an equivalent standby cluster must be configured at a remote site and kept synchronized with unidirectional replication. Used in this way, clusters have the same disaster recovery characteristics as active/backup systems using unidirectional replication, described next.

1.8.4.4 Unidirectional Replication

Data replication is the new paradigm for database backup. It can provide zero data loss (satisfying an RPO of zero); and properly configured, it can provide nearly instantaneous recovery (an RTO of almost zero).

Unidirectional data replication is the simplest form of the data replication architecture (FIG. 22). An active node processes all transactions, and the changes that it makes to its database are replicated to a remote standby node. Therefore, the two databases are in (or are nearly in) synchronization. Should the active node fail, no data or only a small amount of data will be lost. If asynchronous replication is used, only the data in the replication pipeline at the time of failure will be lost, thus supporting subsecond RPOs. If synchronous replication is used, no data will be lost following an active node failure (RPO of zero).

Applications may be up and running in read-only mode in the standby node so that the standby database may be actively used for query and reporting purposes (this is called a "hot standby"). Should the active node fail, the applications at the backup node can remount the database for read/write access and can take over the role of the original active node. This typically takes only a few minutes, leading to RTOs measured in minutes.

As pointed out above, two problems with clusters are that they can be taken down by a site disaster and that a node failure may corrupt the database, leading to a long recovery time and lost data. Both of these problems are solved by data replication. For one, data replication allows the active node and its backup to be separated by an arbitrary distance. Therefore, the system can be configured so that no common disaster can take down both the active and backup nodes.

In addition, an active-node failure cannot corrupt the backup database since only changes are being replicated. On takeover, all that is needed is to roll back uncompleted transactions from the database.

1.8.5 Disaster Tolerance

The above systems meet the needs of disaster recovery but not necessarily disaster tolerance. This is because their recovery times are measured in minutes or more. If users are down for several minutes, or even worse, hours or days, they certainly have been affected by the outage. To be disaster tolerant, recovery must be so fast that users are not aware of the outage or at least are not inconvenienced by it. Recovery times measured in seconds qualifies a system to be called disaster tolerant.

Disaster tolerance requires that there be a backup node that can take over in subseconds or seconds in the event of an active-node failure. Two data replication configurations are described that can satisfy this requirement.

1.8.5.1 Sizzling-Hot Standby

A sizzling-hot standby is similar to a standby node using unidirectional replication, as described above, except that it is immediately ready to start processing transactions (FIG. 23). This means that it has its local copy of the application database already open for read/write access. Using data replication, it can do this because its local database is synchronized with the active database and is completely consistent and accurate. In fact, except for the fact that the active node would be unaware of the standby's database changes, the standby node could be actively processing transactions (an excellent example of another type of sizzling-hot standby configuration is an HP NonStop checkpointed process pair, except that process state is replicated rather than data).

Should the active node fail, all that is required for failover is to switch the users or their transactions to the standby node. This can be done in subseconds to seconds, leading to very small RTOs.

The sizzling-hot standby configuration has another big advantage over the disaster recovery systems described above, and that is the absence of failover faults. In the systems previously described, the standby system is not actively involved in the application. Therefore, it is not known whether it is really operational. Should a failover attempt be made to a nonfunctioning backup system, the application is down. This is known as a failover fault.

Because of the potential for failover faults, there is typically a failover decision time added to recovery time. The nature of the primary system failure must be analyzed to determine whether it is faster and safer to try to recover the primary system or to fail over to the backup system. This decision must often be made by management, who may not be immediately available.

With a sizzling-hot standby, it is known that the backup node is working (it can be periodically exercised with test transactions to ensure this). Consequently, failover can be automated, which is a requirement if very short RTOs are to be satisfied.

Finally, the sizzling-hot standby can be configured with reverse replication up and running so that it has a backup as soon as the old primary node is recovered. With reverse replication enabled, the standby will be queuing the changes that it is making to its copy of the database so that the failed node can be resynchronized upon recovery.

This configuration can achieve a zero RPO if synchronous replication is used or RPOs measured in milliseconds if asynchronous replication is used. If failover is automatic, RTOs measured in subseconds or seconds can often be satisfied.

A sizzling-hot standby with reverse replication enabled is similar in many respects to a two-node active/active system, described below, except that only one node is actively processing change transactions (though the backup node can be processing queries). It has applicability if data collisions are to be avoided. It can also be used to achieve many of the active/active benefits described next if the application cannot be made active/active ready (for instance, if all events must be processed in exact sequence, such as in a process control application).

1.8.5.2 Active/Active

An active/active configuration takes the sizzling-hot standby configuration one step further. All nodes in an active/active network may be simultaneously processing transactions for the same application using their local copies of the application database (FIG. 24). Bidirectional data replication is configured between each node pair so that any change that a node makes to its local copy of the application database is immediately replicated to the other nodes in the application network.

Active/active systems bring many benefits to an application:

1. Availability Benefits
   a) Recovery times so short that failures may not even be noticed by the users (very small RTOs).
   b) Little (asynchronous replication) or no (synchronous replication) data loss following a node failure (very small or zero RPOs).
   c) Extreme reliability, with failure intervals measured in centuries.
   d) Risk-free failover testing—all nodes are being tested all the time.
   e) The absence of failover faults and failover decision times.
   f) Inherent disaster tolerance.
   g) The elimination of planned downtime by rolling upgrades through the system one node at a time.
   h) Improved lights-out operation because repair times can be relaxed.
2. Maintainability Benefits
   a) Easily scalable by adding nodes without impacting ongoing processing.
   b) Easy load balancing by simply moving users from one node to another.
3. Performance Benefits
   a. Use of all available capacity.
   b. Improved application response times through the use of local application databases.
   c. Distribution of user requests over all nodes.

If an application cannot run in an active/active mode, it can be run in a sizzling-hot standby configuration, as described above. Though sizzling-hot standbys do not address the maintainability and performance benefits of active/active systems (except that queries can be run on the backup node), they do provide all of the availability benefits.

1.8.6 The Business Continuity Continuum

A major contributor to business continuity is the continuous availability of a company's IT services. To be truly continuously available, corporate applications must have an RTO and an RPO of zero.

Though this ideal system does not exist, today's redundant architectures can come very close. Active/active systems (and those running as sizzling-hot standbys) can achieve zero RPO (no data loss) and an RTO measured in seconds or subseconds (very fast recovery).

The relationship between the business continuity architectures described above is illustrated in FIG. 25. This diagram plots RPO versus RTO and shows where each methodology fits. The horizontal axis shows improving RTO as it trends toward zero recovery time, and the vertical axis shows improving RPO as it trends toward zero data loss following a node failure. System continuity increases as shown.

The magnetic tape approach has the lowest availability. Its RPO is the greatest as is its RTO—hours to days for both. Virtual tape is a significant advantage over magnetic tape, reducing RPO and RTO to hours, not days.

With unidirectional replication, recovery time (RTO) can be in minutes. RPO can be zero if synchronous replication is used, or it can be measured in milliseconds if asynchronous replication is used.

Active/active systems and sizzling-hot standby systems provide the greatest availability. Recovery times (RTO) can be milliseconds to seconds since all that needs to be done is to reassign users or reroute transactions to a surviving node. If synchronous replication is used, there is no data loss (RPO of zero). If asynchronous replication is used, data loss can be minimized to milliseconds.

Sizzling-hot standby systems provide many of the advantages of active/active systems. Note that these systems are not scalable, they cannot be load balanced, they cannot provide data locality, and they make use of only half of the configured capacity. However, they do provide all of the extensive active/active availability advantages for applications that cannot, for some reason, run in a truly active/active environment.

As noted earlier, clusters do not inherently provide disaster tolerance. A remote standby cluster must be configured and kept synchronized via replication. Therefore, a cluster has business continuity characteristics similar to those of asynchronous unidirectional replication.

Further insight into the various data replication architectures can be gleaned from FIG. 26. Shown in this figure are typical RPOs and RTOs (FIG. 26, part a), typical configurations (FIG. 26, part b), and typical applications (FIG. 26, part c) for the four combinations of unidirectional and bidirectional asynchronous and synchronous replication. Representative characteristics for systems implemented with each of these are as follows:

1. A unidirectional asynchronous system has an RPO measured in seconds (the replication latency of the data replication channel). Its RTO is measured in minutes as applications are started following a failure of the active node, the databases are mounted, and the network is reconfigured. Additional recovery time may be required for the decision time to fail over to the backup system and for testing to ensure that the backup is performing properly.

This replication method is used for classic disaster recovery active/backup configurations. It supports applications that must be highly available but in which the transactions do not have a high value. CRM (customer relationship management) and HR (human resources) corporate applications are examples of this class of application, as are ATM transactions. ATM transactions have a low value; and if the ATM machine is down, the customer can go to a different ATM machine serviced by a different bank.

2. A unidirectional synchronous system has the same recovery (RTO) characteristics as the unidirectional asynchronous system. However, it suffers no data loss following a node failure (its RPO is zero). Consequently, it is often referred to as a zero lost data system.

It is suitable for applications that require high availability while processing transactions that have a high value and cannot be lost. Back-office applications for brokerage firms and banks are examples.

3. A bidirectional asynchronous system has an RPO measured in seconds (the replication latency) and can recover in milliseconds or seconds in an active/active or sizzling-hot standby configuration.

It is suitable for applications that require continuous availability but that process transactions that do not have a high value. Typical applications include telco applications (many call-related transactions worth pennies) and some 911 applications. Point-of-sale (POS) transactions are another example. Like ATM transactions, they have low value. However, should a POS application go down, retailers cannot service customers using credit or debit cards.

4. A bidirectional synchronous system is the ultimate in system availability. It suffers no data loss following a node failure (RPO=0), and it can recover in milliseconds or seconds in an active/active or sizzling-hot standby configuration. In fact, if the failover is sufficiently fast so that users don't realize that there has been a failure, in effect, there has been no failure; and an RTO of zero has been effectively achieved.

This configuration supports applications that must be continuously available and in which transaction value is high. Typical applications with these characteristics include online financial applications such as online banking and stock market trading as well as some 911 applications.

2 Part 2: Synchronous Replication via one Preferred Embodiment Overview 2.1 Synchronous Replication with Shadowbase® Plus SR™

Shadowbase Plus SR, from Gravic, Inc., Malvern, Pa. (www.gravic.com), is a synchronous replication engine using coordinated commits. Compared to other synchronous replication technologies, Shadowbase Plus SR requires no changes to applications and can provide synchronous replication over the hundreds or thousands of miles often required for disaster tolerance.

Part 2 describes the Shadowbase Plus SR architecture and its procedures for synchronous replication. The various software processes comprising Shadowbase Plus SR are described, and the flow of data and transaction control through these processes is illustrated.

As with all synchronous replication engines, Shadowbase Plus SR imposes a delay on the completion of the source's transactions while it ensures that transactions are able to be completed on all database copies in the application network. This delay is known as application latency. However, as discussed in Part 1, the coordinated commit method used by Shadowbase Plus SR is much less affected by communication delays as are other synchronous replication technologies. Hence, in addition to being suitable for systems that are collocated or located in a metropolitan area, it is also suitable for synchronous replication between database copies separated by long distances. Part 2 describes the components of Shadowbase Plus SR's application latency and the impact of application latency on applications.

Recovery from a fault in a synchronous replication environment is complex and should be a function provided by the replication engine. The faulty component must be removed from the scope of further transactions. Once repaired, it must be synchronized with the current state of the application database before it can be returned to service. The Shadowbase Plus SR provisions for fault detection, recovery, and component return-to-service are described in detail.

2.2 The Shadowbase Replication Suite

The Shadowbase Replication Suite, comprises a set of products that support unidirectional and bidirectional data replication. Both asynchronous replication and synchronous replication are supported.

The Shadowbase products include:

5. Shadowbase, a low replication-latency asynchronous replication engine using efficient process-to-process data replication.
6. Shadowbase Plus SR, a synchronous data replication engine using coordinated commits for low application latency over long distances.
7. Autoloader, an online loading facility for copying a source database to a target database without having to pause the source database.
8. SOLV, an online loading facility for copying a source database to a target database and for keeping the target database synchronized throughout the load as changes are applied to the source database.

The Shadowbase products support not only HP NonStop server databases but also open server databases (such as MySQL, Oracle, and Sybase) as well. Replication with the Shadowbase replication engines as well as target database loading with Shadowbase's online loaders is heterogeneous. The source and target databases can be from different vendors. They can also represent different architectures such as relational databases and flat-file systems.

The following sections of this overview focuses on Shadowbase's synchronous data replication engine, Shadowbase Plus SR. Its architecture, its advantages, and various issues associated with its use are described. But first, as background, the Shadowbase asynchronous replication engine which forms the basis for Shadowbase Plus SR is described.

2.3 Shadowbase Asynchronous Replication Architecture

The Shadowbase asynchronous data replication engine uses process-to-process replication to move data from a source database to a target database. Since there are no disk-queuing points introduced by Shadowbase, replication is highly efficient; and replication latency is minimized.

The Shadowbase replication engine has been used for several decades in hundreds of installations. It is, therefore, a very mature product.

2.3.1 Shadowbase Asynchronous Unidirectional Replication

Looking at a unidirectional Shadowbase data replication engine for an HP NonStop server, the replication engine's architecture is shown in FIG. 27. The heart of the replication engine is a Collector process running on the source node and a Consumer process running on the target node. (In some special cases, the source and target nodes can be on the same node. However, this discussion primarily deals with business continuity environments that have active/active systems in which the source and target nodes are different, typically separated by disaster tolerance distances). In addition, Shadowbase provides the AUDCOM process for control and the AUDMON process for monitoring.

As an application transaction makes changes to the source database, these changes are logged by the NonStop Transaction Monitoring Facility (TMF) on the source node into TMF's audit trail. This audit trail is used to back out aborted transactions and to recover lost transactions should the source node fail. A NonStop library, ARLIB, is provided by HP to read the audit trail.

The Shadowbase Collector process uses this library to read the source database changes as they are logged by TMF. It buffers these changes and sends them in a communication block to the Shadowbase Consumer running in the target node. Communication between the source and target nodes may be either via NonStop EXPAND or via TCP/IP (If TCP/IP is used, Shadowbase adds a source-side Consumer process that supports TCP/IP communications with the target-side Consumer. The Collector sends changes to the source-side Consumer for transmission to the target-side Consumer, which will apply the changes to the target database).

The first change received by the Consumer for a source transaction is used to start an independent transaction on the target node. This change and all further changes for this transaction are applied tentatively to the target database until it is notified that the transaction has either been committed or has been aborted at the source node. If the transaction has been committed at the source database, the Consumer will commit it at the target database. Conversely, if the transaction was aborted at the source database, the Consumer will not apply the transaction's changes to the target database.

All changes flow directly from the source's audit trail to the target database with no intermediate disk-queuing points. Therefore, the Shadowbase replication engine is very efficient and minimizes the replication latency of the data replication engine.

Shadowbase can support multiple Collectors and Consumers to improve performance. If multiple Collectors are used, each transaction is typically handled by only one Collector (Transactions, and the events inside them, can be spread across one, or multiple, Collectors and/or Consumers; this aids scaling for volume. However, to guarantee that events for the same data set are applied to the target database in the proper order, a particular data set is generally assigned to a specific Collector/Consumer replication thread). If multiple Consumers are used, each table or file (or subset thereof) is typically handled by only one Consumer. In this way, it is guaranteed that changes made to any file or table (or key range thereof) are correctly sequenced.

2.3.2 Shadowbase Asynchronous Bidirectional Replication

A unidirectional Shadowbase asynchronous replication engine is useful to maintain synchronization of a backup database with its primary database. In this case, the backup system is idle so far as update processing is concerned. However, it can be used for query processing since Shadowbase guarantees that the target database, though delayed by the replication latency, is always a consistent copy of the source database.

By extending this architecture to bidirectional data replication, both nodes can be actively processing transactions since each has a reasonably up-to-date copy of the application database (typically, up-to-date within milliseconds). This is the realm of active/active systems, which were described in Part 1.

As shown earlier in FIG. 10, bidirectional replication is accomplished simply by using two replication engines, one in each direction. The Shadowbase bidirectional architecture is shown in FIG. 28. It comprises two independent unidirectional data replication engines, each replicating from one node to the other. As changes are made by application A to its database A, these changes are captured in the TMF audit trail on node A. Collector A reads these changes and sends them to Consumer A on the target node, which applies them to database B on node B. Likewise, changes made to database B by application B are replicated to node A by Collector B and Consumer B.

Though it was discussed above that these two data replication engines were independent, this is not quite true. One problem with data replication is ping-ponging—the return of a replicated change back to the original source system. If means are not provided to prevent ping-ponging, a change will circulate forever between the two nodes. To prevent this, Shadowbase provides its own transaction ID log with each data replication engine (transaction ID logs A and B in the FIG. 28). Whenever a Consumer applies a change to its target database, it notes that change in its transaction ID log. The change recorded in the target node's audit trail is marked as a replicated change. In this way, the Collector reading that audit trail will know not to replicate the change. This anti ping-ponging feature creates the one connection between the two data replication engines.

As described earlier in Part 1, another serious problem encountered with bidirectional replication is data collisions. A data collision occurs if nearly simultaneous changes are made by each node to the same data item. Nearly simultaneous means within the replication-latency interval. Should this happen, both changes will be replicated to the other node and will overwrite the original change made at that node. Now, both databases are different; and both are wrong.

Data collisions must either be avoided by using certain architectures such as data partitioning, or they must be detected and resolved. The Shadowbase asynchronous data replication engine supports collision-avoidance architectures. If collisions cannot be avoided, Shadowbase provides the mechanisms necessary for detecting and resolving data collisions.

FIG. 28 illustrates bidirectional replication between two nodes in an active/active system. However, there is no limit to the number of nodes that can cooperate in such a system. All that needs to be done is to provide bidirectional replication capabilities between each of the nodes in the application network.

2.4 Shadowbase Plus SR Synchronous Replication

2.4.1 Attributes

The primary requirement that Shadowbase Plus SR meets is to provide a reliable synchronous replication engine with low application latency. Its design supports several important attributes:

1. Low Application Latency—Based on coordinated commits, synchronous nodes can be separated by hundreds or thousands of miles, providing full tolerance to disasters.
2. Efficient Communication Utilization—By sending the change data in large blocks, communication utilization is optimized.
3. Capacity—Shadowbase Plus SR supports high transaction rates with multithreaded replication while minimizing application latency and maximizing communication utilization.
4. Transaction Consistency—There is one and only one target transaction for each source transaction.
5. Transaction Isolation—Dependent transactions are executed in order without having to queue behind other independent transactions.
6. Flexibility—Tables or files can be independently configured to be replicated synchronously or asynchronously.
7. Fault Tolerance—All Shadowbase processes within the replication engine are either NonStop process pairs or are persistent processes that will automatically be restarted by the node's Shadowbase Plus SR process monitor.
8. Noninvasiveness—Since Shadowbase Plus SR uses coordinated commits and is based on the Shadowbase asynchronous replication engine, there are no changes required to the application in order to take advantage of synchronous replication. The only exception to this is if it is optionally decided to modify the application to notify Shadowbase Plus SR of a new transaction (this is done with no application modification if the Shadowbase intercept library is used).
9. Tunable—Extensive monitoring and configuration tools provide the means to maximize performance, capacity, and reliability.
10. Graceful Failover—A failed node is automatically removed from the scope of subsequent transactions.
11. Smoothly Staged Recovery—Automatic procedures resynchronize a restored node and let it join future transactions.

Shadowbase Plus SR initially supports HP NonStop Enscribe and SQL/MP databases as both sources and targets. Future releases will support HP NonStop SQL/MX native tables and a variety of open databases.

Since Shadowbase Plus SR is based on Gravic's patented coordinated commit technology, which uses asynchronous replication of database changes, it leverages extensively the existing Shadowbase asynchronous architecture. The Shadowbase product comprises stable, high-quality code that has been field tested for decades in many hundreds of demanding production installations. Shadowbase Plus SR continues the best-in-class features of Shadowbase, such as low latency, high availability, and communication efficiency.

2.4.2 The Two-Phase Commit Protocol

In order to better comprehend the Shadowbase Plus SR architecture, it is important to understand certain aspects of the transactional two-phase commit procedure. Basically, this procedure allows a transaction to span multiple databases. A transaction is either committed across all databases involved in the transaction, or it is aborted; and no changes are made to any of the databases (A transaction exhibits the ACID properties of atomicity, consistency, isolation, and durability).

2.4.2.1 The X/Open Distributed Transaction Processing Model

The two-phase commit procedure is defined by the XA standard, which is a specification by the X/Open Group for Distributed Transaction Processing (DTP). It is often referred to as the X/Open DTP specification.

As shown in FIG. 29, the X/Open DTP model comprises five components:

1. application programs.
2. a Transaction Manager (TM).
3. resources such as disks, queue managers, or applications.
4. Resource Managers (RMs) that hide the attributes of resources.
5. a transaction log (Tx Log).

Applications use resources such as databases or queues. Each resource is managed by a Resource Manager (RM). The RMs hide the details of their resources from the applications and from the Transaction Manager (TM) by providing a common interface used by the other components.

When an application begins a transaction (1), the TM assigns the transaction an ID and monitors its progress, taking responsibility for its success or failure. All changes to a resource such as to a database (2) are typically logged in a transaction log by the TM (3). The transaction log provides the change information necessary should a transaction abort and need to be backed out or should a system fail and its database require reconstruction.

2.4.2.2 The Two-Phase Commit

The TM has a particularly important responsibility at commit time. When the application directs the TM to commit a transaction (1), the TM first queries each RM to ensure that it is prepared to commit the transaction (4). This is Phase 1 of the two-phase commit protocol, the Prepare phase. An RM will respond positively to the prepare query (that is, it votes "yes" for the commit) only if it has safe-stored or has tentatively applied the change data for the transaction to the target database, thereby assuring that the RM can ultimately make all of the transaction's changes to the database.

If an RM cannot guarantee that it can make the changes, it votes "no" in response to the prepare query.

If all RMs reply that they can commit the transaction, the TM issues a commit directive to all RMs (4). This is Phase 2 of the 2PC, the Commit phase. When an RM receives a commit directive, it applies the changes to the database if it had not done so as part of Phase 1.

Alternatively, if any RM votes "no" because it cannot make the transaction's changes, the TM issues an abort directive to all RMs. Each RM either makes no changes, or it rolls back the transaction's changes if it had already applied the changes to the database. The transaction has no effect on the database.

2.4.2.3 Resource Managers

There are two methods that a Resource Manager can use to register its participation in a transaction:

1. Static Registration requires that the application declare all RMs that it will use. Each such RM will be registered with the TM. The TM must include all registered RMs in the 2PC, whether they are involved in the transaction or not.
2. With Dynamic Registration, an RM registers with the TM for a single transaction if it receives a request for its resource as part of that transaction.

a. In addition, there are several types of RMs, distinguished by how they participate in a transaction:
3. A Recoverable Resource Manager participates in the entire 2PC process. It votes during the Prepare phase and commits or aborts during the Commit phase. If there is a system failure, it is part of the database recovery process.
4. A Volatile Resource Manager (VRM) is a manager of volatile resources. A volatile resource is assumed by the Transaction Manager to be nondurable, such as in-memory structures. A VRM participates in the 2PC protocol. If a VRM fails after it has responded to the prepare query but before the commit is issued, the TM can commit the transaction anyway. Though a VRM participates in the 2PC procedure, it is not part of the TM's recovery process. If it is, in fact, durable, it is the VRM's responsibility to provide its own recovery services.
5. A Read-Only Resource Manager is one that participates in the transaction, but is never given any work to do. When the TM requests it to prepare, the Read-Only Resource Manager replies with a message that it has done no work. It then leaves the transaction and does not participate in the Commit phase.
6. A Single-Phase Resource Manager does not participate in the two-phase protocol at all. It does not vote in the Prepare phase and does not participate in the Commit phase. When it receives a prepare request from the TM, it simply commits its transaction.

2.4.3 The HP Synchronous Replication Gateway 2.4.3.1 Interacting with TMF

Though HP NonStop systems follow the X/Open DTP model, they are not XA-compliant. Specifically, they do not use the XA API; and they do not support heterogeneous databases. Historically, their TM, known as the Transaction Management Facility, or TMF, supported only Enscribe and NonStop SQL RMs. Other Resource Managers could not participate in a TMF transaction.

HP has recently announced its Synchronous Replication Gateway (SRG) (code named "Open TMF" or OTMF during development). SRG provides the facilities for a foreign resource not classically supported by TMF to participate in TMF transactions via a Volatile Resource Manager (VRM). Though under the X/Open DTP model, Resource Managers are external to the TM, HP has implemented SRG so that the VRM state machine is a part of TMF. SRG assumes the existence of a gateway process that is an interface to the foreign resource. The gateway process communicates with TMF via the VRM supplied by TMF.

SRG is a library that provides an API for use by a gateway to communicate with TMF. As shown in FIG. 30, the library uses a Resource Manager pseudo-file (RM file) to identify the gateway and to exchange TMF signals (messages) between the gateway and the VRM via library API calls and several standard Guardian procedures. A gateway process may have multiple RM files open—this can be useful if the gateway must manage more simultaneous transactions than a single VRM can process. However, an RM file can be opened by only one gateway.

Communication between a VRM and a gateway is via TMF signals (messages) that indicate requests, responses, and state changes. A gateway writes to the RM file to deliver signals to TMF via the VRM, and it posts a read on the RM file to receive signals from TMF.

There is at least one RM file associated with each gateway. Before a gateway can communicate with TMF, it must open an RM file. RM files are opened with a sync depth of 1 so that gateway reads from the file can be waited or nowaited.

Shadowbase Plus SR is implemented as an SRG gateway, which interfaces to the database that is the target of the replication engine. Using the SRG API, the Shadowbase Plus SR data replication engine can join a transaction when notified by an application that the application is beginning a transaction to which it wants Shadowbase Plus SR to be a party. Should the application decide to commit the transaction, the Shadowbase Plus SR data replication engine will be asked to vote on the completion of the transaction as part of TMF's Prepare phase; and it will commit or abort the transaction under the direction of TMF.

2.4.3.2 Signals

TMF signals are used by TMF to communicate with all Resource Managers. They include, among others:
1. TMF_SIGNAL_EXPORT_DONE: A nowaited request to the VRM from the gateway to join a transaction has completed.
2. TMF_SIGNAL_REQUEST_PREPARE: The VRM is requesting the gateway to vote on the outcome of the transaction.
3. TMF_SIGNAL_READ_ONLY: The gateway indicates to the VRM that the gateway had no work to do and is leaving the transaction.
4. TMF_SIGNAL_READY: The gateway is indicating to the VRM that the gateway's transaction is prepared to commit.
5. TMF_SIGNAL_REQUEST_COMMIT: The VRM is indicating to the gateway that the transaction has been committed.
6. TMF_SIGNAL_REQUEST_ROLLBACK: Either the VRM or the gateway is indicating that the transaction should be aborted. The signal also carries the reasons for the abort.
7. TMF_SIGNAL_FORGET: The gateway is informing the VRM that the gateway has completed processing the transaction.

Abort reasons signaled by TMF_SIGNAL_REQUEST_ROLLBACK include:
1. communication failure
2. deadlock
3. integrity violation
4. protocol error
5. timeout
6. transient
7. unspecified TMF also generates signals to notify the VRMs about significant TMF state changes. The signals are:
1. TMF_SIGNAL_TMF_ENABLED: TMF is started, and BEGINTRANSACTION is enabled.
2. TMF_SIGNAL_TMF_DISABLED: BEGINTRANSACTION has been disabled.
3. TMF_SIGNAL_TMF_DOWN: TMF has crashed or has shut down.

2.4.3.3 API

The TMF API is simple. It contains only six calls.
1. OTMF_VOL_RM_OPEN: Opens a VRM file. A VRM file must be open before the gateway process can communicate with the VRM. As soon as the file is opened, the gateway is informed as to whether TMF is enabled, disabled, or down. The file can be closed via a standard file close call.
2. OTMF_EXPORT: Allows the gateway to participate in a transaction.
3. OTMF_EXPORT_ASYNC: Allows the gateway to make a no-waited request to the VRM to participate in a transaction. The request's completion is indicated by the receipt of a TMF_SIGNAL_EXPORT_DONE signal.

4. OTMF_WRITE_SIGNAL: Used by the gateway to send a signal to the VRM via the RM file.
5. OTMF_WAIT_SIGNAL: Waits for a signal from a VRM following a READX on the RM file.
6. OTMF_INTERPRET_SIGNAL: Interprets a signal returned in a call to AWAITIOX instead of a call to OTMF_WAIT_SIGNAL. Instead of calling OTMF_WAIT_SIGNAL and blocking waiting for the signal, the gateway can call AWAITIOX instead, allowing other I/O completions to be processed as they complete. OTMF_INTERPRET_SIGNAL is then called to parse the data sent by the VRM.

2.4.3.4 SRG State Transitions

A state diagram for SRG is shown in FIG. 31. In this figure, only the state transitions for a VRM are shown. SRG also supports Read-Only Resource Managers and Single-Phase Resource Managers whose state transitions are not shown.

FIG. 31 shows state transitions from the viewpoint of the VRM. In this figure, "send" means sending a signal to TMF via OTMF_WRITE_SIGNAL, and "receive" means receiving a signal from TMF via a nowaited READX/AWAITIOX/OTMF_INTERPRET_SIGNAL sequence or a waited READX/OTMF_WAIT_SIGNAL sequence.

When the gateway wants to join a transaction, it does so via the OTMF_EXPORT API call. Among other parameters, it provides the ID of the transaction that it wishes to join. The EXPORT call can either be waited or nowaited. OTMF_EXPORT is the waited call. If a nowaited call is desired, OTMF_EXPORT_ASYNC is called for a nowaited export. When the export has completed, the gateway will be notified by a TMF_SIGNAL_EXPORT_DONE signal. At the completion of the export, the gateway enters the active state.

While in the active state, the gateway processes the lock, read, update, and delete operations within the scope of the transaction. During this time, the gateway posts to the RM file a read that listens for a signal from TMF. At the end of the transaction, when TMF has received a commit from the application, it sends to all RMs a TMF_SIGNAL_REQUEST_PREPARE signal asking them to vote on the transaction. This begins the Prepare phase of the 2PC protocol.

The gateway enters the preparing state at this point. It checks to see if it is in a position to guarantee that it can complete the transaction (that is, it has acquired all locks; and all updates have been safe-stored or tentatively applied). If so, it responds to TMF with a TMF_SIGNAL_READY signal.

If TMF receives a TMF_SIGNAL_READY signal from all of the RMs that have joined the transaction, it enters the Commit phase of the 2PC protocol and sends a TMF_SIGNAL_REQUEST_COMMIT to all RMs. Upon receipt of this signal, the gateway will commit the transaction and will respond with a TMF_SIGNAL_FORGET signal, indicating that it has received the commit and is leaving the transaction.

If the gateway cannot commit the transaction, at the end of the Prepare phase it will send a TMF_SIGNAL_REQUEST_ROLLBACK signal to TMF. If TMF receives a TMF_SIGNAL_REQUEST_ROLLBACK signal from any of the RMs involved in the transaction, it will abort the transaction by sending a TMF_SIGNAL_REQUEST_ROLLBACK signal to all RMs.

Should the gateway detect a fatal error in transaction processing while it is either in the active state or in the preparing state, it may immediately abort its transaction and send a TMF_SIGNAL_REQUEST_ROLLBACK signal to TMF, causing TMF to abort the transaction with all RMs.

2.4.4 Shadowbase Plus SR Replication Architecture

An explanation of how the SRG API is used by Shadowbase Plus SR to implement coordinated commit replication is now provided.

2.4.4.1 Overview

In HP NonStop server installations, Shadowbase Plus SR uses the SRG facilities provided by HP to join a transaction as a Volatile Resource Manager. Once having done so, it becomes a voting participant in that transaction. The transaction cannot commit unless Shadowbase Plus SR agrees to do so. Referring back to FIGS. 6 and 7, Shadowbase Plus SR will agree to commit the transaction only if it has received a positive reply from the target database to its "ready to commit?" query.

Though Shadowbase Plus SR joins an application's transaction, it is not part of that transaction. Rather, as part of the coordinated commit procedure, Shadowbase Plus SR begins a totally new and independent transaction on the target database, as shown by Step (1a) in FIG. 7. Changes made to the source database by the application are not delayed as they are applied to the target database. Rather, changes are asynchronously replicated to the target database with no application impact.

Because Shadowbase Plus SR has joined the transaction, it gets to vote in the Prepare phase of the 2PC. It can vote to commit the transaction or to abort the transaction. If all voting RMs vote to commit the transaction, it is committed in the Commit phase. Otherwise, it is aborted. The commit directive flows to the target database via the audit trail and through the replication engine. Only when the target database receives the replication commit does it commit the transaction.

As opposed to asynchronous replication, in which the data replication engine is completely divorced from the application, the Shadowbase Plus SR synchronous replication engine needs one simple application interface. It needs to know when an application begins a transaction so that it can join that transaction as a voting member. This interface is provided either as an intercept library or as a callable API, as described in detail later.

2.4.4.2 The Coordinated Commit Protocol

With coordinated commits, when the application starts a transaction, the replication engine participates in the transaction via the SRG API through a VRM. Asynchronous replication is used to replicate updates to the target database, locking the data objects as it does so. Thus, there is no additional latency imposed upon the application during this process. However, transaction commit is synchronous. As a result, no data is lost should the source node fail Likewise, since all data objects are locked at both the source and target databases until commit time, there can be no data collisions. Application latency only occurs as the source system waits for the replication engine to vote rather than after every update that has been issued by the source system, as in the case of the dual-writes approach.

A simplified view of the synchronous replication coordination employed by Shadowbase Plus SR is given in FIG. 32 and FIG. 33. The coordinated commit replication engine is a VRM gateway. Both TMF and the replication engine are informed when the application begins a transaction (1). As described earlier, this notification is given to the replication engine either via an application-bound library that intercepts the begin transaction call issued by the application, or it is generated by the application via a call to an API provided by Shadowbase Plus SR. At this point, the replication engine requests that it join the transaction (2). This lets it vote on the outcome.

As the application issues updates (3*a*), they are written to the DP2 processes (3*b*), which are the RMs for the NonStop disks. Updates are also written to the TMF audit log. The replication engine reads the updates from the audit log (3*c*) and replicates them to the target database, where they are tentatively applied.

When the application issues a commit directive (4), TMF sends prepare signals in parallel to all of its resource managers (5*a*), including the VRMs (the replication engine in this case) (5*b*). This is the Prepare phase of the two-phase commit protocol. The resource managers check that they have safe-stored or tentatively applied all updates within the scope of the transaction and if so, reply with a "yes" vote, a Ready signal (6*a*, 6*b*), to TMF. If all RMs have voted "yes," TMF sends a commit signal (7*a*, 7*b*) to all RMs, the Commit phase, and notifies the application that its transaction has been committed (8).

If any RM cannot commit the transaction, it votes "no;" and TMF will send a Rollback signal to all RMs informing them to abort the transaction.

2.4.4.3 Shadowbase Plus SR Architectural Overview

FIGS. 32 and 33 have described the transaction flow through Shadowbase Plus SR at a very high level. FIG. 34 shows the structure of the Shadowbase Plus SR replication engine. This patented architecture is now described in more detail.

Shadowbase Plus SR comprises the following processes:
1. AudColl is the Collector process (the Extractor in FIG. 6) that follows the TMF audit trail and extracts the changes made to the source database.
2. AudCons is the Consumer process (the Applier in FIG. 7) that receives the source database changes and applies them to the target database.
3. AudRtr is the Router process that routes changes to the Consumers based on transaction ID.
4. AudCoor is the Coordinator process that ensures that changes have been successfully applied to the target database before voting to commit a transaction.
5. Metronome is the process that periodically generates a small transaction that encompasses all disks involved in synchronous replication to ensure that all data changes have been flushed to the TMF audit trail.
6. AudCfg is the Autoconfiguration process that accepts online configuration changes and provides configuration information to the application library.
7. AudMon is the monitor for all Shadowbase Plus SR processes. It will restart a process that has failed. It runs as a checkpointed process pair so as to survive a CPU failure.

2.4.4.4 Procedural Flow

Expanding the diagram of FIG. 34, look at the transaction process in more detail. In the UML diagrams below, "send" is the waited sending of a signal via the OTMF_WRITE_SIGNAL API call, and "receive" is the waited receipt of a signal via a READX/OTMF_INTERPRET_SIGNAL sequence.

2.4.4.4.1 Beginning a Transaction

The begin transaction activity is shown in FIG. 35 and in more detail in FIG. 36. An application begins a transaction by issuing a begin transaction command (BEGINTRANSACTION or TMF_TXBEGIN) to TMF (1). It also informs AudCoor about the new transaction (2) so that the replication engine can join the transaction. AudCoor first requests the transaction ID from the application. There are actually two transaction IDs that are fetched on separate waited calls:

1. The trans id (2*a*) is a transaction ID used by the applications. It is a structured field comprising the node ID, the CPU, and a sequence number.
2. The tx id (2*b*) is an internal ID used to interact with TMF.

AudCoor then registers with TMF so that it can join the transaction. It does so by exporting the transaction ID to TMF via the OTMF_EXPORT_ASYNC call as a nowaited call (3*a*). It is informed of its successful registration by a TMF_SIGNAL_EXPORT_DONE signal (3*b*).

At this point, AudCoor responds to the waited Begin Transaction call from the application to complete the call (2*c*).

Shadowbase Plus SR is now a voting member in the transaction.

2.4.4.4.2 Replicating Changes

At this point, the application can proceed with its transaction. Referring to FIGS. 37 and 38, the application begins making changes to the source database as part of its transaction (4). These source database changes are monitored by TMF and are written to its audit trail (5).

Shadowbase Plus SR's AudColl process (the Collector) follows the audit trail via the NonStop Audit Read library (ARLIB) (6) and sends changes to the target node over the communication channel (7).

At the target node, AudRtr (the Router) receives the changes and distributes them to its multiple AudCons processes (the Consumers) according to the transaction with which the change is associated (8). Each Consumer typically handles one transaction at a time, and all changes associated with a transaction are routed to the Consumer handling that transaction (Best practice is to set the AudCons pool large enough so that each AudCons process handles only one transaction at a time. However, Shadowbase Plus SR is implemented so that an AudCons process can handle multiple transactions should the need arise.). The AudCons processes write the changes routed to them to the target database (9) under the appropriate target transaction ID.

Because each transaction is handled by a different Consumer, one transaction does not have to wait for another transaction's data to be applied. That is, they are independent transactions. Therefore, transaction isolation is achieved. Though the fact that different threads are handling different independent transactions means that the transactions may be executed at the target database in an order different than that at the source database, this does not impact the integrity of the target database.

However, the integrity of the target database requires that dependent transactions, that is those that change the same data item, be executed in the same order as they were at the source database. This is guaranteed by the locking sequence at the source node. If two transactions want to change the same data item, only one transaction can proceed. The second transaction waits for the locks held by the first transaction to be released, which occurs either at commit or abort time. The first transaction will not commit on the source node until it is able to commit on the target node. Therefore, the second transaction cannot proceed at the source until the first transaction has committed at the target. Consequently, transaction ordering is maintained.

2.4.4.4.3 Committing a Transaction—Phase 1

TMF uses a two-phase commit. During the Prepare phase, it queries all of the participants in the transaction to ensure that they can commit the transaction. If they all agree, the Commit phase directs all of the participants to commit. If any participant cannot commit the transaction, TMF will direct all participants to abort the transaction in the Commit phase.

The Phase 1 commit procedure for Shadowbase Plus SR is shown in FIGS. 39 and 40. When the application has issued its last change to the source database under a transaction, it issues a commit command to TMF (10). TMF sends a TMF_SIGNAL_REQUEST_PREPARE signal to each participant in the transaction, requesting it to prepare to commit the transaction. Recipients include AudCoor, which is the process that had originally registered as a participant with TMF (11).

Having received the prepare-to-commit directive from TMF, AudCoor sends a "ready to commit?" query via Aud-Coll (12) to the target Router AudRtr (13). AudRtr knows the Consumer AudCons process that is handling this transaction. Once receiving assurance that the target AudCons process has successfully applied all of the changes for the transaction and hence can commit, AudRtr returns a "ready to commit" response to AudColl (14), which passes it back to AudCoor (15).

AudCoor votes "yes" by sending a TMF_SIGNAL_READY signal to TMF (16). If all participants vote "yes," TMF will commit the transaction.

If, on the other hand, AudRtr determines that its Consumer cannot complete the transaction, it replies in the negative to AudCoor via AudColl. In this case, AudCoor will send a "no" vote to TMF as a TMF_SIGNAL_REQUEST_ROLLBACK signal. This will cause TMF to abort the transaction as part of the Commit phase.

2.4.4.4.4 Committing a Transaction—Phase 2

If all participants have voted "yes" to commit in Phase 1, TMF enters Phase 2 to complete the transaction commit. The activities for Phase 2 are shown in FIGS. 41 and 42.

If the transaction is to be committed, TMF sends a commit directive to all participants in the transaction via a TMF_SIGNAL_REQUEST_COMMIT signal. For Shadowbase Plus SR, this directive is sent to AudCoor (17), which is the process that is registered with TMF. AudCoor can now leave the transaction. It does so by sending a TMF_SIGNAL_FORGET signal to TMF (18), which will deregister AudCoor from this transaction.

To complete the commit, TMF will write a commit record to the audit trail (19) and will then inform the application that its transaction has been committed (20).

AudColl will read the source's commit record from the audit trail (21) and will send it to AudRtr on the target node (22). AudRtr will forward the commit command to the Aud-Cons Consumer process handling this transaction (23). The Consumer will commit the target transaction, which will release the locks that it is holding on the transaction's changes (24).

If the transaction is to be aborted, TMF sends an abort directive to all participants in the transaction via a TMF_SIGNAL_REQUEST_ROLLBACK signal. As with the commit directive, AudCoor receives the abort signal and leaves the transaction by sending a TMF_SIGNAL_FORGET signal to TMF. TMF will write an abort record into the audit trail and will inform the application that the transaction has been aborted. The abort record will be replicated to the proper AudCons process at the target database. AudCons will abort the transaction and release its locks.

Note that the source database commits or aborts the transaction first. It is the arrival of the commit or abort token at the target database that causes the target database to commit or abort its transaction. The transaction has now been committed to or aborted at both the source database and the target database.

2.4.4.5 The Application Library

As seen from the above description, the only interface between the application and the Shadowbase Plus SR replication engine occurs at begin transaction time. Though the application is delayed at commit time as Shadowbase Plus SR ensures that the transaction can be committed on the remote target node, this does not entail any interaction between the application and the replication engine. Commits are managed solely by TMF so far as the application is concerned.

Shadowbase Plus SR provides two methods for the application to interface with it to begin a transaction—an intercept library and a callable library.

2.4.4.5.1 Intercept Library

The Shadowbase Plus SR intercept library can be bound into the application without recompilation and requires no code modifications to the application.

An application begins a transaction by issuing a BEGINTRANSACTION command or a TMF_TXBEGIN command to TMF. The Shadowbase Plus SR intercept library traps these commands.

When either command is issued by the application, the library:
1. will issue a begin transaction command to TMF, and
2. will register the transaction with AudCoor.

The intercept library also provides an optional API to get status, statistics, and error details. Configuration change notifications are piggybacked onto the reply to the registration request so that the application can query AudCfg to get the configuration changes.

2.4.4.5.2 Callable Library

A callable library is also supplied and provides an API that an application may use. The use of this library requires modifications to the application.

The calls that the library furnishes include:
1. SB_BEGINTRANSACTION and SB_TMF_TXBEGIN to start a transaction.
2. SB_REGISTER_TX to register the transaction with AudCoor.

As with the intercept library, additional calls are provided to read status, statistics, and error details. Also, configuration change notifications are piggybacked onto the reply to the registration request so that the application can query AudCfg to get the configuration changes.

Though the callable library requires application code modifications, it has the advantage that the application can decide which transactions should be executed synchronously and which should be executed asynchronously. If a certain transaction is to be executed asynchronously, the application simply does not involve Shadowbase Plus SR. The data replication engine will still asynchronously replicate changes but will not join the transaction and will not vote on the commit.

2.4.5 Application Latency

The application latency of the Shadowbase Plus SR synchronous replication engine depends upon many configuration factors.

Factors that contribute to application latency include:
1. transaction registration latency, which is the time required to register the transaction (this is an interprocess message to AudCoor and a message to TMF and is insignificant).
2. the delay in flushing the disk processes' changes to the audit trail. This is called materializing the audit and is required so that the Collector can read the changes and can replicate them. The delay in assuring that all data has been flushed to the audit trail can be influenced by the Metronome, described later.
3. the delay in reading the audit trail since the Collector has to poll the audit trail for changes. This is because of the way that the NonStop ARLIB audit reading library works. The audit trail polling interval is configurable via the Shadowbase Plus SR parameters ADTSAMPLEDELAY and ADTEOFDELAY.
4. the amount of time that a change waits in the communication buffer before sending it to the target node. In Shadowbase Plus SR, this is controlled by the parameters TURBOWAITTIME and TURBOMAXEVENTS. TURBOWAITTIME specifies the maximum time to wait before transmitting a communication buffer that hasn't filled. TURBOMAXEVENTS specifies the number of events that can accumulate in the communication buffer before transmitting it.

5. the communication channel latency (its round-trip time, typically about two milliseconds per 100 miles).
6. the time to apply the changes to the target database. The time may be small if there is a high percentage of disk cache hits on the target database.
7. processing overhead (generally insignificant).
8. various other buffering points.

So far as buffering is concerned, there are several points in the replication engine where messages can be buffered and where the amount of buffering can be configured. Traffic between any of the replication engine processes can be buffered to save interprocess messages. Traffic between AudColl and AudRtr can be buffered to make more efficient use of the communication channel. Buffering reduces the load on system resources at the expense of increased application latency. Interestingly, as transaction rates increase, buffers fill faster; and application latency decreases.

In some replication engines, certain buffers are maintained on disk for recovery or for event-filtering purposes. To the extent that additional disk-queuing points are required, application latency may be significantly impacted. Shadowbase Plus SR uses no disk-queuing points. It provides strictly process-to-process replication.

It must be noted that increasing application latency has other penalties besides extending the application's transaction response time. Because a transaction is living longer, it will hold its locks longer, extending the time that other applications will have to wait on those locks. In addition, at any given transaction rate, the number of simultaneously active transactions will increase. Care must be taken to not let this number exceed the maximum number of transactions that TMF can have outstanding at any one time.

However, application latency does not reduce the throughput of the system. Just because an application takes longer to process a transaction does not mean that it is using more system resources. Rather, additional application threads must be supplied to handle the increase in the number of active transactions. In NonStop systems, for example, this generally means configuring more processes in a server class running under Pathway.

2.4.6 Scalability

Shadowbase Plus SR is inherently scalable to handle large transaction volumes:

1. AudCoor is scalable. It is recommended that there be at least one copy in each CPU in the system and that applications use the copy in the CPU in which they are running. This will ensure that an AudCoor process is always available to manage replicated transactions even in the face of a CPU failure. Furthermore, this configuration increases node availability. If an application uses an AudCoor in its same CPU, the application's transaction will fail only if that CPU fails. However, if the application is using an AudCoor in another CPU, a transaction initiated by that application will fail either if its CPU fails or if the CPU in which its AudCoor process is running fails.
2. The AudCons Consumer processes in the target's Consumer pool are scalable. In fact, a general rule is that the number of AudCons processes should be equal to the maximum expected number of simultaneous transactions. In this way, each new transaction will always have an AudCons process available to it.
3. AudColl Collector processes are scalable. Each AudColl process will be responsible for a defined subset of transactions (for instance, only odd-numbered transactions). If a transaction starts subtransactions on other nodes (exclusive of those transactions started by Shadowbase Plus SR), one or more AudColl processes must be running on each such node in order to capture and replicate the changes made by the subtransactions.
4. AudRtr scalability is being considered for future releases. Since it does no disk I/O, it will initially not be a bottleneck.

2.4.7 Audit Trail Synchronization

Synchronous replication depends upon the target node having successfully applied all of the changes to the database (or having failed to be able to do so) so that Shadowbase Plus SR can vote on the transaction on the source as part of Phase 1 of the TMF transaction. This presents a problem.

The crux of the problem lies with the materialization of changes to the audit trail on the source node. When an application makes a change to a data item in the database, the changed data is managed as insert, update, and delete events and is saved in a change buffer maintained by the involved data disk process(es). These changes must then be sent from the data disk process(es) to their assigned audit trail disk process(es), master or auxiliary, in order to be written into the appropriate audit trail file.

Shadowbase Plus SR uses the HP TMF ARLIB(2) library to read the change events from the audit trail. ARLIB will not (cannot) return the change events until they have been physically written to the audit trail by the audit trail disk process (ADP). The rules for flushing data from the ADP's internal buffers to disk are an area under considerable review at this time between HP and Gravic. As mentioned in the text, the ARLIB cannot read/return audit trail events that have not been flushed to disk. To improve TMF performance, data to be flushed is buffered, and flushing is done infrequently. Hence, Gravic is working with HP to hopefully enhance the ARLIB to allow it to read/return audit trail events that have not yet been flushed to disk. This should lessen flushing latency, and remove the uncertainty of when transaction events are available to Shadowbase Plus SR.

Shadowbase Plus SR must then periodically poll the audit trail, via ARLIB, to see when/if these events are available. The ADP will only flush these events upon certain events occurring in the system (e.g., buffer full and disk process control points). Exposing the data changes by writing them to the audit trail is called materializing the audit changes.

Changes are materialized by TMF and the audit trail disk process (ADP) based upon an internal algorithm that attempts to optimize both performance and reliability. However, there is no indication from TMF to Shadowbase Plus SR that all of data has been materialized until the commit record for the transaction is read from the audit trail.

This presents a "Catch 22," that is a difficult situation from which there is no escape because it involves mutually conflicting or dependent conditions. Shadowbase Plus SR cannot vote to commit until it knows it has read all of the data from the audit trail, but TMF does not provide an indication (signal) until after all Resource Managers have voted to commit. As a Resource Manager, Shadowbase Plus SR cannot respond to the prepare query until it sees all of the changes for the transaction, which requires that the changes be materialized by TMF. In other words, it cannot respond (with full certainty) until after it has responded.

Fortunately, there is a solution, as described later. First, though, look more closely at the situation.

The prepare process is shown in FIG. 43. When the application asks TMF to commit a transaction (1), TMF will send a prepare directive to all of its Resource Managers and will ask them if they are prepared to commit the transaction (2). The RMs include all of the NonStop DP2 disk processes that are involved in the transaction and the Shadowbase Plus SR replication engine. It is the AudCoor process in the replication engine that has registered with TMF for the transaction that is the recipient of the prepare directive from TMF.

At this point, all Resource Managers will ensure that their changes to the database are durable and if successful, will respond positively to the prepare directive. The DP2 disk processes will accomplish this by sending all of the changes that have accumulated since the last flush (in addition to flushing on a prepare directive, a DP2 cache will be flushed following a timeout or if its change buffer has filled) to the audit trail's DP2 disk process (3a). These changes include all transaction data for all transactions accumulated up to the start of the prepare directive. The audit trail's DP2 disk process will buffer these changes and will eventually materialize them when the buffer is full or triggered by other internal conditions.

At the same time, the AudCoor process will send a ready-to-commit query (RTC?) to the AudColl process (3b), which will forward it over the communication channel to the AudRtr process (4). AudRtr will delay responding to the RTC? query until it has applied all changes that it has received for the transaction to the target database. These changes are being read by AudColl from the audit-trail disk via the NonStop ARLIB library (5) and are sent to AudRtr (6) for applying to the target database.

When AudRtr has applied the last change received for the transaction, it will return its RTC! reply to AudColl (7), which will forward it to AudCoor (8). AudCoor will inform TMF as to the results (prepared to commit or cannot commit) (9). Based on this and the responses from the other Resource Managers, TMF will decide whether to commit or to abort the transaction. If it decides to commit the transaction, it will materialize the changes that have been sent to it by the DP2 processes by flushing them to the audit trail disk (10), thus making all changes durable (that is, they can be recreated if necessary from the audit trail). This completes the Prepare phase of the 2 phase commit (2PC) sequence.

During the Commit phase (second phase of the 2PC sequence), TMF will inform all RMs to commit the transaction (or to abort it, in which case each RM must roll back the changes that it has made to the database for that transaction).

On the surface, this procedure seems straight forward. However, the problem is that though the disk processes have sent their changes to the audit trail's disk process (step 3a), TMF is non-deterministic as to when it writes the data to the audit trail—as mentioned above, the only indication from TMF that all of the data for a transaction has been materialized is when the commit record is read. But the commit record is not written until after the Resource Managers have voted. Some other solution for determining when data has been written must be determined.

Fortunately, there is a mechanism for a solution. As described above for Steps (3a) and (10), when the audit trail DP2's materialize changes, they do not just materialize the changes for the involved transaction. They materialize all database changes that have been flushed to them so far (and internally buffered). This includes all database changes for all transactions up to the time of the application commit directive that triggered the flush. Therefore, when a synchronous transaction is completed, Shadowbase Plus SR will see that transaction's changes as soon as another transaction—any transaction—successfully commits.

Furthermore, materialized changes carry the timestamp of when the block was flushed. All changes within a single flush will carry this timestamp. For a particular data disk process, the changes will nevertheless be sequenced in the audit trail according to the order that they were actually made; successive events from a particular data disk process are thus timestamped in ascending order. All changes across all data disk processes that are thus comingled at the audit disk process in the order received from the data disk process(es). Therefore, when a change is received, it is known that changes for any transactions whose commit times were earlier than the newly-received change's timestamp have already been received.

How can Shadowbase Plus SR determine when all of the changes for a waiting transaction have been materialized? There are two solutions:

1. Wait a reasonable period of time, and assume that some other transaction has committed and caused the waiting transaction's changes to be materialized.
2. Periodically create its own transactions to ensure that all of a waiting transaction's changes have been materialized. This is the job of the Shadowbase Plus SR Metronome.

Shadowbase Plus SR supports both of these strategies. The prepare query is processed by Shadowbase Plus SR in the form of a request-to-commit query (RTC?—see Step 12 in FIGS. 39 and 40). The RTC? is issued by the AudCoor process as soon as the prepare query is received from TMF, which happens as soon as the application commits the transaction. The solutions described below delay the request-to-commit response (RTC!) until it is reasonably assured (Solution 1) or absolutely assured (Solution 2) that all changes for the transaction have been materialized and have been applied to the target database.

2.4.7.1 Solution 1: Waiting a Reasonable Period of Time

The first solution involves waiting for a maximum configured period of time sufficient to ensure that there is a strong likelihood or probability that all of the changes for the transaction have been read by AudColl. Of course, there will be cases in which some changes will be read by AudColl after the "reasonable period of time" has elapsed. In these cases, the transaction will have already been committed on the source system; and the late changes will be replicated asynchronously outside of the transaction.

For instance, assume that it is acceptable that 0.001% of all changes be replicated asynchronously. If measurements indicate that 99.999% of all changes will make it to AudColl within 150 milliseconds of the application's commit directive, AudColl will assume that it has received all of the transaction's changes within 150 milliseconds of its receiving the RTC? from AudCoor. After this time delay has elapsed, AudColl can proceed with the prepare process for the transaction.

AudColl is actually more efficient than this, making use of provisional RTCs. Rather than waiting for the timeout to occur before issuing the RTC?, it issues an RTC? to AudRtr shortly after receiving the request from AudCoor. In most cases, it will have seen all of the data for that particular transaction already. If it sees more data for the transaction, it sends the data plus another RTC? to AudRtr. AudRtr's response to the first RTC? query will be ignored. This allows the timer and the RTCs to run in parallel, significantly reducing the overall latency (on average).

Once it has determined that it has received all of a transaction's changes, AudColl must wait for AudRtr to respond with an RTC! response for the last change associated with this transaction. This indicates that all changes for the transaction have been applied to disk at the target database. At this point, AudColl can respond to AudCoor with an RTC!; and AudCoor can now vote yes or no depending upon the RTC! response.

There is still one problem with this procedure, and that is overall system delays. In a loaded system, there may be significant delays after the application's call to commit before a change is read by AudColl. This delay could amount to hundreds of milliseconds or even seconds in a heavily loaded system, for example when AudColl is not getting sufficient system resources to keep up. Therefore, the timeout cannot be based on wall-clock time. Rather, it must be based on the timestamps of the RTC? query and the changes read from the audit trail. Only when the change timestamps exceed the RTC? timestamp by the configured amount can AudColl assume that it probably has received all of the transaction's changes and can proceed with the prepare sequence.

2.4.7.2 Solution 2: Periodically Create Transactions with the Metronome

Another solution to this Catch 22 is to artificially create transactions on a timed basis. This is the job of the Metronome, shown in FIG. 43. The Metronome will periodically generate a transaction that includes a single I/O for every data disk that has a table or file (or partition thereof) that is configured for synchronous replication. This will cause the change buffers for those disks to be flushed to the corresponding audit trail disk, thus driving their changes to AudRtr. AudRtr then knows that it can respond appropriately to all RTC?s received before that time.

More specifically, the Metronome will periodically generate a transaction that updates a single-row Metronome-managed file on every disk configured for synchronous replication. Since the repetitive transactions are always updating the same rows, it is guaranteed that these rows will always be in the data disk process's cache; and Metronome transaction processing will have low overhead and be very fast. The Metronome transaction is issued as an asynchronous transaction so that it is not held up by the time it takes the system to complete its own commit processing. In effect, the Metronome transaction will materialize all changes for all other application transactions that have accumulated up to the time the Metronome generated the update sequence (called the Metronome tick time).

The RTC? for a transaction carries a timestamp corresponding to the time that the commit for that transaction was issued. In addition, each data change in the audit trail carries the same timestamp when it is flushed to the audit trail. Therefore, when the Collector sees a Metronome data change (or any data change, for that matter) for every disk with a timestamp that is later than the timestamp of the RTC?, it knows that it has seen all of the changes for that transaction; and it can return its prepare vote to TMF via AudCoor (steps (8) and (9) in FIG. 43).

Any commit that is later than the RTC? for this transaction will ensure that all of the data changes for the disks involved have been materialized. However, there is no guarantee that such a random event will happen for all data disks in any time that is useful (various internal system testing bears this out). It is the Metronome that makes this time deterministic. When all of the changes for a Metronome transaction have been seen by AudColl, it is known that the data changes prior to that time for all data disks have been materialized. This time is called a Metronome tick.

The Metronome guarantees that every transaction will complete synchronously. However, its tick interval has an impact on application latency, as well as overall system loading. AudColl may have to wait for a Metronome tick later than the RTC! response to the transaction's last change to determine that AudRtr has received and has applied all of the changes for the transaction. This additional waiting time will add to the transaction response time.

The implementation of the Collector seeks to minimize this delay via provisional RTCs. Rather than wait until it receives the terminating Metronome tick before sending AudRtr the RTC? query, AudColl will send AudRtr a provisional RTC? query with each transaction change. As it receives an RTC! reply in response from AudRtr, AudColl will throw away the previous provisional RTC!, if any. Once it has received a Metronome tick that is later than the RTC?, it will wait for the RTC! reply from AudRtr for the last transaction change. In some cases, this RTC! reply will already have been received as a provisional reply; and AudColl can respond immediately to AudCoor with an RTC! reply. In the worst case (i.e., the case in which the last change was sent just before receiving the Metronome tick), AudColl will have to wait for a replication round-trip interval before it can respond to AudCoor.

Section 3.5 shows that the average application latency added by the Shadowbase Plus SR replication engine is $$\text{average application latency} = d + \frac{t^2 + c^2}{2t}$$

where
d d=delay time from the commit to when AudColl reads the last change from the audit trail.
t t=Metronome tick interval.
c c=replication channel round-trip time The replication channel round-trip time in this case includes the time from when AudColl reads the last change from the audit trail to the time that AudRtr applies the change and is ready to respond with the RTC! response It also includes a communication channel latency time for the response to be returned to the source system.

For instance, if it takes an average of 20 milliseconds from the commit to when AudColl sees the last change (d=20 msec.), if the Metronome tick interval is 100 msec. (t=100 msec.), and if the replication channel round-trip time is 50 msec. (c=50 msec.), the average application latency added to a transaction by Shadowbase Plus SR will be 82.5 msec.

Note that it does not reduce the application latency to configure a Metronome tick interval that is less than the replication channel round-trip time, c. This is because the minimum delay from when the last change is read by AudColl to the time that AudRtr will return the final RTC! response is the replication channel round-trip time. Any additional Metronome ticks that occur during this time interval are meaningless since AudColl only needs the receipt of one tick following the final change to know that it has received all changes.

The Metronome tick interval can be adjusted to control the effect of RTC? delay on application latency, as shown in FIG. 44. Decreasing this interval to reduce latency imposes additional overhead on the system. Every Metronome tick will generate one transaction containing one I/O for every disk holding a file or table configured for synchronous replication. For instance, if 100 disks are synchronously monitored, and if the Metronome ticks every 100 milliseconds, then a system load of 10 transactions per second and 1,000 disk I/Os per second will be generated.

Therefore, as the Metronome tick interval is shortened to minimize application latency, the load that it imposes on the system increases.

Notwithstanding the penalties imposed by these two methods to handle audit trail synchronization—delaying if necessary by a fixed time or using a Metronome, the audit must be materialized before a transaction can commit. Shadowbase Plus SR supports both of these strategies.

2.4.8 Node Failure and Recovery

The failure to be able to replicate to a remote node in a synchronous replication network presents a particular problem since that node can no longer participate in transactions. If it is not removed from the participant list, no synchronous transaction can be completed. Replication failure can occur if the target node fails, if the network between the source node and target node fails, or if the replication engine fails.

Shadowbase Plus SR handles this situation by converting to asynchronous replication for the downed node. At a high level, changes directed to the downed node are queued in the audit trail for later transmission. When the node is returned to service, it does so in asynchronous mode; and the changes that have queued are drained and replicated to it from the source system's audit trail. When its database has been resynchronized, it can be returned to synchronous service.

Resynchronization occurs in four stages—asynchronous (queue) mode, coordinated asynchronous mode, semi-synchronous mode, and, finally, synchronous mode:

1. Asynchronous (queue) mode—this is the mode that the replication engine enters when it cannot replicate to the target node. In this mode, the source application runs independently of the replication engine, and the database changes are queued on the sending side (in other words, in classic asynchronous replication mode). The replication engine remains in this mode until the target node is recovered and the replication engine can then communicate with the target node's replication engine.
2. Coordinated asynchronous mode is used to begin target-node recovery. During this mode, the changes that built up while the target node was unavailable are drained from the source node's audit trail to the target node's database via asynchronous replication.
3. Semi-synchronous mode is entered when asynchronous replication has substantially drained the change queue. Synchronous replication of new transactions is begun (actually in two stages, as discussed later). In this mode, both asynchronous replication of older changes and synchronous replication of newer changes are underway.
4. Synchronous mode is entered when all asynchronous and semi-synchronous replication has completed. At this time, replication is purely synchronous; and synchronous replication to the target node has been recovered.

During coordinated asynchronous mode, the application is running the fastest, with no application latency as the system works to catch up with replication. As recovery moves to semi-synchronous and synchronous modes, application latency grows until full synchronous operation is achieved.

Recovery steps through the modes are shown in FIG. 45.

2.4.8.1 Coordinated Asynchronous Mode

When a node is to be restored to service, it cannot immediately be put into synchronous mode. Otherwise, the commit of current transactions will be delayed until the entire backlog of changes has been posted to the newly-restored node, massively increasing application latency during this time.

Therefore, the first step in the recovery process is to asynchronously drain the queue of changes that have accumulated during the outage to the target node. Shadowbase Plus SR accomplishes this by using its inherent asynchronous replication capabilities. Queued changes as well as new changes are replicated asynchronously as they normally are, but the application is not held up by the commit process. Rather, the updating of the target database is coordinated with the source transaction's commit or abort outcome after the fact.

The coordinated asynchronous mode proceeds as follow:

1. Step 1a: When a synchronous transaction is begun by an application, AudCoor is informed and registers with TMF. When a transaction commit is called, and AudCoor receives a prepare directive, it will respond directly to TMF with an affirmative vote. In this way, source transactions registered for synchronous replication are allowed to proceed and are not delayed. Note that the rest of replication may be down during this phase—only AudCoor is required to vote on the transaction.
2. Step 1b: When AudCoor has established a connection with AudColl, it passes the voting responsibility to AudColl. AudCoor passes prepare directives to AudColl in the form of RTC? queries. If AudColl has not established replication, or if it is busy draining the queue of changes that have accumulated in the audit trail during the outage, it will respond immediately with an RTC!, thus avoiding any delay to the transaction.

During this time, asynchronously replicated changes are sent to AudRtr, which will assign them to an AudCons process based on table or file. All changes for a given table or file are applied by the same AudCons (which may be handling several tables and files) so that the updates to a table or file are done in the correct order (the order in which they were applied to the source database).

AudCons will commit its changes when directed by AudRtr, which will do so when it receives a commit token read from the audit trail and sent to it by AudColl. However, this commit is transparent to the source system and occurs long after the RTC! has been returned to AudColl by AudRtr. The target updates are coordinated with the commits or aborts at the source system, but the commit process does not delay the source transaction.

1. Step 1c: AudColl continually checks to see if it has drained its change queue (i.e., the changes backed up in the audit trail) down to a small size. This check is based on comparing the change times to the wall-clock time. If the changes are within a configured time interval (say, 50 milliseconds) of the wall-clock time, voting is transferred to AudRtr by sending the RTC? queries to it.

If AudRtr's queues of changes to its AudCons processes are long, it will respond immediately to an RTC? with an RTC! so that source transactions are not delayed (this is similar to simply having AudColl respond to AudCoor with the RTC! Reply). When all of its AudCons queues are short (a configurable value), semi-synchronous mode (Step 2a) is entered.

During coordinated asynchronous replication, there is typically no guarantee of either inter-transaction or intra-transaction referential integrity. This is because there is usually no coordination of the changes being made to the files and tables across the AudCons processes (however, each AudCons applies the events it receives in the proper order to maintain database consistency for all data received along that replication path). Though changes are ordered within a particular file or table, related changes to different files or tables (or partitions within a file) may be applied in a different order than was done on the source system. Changes will be made as soon as they are received by the responsible AudCons process.

2.4.8.2 Semi-Synchronous Mode

At the conclusion of Step 1c, semi-synchronous mode is entered. During this mode, new source transactions are synchronously executed. If the Metronome is to be used, it must be activated when semi-synchronous mode is entered. It is used to facilitate the completion of the new synchronous transactions initiated in this mode.

1. Step 2a: New transactions are executed synchronously under the first phase of the semi-synchronous mode. In this phase, the transaction updates for these new source transactions are still sent to the appropriate AudCons process based on a Database Specification (DBS) assignment, which specifies which files or tables are to be replicated and which are not to be replicated. However, each such AudCons process will have a separate target-side transaction to perform its replay work on behalf of the original source transaction. Instead of one source transaction being replayed using one target transaction (as is done in full synchronous mode), each target AudCons involved in the replay uses a separate target side transaction to replay its share of the source transaction's data.

As each new source transaction occurs, the changes are picked up by the AudColl, sent to the AudRtr, and are then sent to the appropriate AudCons based on the DBS assignments. Each AudCons starts its own target transaction and starts replaying the changes as it receives them. When the source application calls commit, and the AudColl forwards the RTC? request to the AudRtr, the AudRtr will forward a RTC? request to each of the AudCons processes involved in the transaction. Only when each of the AudCons reply with the RTC! reply (meaning they have successfully applied all data for that transaction), will AudRtr respond back to the AudColl with the RTC! reply.

At source commit time, the AudCons transactions are not committed until AudRtr receives a commit token over the replication channel. For each AudCons involved in the transaction, AudRtr generates a commit command instructing the AudCons to commit the transaction's changes.

During this phase, all new incoming changes are still directed to the AudCons handling that file or table. Inter-transaction referential integrity of new transactions is assured since transactions are committed in order. However, intra-transaction referential integrity is not guaranteed because there is no control over the ordering of changes in different files or tables.

Bear in mind that while new transactions are being executed in a synchronous manner (albeit with one source transaction being replicated as one or more target transactions), existing coordinated asynchronous mode transactions may still be active (may not have completed yet). Hence, transaction isolation is not (yet) guaranteed since an AudCons process must complete each update before it can process the next update. Thus, a transaction updating a particular file or table can hold up a completely independent transaction that needs to update that same file or table. Shadowbase has the facilities (for example RESOLVELOCKS and RESOLVELOCKSQ) to alleviate transaction isolation issues.

2. Step 2b: When all of the original coordinated asynchronous mode transactions have been completed, Shadowbase Plus SR recovery enters Step 2b of the semi-synchronous mode. New transactions are now executed under the second phase of semi-synchronous mode. In this phase, AudRtr routes each transaction to its own AudCons as it does under full synchronous replication. In this mode, a particular AudCons replays all of the source transactions updates, using a single target transaction.

At this time, each AudCons is now handling some Phase 1 (step2a) transactions that are being distributed to AudCons processes based on file or table assignment as well as some Phase 2 (step 2b) transactions that are being distributed by transaction (by AudRtr, generally based on AudCons availability/loading).

Keep in mind that both Phase 1 and Phase 2 transactions are synchronous transactions. The source system will not be allowed to commit and release the locks of either transaction type until that transaction has been successfully replicated to and applied on the target system. Therefore, these two types of transactions can be mixed because source system record and row locking avoids the confusion of a Phase 2 transaction attempting to update out-of-order a table being updated by a Phase 1 transaction.

2.4.8.3 Synchronous Mode

During both Steps 2a and 2b of the semi-synchronous mode, the system is handling a mix of transaction types. During Step 2a, it is handling asynchronous transactions and Phase 1 synchronous transactions. During Step 2b, it is handling Phase 1 and Phase 2 synchronous transactions.

3. Step 3: When all of the Phase 1 transactions in Step 2b have completed, "full" synchronous mode is entered. At this point, all synchronous transactions are Phase 2 transactions being routed to their own, assigned, AudCons. This is the standard Shadowbase Plus SR synchronous-replication mode.

No action need be taken in Step 3. It is simply the completion of all Phase 1 transactions in Step 2b that leaves the system in standard synchronous mode.

Recovery is now complete. Inter-transaction referential integrity, intra-transaction integrity, and transaction isolation are all guaranteed.

If the nodes are running in an active/active configuration, applications on the failed node should not be started until full synchronous operation has been restored in Step 2b because of the lack of inter-transaction referential integrity on the target system during earlier steps.

The one exception to this rule is if the database is partitioned so that the application being recovered is updating only its partition of the data. In this case, the node being restored could begin active processing during Step 1c of the coordinated asynchronous mode. In any event, query processing can be running on the node being recovered starting with Step 1c of the coordinated asynchronous mode.

2.4.8.4 Actions Taken Upon Replication Failure

When replication fails due to a target node failure, a network failure, or a replication failure (and also at system startup time (it is recommended that Shadowbase Plus SR be treated like a system function at system initialization time and be brought up before any applications)), applications will try to call the Shadowbase Plus SR replication engine to begin synchronous transactions. Three options determine how Shadowbase Plus SR will respond. It can be configured to:

1. tell the application to proceed. Replication will continue in coordinated asynchronous mode if the target node is not available.
2. pause the application by not responding to the request until replication is restored or switched to another state.
3. not start a transaction and return an error.

For those applications that use the Shadowbase Plus SR intercept library, error status is available following the application's begin transaction call from an optional call to a Shadowbase Plus SR API, as described earlier.

2.4.8.5 Object-by-Object and Transaction-by-Transaction Allocation

During the replication sequence described in the preceding sections, the transaction steps or operations, or the entire transaction themselves, can be routed or processed or assigned or applied or identified to be replayed (also referred to as "allocated") on an object-by-object basis and/or on a transaction-by-transaction basis (note that routed, processed, assigned, applied, identified, or allocated is meant to be used interchangeably herein). This can be independent of the method used to replay the event or transaction (i.e., it can be independent of the asynchronous or synchronous method used for the replication system). As a matter of fact, there are cases as described below when one would want to allocate on an object-by-object basis for asynchronous replication, object-by-object basis for synchronous replication, transaction-by-transaction basis for asynchronous replication, or transaction-by-transaction basis for synchronous replication, as described below.

Routing (or processing or assigning or identifying or allocating) in or on an object-by-object basis usually refers to allocating the transaction steps or operations depending upon which "object" they come from or belong to. In this case, an object typically refers to a file or table or logical or physical partition thereof that they pertain to. An object can thus represent a range of rows in the file or table.

For example, if a transaction step (step or operation and "event" are used interchangeably herein) comes from or affects one object (e.g., file or logical partition thereof), and a second transaction step (in the same transaction) affects another object (e.g., file or logical partition thereof), the first step may be allocated to one applier (for example) and the second step allocated to another applier (or to the same applier, but then either use the same or possibly use separate transactions for replay). These appliers may or may not use the same target side transaction for replay. If a $3^{rd}$ step then comes from or affects the same object as the first step did, it also would then also typically be allocated to the same applier as the first step was. Additionally, if another step (the $4^{th}$) then comes from or affects the same object as the second one did, it would then be allocated to the same applier as the second step was. In this way, the steps are allocated on an object-by-object basis without necessarily considering what transaction they belonged to. The steps or operations that affect the same object are replayed in the correct order, and the steps or operations that affect another object (and are being allocated to a different applier or thread in this applier) will also be applied to that other object in the correct order, but the sequence of steps or operations across the two appliers may not be applied in the same order as they were in the original or source system or database. This approach is often referred to as object-by-object allocation, processing, routing, or assignment.

Allocating in a transaction-by-transaction basis usually refers to allocating the transaction steps or operations depending upon which transaction they come from or belong to (for example, allocating all (or a subset) of a particular transaction's transaction steps or operations to the same applier). This approach is useful for preserving either the full source system (originating node) transaction's consistency, or a subset of the source system transaction's consistency. It also helps preserve a form of transaction isolation by keeping one transaction's steps or operations from being delayed or affected by another transaction's steps or operations (especially if each applier is only being allocated for replaying one transaction at a time until that transaction ends (commits or aborts)).

Allocating on an object-by-object basis across replication threads whereby the replication engine at the target uses separate transactions for replay can violate the source transaction's consistency. Allocating on a transaction-by-transaction basis across replication threads generally preserves the source transaction's consistency.

When the replication engine is operating in an asynchronous mode, the replay of the data by the replication engine is independent of the source transaction, and the application is generally not affected. The source application is thus not impacted by the replication engine. When the replication engine is operating in a synchronous mode, the replay of the data by the replication engine is dependent of the source transaction and the application is delayed by the replication engine's ability to replay that data.

It is often possible and desirable to allocate by one method or the other, either mutually exclusively or in a controlled escalation fashion. For example, in the preceding sections, one may want to allocate the steps or operations on an object-by-object basis when in coordinated async mode, yet eventually convert to transaction-by-transaction basis later on as the replication engine converts from one replication mode to another (e.g., from asynchronous mode to synchronous mode). During that conversion from object-by-object to transaction-by-transaction allocation, there will be times where all allocation is all object-by-object, a mix where both approaches are used at the same time, and then times where all allocation is transaction-by-transaction. This is the "escalation" approach described in one preferred embodiment of the current invention (alternate embodiments will allow the mix of allocation approaches or methods to remain instead of going all one way to the other as described below).

It is not necessary to always be mutually exclusive at a transaction id level either (i.e., there are times when all transaction steps or operations for a specific transaction are allocated one way or the other, and other times when it is desirable to apportion some of the transaction steps to be allocated one way and some the other way, regardless of the replication mode (synchronous or asynchronous) in use). Interestingly, in an alternative embodiment, it is also desirable at times to exclusively allocate one set of transaction steps or operations using one method or approach (object-by-object or transaction-by-transaction) when the replication engine is operating in the synchronous replication mode, and to exclusively allocate another set of transaction steps or operations using the other method (object-by-object or transaction-by-transaction) when the replication engine is operating in the asynchronous replication mode.

For example, there may be times when some of the transaction steps or operations are routed on an object-by-object basis while other transaction steps or operations in the same transaction are routed on a transaction-by-transaction basis. For example, if one transaction updates two accounts, one of the updates to one of the accounts could be done on an object-by-object basis while the other update to the other account is done on a transaction-by-transaction basis. This is useful, for example, when the accounts have a different level of service (or importance) assigned to them by the application. Additionally, over time, some transactions may have their transaction steps or operations allocated on a transaction-by-transaction basis while at the same time other transactions have their transaction steps or operations allocated on an object-by-object basis.

Object-by-object allocation is often used by asynchronous replication engines. This has been historically a popular approach (prior art) for many of the asynchronous replication engines in use today. Additionally, transaction-by-transaction allocation is often used by synchronous replication engines. This has been historically a popular approach (prior art) for many of the synchronous replication engines in use today. Using one or the other approach, but not both at the same time, is part of the prior art. Similarly, in the prior art, switching from one approach to the other is on an all-or-nothing basis, and does not allow for a gradual mix of the approaches to be done at the same time, especially when the allocation methods (object-by-object vs transaction-by-transaction) are considered. This combination of capability is one aspect of the present invention.

The present invention describes a scheme whereby both approaches can be used at the same time, and for all or parts of a source transaction's transaction steps or operations to either be allocated on an object-by-object basis or on a transaction-by-transaction basis.

As mentioned above, in the prior art, the replication engine can switch between asynchronous and synchronous modes. They have been mutually exclusive (i.e., all synchronous or all asynchronous) to the same target environment, generally not allowing both to be used at the same time, certainly not to the same object (e.g., file or logical partition thereof) at the same time.

In the present invention, the replication engine can switch between asynchronous and synchronous modes, using each allocation approach as appropriate for the mode it is running in. However, the present invention can also employ both approaches (asynchronous replication and synchronous replication) at the same time, for parts of the same, or different, transactions, and transaction steps or operations. And, the present invention can switch between allocating on an object-by-object basis as well as allocation on a transaction-by-transaction basis regardless of the asynchronous or synchronous mode it is running in.

Furthermore, the present invention can support using object-by-object allocation and transaction-by-transaction allocation while running in asynchronous mode as well as using object-by-object allocation and transaction-by-transaction allocation while running in synchronous mode; all four of these combinations of allocation can be in use at the same time (during the same time period).

In other words, the replication engine may be running in any single one, pair, three, or four allocation approaches exclusively as well via any combination of the allocation approaches at the same time: asynchronous object-by-object, synchronous transaction-by-transaction, asynchronous transaction-by-transaction, and synchronous object-by-object allocation. Each individual transaction step or operation is generally only replayed or processed by one of these allocation approaches (not typically more than one while or when it is replayed or processed).

An example of combinations of these modes (mode and architecture and approach are meant to be used interchangeably herein) is described above for one preferred embodiment (the Shadowbase Plus SR architecture is a preferred embodiment), for example when the replication engine is recovering from an outage. In this approach, the replication engine starts out in "classic" asynchronous mode, allocating all transaction steps or operations on an object-by-object basis. It continues to use this approach while it ramps up the supporting synchronous replication infrastructure thru the coordinated asynchronous allocation approach. It then enters the semi-synchronous mode, where it is allocating some events on an object-by-object basis and other events on a transaction-by-transaction basis, albeit with synchronous replication. It eventually enters "full" synchronous mode when all transaction steps or operations are being allocated on a transaction-by-transaction basis.

Generally, the transaction steps or operations are grouped into "sets" of events to be replayed. The identification of what events go in what set can be application based (the application tells the replication engine this information, for example as a configuration item), or the replication engine may pick the items to be assigned to the set based on the state of the replication engine. For example, when synchronous replication cannot be ensured (i.e., when synchronous replication cannot be completed or completed within an acceptable timeframe), the replication engine in one preferred embodiment will group all events to be replicated and allocated on a object-by-object asynchronous replication basis (as described in the Shadowbase Plus SR description).

As mentioned above, the sets of data can affect the same, or different objects. Usually a set of transaction steps or operations are processed similarly, for example all of the items in the set using asynchronous object-by-object mode or all of the items in the set using synchronous transaction-by-transaction mode. However, as shown above, the sets need not be mutually exclusive, nor do they need to not intersect or overlap (either with the data items they touch or the time period the changes pertain to).

Noting the preceding discussion, at startup (or restart) one preferred embodiment will allocate a first set of transaction steps or operations on an object-by-object basis when the replication system operates in asynchronous replication mode. At startup, all transaction steps or operations will be allocated on an object-by-object basis where the replication system operates in asynchronous mode. It will continue this allocation approach until it can enter the semi-synchronous mode, at which time it will then start allocating a second set of transaction steps or operations on a transaction-by-transaction basis in synchronous replication mode. In this case, the replication system will continue using both allocation approaches until all transaction steps or operations for transactions that started being allocated in an object-by-object approach complete; new transactions that begin will have their transaction steps or operations allocated on a transaction-by-transaction basis. Eventually, when all transactions that were allocated on a object-by-object basis complete, all new transaction steps or operations will be allocated in a transaction-by-transaction basis where the replication system operates in a synchronous replication mode.

Noting the sequence above, an alternative embodiment could allocate a third set of transaction steps or operations on a transaction-by-transaction basis when the replication system is operating in an asynchronous mode. This allocation approach is useful for preserving the source transaction's consistency while decoupling the replay of the data from the original application (i.e., not delaying the application to wait for the replication engine to perform its work). This is especially true when there are several replication threads and each of the target appliers uses the same target transaction to replay all of the source transaction steps or operations.

Additionally, another alternative embodiment could allocate a fourth set of transaction steps or operations on an object-by-object basis when the replication system is operating in a synchronous mode. This allocation approach is useful for performing fully synchronous replication, yet preserving the multi-threaded and high performance nature of the classic object-by-object architecture. Although it has the ability to achieve very high throughput rates in each applier, this approach is often less desirable than transaction-by-transaction allocation as it generally requires that each of the replication threads coordinate the target transaction that they use for replay, and this is often a slow or cumbersome sequence (or in some target environments not even available). Additionally, in situations where the replication threads are applying the events on an object-by-object basis, it is typical that each thread will be working on several target transactions at the same time, and it is thus possible for one transaction to hit a lock and not be able to proceed, hence delaying all of the other work (and transactions) queued to it for replay.

2.4.9 Replication Engine Failure and Recovery

Shadowbase Plus SR recovers from three types of internal failures:
1. Transient failures
2. Major failures
3. Process failures 2.4.9.1 Transient Failures A transient failure occurs when a recoverable fault temporarily interrupts replication. Shadowbase Plus SR can be configured to attempt to recover while maintaining full synchronous replication. In the recovery mode, the application is essentially paused—commits and transaction registrations are held up within Shadowbase Plus SR while replication attempts to recover. In some cases, replication may need to resend existing, active transactions to the target. If replication can be restored within a short (configurable) time period, the application can be resumed and synchronous replication can continue.

The amount of time that the replication engine is allowed to attempt to recover is configurable. If replication has not been restored in this time, synchronous replication will be stopped; and Shadowbase Plus SR will enter the configured failure mode, as described next.

2.4.9.2 Major Failures

A major failure, one from which transient recovery is impossible, is typically due to a node or network failure. If a node has failed, replication can continue with changes being queued in the audit trail. Once the failed node is returned to service, it is recovered, as described previously. However, if the network has failed, steps must be taken to ensure that split-brain processing does not ensue.

Shadowbase Plus SR has three failure modes that can be configured:
1. Maximum-Reliability Mode
2. Maximum-Availability Mode
3. Split-Brain Protection Mode 2.4.9.2.1 Maximum-Reliability Mode The Maximum-Reliability Mode protects the databases at the expense of availability. In this mode, application processing is stopped when one or more nodes are unavailable (i.e., application processing is stopped when replication to all desired nodes cannot be ensured). This is done by AudCoor, which either will not respond to new transactions, thus delaying them forever, or which will abort all in-process and new transactions. In effect, the system is down.

Depending on the application, this mode might be useful as a temporary measure until the source of the problem can be determined and a suitable course of action decided upon. For instance, it can be determined whether the problem is due to a node failure or a network failure. If the former, the system can then be manually switched to Maximum-Availability Mode. If a network failure is suspected, the system can be commanded to enter Split-Brain Protection Mode.

Note that the use of this mode effectively reduces the MTBF (mean time before failure) of a multinode system since a failure of any one of the nodes will take down the system. If a node has a MTBF of T hours, an n-node system running in Maximum-Reliability Mode will have an MTBF of T/n hours.

Note that in an alternative embodiment, as an additional method to control the environment, when replication cannot be ensured, the replication engine (or agent thereof) can prevent selective transaction steps or operations that are requested to be initiated (or executed or processed) from being initiated. For example, when replication cannot be ensured, the replication engine can interact with the operating system environment to disallow (e.g., postpone, suspend, or delay) additional or new transactions from starting or it can interact with the database to disallow additional transaction steps or operations from initiating (being allowed to occur or execute). This can be implemented on either (or both) the originating or target node.

2.4.9.2.2 Maximum-Availability Mode

In Maximum-Availability Mode, when a node is inaccessible, processing continues. AudCoor allows transactions to proceed by always voting to commit each transaction without a confirmation from the target node. Changes are queued for the target node in the source node's audit trail. When the target node becomes available, it is recovered, as described earlier.

However, if two or more nodes in an active/active application network enter this mode following a network fault, split-brain processing will occur unless database partitioning is used.

Note that certain combinations of these failure modes may be useful to your system architects. For example, in a 2-node network, it may be desirable to configure the system such that replication in one direction is managed in Maximum-Reliability Mode, while replication in the opposite direction is managed in Maximum-Availability Mode. This could have the desirable effect of automatically (and immediately) choosing a nodal winner in the event of certain failures, such as a network failure that cannot be (immediately) recovered. In this case, the application on the node configured for Maximum-Availability Mode continues, and the application on the node configured for Maximum-Reliability Mode stops. Users connected to the "downed" node could then be switched to the surviving node in order to continue processing. In this instance, overall system availability is improved over solely using Maximum-Reliability Mode, yet it will avoid the potential for data collisions that could occur when running in Maximum-Availability Mode when asynchronous replication is used (assuming data collisions are possible, for example the application is not running in a partitioned manner). Of course, this dual (or multi) mode configuration has lesser availability than a pure Maximum-Availability Mode configuration if the node that fails is the one configured for Maximum-Availability Mode (as the remaining node, in Maximum-Reliability Mode, will stop processing). The Split-Brain processing mode, discussed below, has similar characteristics.

2.4.9.2.3 Split-Brain Protection Mode

If the nodes in the system are running in an active/active configuration, all nodes are updating the application database and are replicating these changes to all of the other nodes in the application network. If a network fault isolates some of the nodes, each of the isolated sets will be making database changes to their local copies, changes that cannot be immediately replicated to the other set. This is split-brain operation and is typically to be avoided in a synchronous replication environment unless data partitioning is used because of the possibility of data collisions. Note that when running in any of the Shadowbase asynchronous replication modes, it is an application issue if data collisions must be avoided, or can be allowed to occur and then be identified and resolved after the fact. Shadowbase Plus SR provides all of the same capabilities that the asynchronous Shadowbase replication engine supports for identifying, and resolving, data collisions.

There are several ways provided to prevent split-brain operation. One has to do with the design of the application. If the database can be partitioned so that each node only changes the data partition that it owns, data collisions cannot occur. In this case, a network fault will not cause split-brain operation; and the isolated nodes can continue processing. Their queued changes can be sent asynchronously to the other nodes when the network is restored. RPO may no longer be zero as a node failure can cause the loss of data.

However, if split-brain processing is a possibility, all processing must be stopped until a decision can be made. This means entering the Maximum-Reliability Mode so that the operations staff can determine the problem and can decide what to do next—let the system continue in Maximum-Availability Mode because the problem is a node failure, or shut down an isolated set of nodes to compensate for a network failure.

2.4.9.3 Process Failures

If a replication engine process fails, the failure is automatically corrected by Shadowbase Plus SR. The correction to be taken depends upon the process.

1. If an AudCoor process fails, TMF will abort all transactions in which this AudCoor process is a participant. The application will get an error notification and can resubmit the transaction. The AudMon monitoring process will restart the failed AudCoor process or will redirect registration requests to a surviving AudCoor process.
2. The failure of an AudCons process affects only the transaction(s) that it is currently handling. These transactions will be aborted on both the target and source. More specifically, when the AudCons process aborts, TMF will auto-abort the target node transaction that the AudCons was using. AudRtr will subsequently vote "no" to the RTC? request, and Shadowbase will ultimately vote "no" to the Phase 1 request from TMF for the source application's transaction, causing the source application's transaction to abort.
    When an AudCons fails, only those transactions it was processing will abort, with the corresponding application transactions at the source node also aborting. Shadowbase Plus SR will restart the affected AudCons, and once it restarts successfully, will start routing new source transactions to it. If the failed AudCons cannot be restarted, it is simply removed from the pool of available AudCons processes on the target node.
3. If an AudColl or AudRtr process fails, replication fails. The failed process will be restarted by AudMon, and the recovery mode will be entered. Transactions in progress will be aborted, and the audit trail will be replayed from the last committed transaction. (In a future release, AudRtr may be made a NonStop process pair that saves transaction state; and a failed AudColl process will simply be restarted without having to replay the audit trail.)
4. If the Metronome fails, it is simply restarted since it is stateless. Depending on the configuration option selected, while it is down, applications may time out since no Metronome ticks are seen.
5. AudMon, the monitor process, is implemented as a NonStop process pair. Should the active AudMon process fail, the backup process immediately takes over.

2.4.10 Transaction Failures

As described above, the coordinated commit architecture uses a separate transaction on the target to replicate the source transaction's changes. The two transactions are completely autonomous, each managed separately by the transaction monitor on each node. It is Shadowbase Plus SR that coordinates the target transaction to match the source transaction's end state, subject to the discussion below.

Shadowbase Plus SR is responsible for performing the coordination tasks to start a target transaction when the first event for a new source transaction arrives, for applying the source transaction's changes to the target under that target transaction id, and for making sure these changes are successfully and completely applied before the source transaction is allowed to commit on the source.

If the source transaction fails at any point for any reason, Shadowbase Plus SR will also abort the transaction at the target once the abort event flows thru the audit trail and is replicated to the target by Shadowbase Plus SR.

If the source transaction doesn't fail, and Shadowbase Plus SR is also successful completing all the tasks for replicating and applying the transaction's events at the target, Shadowbase Plus SR will vote "yes" to allow the source transaction to commit. From that point forward, it is up to the transaction monitor on the source to either commit or abort the transaction on the source, depending on how the other resource managers vote. Shadowbase Plus SR simply waits for this transaction end state to arrive, and then it will follow the same operation (either commit or abort) on the target.

That leads to several possibilities when the source transaction completes, and Shadowbase Plus SR is waiting to receive and apply this result at the target. For example, what if the network is lost at this point? What if the commit event arrives at the target, but the target transaction aborts anyway, e.g., due to some TMF issue at the target?

Each case is discussed below:

1. If a fatal network or replication error occurs and Shadowbase Plus SR has not voted on the transaction yet, Shadowbase Plus SR will abort the transaction at the target (as a recovery sequence will occur). The recovery sequence referenced here is discussed in the Replication Engine Failure and Recovery section.
2. If a fatal network or replication error occurs and Shadowbase Plus SR has voted on the transaction, Shadowbase Plus SR will either abort the transaction at the target (as a recovery sequence will occur), or pause awaiting a manual (or automated) command from the application environment. The issue with this case is that Shadowbase Plus SR does not know what the ultimate outcome of the transaction on the source was, and if the source system has disappeared in a disaster or not. Hence, the transaction end state on the source is unknown. If Shadowbase had voted to abort the transaction in the first place, it can certainly abort the transaction on the target. But if Shadowbase Plus SR had voted to commit the transaction, Shadowbase Plus SR is in effect unsure of the outcome on the source, and the transaction is in what is known as an "indeterminate", or "hung" state. The application environment can thus be helpful in telling Shadowbase Plus SR what it wants it to do in this case.
3. Note that even when everything is working properly, there is a time lag (the replication latency time) from when the source is allowed to commit the transaction, and that commit event is replicated to the target environment and applied by Shadowbase Plus SR. If, for instance, a commit event arrives for the transaction and Shadowbase Plus SR cannot commit the transaction for any reason, Shadowbase Plus SR will attempt recovery and if unsuccessful, it will cause a recovery sequence to occur.

2.4.11 Replicating Events for Transactions Synchronously vs Asynchronously

When configuring a Shadowbase Plus SR replication environment, the user can specify the data sets that are to be replicated asynchronously, the data sets that are to be replicated synchronously, and the data sets that should not be replicated at all. As a matter of fact, the decision can be made on the fly as to whether data should be replicated asynchronously, synchronously, or not at all, with user logic embedded into the Shadowbase replication engine. And, that decision can change over time as the source application runs.

Data is generally identified to be replicated synchronously, asynchronously, or not at all in the initial Shadowbase configuration. This can be at the file or table level, partition within the file or table, or even down to the specific record or row via the Shadowbase User Exit (UE) capability (Shadowbase User Exits allow the user to embed additional logic into the replication engine, including the ability to dynamically tell Shadowbase what should be replicated, and how it should be replicated).

Hence, for a source transaction, the following combinations are possible:

1. All events in the transaction will be replicated synchronously.
2. All events in the transaction will be replicated asynchronously.
3. No events in the transaction are to be replicated.
4. Within a transaction, the decision on whether to replicate an event, and how it is to be replicated (synchronously or asynchronously), can be at the individual event level.
5. Or any combination of the above, either for all cases as well as for specific decision cases (there are certain restrictions on dynamically deciding whether to replicate a particular dataset synchronously vs asynchronously, as the replication paths are usually distinct/separate. However, Shadowbase Plus SR will support this dynamic decision capability in a future release and then properly sequence the event replay at the target environment).

The reason for this level of flexibility is to support those environments where the application requirements are mixed. For example, where some data needs to be replicated synchronously (e.g., account trade data), some of the data can be replicated asynchronously (e.g., user profile information), and some of the data not replicated at all (e.g., system logs). That way, the application latency "cost" associated with synchronous replication is only associated with the data that actually requires it; other, perhaps less important or sensitive data, can then be replicated asynchronously or not at all.

As mentioned above, data is identified as needing to be replicated synchronously, asynchronously, or not at all in the initial Shadowbase configuration (or dynamically in a Shadowbase User Exit). To be replicated synchronously, the source transaction making the data changes needs to be registered with the Shadowbase Plus SR environment (via the registration call to AudCoor).

Note that even if a transaction is registered with Shadowbase Plus SR, it may be that none (or only some) of the data it changes is configured for synchronous replication; hence only that part of the data will be synchronously replicated. The remainder of the data will be replicated either asynchronously, or not at all.

2.4.12 Insuring Synchronous Replication for Key Data Via Shadowbase Plus SR

It is important to note that Shadowbase Plus SR takes responsibility for synchronously replicating your key data when it is properly configured and managed in your environment. As described previously in this section, there are several components in the Shadowbase Plus SR architecture that interact with the application environment, and that need to be made operational both before and during application processing. This section will explain how Shadowbase Plus SR strives to insure that it is properly configured and working, and to explain how it tries to continue to verify that while your application environment runs.

2.4.12.1 Verifying Shadowbase Plus SR Library Usage

Synchronous replication can be enabled by simply binding the Shadowbase Plus SR (SBSR) intercept library with the application process, or by modifying the application to explicitly call the SBSR callable library. Regardless, the process will successfully run whether or not the library is bound and the data will be replicated if the library is not bound. It just will not be replicated with the protection synchronous replication affords. In short, it is difficult with a cursory inspection to determine whether an application is using the intercept or callable library or not. And, even if a SBSR library is bound or linked in, the application may not be properly invoking a SBSR API to register all transactions that should be registered.

2.4.12.2 Insuring the Shadowbase Plus SR Libraries are Bound into the Application Customers require some mechanism to insure that the library is bound for all of their production code requiring synchronous replication. There are two options: a standalone utility that checks executables and reports those that are not configured for synchronous replication, and an online validation utility that prevents executables from starting when they do not have the library. Users would typically run the standalone utility as part of the installation process when a new release of application software is installed in production and would use the online validation to guarantee that no software is running without synchronous support embedded into it.

Both utilities share some common functionality. The set of files to be scanned needs to be specifiable using multiple file patterns. Each executable must be checked to see if it uses TMF (looking for one of the intercepted calls in either the program or its associated libraries/DLLs). If it does, the validation needs to make sure it is also using either the intercept or the callable library.

The standalone utility will, by default, report any executable that uses TMF but does not use one of the libraries. It can also optionally display:

1. All programs using TMF that are using the library, along with the library type and version.
2. All programs that don't use TMF.

2.4.12.3 Verifying Active Processes are Shadowbase Plus SR Enabled

As described above, one method to determine if programs are enabled for Shadowbase Plus SR replication is to scan the object files, validating that an appropriate version of the SBSR library is bound or linked into it.

Alternatively, as each process creation occurs on a NonStop system, the process creation request can be "intercepted" from the O/S and a SBSR validation can be done at that point. On older NonStop systems, the CMON utility ($CMON process) could be used. However, this approach is not fool-proof (not all process creation attempts go thru $CMON).

Alternatively, the online validation can be integrated with Safeguard on HP Nonstop systems and Shadowbase Plus SR can then monitor process creation requests. It will reject any process creation request where the process matches the file name specifications, uses TMF and doesn't have one of the synchronous libraries installed, thereby preventing the executable from being run.

Since Safeguard can be configured to allow Shadowbase Plus SR to validate all process creation attempts on the system, this will provide a "complete" method to verify that programs have the correct libraries bound in.

2.4.12.4 Detecting Transactions that were not SBSR-Registered

Even though an application may have the SBSR library bound into it, there is no guarantee that the application has properly/successfully registered a transaction with Shadowbase Plus SR. As of the present time, there is no FUP or TMF attribute that can be set to alert the system that I/O against this file or table should be done in a synchronous replication environment; that concept is under discussion between HP and Gravic. Additionally, there is no "registration" or event call back in a general sense when a transaction gets started by an application. Having this capability could be useful as Shadowbase Plus SR could then register all transactions, and only perform synchronous work when the transaction touches data that should be replicated synchronously (otherwise, the source transaction would be allowed to commit immediately). Again, this concept is under discussion between HP and Gravic.

Not all transactions need be registered, only those with synchronous files or tables that are being changed.

Hence, Shadowbase Plus SR may see audit trail events for "synchronous" files and tables even though the transaction was not registered. When (if) this occurs, Shadowbase Plus SR will have configurable options for how to handle this case.

For example, when data is seen in the Collector (AudColl) that should be replicated synchronously yet the transaction id has not been registered, Shadowbase Plus SR can immediately attempt to register that transaction (and optionally log a message). If successful (e.g., the application has not called commit yet, and the transaction has not aborted), the transaction will now be performed synchronously (the application and Shadowbase Plus SR can proceed). If unsuccessful because the transaction aborted, no "harm" is done and the application and Shadowbase Plus SR can proceed. If unsuccessful (e.g., the application has already called commit), Shadowbase Plus SR can take a number of recovery actions including do nothing (optionally with logging), or to immediately stop or pause replication/synchronous transaction processing (including optionally allowing new transactions to start or disallowing them form starting) until either a command is received or other configurable action is taken (e.g., execute the failure and recovery sequence).

3 Part 3: Synchronous Replication Issues and Concerns Overview 3.1 Synchronous Replication Issues and Concerns There are several issues that must be considered if one is to move into a synchronous replication environment for applications. Part 3 explores many of these issues.

Application latency is predominant among these issues because it has many side effects. Not only does application latency extend the response time of the source application's transactions, but also throughput is reduced, locks are held longer, and when running in an active/active environment, distributed lock collisions leading to deadlocks/timeouts are possible.

Throughput can be maintained by running more transaction threads, but this means that the application must be scalable. Longer lock-hold times may decrease concurrency on the source, and increase the chance of distributed lock collisions leading to deadlocks/timeouts. Note that Shadowbase Plus SR can alleviate deadlock problems with its intelligent random deadlock-timeout capability as discussed in the Distributed Deadlocks section below.

Application latency is so dependent upon communication channel latency—the time that it takes to get a message from one point to another over a communication channel—that it is important to have channel-latency specifications in the communication SLA negotiated with the communication providers.

There are many additional reasons that a transaction may abort, and applications must be able to gracefully handle these situations and not just assume that all transactions will commit. Among these reasons are network, remote node, and replication engine failures, which the synchronous replication engine must be able to detect and handle properly.

An especially onerous failure is a network failure; because unless prompt action is taken, the application network could start operation in split-brain mode, in which the separated nodes continue processing without the capability of keeping the database copies in synchronism. Shadowbase Plus SR has several options for handling this problem.

If bidirectional synchronous replication is to be used to configure an active/active system, there are many more application issues to be considered. These are discussed here in Part 3.

3.2 Other Synchronous Replication Issues

There are several application issues that must be considered when moving to synchronous replication. Some of them have already been covered. They are reviewed below, and others are addressed. Synchronous replication issues include:

1. General Issues
       a. Application latency
       b. Communication channel latency
       c. Throughput
       d. Application scalability
       e. Simultaneous transactions
       f. Longer lock life and data "hot spots"
       g. Referential integrity and data consistency
       h. Additional aborts
       i. Issues with NonStop AutoTMF
       j. Network requirements
       k. Performance
       l. Application modifications
       m. Failure management and recovery
       n. TMF configuration
    2. Bidirectional Issues
       a. Distributed deadlocks
       b. Unique alternate keys/unique indices
       c. Split-brain mode
       d. Active/active application issues
       e. Replicating read-only lock operations
       f. Eliminating planned downtime 3.2.1 Application Latency The source application's transaction response time will increase due to the added delay as the application waits to ensure that the transaction can complete on the remote nodes. This delay is known as application latency.

There is some additional latency caused by the processing of the begin transaction request (i.e., in order to register that transaction with Shadowbase Plus SR), but this is small (e.g., typically less than 1 millisecond) and can usually be ignored. Choosing a replication engine that minimizes replication latency is very important. The fastest replication engines such as Shadowbase Plus SR eliminate intermediate disk queuing of the data or messages being replicated and are process-to-process.

Application latency depends strongly upon the synchronous replication method used. In the industry, earlier implementations were based on network transactions. As described in Part 1, newer, more efficient algorithms such as coordinated commits used by Shadowbase Plus SR improve on the weaknesses of the earlier approaches.

3.2.2 Communication Channel Latency

A major factor in application latency is communication channel latency. This is the time that it takes for a message to travel from a source node to a target node. All synchronous replication techniques are dependent upon the round-trip time of the communication channel interconnecting the source and target nodes since the completion of a transaction at the source node is dependent upon the completion of that transaction at the target node. Note that the initial release of Shadowbase Plus SR will actually apply the source transaction's data into the target database while the source transaction remains active. Future releases of Shadowbase Plus SR may alternatively provide the option of simply safe-storing the source transaction's data (and not applying it) on the target while the source transaction is active. This is sufficient for certain zero data loss requirements.

Depending upon the synchronous replication method, anywhere from one to many communication channel round-trip times will be included in the application latency. As discussed in Part 1 above, Shadowbase Plus SR was engineered to minimize the communications channel round trips required, resulting in lower overall application latency and far more efficient communication channel utilization than these other approaches.

Communication latency is a function of the distance between the nodes, as well as the communications equipment in use along the path (e.g., router efficiency/speed, number of "hops", and so forth). Signals travel about half the speed of light over copper or fiber networks. Therefore, the round-trip time of a request and its response is about two milliseconds per hundred miles. Consequently, application latency is strongly affected by the internode separation distance. Distances of kilometers (campus clusters and metro clusters) are often insufficient to protect against widespread disasters such as hurricanes, floods, earthquakes, power outages, and terrorist attacks. Intra and intercontinental-cluster distances of hundreds or thousands of miles are often required.

In addition, continental-cluster distances are often dictated by the existing locations of an enterprise's data centers that will house the nodes of the application network. Nodes are also often positioned to provide locality of services to disparate communities of users.

3.2.2.1 Effect Upon Application Latency

As discussed in Part 1, network transactions impose multiple communication round trips on application latency. For large transactions or long distances, network transactions can add hundreds of milliseconds or even seconds to the transaction response time.

Shadowbase Plus SR uses coordinated commits for synchronous replication. Coordinated commits, on the other hand, which depend upon asynchronous replication to deliver the source changes to the target node, require only a single communication round-trip time. This occurs when the source application calls commit and the target node is asked if it is ready to commit. In addition, there is a delay of a replication interval as the ready-to-commit message is sent to the target node.

Consequently, network transactions may perform adequately for short (campus cluster) distances, assuming small transactions and low overall I/O rates. However, coordinated commits are preferred for long distances, large transactions, or high I/O rates. Additionally, for any case where efficient communications channel utilization is required, coordinated commits is the preferred solution due to its message buffering and lower communications channel overhead. If nodes must be separated by hundreds of miles or more, if transactions are very large, or the application's I/O rate is high, the use of coordinated commits is the synchronous replication method of choice.

3.2.2.2 Communication Channel Latency SLA

Because application latency is so sensitive to communication channel latency, care must be taken to control channel latency. Normally, when contracting for a communication channel, a company will negotiate with the communications carrier an SLA that specifies a minimum bandwidth and a maximum error rate for the channel(s) to be provided. However, if the communication channel is to be used for synchronous replication, it is imperative that channel latency also be specified with penalties if it is not met.

Note that channel latency is not really a function of how far apart the nodes are. Rather, it is the communication distance between the nodes that counts. For instance, two nodes in a metropolitan area may be ten miles apart. But if communication must first be routed to a major switching center in another city and then to secondary switching centers before reaching its destination, the communication distance might be many times the physical distance between the nodes. It is this communication distance that determines channel latency (about two milliseconds per hundred miles for a round trip).

The problem that occurs if a communication link fails is that the carrier will redirect communications over another route. That route could be quite circuitous, causing significantly longer channel latencies and therefore greater application latencies. A nominal one millisecond latency over a fifty-mile separation could suddenly become hundreds of milliseconds.

Moreover, channel latency is not the only factor in the time it takes to deliver a message. Communication errors can significantly slow down the delivery of messages. Therefore, the specification in the SLA of an appropriate maximum error rate is just as important as the specification of the channel latency. A simple ping may show acceptable channel latency, particularly if using small data packet sizes. However, that is no guarantee that messages will be delivered in a timely manner if error rates are high, which is particularly important as the data packet size grows.

Though not directly affecting channel latency, the provided bandwidth could cause delayed message problems. If the bandwidth of the communication channel should fall below a specified minimum, messages may queue at the source node as they wait for access to the communication channel. This will also slow down the delivery of messages, adding to application latency.

There have been reported cases of critical applications crashing when transaction response times reached unacceptable levels due to a change in application latency. It is important to ensure that the characteristics of the communication channel do not contribute to this.

3.2.3 Throughput

It is important, and probably counter-intuitive, to note that just because transaction-response times increase due to application latency does not mean that system throughput decreases. Rather, each transaction is spread over a longer period of time as it waits for the remote commit. Therefore, the processing of a transaction imposes less of a load on system resources. Consequently, additional transaction threads can be spawned to take advantage of this spare capacity, thus maintaining system throughput. If no-waited (asynchronous) commits are used, the application's transaction processing load is not affected by synchronous replication; and throughput remains the same. If your application supports this mode of operation, for example an HP NonStop application that opens the TFILE specifying a non-zero depth, and you perform no-waited commit calls whereby your application does not wait for the commit to complete before processing the next transaction, your application will typically maintain the same throughput rates with typically no change in configuration.

To explain this further, there is an important but simple fundamental law of data processing systems known as Little's Law. Little's Law states that the number of transactions in a system is equal to its transaction throughput multiplied by the life of a transaction (its response time):

number of transactions in system=(system throughput×transaction response time)

For instance, if a system has a throughput of 100 transactions per second, and if the transaction response time is 100 milliseconds, then on the average there will be ten active transactions in the system at any one time. Should the transaction response time double and the number of simultaneous transactions remain the same, throughput will be cut in half. To restore the original throughput, the number of simultaneous transactions being handled by the system must be doubled. Since each transaction is imposing a system load only half that of the original system, doubling the number of transactions in the system restores the system load to its original value.

Therefore, to maintain throughput in the presence of application latency, the application must be scalable so that it can handle additional transaction processing threads.

3.2.4 Application Scalability

Application scalability as used here is the ability for an application to spawn additional transaction processing threads. This is required if system throughput is to be maintained in the presence of application latency caused by moving to synchronous replication.

If a system had been handling 100 simultaneous transactions in order to achieve its throughput, and if the lifetime of a transaction is doubled due to application latency, the system must now be able to handle 200 simultaneous transactions to maintain throughput.

This implies that the number of transaction threads that an application can handle must be expandable. If the application itself is multithreaded, it must be able to spawn additional threads. If its multithreading capability is insufficient for the necessary expansion, it must be modified; or else the reduced throughput must be accepted.

Many transaction monitors and application environments such as HP NonStop Pathway/HP NonStop TMF or Tuxedo provide an environment wherein multithreading is accomplished by spawning and managing multiple server processes, each usually being single-threaded. If such an environment is being used, increasing the number of transaction threads is simply a matter of increasing the number of server processes that can be spawned.

3.2.5 Simultaneous Transactions

If the number of transaction threads is increased to maintain an application's throughput, this will increase the number of simultaneous transactions active in the system. Care must be taken not to exceed the number of simultaneous transactions that a system can handle. There are often system limits other than the number of application threads that can be spawned and managed.

For instance, in the NonStop TMF transaction monitor, TMF has a limited number of simultaneous transactions that it can support. If this limit will be exceeded in order to maintain throughput, TMF must be reconfigured to increase these limits and/or steps must be taken to try to reduce the application latency so as to increase throughput with the available number of threads.

If the system is an active/active system, one may be tempted to simply add additional nodes to distribute the transaction load among these nodes. However, with synchronous replication, each transaction spawns transactions at all nodes. Each node must be able to support the total number of transactions active at any one time in the entire application network. Therefore, adding nodes does not solve the problem.

3.2.6 Longer Lock Life and Data "Hot Spots"

Because transactions in a synchronous replication environment live longer due to application latency, they will hold their locks longer. This may lead to several problems.

For one, transactions will be even further delayed as they must wait longer for locks held by other transactions. This will have the effect of reducing overall source application concurrency to the database. In this context, concurrency is referring to the simultaneous access to the database data by multiple applications. To the extent that multiple applications need to access the same data items, longer lock life causes a queue to form for access to that data. This leads to an overall reduction in access to the data items, in essence a reduction in data concurrency.

Longer lock life is of particular importance to applications that suffer from data "hot spots", or request queues being formed to access the same data by multiple applications. If each application needs exclusive access to that data, increasing the amount of time that each application holds its exclusive locks will hence decrease the access rates to the data, lowering overall concurrency to that data. Hence, it is vitally important that applications that suffer from data "hot-spots" be reviewed to understand the effect that longer lock life will have on their overall application processing.

Longer lock wait times mean slower transaction response times, which mean more simultaneous transactions. This may put additional pressure on the system limit for the number of simultaneous transactions, as discussed earlier.

Compounding this situation is that the delay in granting a lock may cause lock requests to convert from spin locks to queued locks. This increases the time and overhead to grant a lock, further increasing the transaction life.

Within a system, when locks are held longer, if an intelligent locking protocol (ILP) is not used, deadlocks become more likely. Specifically, an ILP requires that both applications lock rows following a locking hierarchy (lock the data in the same order).

For instance, consider two applications that must access Rows A and B. Application 1 locks Row A first and then locks Row B. Application 2 does just the opposite, locking Row B first and then Row A. If both applications attempt this locking sequence at the same time, and both successfully acquire their first lock, Application 1 will not be able to acquire a lock on Row B; and Application 2 will not be able to acquire a lock on Row A. Each will wait for the other to release its lock, and a deadlock will occur. The common solution to the deadlock problem is for one or both applications to time out and to try again.

As the applications run more slowly, the time that they hold locks increases. Thus, the threat increases that Application 1 will not have released its locks by the time that Application 2 requests those locks, heightening the chance of a deadlock. This will increase the transaction lifetime even more, further compounding the problem.

Alternatively, if both applications follow an ILP requiring a lock on item A before one is requested for item B, the first to lock item A will be able to complete his transaction; the second will wait behind the first's lock on item A, and the deadlock situation is avoided. Adding synchronous replication into this situation compounds the issue as now the ILP needs to be global in scope when active/active environments are being considered. See section 1.6.2.2.2, "Distributed Deadlocks," for more information.

One other consideration is that longer running transactions that will hold locks longer mean that there may be an increase in the number of outstanding lock requests and outstanding locks. Both of these may come up against system limits, and this situation must be considered.

3.2.7 Referential Integrity and Data Consistency

The referential integrity and data consistency of the target database is imperative if it is to be useful for applications running on the target. In many high-performance replication engines, updates are replicated over multiple threads. Unless special facilities are provided, there is no guarantee that transactions will be committed in the proper order or that changes within a transaction will be applied in the same order at the target node as they were at the source node.

If transaction ordering is violated, the database's referential integrity may be violated for short periods of time. For instance, child rows may exist without a parent. If an application tries to make use of such rows, it may fail. Proper transaction ordering is imperative if referential integrity checking is to be active at the target database or if the target database is to be actively used in an active/active configuration.

If changes within a transaction are applied without attention to proper ordering, intra-transaction referential integrity checking may not be able to be turned on at the target node. For instance, if changes within a table are not properly ordered, the database could become corrupted. If the transaction deletes a row and then inserts a row with the same key value, the delete/insert operations must be performed in that sequence. If these changes arrive at the target database in opposite order, the insert will fail (or be converted to an update); and the row will then be deleted. Now the row exists in the source database and not the target database. The target database has been corrupted.

Shadowbase Plus SR guarantees that transactions are applied in proper order to the target database. Both within and across transactions, it also guarantees that all changes to a specific table (actually partition thereof) are applied in the proper order. Within a transaction, however, it cannot guarantee that the order the events were applied on the source will be preserved at the target when the events span source disk packs (see below). When using the Metronome, Shadowbase Plus SR guarantees that all of the source transaction events are incorporated into a single target transaction (when running in "full" synchronous mode).

Note that the order of the I/O changes within a transaction to different tables may not be preserved; so intra-transaction referential integrity may not be guaranteed. This is actually a side effect of how the TMF and file system event flushing works on a NonStop system, as discussed below.

More specifically, when an application starts a transaction and changes data on files or tables that are resident on different disk processes, there is no guarantee that the order these events are stored in the audit trail will match the order that the application performed them in. This is because each of these disk processes will flush their data to the audit trail disk process in a nondeterministic order.

For example, assume that an application inserts a purchase order header row into table A, and table A resides on disk 1. Next assume that the application inserts a purchase order detail row into table B, and table B resides on disk 2. At any point, either or both of these disk processes could flush their data to the audit trail disk process, in any order. Hence, the data can appear in the audit trail with either the table B or table A data first. Unfortunately, there is no method to reorder these events back into the actual order in which the application performed them (timestamps, physical audit trail location, etc are all insufficient for recreating the application's actual I/O order). Shadowbase, and other replication engines, will simply pick up these events in the order they are stored in the audit trail and replicate/apply them to the target in that order.

This means that when replicating from a NonStop source to another target database, intra-transaction event order may not be preserved. Any target side referential integrity checking should be at commit time, not at the time each event is applied.

The following table summarizes the audit trail, referential integrity, and data consistency aspects of replication:

TABLE 2

| Referential Integrity, Data Consistency, and Audit Trail Rules | Comments |
| --- | --- |
| Disk process event order | All I/O events applied by a particular disk process, regardless of the transaction they are performed under, are serialized into the order they occurred in. The disk process fills an internal buffer with these events, and periodically (e.g., at commit time) flushes this buffer to the audit trail disk process. This serialized order will be preserved in the audit trail, although the events may not be physically contiguously located in the audit trail. |
| Intra-transaction event ordering | For I/O events within the same disk pack partition, these are stored in the audit trail in the order issued/applied by the application. |
| Intra-transaction event ordering | For I/O events across different disk pack partitions, these are stored in the audit trail in a nondeterministic order (not necessarily the order issued/applied by the application). |

TABLE 2-continued

| Referential Integrity, Data Consistency, and Audit Trail Rules | Comments |
|---|---|
| Commit events | Will not be written into the master audit trail until all I/O events have been flushed to the audit trail disk process. Hence, the commit event for a transaction always follows any and all I/O events for that transaction in the audit trail. |
| Audit trail event order | As disk process events are flushed to an audit trail disk process, the audit trail disk process appends them into an internal buffer and internally flushes when the buffer fills or a time period elapses. The order of the events in the audit trail depends simply on the order that the events arrive at the audit trail disk process, and is hence nondeterministic. |
| Inter-transaction event ordering | Subject to the rules above, depends on the flush order of the disk process's to the audit disk process. Because disk locking protocols protect data that is updated during a transaction, you will never have the same data being updated by 2 different transactions that are active at the same time (i.e., you would need to see the commit or abort event for the first transaction before you would see the second update event for that data in the audit trail). |

3.2.8 Additional Aborts

Synchronous replication can increase the frequency of transaction aborts. Whereas under asynchronous replication, transactions at the source node will commit independently of the target node, under synchronous replication, all nodes must be able to commit the transaction; or none will.

In addition to the normal single-system aborts, a transaction in a synchronously replicated environment may fail due to a number of additional reasons. These are generally due to the fact that the network and target system must now be available and performing properly, and a replication engine is now part of the processing path, for the synchronous transaction to be successful.

Transactions can time out and abort for other, more insidious reasons. For instance, if the communication channel latency suddenly increases due to rerouting around a failed link, application latency could climb so high that transactions time out. In a heavily loaded system, a transaction can time out while waiting for a lock or for an available processing thread.

The replication engine and the interconnecting network are additional components in the transaction processing path. Faults in either of these components can cause transactions to abort. If the replication engine cannot join a transaction, either the transaction cannot proceed or the transaction will not be replicated, depending upon the nature of the fault. If any software component in the replication path should fail, such as the AudColl, AudRtr, or AudCons processes, the transaction will fail.

The network interconnecting the source and target nodes must be more reliable than the desired system availability. If the network fails, and if there is no backup communication link, transactions will be aborted (worse, the replication engine may not be able to reconnect). If its latency should increase beyond a critical limit, transactions will time out.

Finally, successful transaction completion depends upon a properly operating target node. Should the target node fail, should it begin to slow down and time out transactions, or if the target database needs to be taken off line or start to have serious problems, transactions will be aborted.

One cannot assume that transactions will always commit. Commit errors must be handled gracefully by the application. The application should be able to analyze the commit fault and to determine whether the transaction should be resubmitted or whether operational staff should be alerted to a critical problem requiring manual intervention. Shadowbase Plus SR provides a command and control API (CnC API) that an application can use to determine the cause of an abort. Refer to the Shadowbase Plus SR Application Programmers Guide and Shadowbase Plus SR Command and Control Guide for more information.

Furthermore, if aborts are being caused by the unavailability of a remote node, either because of a node failure or because of a network failure, means must be provided to remove that node from the scope of further transactions so that processing can continue. In addition, recovery procedures must be in place to resynchronize a node and to return it to service when it is once again available.

For many faults, a brief hiatus may be expected and must be handled properly. For instance, if the replication engine should experience a recoverable fault, or if the network should fail and needs to be rerouted, replication may be down for several seconds while the failed components are restarted or the network rerouted. Transaction processing should be gracefully paused and restarted when able without aborting the application because it might take several minutes to restart an aborted application, or it might cause undue hardship to the users.

For bidirectional replication environments, for example when configuring an active/active environment, an additional reason that the source transaction may abort is due to distributed deadlocks (described in more detail in the Bidirectional Issues section below). If the source and target nodes each attempt to lock the same data item within the lock latency period, unaware that the other node has also locked that data item, neither will be able to acquire the lock on the remote copy of the data item. One or both transactions will time out and will have to be retried.

Certainly, for all of the above reasons, transaction aborts will increase as the number of nodes in the application network increases. These aborts must be handled gracefully by the applications that submitted them.

3.2.9 Issues with NonStop AutoTMF

NonStop AutoTMF is a facility provided by HP that automatically converts a nontransactional application to one that uses transactions. It monitors disk activity so that it can automatically generate transactions that group related disk activity.

One issue with AutoTMF is that it will cause the application process to end abnormally (abend) on a commit error, as this would undo an I/O operation that the application intended to execute. Shadowbase Plus SR can aggravate this problem, since it introduces a new environment not contemplated by the application's designers. Certain situations will cause Shadowbase Plus SR to return commit errors, further increasing the chances for an AutoTMF-enabled application to abend.

This might be acceptable in Maximum Reliability mode, in which synchronous replication problems force the application to terminate. However, in Maximum Availability mode, the operations staff may have to rely on their process monitor to automatically restart the application.

To minimize synchronous transaction commit errors, distributed deadlocks (lock collisions) should be avoided. Therefore, AutoTMF applications should not be run in active/active mode unless the database is partitioned to avoid data conflicts. An alternative to this is to configure Shadowbase Plus SR to never vote "no" when a synchronous tx cannot complete, thereby avoiding the AutoTMF-induced abend of the application program. Under this mode, Shadowbase Plus SR would immediately fall back into a failure and recovery scenario (e.g., asynchronous replication) until the issue was resolved and it could re-enter synchronous mode.

Another issue with AutoTMF is that there are certain files, tables, and I/O operations that result in transactions being generated with only one I/O; this is usually caused by data locking concerns/constraints. Application latency caused by synchronous replication can cause these applications to run much more slowly, typically requiring many more application process copies to be run in parallel to preserve the overall throughput rates. Certain Base24 transaction logs are an example of a third-party application that exhibits this behavior.

3.2.10 Network Requirements

The network interconnecting the source and target nodes must be reliable. Should it fail, synchronous replication stops.

At the least, the communication link between the source and target nodes should be redundant. Each link should be able to handle the full communication load should the other link fail. Links should be monitored for quality in order to provide early detection and correction of problems, such as increasing error rates, decreasing bandwidth, or increasing channel latency. This is especially important for idle backup links to ensure that they are available when needed.

Ideally, the links should be self-testing, with automatic failover to minimize network downtime in the event of a link fault.

The best redundant communication channel configuration is to have two or more links and to load-share replication traffic across all links. This is the communication equivalent of an active/active system. Since all links are being used, it is known that all are operational. Should a link fail, there is no question concerning the viability of the backup link. It is known to be good. Also, failover is virtually instantaneous. In fact, there really isn't a failover. There is only a redirection of traffic.

True redundancy implies that there is no single point of failure. This is not always so obvious when it comes to communication networks. For one thing, there are the obvious caveats about running redundant communication links through a common conduit as they enter the data center.

Beyond that, it is important that the two links be provided by separate communication carriers. A fault in a common carrier's communication equipment could take down both links.

Even worse is the fact that carriers often lease channels from each other. It may be that the redundant links are being acquired from different carriers but that each leases channels from some third carrier. Should that intermediate carrier suffer a communication fault, redundant links might fail simultaneously.

Planning doesn't stop here. Even though the redundant links are being supplied by independent carriers, it must be ensured that they are routed over different physical routes. Otherwise, some common event may take out both links. For instance, it may be that the redundant links diverge nicely except that to get across a major river, they both use the same bridge. Should the bridge fail in a major flood, both links are lost.

Because synchronous replication is sensitive to channel latency, it is important to know how a carrier will reroute a link in the presence of a link failure. If its rerouting plan extends the communication distance from 100 miles to 1,000 miles as it routes through different switching centers, the increase in application latency may make the applications fail due to the slowdown in response times or outright timed-out transactions.

Also, as discussed above, error rate and bandwidth specifications are equally important. High error rates can extend the time that it takes to get a message across the communication channel. Low bandwidth can cause unacceptable queuing delays in the source node. Both of these factors add to application latency.

All of this argues for a strong SLA (service level agreement) with the communication carriers that are selected. Not only must the SLA specify the channel availability, the bandwidth to be supplied, and the error rates to be met, but it also must specify maximum channel latency. A poorly functioning or failed network can be quite costly to a company. In a two-node active/active environment, the company's applications are running with a single point of failure—the single surviving node—during a network outage if split-brain operation is to be avoided. The likelihood of a complete failure during this interval is magnified many fold because there is no backup should the primary node fail. If downtime is costly, the SLA should have significant penalties for non-performance.

3.2.11 Performance

Replication can have an impact on system performance. This is a function of the usage of system resources by the replication engine. To the extent that processor power, memory, or disk accesses are consumed by the replication engine, there is less available for application processing; and performance will suffer.

Synchronous replication using network transactions may impose a measurable load on processing resources. This is because these transactions send many small messages—one per operation—that must be handled at the interrupt level. This is expensive processing. In addition, the transmission of many small messages can have a significant impact on communication channel loading.

Shadowbase Plus SR uses coordinated commits and avoids these problems because database changes are buffered and are sent in large blocks over the communication channel. This makes more efficient use of communication channel capacity. In addition, there is only one interrupt per block of many changes rather than one per change.

Shadowbase Plus SR coordinated commit replication engine has a very small footprint. It does not require much memory or processor time; the bulk of the time is spent in communications message handling or is I/O bound. Depending on the configuration, Shadowbase Plus SR does not use any intermediary disk queue points.

In any event, synchronous replication using coordinated commits has about the same footprint as asynchronous replication. There is some additional synchronous replication processing required for the replication to join a transaction and to vote on the commit, but this is simply processing time and is generally insignificant. It is usual that replication, whether asynchronous or synchronous using coordinated commits, has minimal impact on system performance on the source node, and basically mimics the application's database update activity on the target system.

3.2.12 Application Modifications

Is an application ready to be deployed in a synchronous replication environment? That depends upon the synchronous replication method being used.

If network transactions are being used, synchronous replication may have to be implemented in the application. The scope of an application's transactions may have to be expanded to include multiple copies of the data across the network. An application must be able to exclude a failed node from the scope of its transactions. In addition, facilities must be added to the application to resynchronize a node that has failed or that has been isolated by a network failure. There are products that provide all of these facilities in a network-transaction environment. However, applications must be able to run on the processors and storage systems supported by these products.

Synchronous replication using coordinated commits uses an asynchronous replication engine and can be implemented with no changes to the application. For instance, Shadowbase Plus SR provides an intercept library that will intercept begin transaction commands so that the replication engine can join the source application's transactions. This is the only interaction required between the application engine and the synchronous replication facility (though an API is provided to allow the application to monitor and/or command and control the replication process if so desired).

Thus, with the proper replication technique, there are no changes required for an application to be deployed in a synchronous replication environment. However, there are some improvements that may be advantageous:

1. The application should be analyzed to determine its timeout values for transactions. These may have to be adjusted to allow for longer transaction times due to application latency.
2. The application may need to be enhanced to handle commit errors more extensively. In a synchronous replication environment, there are many more reasons that a transaction will not successfully commit; and there are different actions to take depending upon the nature of the commit error. For instance, if a transaction didn't commit because it timed out, it should probably be resubmitted. However, if it failed to commit due to a network or target node failure, it may be better to abort the transaction.
3. It may be advantageous to modify the application so that it can monitor the replication engine's health and performance. Replication engines often provide an API for just this purpose, Shadowbase Plus SR being an example.

3.3 Failure Management and Recovery

The recovery of a failure in a synchronous replication environment is a complex process and is best left to the replication engine rather than to operational staff. There are three primary failure mechanisms that must be handled by the replication engine:

1. Node failures
2. Network failures
3. Replication engine failures

The Shadowbase Plus SR failure management and recovery procedures have been described in detail in Part 2. They are summarized below.

A problem with node and network failures is that it is difficult to determine whether replication to the remote node has failed because the node has failed or because the network has failed. If the network has failed, it must be decided which node to take down to avoid split-brain operation. Shadowbase Plus SR can be configured so that the system pauses to give operational staff time to decide what to do (Maximum Reliability Mode), or it can be configured to allow both nodes to continue processing (Maximum Availability Mode, useful, for instance, if the database is partitioned so that data collisions cannot occur).

If a node leaves the synchronous-application network either due to an unplanned failure, a planned outage, or a network fault, its database must be resynchronized with the application database before the node can rejoin the network. When a node leaves the network, other nodes replicating to it transition to asynchronous replication to that node. While the node is out-of-service, changes being made to the application database accumulate in the change queues of each operating node. When the downed node is ready to be resynchronized, the change queues are asynchronously drained to the downed node to bring its database into synchronization. At this time, the node can rejoin the network and can participate in further transactions.

If the replication engine fails, the first step is to try to restart replication. This is basically done by replaying transactions that have failed from the change queue. If this is successful, replication can proceed normally.

If the failure was caused by a replication process aborting, an attempt is made to restart that process or to fail over to a backup copy of the process. If this is successful, failed transactions are replayed from the change queue; and replicated operation can continue.

If the replication engine cannot be restored, the result is that the node cannot replicate its changes to other nodes. In this case, the source node is treated as a downed node and is removed from service.

Note that the failure profile for synchronous replication is the same as that for asynchronous replication. In a two-node system, if either node is up, the system is up. The system fails only if both nodes simultaneously are down. In an n-node system with s spares, the system is down only if s+1 nodes have failed.

3.3.1 TMF Configuration
3.3.1.1 TMP Wait Timer

The commits of all transactions in a NonStop system are coordinated by the fault-tolerant Transaction Monitor Process (TMP), which is part of TMF. TMP can be configured to process transactions in batches to improve system performance.

The TMP Wait Timer (originally called the "Commit Timer") determines how long TMP should "sleep" before processing the next batch of transactions. It has three settings:

1. off (process each commit immediately)
2. auto (allow TMF to compute a wakeup interval)
3. n milliseconds (sleep this long between servicing commits that have accumulated)

For lowest application latency, the TMP Wait Timer should be set to "off"; this is the default starting in the G06.27 release of the Guardian O/S.

3.3.1.2 PIO Buffer

The PIO Buffer is used to batch broadcast messages to CPUs, informing them about transaction begins and completions.

When a transaction begins, a broadcast message is sent to all CPUs in the system, advising them of this event. When the transaction completes (either as a commit or as an abort), a "prepare" broadcast message is sent to all CPUs, asking them whether they were involved in the transaction and, if so, which DP2 processes in each CPU were involved. These DP2 processes will then be asked to vote on whether the transaction should be allowed to commit, or if it should be aborted.

When TMF decides the outcome of the transaction, another broadcast message is sent to the CPUs involved in the transaction with a list of DP2 processes in each CPU. These processes are told to commit or abort the transaction and to release their locks on the changed data.

Under heavy transaction loads, there may be a high volume of broadcast messages. To improve system performance, TMF can accumulate these inter-CPU broadcast messages into the PIO Buffer and send them as a batch. This originally was called "TMF-Boxcarring."

There are several configuration parameters for the PIO Buffer. They include the size of the buffer, how many buffers to fill before sending, and a time in which to send the buffers if they haven't filled. The default is to send a transaction broadcast message as soon as it is received. If multiple broadcast messages have accumulated since the last broadcast, they are all sent as a batch.

This setting, the current TMF default (as of G06.27), should be used to minimize application latency.

3.4 Bidirectional Issues

An active/active configuration requires bidirectional replication to keep all database copies in the application network synchronized since they are being independently changed. Active/active systems provide important business continuity advantages due to their rapid (seconds) recovery time and tolerance to site disasters. However, systems that require bidirectional data replication bring with them an additional layer of complexity and issues.

3.4.1 Distributed Deadlocks

Even if an (local) ILP is used, there is still the chance for distributed deadlocks. When an application requests a lock on a data item resident in a database copy that is on a remote node, there is a time delay as the lock request propagates across the communication channel. This delay is known as lock latency. A distributed deadlock occurs if two applications running in different nodes attempt to acquire a lock on the same data item within the lock-latency interval. It is important to note that this deadlock can occur even if the application is only trying to update a single data item as part of its transaction.

Lock latency is different from application latency. If synchronous replication employing network transactions is used, lock latency is a one-way communication latency. If coordinated commits are used, lock latency is a replication latency since the lock request is asynchronously replicated.

The flow chart shown in FIG. 46 illustrates distributed deadlocks. Transactions 1 and 2 are both following an ILP and lock Row A first. In a single system, this procedure will avoid deadlocks. However, this is not so in a distributed system.

As shown in FIG. 46, both applications lock Row A in their own nodes and then request a lock on Row A in the remote node. However, the application resident in the remote node has already locked Row A; and thus, the lock cannot be granted. Therefore, the applications deadlock and must time out and try again.

Many applications written to run in a single-node environment don't check for deadlocks when using an ILP because deadlocks presumably won't occur. However, when these applications are moved to an active/active environment using synchronous replication, distributed deadlocks are now possible. The synchronous replication engine can solve this problem to some extent if it can detect deadlocks. For instance, Shadowbase Plus SR can be configured with intelligent random lock-wait timeouts so that only one application needs to back off or abort. The aborted transaction can then be retried.

Distributed deadlocks are a particular problem if there are hotspots in the database. A hotspot is a small table or portion of a table that is updated frequently by multiple applications. For instance, if the next invoice number to be used is stored in the database, it will most likely be a hotspot (The probability of distributed deadlocks can be calculated based on the size of the active database tables, the number of nodes in the application network, and the update rates for these tables.).

Even with automatic deadlock detection and resolution, distributed deadlocks will lengthen the lifetime of a transaction, thus compounding all of the problems associated with additional transaction response times, as discussed previously. Distributed deadlocks may be avoided by using global mutexes to protect database structures. A global mutex resides on one node known as the lock master. For instance, there might be a global mutex that protects each invoice. In order to modify that invoice or any of its detail rows, an application must first acquire the global mutex. It is then free to modify any of the rows protected by the global mutex.

If the node that is acting as the lock master fails, another node must be promoted to be the new lock master.

Using global mutexes may require application changes unless they are already supported by the system or by the replication engine (This technique is used by OpenVMS split-site active/active clusters for distributed lock management. In these systems, the role of lock master for a particular database resource migrates to the node that is the most active user of the resource.).

3.4.2 Unique Alternate Keys

Another situation in which a distributed deadlock may occur is if the application uses unique alternate keys (Enscribe) or unique indices (SQL). In this case, two transactions in the same node may each attempt to write a data record with the same unique key. Normally, one of the key updates will fail with a duplicate key error; and the transaction will be aborted. However, in a synchronous replication environment, the two transactions may be executed in the reverse order at the target node since they are traveling over different threads (this situation is similar to primary key lock collisions, but not as obvious).

Transaction 2 may be waiting at the source node for Transaction 1 to release its lock on the alternate key row, while Transaction 1 is waiting at the target node for Transaction 2 to release its lock on the copy of the alternate-key row. Neither can proceed; and a distributed deadlock has occurred, requiring a timeout by one or both transactions.

3.4.3 Split-Brain Mode

A network failure has an additional severe consequence. That is how to continue processing should the network fail. There are two options. One is to allow both nodes to continue processing without replication in split-brain mode. The other is to shut down one node and route all transaction activity to the surviving node. Split Brain mode is more fully discussed in the Split Brain Node Failure and Recovery section.

Split-brain mode is a poor option in a synchronous replication environment. When operating in this mode, unless the database is partitioned to avoid data collisions, changes made to the database by a node will be queued on the originating node. When communication is restored, the databases will have to be resynchronized with each other by exchanging the database changes that occurred during the network outage. There are bound to be many data collisions that must be detected and resolved. Split-brain mode may be acceptable in an asynchronous environment that has collision detection and resolution built into the replication engine. But one major advantage of a synchronous environment is the elimination of data collisions. In order to recover from this situation, the replication engine needs to have the ability to identify and resolve any such data collisions. Shadowbase Plus SR supports a myriad of techniques and algorithms to identify and resolve data collisions.

If the database is partitioned so that only one node can update a given partition, then all nodes can remain operational since there will be no collisions. Data changes are queued for later data replication to the remote nodes. This is the Shadowbase Plus SR Maximum Availability mode, described earlier.

Another option is to shut down one of the nodes and route all transaction activity to the surviving node. Since a node must be configured to handle the full transaction load anyway, this will certainly work. The problem is to determine which node to shut down. This can be done by pausing all nodes for a short period of time while the operation staff determines which node to shut down. This is the Shadowbase Plus SR Maximum Reliability mode.

Between its Maximum Availability mode and its Maximum Reliability mode, Shadowbase Plus SR provides a selection of failover mechanisms to avoid split-brain operation.

3.4.4 Active/Active Application Issues

If an application is to be used in an active/active environment, there are several issues that must be considered. They are generally independent of whether synchronous or asynchronous replication is used and include:
1. Global mutexes may have to be implemented if avoiding distributed deadlocks is desired.
2. Unique number generators (such as generating invoice numbers or customer numbers) must be modified to ensure uniqueness across nodes (for instance, by assigning ranges to nodes or by appending a node ID to the key).
3. There must be a method to distribute transactions among the nodes (intelligent routers or IP address assignment, for instance).
4. Memory-resident local context that is important to a distributed application must be made visible across the network.
5. Decision points to run a batch process must be limited to one node or must be distributed across the nodes intelligently.
6. There must be a means to distribute configuration changes and application updates across the network.
7. Application management tools may have to be replaced with network-aware tools for application configuration, management, and monitoring.

3.4.5 Replicating Read-Only Lock Operations 3.4.5.1 Lock Operations

Locks are a means to prevent modification of a data object by more than one application at a time. FIG. 89 illustrates the problem that locks can solve. In an inventory application, the order-entry application may read a product item row from the database and find that there are ten items in stock. It wants to satisfy an order for three items, so it decrements the quantity to seven and writes the row back to the database. Nearly simultaneously, the restocking application must add twenty new items to the inventory. It reads the current quantity from the database, finds that there are ten items in inventory, adds twenty items to the quantity, and writes a quantity of thirty back to the database. One of these updates will follow the other, and the database will reflect the last update. Therefore, the quantity left in the database will be either seven or thirty, whereas the correct quantity is twenty-seven.

Locking is a mechanism to solve this problem. With a locking facility, an application can lock a data object that it wants to modify, thus preventing any other application from reading or modifying that data object until the original application has released the lock.

One classic locking mechanism, or protocol, well known in the art to provide this capability works as follows: when the application needs to change the value of a database item, it reads and locks the item, followed by re-writing the item with the updated value. It can remove the lock when the re-write completes, or for classic transactional systems, when the subsequent commit (or abort) occurs. Using this locking protocol thereby avoids the data corruption that would otherwise occur if no locking protocol were in use as no other application can gain access to the locked data item until the lock is removed.

3.4.5.1.1 Distributed Locking

Locking is more complex in distributed systems, particularly when each node has access to a local copy of a replicated database. Unless the system provides some mechanism for lock coordination between the nodes of the distributed system, applications in one node are not necessarily aware of lock acquisitions by applications in other nodes. Therefore, applications in two different nodes might simultaneously acquire a local lock on the same data object and then make their own modifications to that object. This is a problem whether the application uses asynchronous replication (often referred to as a data collision) or synchronous replication (often referred to as a lock wait that leads to a deadlock).

Data replication can solve to some extent the distributed lock problem since the system will replicate update lock commands either implicitly or explicitly with the corresponding data updates. However, the time delay between when a source node acquires a lock and when other nodes know about that acquisition can lead to some confusion (non-deterministic or incorrect behavior) among the applications. The nature of this confusion is different for asynchronous replication and synchronous replication.

With asynchronous replication, each node will lock its (local) copy of the data object that it wishes to modify, will execute its update, and then will replicate its change to the other node. The changes made by each node will thus overwrite the changes originally made by the other node. This is a data collision, which is discussed further in Section 1.6.2.1.1, "Data Collisions."

If synchronous replication is used, an application must first acquire locks on all copies of the data object that it wishes to update before it can execute the update. However, if the applications on two nodes lock their own local copies simultaneously, each node will be unable to acquire a lock on the remote data object copy since the other node is already holding that lock. Consequently, the applications in both nodes will be unable to proceed. A distributed deadlock has occurred. Section 1.6.2.2.2, "Distributed Deadlocks," discusses this situation.

There are two major classifications of locks, namely, implicit locks and explicit locks. Implicit locks include update (or change data) locks (where the data is actually modified), as described above, and explicit locks include read locks (where the data is typically not changed). An application will use an explicit lock if it is necessary to lock a data object, but without any intention to update or modify it. However, explicit locks are generally not logged in the change queue and hence may not be replicated. Therefore, explicit lock coordination is more complex. The replication of explicit locks for distributed application coordination is one preferred embodiment of the present invention.

3.4.5.1.2 Prior Art Solutions 3.4.5.1.2.1 Global Mutex

Chapter 6, "Distributed Databases," of the book by B. D. Holenstein, W. H. Highleyman, P. J. Holenstein, entitled "Breaking the Availability Barrier II—Achieving Century Uptimes with Active/Active Systems," AuthorHouse; 2007, discusses the prior art that allows the proper handling of locks in a distributed system.

A common prior art technique in the prior art for coordinating locks in a distributed system is the use of a "global mutex." With this technique, one node in the application network, commonly called the "master lock manager," manages locks that must be acquired by any node in the network before the node can update its local copy of data objects or data structures controlled by the locks. A lock managed by the master lock manager is called a global mutex ("mutex" is a contraction of the term "mutual exclusion").

FIG. 90 shows a typical use of a global mutex in a two-node distributed system. The master lock manager, resident on Node 1, holds locks on invoices that any node in the system can access and update. It is important to ensure that only one application copy at a time can update the information in a particular invoice. The master lock manager protects each invoice with a global mutex associated with that invoice. An invoice may comprise many rows or records in the database—customer information, shipping information, detail lines for each service or product ordered, and so on. The global mutex for an invoice protects all of its rows. In order to modify any row, an application must first acquire the global mutex for that invoice from the master lock manager. Then and only then can the application modify the rows comprising the invoice. When it has completed updating the invoice, it must release the mutex.

As shown in FIG. 90, when Application A on Node 1 needs to update a particular invoice, it must first acquire the global mutex for that invoice from the master lock manager, which happens to be on Node 1. If Application B on Node 2 also wants to update the same invoice, it must wait for Application A to release the mutex. Only then can Application B update the invoice header or any of its detail lines. Bidirectional replication keeps the copies of the database held on Nodes 1 and 2 in synchronism.

In this way, many application copies running in processing nodes that are geographically distributed can cooperate in a common task that involves a common database. If the database comprises a set of database copies, each owned by one of the processing nodes, replication engines can replicate changes made by one application copy to the other database copies in order to keep all copies in synchronism.

3.4.5.1.2.2 Database Partitioning

Another prior art strategy for handling distributed locks is to avoid the need for them by avoiding data collisions or deadlocks altogether. This can be accomplished via database partitioning. Database partitioning is the division of a database table into distinct independent parts. Typically, a partition reflects a range of table data or a particular table index, such as customer number. A developer can avoid data collisions if the application database can be partitioned so that only one node can update a specific partition, as shown in FIG. 91. Since only one node can update any given data object, data collisions and deadlocks will be avoided and thus there will never be a need for a distributed lock.

In some cases, the developer cannot cleanly partition the database. For instance, in a purchase-order application, access must be available to both the customer table and the parts table. If the developer partitions the customer table by customer number, a transaction must still be able to access all items in the parts table. Therefore, all nodes must be able to access any part in the parts table; and data collisions or deadlocks will likely occur. Likewise, if the developer instead partitions the parts table, all transactions (and therefore all nodes) must have access to the customer table, resulting in data collisions.

To solve this problem, the developer must partition both the customer table and the parts table. A transaction must send any customer updates that it wishes to make to the node that handles that customer partition, and it must send any parts updates to the node that handles that parts partition. In this case, the developer has achieved distributed deadlock avoidance at the expense of a more complicated application.

3.4.5.1.2.3 Conflict-Free Applications

There are some applications in which data collisions or deadlocks are not a problem, and hence locking is not a problem. For instance, if an application such as one that does event logging does nothing more than insert rows into a table, then data conflicts can typically not occur. Locks are not generally required, and distributed locking is not an issue.

3.4.5.1.3 Update Locks

By locking a data object, an application has either shared (called a shared lock) or exclusive (called an exclusive lock) access to that data object until it releases the lock. No other application can update the data object; and depending upon the system and the lock option chosen, no other application can read the data object. Shared locks typically allow other applications to read the data while the lock is held, and even apply a shared read lock of their own; exclusive locks only allow the holder to read the data item, and an exclusive lock is required to update the data item. Unless otherwise specified below, a "read lock" refers to a shared lock and an "update lock" refers to an exclusive lock. An unqualified "lock" refers to an exclusive lock. (In some cases, "dirty reads" can be executed that read through all types of locks; but data consistency is not guaranteed as the data may change.)

To correct the conflict problem posed by the example of FIG. 89, consider that example with the use of the prior art approach via locks, shown in FIG. 92. The order-entry application is the first to read the product item. It obtains a lock on the item, reads it, updates it, and rewrites it. It then releases the lock, possibly as part of the rewrite operation. If the restocking application tries to read the product item while the order-entry application is holding the lock, the restocking application will be paused and its read not honored until the order-entry application has released its lock. The restocking application can then update the quantity. The order-entry application will decrement the quantity to seven, and the restocking application will then increment it to twenty-seven, leaving the correct result in the database.

In some systems, an application must issue an explicit lock operation or command prior to updating a data object, as shown in FIG. 92. In this case, the application issues a lock command to lock the data object followed by a read/modify/rewrite/unlock sequence. In others, the lock is implicit in the update command. As soon as the database receives an update command, it locks the data object automatically. For instance, SQL update statements provide implicit locking.

3.4.5.1.4 Read Locks

There are times that an application (or database management system) has reasons to lock a data object (e.g. column, row, table, database, or subset thereof) even though the application may not intend to update it. These cases are often referred to as the application (or DBMS) implementing a "locking protocol", herein referred to as an "intelligent locking protocol", or ILP. In these cases, the application will issue an explicit lock operation step often referred to as a "read lock." In these instances, the application explicitly requests that certain data objects be locked, in a certain order, to avoid (or at least minimize) the chances that its locking requests will collide with those of another application (or transaction). Read locks are referred to herein as being the explicit locking operation, however the operation in practice might be another form of operation such as a direct explicit lock API call.

A read lock may either be exclusive, in which case only the holder of the lock can read the data, or shared, in which case any other application can also read the data. A data object will remain in the read-locked state so long as any application is holding a read lock on it, whether shared or exclusive. When one or more applications hold such a lock on a data object, no other application (or transaction), can update that data object. If an application decides that it needs to update the data object, it must escalate its lock to an update lock (depending on the file system, this escalation may either be implicitly performed as part of the update request, or it may otherwise need to be explicitly performed as a separate step). It must then wait until all of the applications currently holding read locks on the data object have released their locks before the lock escalation completes and it can perform its update.

One use of a read lock is to guarantee consistent reading and rereading of the value of a data object. This may be important for certain query processing or reporting functions. In effect, the read lock prevents anyone else from updating that data object for the duration of the lock. For instance, consider the inventory application used as an example in the previous section. A Reorder application scans the Product Table and looks for items whose inventory has dropped below a reorder threshold (FIG. 93). If it finds such an item, it calls an order process that will place an order for additional items. It is important that no other application modify the item quantity until the order process has been completed to prevent the order process from reordering the wrong quantity.

As mentioned above, an important use of read locks is in the implementation of an intelligent locking protocol, or ILP. The use of an ILP can prevent deadlocks. If an application needs to lock several rows in order to complete its processing, it must take steps to avoid a deadlock situation. For instance, if one application locks row A before row B, and if another locks row B before row A, a deadlock is possible. This occurs when both applications attempt to access these rows nearly simultaneously. Application 1 locks row A at the same time that Application 2 locks row B. Application 1 cannot then acquire its lock on row B, and Application 2 cannot acquire its lock on row A. A deadlock has occurred. The applications can resolve the deadlock by one or both releasing their locks and trying again with random delays, however this is inefficient and costly in the terms of failed operations needing to be resubmitted.

Applications can avoid this sort of deadlock by always requesting locks in the same order. Thus, when Application 1 acquires a lock on row A, Application 2 must wait before it can gain access to row A and then lock row B. This is an ILP.

Many applications using an ILP are written to run in a single-node (or single database) environment and do not check for deadlocks because deadlocks presumably will not occur. However, when these applications move to a distributed environment using replication to keep multiple database copies in synchronism, data conflicts such as data collisions (with asynchronous replication) and distributed deadlocks (with synchronous replication) can occur, as described earlier. Developers must exercise care to ensure that these conditions are understood and accounted for.

A particular form of prior art ILP depends upon read locks, as illustrated in FIG. 94. Consider a purchase order represented in the database via a header row in the Purchase Order Table and several detail rows found in the Detail Table. If an application wants to modify one or more detail rows in a purchase order, it first acquires an exclusive read lock on the purchase order header row (the "superior" data). The application can now update one or more detail rows (the "subordinate" data) of the purchase order, releasing its header lock when it has completed processing. During the time that it is holding the lock on the header, no other application can gain access to the purchase order header or its detail rows. Therefore, the application holding the header lock does not need to acquire locks on the detail rows—it already has exclusive access to these rows. The application has avoided deadlocks, at least in a single-node system.

The superior data is often the parent and the subordinate data is often the child in a classic parent/child relationship. This relationship is typically implemented as a foreign key in a relational database management system.

3.4.5.2 Replicating Read Locks

Locking in a bidirectionally-replicated distributed environment such as an active/active system is somewhat more complicated. Read locks do not modify the database. Therefore, the transaction manager does not generally write these locks to the change queue; and the replication engine will not replicate them to the target system.

In some cases, it is unnecessary (or perhaps undesirable for performance or application-concurrency reasons) to replicate read locks. For example, in FIG. 93, assume the Reorder application is running in System A, an application running in System B is generating an update to item x, and the database copies are being synchronized via asynchronous replication. If the System B application is unaware of the read lock on item x held by the Reorder application in System A, it will proceed to update its local copy of item x. System B will replicate this update to System A, which will wait on the lock held by the Reorder application. Only when the Reorder application has released its lock on item x will System B's update be applied to item x. Therefore, the operation sequence is the same as it would be in a single system without replicating the read lock.

However, in other cases, it is imperative to replicate a read lock. In some implementations, for example, one or more of the locks in an ILP sequence may be read locks, as described above. If the replication engine does not replicate these locks, the ILP is ineffective on the target system; and data collisions and/or deadlocks may occur. Preferred embodiments of the present invention address this problem.

The ILP shown in the purchase order example previously described in FIG. 94 illustrates this point. Assume Application 1 and Application 2 are running in different systems that are synchronized via asynchronous replication. If there is no replication of the read lock on the purchase-order header, Application 2 will not know that Application 1 is also modifying the purchase order. Application 2 will lock its copy of the header row and will update its copy of the detail lines at the same time that Application 1 is doing the same thing to its local database copy. As a result, data collisions might occur, corrupting the database if they are not detected and resolved.

In this example, if the read lock acquired by Application 1 is replicated to the database being accessed by Application 2, Application 2 will be unable to acquire the lock on the purchase order header and to update the purchase order's detail lines until Application 1 releases the lock. Therefore, there will be no conflict.

Therefore, in some applications, it is important to be able to replicate read-lock operations, preferably on a selective basis so that only those read locks that need to be replicated actually are replicated. Preferred embodiments of the present invention address this issue.

Also, regardless of whether asynchronous or synchronous replication is used, when the replication engine is performing the replicating and applying of the I/O operations against the target database, the replication of the I/O operations and replay of them on the target is asynchronous to the original execution of the I/O operations on the source (the local and remote commits may be coordinated, or not, to enforce synchronous replication as described in Section 1.4.1.2, "Coordinated Commits"). As contrasted with dual writes, wherein the individual I/O operations on the source do not complete until each the individual I/O operations have completed on the target (see Section 1.4.1.1, "Network Transactions") in a synchronous manner, replicating via a replication engine allows the target I/O operations to be asynchronously applied against the target database with respect to when those I/O's completed against the source database. This is true regardless if the I/O operations consist of update, and/or read-lock, operations.

3.4.5.3 Distributed Data Conflicts

Data conflicts that would not occur in a single system can occur in a distributed system. For instance, in the example of FIG. 94, even with proper lock replication, if both Application 1 and Application 2 request the read lock within a lock latency interval, as previously described in Section 3.4.1, both will be successful in acquiring their local locks. In an asynchronous replication environment, both applications will be free to update their local copies of the same purchase order's detail rows. Both will replicate these changes, causing data collisions and database corruption unless the system can detect and resolve the data collisions.

In a synchronous replication environment, both applications will obtain locks on their local copies of the purchase order header; but neither will be able to acquire the lock on the remote copy. A distributed deadlock will occur. One or both applications will have to release their locks and try again, preferably with different time delays; or one or both applications will have to abort and retry their respective transactions. Shadowbase provides for variable deadlock delays, as described in Sections 3.4.1 and 3.9.3.

Chapter 6, "Distributed Databases," of the book by B. D. Holenstein, W. H. Highleyman, P. J. Holenstein, entitled "Breaking the Availability Barrier II—Achieving Century Uptimes with Active/Active Systems," AuthorHouse; 2007, and Chapter 9, "Data Conflict Rates," of the book by W. H. Highleyman, P. J. Holenstein, B. D. Holenstein, entitled "Breaking the Availability Barrier: Survivable Systems for Enterprise Computing," AuthorHouse; 2004, discuss distributed deadlocks in more detail. In addition, Section 4.14 below discusses several techniques for avoiding or resolving distributed deadlocks. They include partitioning the database so that only one node updates a particular data object, using a global lock that resides on a single master system, distributed lock managers, and hierarchical architectures that designate a winner in the event of a deadlock.

3.4.5.4 Methods for Replicating Read Locks

In some open-source databases, it may be possible to configure the database to allow the replication engine to capture lock requests. However, this is not generally the case; and one must find other solutions. Solutions for replicating read locks are the subject of preferred embodiments of the present invention, and include the following:

1. Change the read-lock into an update operation that is replicated by replacing the read-lock operation with a "null" update (equivalently "no change" update or "no operation" update) that will have no logical effect on the database except to lock the data object.
2. Intercept read-lock requests generated by the application, and replace them with null updates or insert lock tokens at an appropriate point in the change queue or post change queue replication engine processing stream for replication to the target system. (A token, in this context, is an event, marker, or other indicator or item that contains the information necessary for the replication engine to identify the lock operation to be performed at that point in the replication stream. When the token is received at the target node and applied by the replication engine, it converts the token into the appropriate read-lock request and applies it against the target database.)
3. Incorporate intelligence into the replication engine so that it can determine when to execute a read lock on the target system.

Descriptions of these techniques follow.

3.4.5.4.1 Null Updates

The null-update method typically requires modifications to an application (or application library, device driver, or other system component) that uses read locks (FIG. 95a). The null-update method entails changing read-lock commands to null updates (FIG. 95b). A null update, also referred to as a "no change update" or a "no operation update", is a normal update that makes no data content change to the row. However, it will cause the data object to become locked. For instance, the SQL statement UPDATE TABLE <T>, SET COL1=COL1 WHERE KEY=<key> is a null update. It sets the value of column 1 of the row identified by the primary key <key> in table T to itself.

The change queue records the null update and replicates it just like any other update to the target system. The null update makes no change to the target data object but locks it just as the application did on the source system. This operation is generally part of a larger transaction, and the commit of the transaction releases the lock.

The performance impact of this method on the source system should be small since the read lock has to interact with the database anyway. The null update will lock the selected row and generate an audit trail (change queue) event but will take no further action on the source system. However, upon receiving the replicated null update, the target system will apply the update, though null, to the target database, consequently locking the target data object.

Alternatively, the application can call an API (application programming interface) provided by the replication facility when it executes a read lock that it wishes to replicate, as shown in FIG. 95c. When called, the API will generate a null update to lock the record and insert it into the change queue.

Some systems cannot guarantee that the target system will execute events within a transaction that affect different tables or partitions in the same order that the source executed them. For instance, NonStop systems do not preserve in the audit trail the order of operations performed on different tables or partitions, as discussed in Section 3.2.7, "Referential Integrity and Data Consistency." For example, in the Purchase Order example of FIG. 94, in which an application must obtain a read lock on the header row of a purchase order before it can update any detail lines, there is no guarantee in a NonStop system that the null update will reach the target before the detail lines. If the null update follows the changes to the detail lines in the audit trail, the target system will update the detail lines before it acquires a lock on the header row, thus violating the locking protocol.

One solution to this problem is to wait an appropriate amount of time after sending or recording the read lock on the header row before sending (or recording) the detail lines. But what is an appropriate amount of time? Section 4.9, "Request to Sync (RTS)," discusses a solution to this problem, shown in FIG. 96. An RTS is a special message sent over the replication channel from the Collector on the source system to the Consumer on the target system The RTS asks for a confirmation that all replicated events for a specified transaction have been received by the Consumer and have been executed or safe-stored. In the null-update example under consideration, the Collector, after it has replicated the null update, sends an RTS request to ask for confirmation of the receipt of the null update by the Consumer. The Collector holds up the detail-line updates until it receives the RTS reply from the Consumer. This guarantees that the Consumer will receive and apply the detail line updates after it has executed the lock request.

The use of an RTS will not decrease distributed data-conflict occurrences. On the contrary, it increases application-latency time, which in turn extends the time that applications hold the locks. This increases the likelihood of data collisions in asynchronous systems or distributed deadlocks in synchronous systems.

3.4.5.4.2 Intercept Library

In some cases, changing read locks to null updates or calling a special API may not be practical because of the expense or risk of modifying an application or even because the source code may no longer be available. If application modification is not feasible, another solution is to intercept lock requests. When the application calls the system procedure to request a read lock, an intercept library (FIG. 97) bound into the application or file system interface or device driver for access to the data intercepts the call. (In practice, the intercept library may intercept all I/O calls or even all system calls, but will act only on read-lock requests.) This requires no modifications to the application. In addition to passing on the request to the local operating system for execution, the intercept library replicates the request to the target system. It can do this by executing a null update on the data object to be locked, replacing the read-lock request with a null update that is replicated to the target (as shown in Case A in FIG. 97). Alternatively, the intercept library can insert into the audit trail (or otherwise insert into an appropriate point in the replication processing stream) a read-lock token informing the target system to lock the record in question (Case B); it can send a lock request directly over the replication channel to the target system (Case C); or it can send a lock request directly to the target system outside of over the replication channel (Case D). In the latter case, the replicated event must be tagged (for instance, with a timestamp or with the current audit-trail insertion point) to indicate where in the replication stream the lock event should occur. This is necessary since replication may be behind in time, and the target system should not execute the lock prematurely since it may interfere with earlier locks or read requests.

The advantage to the intercept approach is that developers need not modify the application. All that is required is to bind the intercept library to the application or otherwise add the intercept functionality into the file system or device driver interface. However, the developer will not have the same control over the replication of read-lock requests as would be the case if the application was modified to change read-lock requests to null updates, as shown in FIGS. 95a-95c. This is because not all read-lock requests need to be replicated (for example, a read-only transaction may not need to be replicated to the target). Consequently, the intercept method may cause unnecessary locking of data objects on the target system, thereby decreasing application concurrency at the target. In addition, some systems do not support intercept technology.

3.4.5.4.3 Replication-Engine Intelligence

If neither application modification nor intercept technology is feasible or desirable, another option is to provide intelligence in the replication engine to initiate a read lock on the target data object when the replication engine detects certain conditions. To accomplish this, the replication engine can incorporate user-defined rules via user exits, in which replication-engine components incorporate or bind in user-developed code or logic.

For instance, consider the case when the previous Purchase Order example of FIG. 94 executes on multiple nodes in a distributed system. Assume that a data-replication engine is used to keep the database copies synchronized. The Consumer in the data-replication engine can bind in a user exit that initially locks the purchase-order header record whenever the Consumer sees the first update to a purchase-order detail line in a transaction. In other words, when the first update to a purchase order detail line arrives in the Consumer, the user exit logic in the Consumer knows that the purchase-order header record needs to be locked before that purchase order detail line is updated.

Specifically, when the Consumer receives an update for a purchase-order detail line, it extracts the purchase order key from the updated row image or otherwise determines the correct purchase order header record key to use and uses this to lock the corresponding purchase order header before applying the update to the purchase order detail line. Should the Consumer receive further detail-line updates for that purchase order, it need not repeat the lock acquisition of the header row since it now holds this lock until the transaction commits.

This method requires that the purchase order header can be accessed based on information in the detail row or that the purchase order header information can otherwise be ascertained or determined via the information contained in the detail row, perhaps by accessing additional information at the target database (for example, a lookup table that maps detail lines to their corresponding header).

FIG. 98 shows an example application that uses an ILP that locks an invoice header row before applying any updates to the invoice data. In this case, the application is updating the ship-to row for the invoice and one of the item-detail rows. When it gets a lock on the invoice header row, it knows that no other process can update any of the data associated with the invoice. For example, no other process can insert another item that will modify the invoice's discount schedule.

In this example, the system is replicating the invoice data asynchronously. Consequently, the target system applies some of the target data after the source commit. The application on the source system starts a transaction and locks the header row. The audit trail records neither action. The application then updates the ship-to row and the item-detail row. The audit trail receives these actions, which are now available for replication. The application then commits the transaction, and the transaction manager writes a commit token to the audit trail.

The Collector reads data from the audit trail and sends it to the Consumer. When the Collector encounters the two updates and the commit in the audit trail, it replicates them to the target system. On the target side, the Consumer receives the ship-to row update. This is the first I/O for the transaction, so the Consumer starts a target-side transaction. The Consumer recognizes that this is an invoice-related update, so it replicates (implements) the locking protocol by acquiring a lock on the invoice header on the target. The Consumer then applies the two updates to the target database. When the Consumer receives the source commit, it commits the target transaction and releases the locks.

Alternatively, the Collector could contain the logic to implement the locking protocol by inserting the appropriate information (such as a lock event for the invoice header) into the audit trail or the replication stream ahead of the first detail line update.

The application does not have to be modified to insert any additional information into the audit trail as would be required if the lock were replicated by doing a null update of the invoice header. The data extracted from the audit trail drives the Consumer's actions so that no intercept libraries are required to notify the Consumer of locks. However, the Consumer's (or alternatively the Collector's) user-exit code must duplicate the business rules for the application's ILP.

It is possible that the replication engine will find that an application on the target system is already holding the lock that it wishes to acquire. In the case of asynchronous replication, the replication engine must wait for the release of the lock held by the target-side application before it can continue. With synchronous replication, the replication engine has the option of waiting for the release of the lock or of aborting the transaction. If an extended deadlock occurs, the replication engine will time out and will abort the transaction.

3.4.5.4.4 Reducing Lock Holding Times with a Metronome

In all of the read-lock replication techniques described above, the time that the target system holds locks depends upon the time that it takes to replicate the data from the source system. A significant portion of this delay is the time that it takes for the source system to materialize the changes to the audit trail. The NonStop transaction manager (TMF) does not write changes made to a file or table to the audit trail until some transaction (any transaction) that has modified that file or table is committed. This time is not controllable by the developer.

To alleviate this problem, the replication engine can use the Metronome technique described in Section 4.4.3, "Metronome Process," to flush transactions periodically to the audit trail. The Metronome process creates a small transaction that makes a null update to every table or file that the system is replicating. When a Metronome transaction commits, the transaction manager flushes to the audit trail all waiting changes to those tables or files. By controlling the period of the Metronome, the developer can control the replication delay time caused by audit-trail flushing.

The use of the Metronome is especially important in systems using synchronous replication. The materialization time adds not only to lock-holding time but also to application latency caused by the application having to wait for the replication engine to apply updates across the network.

3.4.6 Eliminating Planned Downtime

An advantage of a replication environment is that upgrades can be rolled through the application network one node at a time. This is true whether the system is configured as an active/active system or as a primary/backup system using unidirectional replication. Either synchronous or asynchronous replication is suitable.

All that is required is the ability to remove a node from the application network so that it can be upgraded. Means must be provided to resynchronize the node's database with the current state of the application database and return the node to synchronous or asynchronous service. Another node can then be removed from service and upgraded. This process can continue with all of the nodes in the application network, thus allowing an upgrade to be rolled through the network with no application downtime.

These facilities are all inherent in Shadowbase Plus SR as they are the same ones needed to recover a failed node. Thus, the elimination of planned downtime comes for free in a Shadowbase Plus SR replicated system.

3.5 Shadowbase Plus SR Application Latency

Application latency has several components, including the time to materialize the changes, the time for AudColl to obtain the changes via ARLIB, and the time for the replication engine to vote following a prepare directive. The time to materialize the changes is outside the control of Shadowbase. The last component, the time for the replication engine to vote, is the time from when the replication engine receives the last update for the transaction to the time that the replication engine's vote is received by TMF. Analyzing this latter time, which is called "L" for the case in which a Metronome is used, let L=average replication engine application latency after receipt of last change.

t=Metronome tick interval.

c=replication-channel round-trip time.

When the last change is received by AudColl, there can be no RTC! response back to AudCoor until AudColl has received a response from AudRtr concerning the status of the transaction. The time to receive this response is the replication channel time, c. Thus, there will always be a latency of at least c following the last change before AudColl can vote on the transaction.

In addition, AudColl must wait until the next Metronome tick before it knows that this was, indeed, the last change. If it has received the RTC! from AudRtr but is still waiting for the next tick, this wait becomes an additional delay. Calculate the value of this additional delay for the case where the metronome interval exceeds the replication channel round trip time (t>c). There are two cases to consider depending on where in the tick interval the last change was received, FIGS. A1 and A2 illustrate the two cases. In the figures, the horizontal axis is time. The last change is shown occurring at some point along the time axis. The tick preceding the last change is shown as the pre-tick time, occurring at time=0. The tick following the last change is shown as the post-tick time, occurring at time=t.

In FIG. 47 the last change (the dark up arrow) was received within a time of c of the post-tick (the time from (t−c) to t, shown as the shaded area). The post-tick occurs before the RTC Response (RTC!) is received from AudRtr and there is no additional delay waiting for the post-tick.

In FIG. 48, the last change was received between the pre-tick and t−c (the shaded area). In this case, there is additional latency added between when the RTC! response is received and the post-tick since AudColl will have to wait for the post-tick before it can respond to AudCoor with an RTC!. Depending upon where the last change falls in this area, the response to AudCoor will be delayed anywhere from a time of (t−c) to a time of 0. Thus, it will be delayed an average of (t−c)/2.

Summarizing this, $$\text{average additional delay} = \frac{(t-c)}{2} \text{ with probability}$$

$$\frac{(t-c)}{t} \text{ for last change arriving before time } (t-c)$$

$$\text{average additional delay} = 0 \text{ with probability } \frac{c}{t}$$

$$\text{for last change arriving after time } (t-c)$$

Thus, the average additional delay is $$\text{average additional delay} = \frac{(t-c)}{2} \frac{(t-c)}{t} = \frac{(t-c)^2}{2t} \text{ for } t \geq c$$

To this one must add the fixed channel latency time, c, since every transaction will be delayed by this amount as it waits for the RTC! from AudRtr:

$$L = \frac{(t-c)^2}{2t} + c = \frac{t^2 - 2ct + c^2 + 2ct}{2t} = \frac{t^2 + c^2}{2t} \text{ for } t \geq c$$

Let
d=delay to receive the last change once the commit has been issued.

d is the time that it takes to materialize the change plus the time that it takes for AudColl to read the change (on average, half the ARLIB poll cycle). The application latency added by synchronous replication when the Metronome is used is then $$\text{average application latency} = d + \frac{t^2 + c^2}{2t} \text{ for } t \geq c$$

Next, consider the case in which the tick interval is less than the replication round-trip time (t≦c), As seen from FIG. 49, it is clear that there will always be a delay of c no matter when the last change was received. Even if the last change occurs early in the interval, the post tick will always occur before the RTC! is received from the target and AudColl will be able to process the response immediately.

Therefore,

L=c for t≦c

As a consequence, there is no application latency advantage to be gained by using a Metronome interval that is shorter than the replication channel round-trip time.

L/c is plotted in FIG. 50 as a function of t/c. It shows application latency, L, as a function of the Metronome tick interval, t, where both L and t are normalized by the round-trip time c.

For instance, if the tick time is equal to or less than the round-trip time (t/c≦1), application latency is equal to the round-trip time (L/c=1). If the tick time is twice the round-trip time (t/c=2), application latency is 1.25 times the round-trip time (L/c=1.25). If the tick time is greater than five times the round-trip time (t/c>5), the application latency approaches t/2 (L/c≈t/2).

Keep in mind that FIG. 50 gives the application latency imposed by Shadowbase Plus SR following the receipt of the last update. To this must be added the delay, d, for Shadowbase Plus SR to receive the last update once the commit has been issued in order to arrive at the total application latency.

4 Part 4: Preferred Embodiment Detailed Description 4.1 Preferred Embodiment Requirements The requirements for a preferred embodiment of a synchronous replication system are:

1. Work Reliably and Fail Gracefully

The replicated databases must remain consistent—if one database commits, all should commit; if one aborts, all should abort. No commits can be issued until all data for the transaction has been replicated. Cases where the outcome cannot be reliably determined, such as when communications is lost after a system has responded with ready to commit but prior to receiving the commit, need to be handled properly—which may mean manually.

2. High Bandwidth

The architecture must support thousands of transactions per second (TPS). The architecture must support a high degree of parallelism and scalability.

3. Low Application Latency

Application latency, the time between the start of the commit and the application's notification of the commit completing, must be minimized. In this case, the theoretical minimum is the communications round trip time to the remote system.

4. Efficient WAN Utilization

The architecture must support replication at Disaster Recovery (DR) distances over a WAN. The WAN needs to be used efficiently to move the data, in particular, this means that the data being sent to the remote site needs to be buffered as much as possible.

5. Fault Tolerant

Replication must continue in the face of a CPU failure. Transactions that are being monitored in the failed CPU will be aborted (limitation of the TMF architecture). In the event of a loss at the target system, replication should be able to continue asynchronously. Critical processes must either be nonstop process pairs or restartable under the control of a persistence monitor.

6. User Configurable

The architecture must support customer controllable options to allow the system to be optimized for their requirements. In many cases, tradeoffs exist and need to be configured on a case-by-case basis. For example, lowering application latency may result in poorer WAN performance and higher bandwidth requirements by decreasing the level of message blocking.

7. Self-Monitoring

Replication must be self-monitoring with timeouts. It must be able to detect and alarm when a synchronously replicated file or table is being updated outside of synchronous replication. It must keep and publish extensive performance statistics.

8. Application Integration

Synchronous replication must be easily integrated with customer applications without requiring modification or recompilation of their applications. It must be easily and quickly disabled without causing any application impact.

9. Database Support

The initial release targets Enscribe and SQL MP databases as both sources and targets on NonStop. Subsequent releases will add additional databases as targets. SQL MX support as a source will be added when it becomes available for asynchronous replication.

Future releases may target other databases as the source, depending on customer demand and the feasibility of integrating into the transaction flow.

10. Replication Control

Synchronous replication must be controllable on a table-by-table basis—that is, some of the tables or partitions affected by a transaction may be replicated synchronously, some asynchronously, and some may not be replicated at all.

Subsequent phases may allow the application to choose which transactions are involved in synchronous replication.

11. Product Requirements

It must be architected as an optional add-on to Shadowbase. Licensing should follow the Shadowbase pass codes.

12. Extensive Troubleshooting and Debugging Capabilities

Synchronous replication will require extensive built-in tools to detect and correct problems remotely. In particular, it will require significant debugging and error logging capabilities.

13. Tunable

Synchronous replication must be tunable. In addition to being high configurable, it must also report on performance statistics to allow the performance to be modeled and modified properly. The performance statistics must be sufficient to allow bottlenecks to be identified and eliminated.

4.2 Preferred Embodiment Goals

1. Goal Oriented Configuration

Ideally, the configuration options would be goal oriented and replication would have the intelligence to adjust parameters and algorithms dynamically to meet the goal. For example, the goal may be to have latency under 300 ms, Replication would monitor the communication times, and change the audit trail reading and buffering algorithms to support the latency goal. Replication must issue an alarm if the goal cannot be met.

Recognizing that the ideal may not be able to be met, the detail parameters must be configurable as well.

2. Minimal Impact on Failure

When a CPU failure occurs, the failure should have the minimum possible impact on synchronous replication. For example, when a transaction coordinator fails, all transactions it is responsible for are aborted. If there is a transaction coordinator in every CPU, and the applications direct the transaction to the coordinator in their CPU, then those transactions that are aborted would have also been aborted because of the application failure. Similarly, if a consumer fails, only those transactions the consumer was processing should be affected.

4.3 Overall Architecture of one Preferred Embodiment 4.3.1 Components

FIG. 51 shows the major components providing synchronous replication through Shadowbase. Moving left to right, these components are:

Application: The user's application. It updates the source database using standard Enscribe calls or SQL database access methods. It interacts with Shadowbase through one of the two libraries provided by Shadowbase, either the Intercept Library or the Callable Library.

Intercept Library: (Not shown, embedded in the application.) One of the two libraries provided by Shadowbase Plus SR for synchronous replication. It mimics calls that start a transaction (such as the TMF library call BEGINTRANSACTION and the SQL embedded call to BEGIN WORK) to both begin the transaction and to register it for synchronous replication. Using the intercept library, a user's application can be integrated with Shadowbase without modification to its code.

Callable Library: (Not shown, embedded in the application.) The other library provided by Shadowbase Plus SR for synchronous replication. It provides an API for the application to control the registration of transactions for synchronous replication. Unlike the Intercept Library, the application must be coded to use the Callable Library. The callable library, however, provides additional capabilities and better control for the application than the Intercept Library. For example, using the Callable Library, the application can choose which transactions are registered. The Intercept Library will register all of the transactions begun by the application.

AUDCFG: Provides configuration information to the libraries for replication. AUDCFG is a persistent process that can be run outside of the Shadowbase environment so that the application can be started before Shadowbase replication. See Section 4.10.2 for more information.

Metronome: The metronome is an optional component for synchronous replication. It issues an update under a transaction on a set of monitored disks to embed a timestamp (or tick) in the audit trail for each disk. AUDCOLL uses the embedded tick to know when a transaction's data has been completely read and to monitor for slow disks. See Section 4.4.3 for more information.

AUDCOOR: The transaction coordinator. AUDCOOR is responsible for coordinating transaction commits with TMF. The application sends transactions to be monitored via one of the two Shadowbase Plus SR libraries and registers them with TMF. When application requests a commit from TMF, TMF notifies AUDCOOR as one of the participants in the transaction. AUDCOOR then issues a Ready to Commit (RTC) message to the collector, AUDCOLL. AUDCOLL in turn checks with the AUDRTR, the router, to see if all outstanding I/O has been successfully applied. AUDCOOR is notified and votes to commit when all I/Os have been applied. See Section 4.4 for more information on commit processing.

AUDCOLL: The collector. AUDCOLL is a modified version of the existing Shadowbase collector, enhanced to support synchronous replication. AUDCOLL is responsible for reading the audit trail and sending relevant transaction records to the target system for application.

Significant enhancements for synchronous replication include:

1. Support for both TCP/IP and Expand communication between the target and source systems.
2. Support for RTC/RTS processing with AUDCOOR.
3. Support for restart and recovery (see Section 4.16 for more information).

AUDMON: The monitor. AUDMON is a modified version of the existing Shadowbase monitor, enhanced to support the new entities required for synchronous replication, such as AUDRTR, AUDCOOR, and the Metronome.

AUDRTR: The router. The router receives the I/O and transaction control records from the AUDCOLL and sends them to AUDCONS, the consumer, to be applied to the replicate database. During normal processing for synchronous replication, AUDRTR assigns I/Os to consumers on a transaction basis (see Section 4.7 for more details). During startup and restart, AUDRTR may assign I/Os to consumers on data partition basis (see Section 4.16 for more information).

AUDCONS: The consumer. AUDCONS is a modified version of the existing AUDCONS Shadowbase consumer. It applies the changes replicated from the source system to the target database. The primary change to AUDCONS is to support the consumer pool concept. In the existing Shadowbase asynchronous architecture, each consumer is responsible for applying I/O to a distinct subset of the replicated files. Each consumer only knows about the structure of the files in the subset. Transaction based routing is used for synchronous replication. Each consumer will be processing data on a transaction-by-transaction basis, not on a file/partition basis. Each consumer needs to know the structure of all replicated data.

AUDCOM: The command processor (not shown). AUDCOM is a modified version of the existing Shadowbase command interpreter. It is responsible for providing the Man/Machine Interface (MMI) to configure and control replication. AUDCOM is enhanced to support configuration and control of the new entities in synchronous replication, including AUDCFG, AUDCOOR, and AUDRTR. It is also changing to support the concept of a collector pool—a pool of collectors to apply transaction based I/Os.

4.3.2 The Transaction Lifecycle

The following subsections describe the processing done during the transaction life cycle for synchronous replication. Transactions replicating synchronous data have the following steps during their lifetime:

1. Begin transaction processing: the transaction is started by the application and Shadowbase is registered with TMF as a participant in the transaction.
2. Data replication: the database on the source side is updated by the application, and the changes are replicated to the target database by Shadowbase.
3. Commit request processing: The application requests a commit, which is ultimately voted upon by all registered resource managers, including the disk processes and AUDCOOR.
4. Commit processing: The commit is completed and replicated to the remote system.

These steps are described in more detail below. Note that the sections are illustrative and show one simple path for the transaction processing. Depending on circumstances, other paths or flows may be required. For example, the begin transaction processing shows the transaction being registered by an inter-process message from the application to AUDCOOR. The registration may also be accomplished by other means, such as a trigger on a table in the source database.

4.3.2.1 Begin Transaction Processing

FIG. 52 shows the processing performed when the transaction is first started. The steps in FIG. 52 are as follows:

1) The application begins a transaction. There are a number of ways the transaction can be started—by calling BEGINTRANSACTION, issuing an EXEC SQL BEGIN WORK statement, or through the callable library. In some cases, the transaction may be started by the database in system code without any special calls by the application.
2) The application registers the transaction. The registration may be done implicitly by a call to BEGINTRANSACTION in the intercept library, or by a call to SB_BEGINTRANSACTION in the callable library; or the application can explicitly register the transaction through the callable library after starting the transaction. In any of the above cases, the library retrieves the transaction identification information and sends it to AUDCOOR for registration. The application will block until the transaction has successfully been registered.
3) AUDCOOR registers with TMF, notifying TMF that it wants to act as a Resource Manager for this transaction. TMF polls resource managers to determine the outcome of the transaction when the commit is requested.

When this phase is complete, the transaction has been started and AUDCOOR has registered with TMF so that it will be notified when the application requests to commit the transaction.

4.3.2.2 Data Replication

During the data replication phase as seen in FIG. 53, the application updates the source database. The changes are replicated and applied to the target database by Shadowbase. The basic steps are:

1) The application updates data in the source database under the registered transaction.
2) TMF copies the change records for the updates to the audit trail. Each disk process maintains a log of changes it made under the transaction. The disk process log is copied to the audit trail whenever any commit request is received or the disk process's buffer becomes full. Note that this algorithm has implications for replication: the order in which I/Os are requested by the application will not necessarily be the same as the order of the records for the I/Os in the audit trail. Only ordering on a disk process basis is guaranteed in the audit trail by TMF.
3) AUDCOLL reads the audit trail and sends the changes to the AUDRTR on the target system.
4) AUDRTR chooses one of the consumers (in this example, the bottom consumer in pool) to receive and process all of the I/O for the transaction. If this is the first I/O received for the transaction, a target side transaction is started.
5) The chosen AUDCONS applies the changes to target database. All of the I/Os for a transaction will be applied by the same AUDCONS under the same transaction started on the target system. There is a one-to-one correspondence between the source side transaction and the target side transaction for normal synchronous replication.

Each change to the source database under the transaction will be replicated to the target database over the same path. Note that AUDCOOR is not involved with the actual replication of data—it is only involved during begin transaction processing and during the transaction commit.

4.3.2.3 Commit Request Processing

FIG. 54 shows the flow when the application issues a commit request. Processing starts with the application requesting to commit the transaction and ends with AUDCOOR voting on the request. The steps during this phase are:

1) The application issues a request to TMF to commit the transaction. If the commit request is done waited, the application is blocked from this point forward.
2) TMF notifies all of the resource managers associated with the transaction to prepare the data for committing. The resource managers include the disk processes as well as AUDCOOR.
3) AUDCOOR sends a Ready To Commit (RTC) token to the collector.
4) AUDCOLL waits an appropriate amount of time to allow transactional data to be sent down to the target system and applied. It then embeds a Ready To Commit? (RTC?) message in the data stream to the router, to check if the replicated I/Os have been applied.
5) When all of the database changes have been applied, AUDRTR will reply to the collector with a Ready To Commit (RTC!) response, indicating that the data has been synchronized.

While the RTC is outstanding, it is possible that AUDCOLL will see more changes in the audit trail for the transaction. If that occurs, the database changes are sent down to the target to be applied, followed by a second RTC. The response to the first RTC, if any, is ignored. This continues until AUDCOLL determines that all I/Os for the transaction have been seen and applied. See Section 4.4 for more detail on the RTC processing in steps 4 & 5.

6) When AUDCOLL determines that all of the data for the transaction has been seen and applied, it responds to the RTC? from AUDCOOR indicating replication is ready to commit.

7) AUDCOOR will then vote to allow the data to be committed by TMF, assuming that the data was successfully applied. If it could not be applied at the target database, AUDCOOR will vote to abort the transaction.

Note that since AUDRTR is keeping the state of each consumer internally, the consumers are not involved in the RTC processing.

4.3.2.4 Commit Request Processing with Virtual RTC's

Gravic's coordinated commit patent, U.S. Pat. No. 7,177,866 (Holenstein et al.), which is incorporated by reference in its entirety herein, describes that virtual tokens could be used in the coordinated commit protocol instead of physical tokens or messages between the source and target systems. Virtual tokens represent a point in the processing stream, rather than a physical message. Using coordinated commits, the source system needs to know that all data for a transaction has been successfully applied prior to committing the transaction on the source system. One method, documented above, is to send a physical RTS message or token to the target system when the commit is requested, and to have the target system replying when the data has been applied. Instead of a physical RTC request and response, a virtual RTS can be used to confirm that all data has been applied for a given a given transaction can be eliminated if there is an acknowledgement that data has been applied from the target to the source. The source can then keep track of the state of the transaction and does not need a separate message to confirm the target application.

Using a virtual RTC can reduce the application latency, particularly if there is a delay between when the application issues the last update that is replicated and calls commit. Replication will not issue the RTC until commit is called if physical RTC's are used, adding to the application latency.

The following two sections describes two different acknowledgement schemes that can be used to implement virtual RTC processing.

4.3.2.4.1 Using Buffer Acknowledgements

Instead of sending an RTC, the collector can track the application of I/O using buffer acknowledgements to determine when all of the I/Os have been applied on the target system, eliminating the need for RTC messages between the collector and the router. Instead of sending an RTC to the router, the collector records the current position of the replication stream to the router. The position is used as a virtual RTC; no additional message is embedded in the stream. The virtual RTC is acknowledged when the router notifies the collector that all I/Os through the recorded position have been applied.

Since the I/O between the collector and router is typically blocked for efficiency, the collector needs only to record the id of the block for the last update sent to the target system for each source transaction. When the commit request for the transaction is received, the collector does not need to send a physical token to the target, but only needs to wait for the buffer acknowledgement prior to replying to the coordinator. If there is a significant delay between the time the last update was sent and the commit request was received, the buffer may have already been sent and acknowledged. In this case, the collector can reply immediately to the RTS. The acknowledgment that all I/Os sent up thru and including that block have been applied serves as the virtual RTC response. This may significantly reduce application latency.

FIG. 55 shows a simplified sequence of events using buffer acks. In the diagram, the collector is sending buffers containing transaction updates. The second buffer in the diagram contains the last data for transaction 1. While the target system is processing the second buffer, the coordinator receives a commit request for transaction 1. It sends an RTC message to the collector, requesting to be notified when all of the data has been applied. As soon as the buffer ack comes back, the collector can reply.

A significant drawback to using the buffer acknowledgment scheme is that the target system must apply all data in the block prior to sending the acknowledgement. If one update is held up (due to a lock for example), the acknowledgement for the block is delayed, holding up all transactions with data in the block. This violates the goal of transaction independence, which requires that independent transactions (transactions that do not access the same data elements) do not affect one-another.

4.3.2.4.2 Using Data Update Acknowledgements

Virtual RTCs can be used without loss of transaction independence if, instead of acknowledging buffers, the target system acknowledges when each data update has been applied. The processing is largely the same as with buffer acknowledgements; the major difference is that the transaction can be released as soon as the target system acknowledges applying the last data update, rather than waiting for all data in the buffer to be applied.

In FIG. 56, TX 1 had two updates. As soon as the last update is acknowledged, the collector knows that all of the data has been applied for the transaction. In this example, the RTC request from the coordinator actually arrives after the data has been acknowledged, so the collector can reply immediately.

This method will significantly increase the traffic from the target to the source due to the increased number of acknowledgements. In the simplistic implementation described above, every I/O on the target results in an acknowledgement when applied.

4.3.2.4.3 Commit Request Processing Using All Data Applied Acknowledgements Since the collector is tracking when all data for a transaction is applied, the target needs only to acknowledge when it has applied all the I/O it has received for each transaction. The collector needs to know that all data has been applied for the coordinated commits algorithm, it does not care about each specific update. In this architecture, like the previous section's architecture, the collector keeps track of the last I/O sent to the target on a transaction-by-transaction basis. However, the target acknowledges only when it has applied all the changes it has received. The acknowledgement includes the transaction and a tag identifying the last I/O received. If the tag matches the last I/O sent, the collector knows all the data sent has been applied. However, if the tag does not match, the collector knows it has sent more data and it needs to wait for another acknowledgement.

Note that target system does not know that it has applied all of the data for the transaction when it issues the acknowledgement: there may be more data in transit that it hasn't received. To further reduce the amount of traffic back to the source, the target could wait a short interval to see if it receives more data prior to sending the acknowledgement.

4.3.2.5 Voted Message

When the source system fails, the target system will have a number of active transactions in various stages of processing. Depending on where the source transaction was when the source failed, the target may or may not have all of the data for the transaction. If the target applies and commits all the active transactions, it could corrupt the database with partial data. If the target aborts all active transactions, it risks removing data for completed transactions on the source. A more intelligent strategy is required.

Part of the strategy is simple: if the target has outstanding data to apply, or if source has not sent an RTC for the transaction and the target replied, the source transaction cannot have been committed. The consumer should abort the corresponding target transactions as well.

If the target has responded to the last RTS sent, or if virtual RTS's are being used and all the data for the transaction has been applied and acknowledged, the situation is more complex. The consumer cannot determine if it received all of the data for the transaction: there may be more data followed by another RTC to follow.

If the source collector sends a 'voted' message to the consumer when it finally responds to the coordinator, the consumer will know that it has received all of the data for the transaction and that the source had requested a commit. The target transaction can be committed without fear of corrupting the database due to incomplete data. Application requirements will determine if this is a feasible course—it may be that all transactions that may have been committed must be manually reviewed. However, if the known complete transactions can be applied automatically, it may significantly reduce the number of transactions that need to be reviewed during a takeover.

4.3.2.6 Commit Processing

FIG. 57 shows the flow as the transaction is committed, first on the source and then on the target. The steps are:

1) TMF writes a commit record to the audit trail, indicating the transaction has been committed.
2) TMF notifies the application that the commit has occurred by completing the commit request. If the commit request was performed with a waited call, the commit procedure returns and the application is unblocked. If the commit request was performed nowaited, a completion indication will be received via a call to AWAITIOx.
3) TMF notifies AUDCOOR that the commit has completed.
4) AUDCOLL reads the commit record from the audit trail and sends it to the router.
5) AUDRTR notifies the appropriate AUDCONS of the transaction completion and AUDCONS commits the target side transaction.

When AUDCOOR receives notification of the commitment, its involvement in the transaction is ended and the transaction is removed from its memory. When AUDCOLL receives notification that the target side transaction has committed, it may advance the restart point to the oldest uncommitted transaction's events in the audit trail.

Transaction aborts follow the same general flow: a record is written to the audit trail, AUDCOOR is notified, the application is notified, AUDCOLL sends the transaction abort control (and possibly the rollback information) to the router, which sends it to the consumer. The consumer may either abort the target transaction, or replay the rollback records and commit the target transaction.

As an alternative to using the commit record in the log, the coordinator could send a commit message to the collector when it receives the commit signal. The advantages to this technique are twofold:

1. the target can commit earlier, freeing up the locks held by the target side transaction, and
2. if the source system fails, there will be fewer hung transactions to process or review.

Note that the commit on the source system should not be held up for the commit on the target system in this case. It should be allowed to proceed normally to reduce application latency.

4.4 Ready to Commit (RTC) Synchronization in one Preferred Embodiment

There are two issues that must be addressed to synchronize the RTC with the data stream from the TMF audit trail. First, the collector is reading the audit trail asynchronously and may be significantly behind when the RTC is issued by the coordinator. Even worse, one cannot easily determine when all of the disk processes have flushed their changes to the audit trail—they start to flush on the same signal that the coordinator uses to generate the RTC token.

FIG. 58 provides an example of the issue. The begin transaction processing has been omitted from the diagram for clarity.

1) The application issues a write to a file on $DATA1. The write is written to the change log for $DATA1.
2) The application issues an update to a file on $DATA1. The update is written to the change log for $DATA1
3) The application issues a write to a file on $DATA2. It is written to the change log for $DATA2.
4) The application issues a commit.
5) TMF issues a prepare request to all that are involved in the transaction: $DATA1, $DATA2, and AUDCOOR.
6) $DATA2 flushes its audit log to the audit trail.
7) $DATA1 flushes its audit log to the audit trail. Note that the flushes can be completed in any order.
8) $DATA1 and $DATA2 signal TMF that the data has been safe stored and is ready to commit.

There is no signal in the audit trail or elsewhere that the data has been flushed to the audit trail. The coordinator does not know when to issue the RTC.

Solving the problem involves tradeoffs between application latency and performance. Several different approaches may be required to allow customers to tailor the replication to their requirements.

4.4.1 Audit Based Ready to Commit Tokens

One solution is to embed the RTC tokens in the audit trail. When TMF sends a prepare request to the coordinator, the coordinator writes the transaction to be checked to a file under another transaction and commits it. When the collector sees the log file entry for the write, it issues the initial RTC request. Note that subsequent RTC requests may be required due to differences in when the disks flushed their logs.

The RTCs can be buffered to reduce the number of writes and transactions, at the expense of increased latency. If, for example, the coordinator buffered the requests and wrote them every 50 ms, adding 20 TPS to the system, the average application latency would be increased by 25 ms.

4.4.2 Time Based Delay

The RTC is delayed by a configurable amount of time to allow the disks to flush. Note that the time must be relative to the time of records in the audit trail, not clock time. For example, assume that 20 ms is allowed for the disk processes to flush to the audit trail. If the coordinator received the request to prepare at time T, it tells the collector to issue the RTC request at time T+20 ms. The collector continues reading the audit trails until either it receives a record whose log time was greater than T+20 ms, or it reaches EOF and the clock time is greater than T+20 ms. Only then does it issue the request to the consumers.

One can also minimize latency by sending multiple RTC requests. Under this scenario, there are two delays. The first is set so that 80%/90% of the time all the data had been received when the delay completes. The second delay, typically much longer, is set so that 100% of the time the data has been received. The first RTC would be issued at the first delay, but the collector would continue to monitor for changes until the second time period has elapsed. If a change is detected between the delays, a new RTC request is issued requiring a new reply to that RTC. For example, if the bulk of data is flushed in 20 ms, but delays of up to 200 ms are possible, the first RTC request would be issued at 20 msecs. If the round trip time is 100 ms, then the collector should have the responses by 120 ms. It would then wait 80 ms before acknowledging the RTC. In this example, the bulk of the requests would have a latency of 200 ms, with a very few going out to 300 ms.

Some learning capability can be built into the collector to further refine the time delay by keeping track of the distribution of deltas between the request to prepare and the last update in the log and adjusting accordingly. Both the initial time to send out the RTC request and total time to wait for data can be modified based upon the tracked information.

4.4.3 Metronome Process

The above two algorithms are not deterministic—there is a chance that portions of a transaction may be delayed and written after the response to the RTC is issued if a disk process is sufficiently delayed in flushing its log. The metronome process offers a guaranteed completion, but at performance penalty.

The metronome process is a relatively simple process that embeds "ticks" in the audit trail providing verifiable checkpoints of when data has been written to the audit trail for each monitored disk. The process embeds the ticks by periodically starting a transaction, writing data to each disk being monitored, and then committing the transaction. When the collector or the consumer sees the data in the audit trail from the Metronome process for a disk, it knows that it has processed data from that disk up to the timestamp in the record. Any transactions that are being monitored for completion that issued the initial RTC prior to the timestamp can be completed.

The monitoring processing (collector or consumer in this case) can either watch for the commit record, or it can have the list of disks being monitored and watch for the I/Os on each disk. In either case, it knows that it has seen all of the data for any transaction whose commit request was issued prior to timestamp embedded in the record. Note that to guarantee all data has been seen for a transaction, all disks that could be involved in the transaction must be monitored for the metronome tick. Using the commit record for the update guarantees that all of the disks will have been flushed, but, it may add some application latency: the time between the last record flushed to the audit trail and the commit record being written. Manually monitoring the disks individually may eliminate that latency. Either method guarantees that all of the I/O for prior transactions have been written to disk.

There are a couple of requirements to make the Metronome efficient and usable:

1) The I/O to the disks should be done nowaited. That is, all disks should be updated, and the process should wait for the completion of the I/O. This also implies that the Metronome files are Enscribe and not SQL.
2) The rate of I/O (see below for timing considerations) and the disks being monitored should be configurable.
3) One may want to have the coordinators join the metronome's transaction. Unlike normal synchronous transactions, the coordinator will immediately vote to commit when TMF sends it the prepare request. The collector can complete any RTCs sent before the Metronome's when it reads the commit for the metronome from the audit trail. This may eliminate several race conditions.
4) The Metronome process should be optional so that those that do not need it do not incur the overhead.

One may want to put feedback in to slow the metronome down when the load becomes too heavy and the collectors begin to fall behind. That will further increase application latency however. Since the metronome tick is embedded in the audit trail, the amount of additional latency it adds is independent of how far behind the application is in reading the audit trail.

4.4.3.1 Race Conditions

If the metronome does not register the transaction with the coordinator, the timestamp of the record must provide deterministic ordering: any event (in this case, the initiation of the commit for the application transaction and the generation of an RTS) that occurs after the metronome "tick" must have a timestamp that is greater than the tick's timestamp. On a single processor system, assigning the timestamp just before writing to disk ensures this sequencing: any RTS request with a timestamp less than the tick must have been issued even before the I/O started. There may be additional RTS's issued between the time recorded and the corresponding record being written to the audit trail—these would be picked up with the next tick.

Nonstop systems, however, are multi-processor systems with independent clocks. These clocks are kept synchronized within a narrow band, but are not in lock step. The ordering cannot be completely guaranteed based upon the timestamps alone. In other words, one determines which RTS's can complete simply by using the relationship:

$$T_{RTS} < T_{Metronome}$$

where:

$T_{RTS}$ is the time the RTS was requested, and
$T_{Metronome}$ is the time the metronome record was written.

There are two solutions to the issue—again, a tradeoff of resource utilization vs application latency. If the timestamps are kept in synchronization within a time band $T_{band}$, the timestamps can be simply offset by that amount. In other words, use:

$$T_{RTS} < T_{Metronome} - T_{band}$$

as the relationship. This increases application latency, since RTS's that occur within the band are being forced to be delayed for a full tick. However, this method adds no additional overhead.

Alternatively, the metronome can work directly with the coordinators to enforce sequencing. In this architecture, the metronome starts the transaction and registers it with all of the coordinators. It then updates the disks as above, and commits the transactions. Every coordinator will get a commit request for the transaction. The coordinators immediately commit the transaction. Any requests to commit application transactions received prior to the metronome's request can then be completed when the metronome data has been seen and the application data applied on the target system.

This alternative adds some overhead—the metronome must register with the coordinators for every transaction and every coordinator must vote on the metronome transactions, but it can reduce overall latency. Any application transaction whose commit started after the metronome generated the timestamp for tick will be delayed until the next tick if using timestamp based processing is used. However, if the metronome transaction is registered, the cutoff point is when the metronome's commit started. Transactions between when the timestamp is generated and the commit will save a full tick in latency.

However, the second alternative can reduce I/Os between the coordinators and, particularly if virtual RTC's are used (see Section 4.3.2.4). With virtual RTC's, the collector does not have to take any action when the commit starts. Instead, the target system sends acknowledgements when it applies data back to the collector. The collector tracks the last update sent for each transaction. When the target acknowledges that it has applied the last data, the collector can respond to the RTC. Since the collector is using the metronome's transactions to determine when it has seen all of the data for a transaction, the coordinator can buffer the RTCs for the application transactions until it sees the commit request for the metronome. Only then does it need to forward the RTCs (and the metronome transaction id) to the collector.

4.4.3.2 Monitoring the Disk Processes

Since the collector knows about the metronome files, it can use the I/O records and the commit records to determine if one or more of the disks are lagging. A disk process may be lagging if there is a significant gap between the start of the I/Os and the last of the I/Os in the audit trail. The collector can issue an alarm when it detects this condition, as the lagging disk will have an impact on transaction times in general.

4.4.3.3 Metronome Timing

Metronome timing should be set at the round trip time or higher. Setting it lower than the round trip time does not decrease the application latency added by synchronous replication and the metronome process. Assume that the round trip time is 100 milliseconds. When the collector sees a tick in the audit trail, it knows that it has seen all the data when it sent out the last RTC, so that it can respond back to the coordinator. Therefore, if the metronome time is set to the round trip (100 ms), and an RTS issued at tick 1+1 ms, the confirmation should be received at t2+1 ms, plus be able to immediately vote to commit. If the tick rate is set to 150 ms, one third of the transactions will be delayed up to a maximum of an addition 50 ms (those that occurred between t1 and t1+50 ms), and two thirds (those between t1+50 ms and t2) will be unaffected since the communication time will drive the response time. The increase in tick interval of 50 ms resulted in an average additional latency of 8.33 milliseconds, One-third see an average increase of 25 ms and two thirds have no increase.

Note that the effect on response time is independent of where the collector is in reading the log. That is, an additional component to the latency. If in the above example, the collector were running 1 second behind with an interval of 100 ms, the latency would be 1.100 seconds: the sum of the collector delay plus the round trip time. Note that if the interval is extended because the collector was running slowly, the latency would be increased even more.

In general, if t=time between ticks; c=communication round trip time; and al=average additional latency time due to waiting for a tick:

If t<c, al=0 (no additional latency).

If t>c, al=$(t-c)^2/2t$.

For t>c: (t−c)/t % of the transactions (those that start at t0 to t0+t−c) will have an additional latency (t−c)/2. For c/t % of the transactions (those that start t0+t−c to t1), the additional latency will be 0.

4.4.3.4 Replicating Metronome Ticks

If the records from the metronome in the audit trail are replicated, the router can use the ticks to determine when it has received all of the I/Os for a transaction. This information can be useful when the source fails. When the source fails, there will be a number of transactions that are in an indeterminate state: transactions where the router has received and responded to an RTC request but has not received the commit record. Replication can be configured to commit or abort those transactions—however, because multiple RTC requests may be sent for a single transaction, the router typically cannot be sure if it has received all of the I/Os for a transaction even if it has received the RTC request. Replicating the metronome information provides such an indication. This allows the target to be configured to commit those transactions that are guaranteed to have all of the data sent, but not to commit those that may still have outstanding data.

4.4.4 ATP Flush Indication

One final option is to get HP to modify OpenTMF to provide a signal when all disks have voted, which means that the data has been flushed to disk. This could be in the form of either an OpenTMF signal or record in the Audit trail.

This solution can be generalized to any database that supports an indication that the data has been written to the log.

4.4.5 Ready to Commit (RTC) Path

There are a number of variations to the architectures based upon where specific functionality lives among AUDCOOR, AUDCOLL, AUDRTR and AUDCONS for implementing the RTC protocol. Each has advantages and disadvantages.

The basic sequence of events is:
1. AUDCOOR receives a PREPARE signal from TMF.
2. A delay of some sort is inserted to insure that the transaction logs have been flushed from the disk process to the transaction log.
3. One or more AUDRTR processes are sent a RTC notification.
4. Each AUDRTR replies with its response.
5. The responses are collated, and when all AUDRTRs have replied positively, or when one responds negatively, the response is returned to TMF.

Some of the functionality is dictated by the existing architecture. AUDCOOR needs to originate the RTC (Step 1), since it coordinates with TMF. AUDCOLL, the collector, is the logical place to put the delay—it knows how far along it is in reading the audit trail. The delay must include AUDCOLL processing the log to at least when the PREPARE signal was received. If the metronome process is used, AUDCOLL will also see the "ticks" from the metronome.

The state of the transaction—whether all I/O has been applied may be maintained in either AUDRTR or the AUDCONS in its pool. If AUDRTR maintains the state of each transaction's I/O, it requires one less hop in each direction for the RTC.

4.5 Minimizing Impact on Non-Replicated Transactions in One Preferred Embodiment Not all data will be replicated synchronously. One needs to reduce the impact of synchronous replication on transactions that contain no replicated data.

Using the non-intercept API, the application developer can do this by not registering the transaction until it is known that the transaction contains replicated data. The intercept library, if it intercepted Enscribe calls, could do the same thing. With this approach:

1. The intercept library intercepts all file open and update calls for Enscribe, as well as the begin transaction calls.
2. The library gets, as part of its configuration, a list of replicated files. It matches the replicated files against the file in the file open calls to build a list of file numbers for replicated files.
3. When an update occurs, the file number is matched against the list of numbers for the replicated file. If it matches, and the transaction has not been joined previously, the join request is then issued to the coordinator.

A similar approach can be used with SQL if the table or tables being updated can be determined by the intercept library. If the table is replicated, the transaction is registered.

Alternatively, the registration can be done immediately by the intercept library when the transaction is begun. With this approach:

1. When the application calls BEGINTRANSACTION or TMF_TX_BEGIN, the intercept library intercepts the calls and sends a request to join the transaction to the coordinator.
2. As in the previous algorithm, the library would get a list of the replicated files as part of its configuration. When OPEN or FILE_OPEN_ is called, the library matches the name passed in against the list of replicated files.
3. When an insert, update, or delete occurs to an Enscribe data file, the library intercepts the calls and matches the file number against the list of replicated file numbers. If it matches, the library records the transaction number.
4. The library also intercepts the call to commit. In addition to calling commit, the library checks to see if the transaction contained any updates to replicated data based upon step 4. If it did not, the library sends a message to the coordinator indicating that this transaction did not have any replicated data.
5. When the coordinator receives an indication from the application that the transaction did not have any replicated data, it votes to commit the transaction without sending an RTC request to the collector.

In addition, the collector will also monitor transactions for replicated data and will reply as soon as possible to RTCs when there is no replicated data without sending requests to the router. Note that the vote must be delayed until the disk processes have had a change to flush the changes to the audit trail and the collector has reached the appropriate point in reading the log (see Section 4.4).

4.6 Registering a Transaction in One Preferred Embodiment

A transaction must be successfully registered prior to the application committing it. Otherwise there might not be a chance to vote. However, it is preferred to minimize the time that the application is blocked while waiting to register the transaction so as to reduce application latency.

There are two places where the coordinator can block application processing prior to commitment. It can block by not replying to the request to register the transaction from the application until after it has successfully registered the transaction with TMF. The application will be blocked until it responds and will not be able to do any I/Os or commits. Alternatively, the application sends a second message just prior to committing to insure the collector has registered the transaction. This may reduce application latency, but increases the number of messages passed between the AUD-COOR and the application.

The first solution (blocking the registration request) will be implemented initially. Depending on the performance, the second option may be implemented as well as a configurable option. However, if the time to register a transaction with TMF is close to the round trip time of an IPC, it will not be worth implementing the second option. In that case, the reduction in latency provided by the asynchronous processing of the registration is offset by the increase in latency caused by the second IPC to confirm the export.

Follow-up: Preliminary statistics indicate that the time to join a transaction is on the order of 1-1.2 milliseconds. Given that an IPC may be on the order of a millisecond, the second solution will not significantly reduce the registration latency.

4.7 Transaction Based Routing in One Preferred Embodiment 4.7.1 Overview

The current method of scaling replication, which is based upon table/partitions, does not ensure transaction consistency. Transactions may be broken up across several consumers, or even among several collectors. Transaction consistency becomes important for synchronous replication. Customers want database integrity with a consistent view of the replicated data—something that is not possible when multiple consumers using multiple target transactions process a single source transaction. Transactional interactions become more important since a source transaction cannot be committed until the data has been replicated—transactions can not be allowed to delay other transactions.

The solution is two-phased: first, a single target transaction will apply the changes for a source transaction to provide transactional consistency. Second, replication will route the transactions to a pool of consumers to minimize the interactions among the transactions. Ideally, one consumer will process one and only one transaction at a time, however, in practice; each consumer may be processing several transactions simultaneously.

4.7.2 Options

A method of routing the transaction to a consumer is required. The determination of the consumer can either be implicit, based upon a well-known algorithm such as hashing or the CPU the transaction originated in; or explicit, determined by a router that routes the transaction based upon the state of the system. The routing can be done at the source (collector) side or at the destination (consumer) side. Each approach has advantages and disadvantages.

Using a hash function or similar method for implicitly routing the transaction may scale better since no central routing process is required. For example, multiple collectors could be used, each collector "knowing" which transactions to handle and send to its consumers and which transactions to ignore. Need more capacity—add more collectors and distribute the load further. Using a router to determine where the transaction should be processed should result in better performance—it can attempt to send the transaction to the least busy consumer and can dynamically add consumers if required. Note that both methods could be used. Transactions could be distributed to collectors based upon a hashing function. The collectors could then be responsible for further distributing the transactions to a pool of consumers based upon their availability.

Where routing takes place also has performance implications. Routing at the destination should provide better WAN utilization (since the communication blocks should be larger, as the transactions are not broken out until after they have been sent).

One Preferred Solution

FIG. 59 shows the preferred solution in a relatively loaded system. The solution actually routes transactions at both the source and the destination to provide optimum scalability. On the source side, collectors use implicit routing rules to determine which transactions they will process. In this case, there are two collectors, one processing odd transactions and one processing even.

Each collector has a single Router/Collector associated with it on the destination system. The Router/Collector parcels the updates for transactions out to a pool of consumers—all of the updates for a single transaction being sent to the same consumer. In the drawing, 3 consumers are shown in each pool, however, in a real configuration, there are likely to be many more consumers in the pool.

This solution:
1. Makes efficient use of the WAN communications. By doing the bulk of the routing of transactions in the destination, the architecture makes the most effective trade-off of data block vs. application latency.
2. Maintains transactional integrity.
3. Has a low level of interaction between transactions. If the consumer pool is large enough, there will only be one consumer per transaction, eliminating interactions. If there are more active transactions than consumers, then it is possible for one transaction to be queued behind a deadlock or slow transaction.

There are two ways of reducing the interactions of transactions if the pool of consumers is too small. First, it may be ameliorated by allowing transactions to be transferred to other consumers when they are queued as follows:
1) When a new source transaction is encountered, the router begins the transaction and records the transaction handle (alternatively, the consumer begins the transaction and sends the transaction handle in the reply).
2) While the consumer is processing data for same transaction, it owns the transaction. When a new transaction is encountered, the original transaction is suspended by a call to TMF_SUSPEND_ and the new transaction is processed.
3) While the second transaction hangs, the router queues the I/O operations for the original transaction.
4) When the router determines that the second transaction is hung, the original transaction's queued I/O operations are sent to another consumer, along with its transaction handle. The new consumer calls TMF_RESUME_ and takes ownership of the transaction.

This solution has a number of performance problems, including:
1) Only one transaction to the consumer can be outstanding at given time, or some significant overhead needs to be added to cancel queued outstanding requests.
2) Buffering will be reduced—more IPCs will be required.

The second method of reducing the interaction is to delay the processing of transactions by batching the I/O operations until either the buffer is full, an RTC request for the transaction is received (for synchronous processing), or a commit/abort is received. This reduces the number of I/Os to a minimum and reduces interleaving of transactions. It does increase the application latency of the transaction since the I/O operations are postponed and done in a batch.

Note that the router will need to buffer transaction data to the consumers. It is possible for a large transaction that is deadlocked to overwhelm the buffering capabilities at the router. In that case, a couple of options are available:
1) Write the additional data to safe storage, and then read it back when the consumer becomes available
2) Abort the transaction on the source system (since this is synchronous replication)
3) Pass the I/Os off to another consumer and have it join the transaction (rather than start a new one). The original consumer would still be responsible for committing the transaction.

Also note that the collector will need to be modified to support TCP/IP point to point, which it does not support now.

4.7.3 Eliminating Ping Ponging

In the current architecture for Shadowbase, the replication transaction ids are identified by the consumer as follows:
The consumer asynchronously begins a number of transactions to be used.
The consumer begins another transaction and writes the available transactions to the TRANSLOG file.
The consumer commits the TRANSLOG file transaction and waits for the commit notification.
The collector will then see the consumer's transaction ids before they are used in the audit trail and can avoid replicating them back to the original system.

This methodology will continue to work in the new architecture. Whichever process starts the transactions will need to be responsible for updating the TRANSLOG file. Note that with large numbers of consumers, each consumer will be processing significantly fewer transactions per second. If the consumer starts the transactions, there will be many more transactions for the collector to process, most of which will be waiting to be used. This argues for moving the transaction start to the router, since it can then dole out the pending transactions to the collectors.

4.8 Asynchronous/Synchronous Transaction Mix in One Preferred Embodiment

4.8.1 Background

The current implementation of Shadowbase provides multi-threading by data partitioning. This means that I/Os that touch the same partition, and by extension, the same data element, are serialized. I/Os and commits to a single partition are applied in the order in which they occurred on the source system.

Synchronous routing will use transaction-based threading. In this scenario, each transaction is assigned a thread, and all I/O (including commits) is done on the thread. This allocation algorithm works well for synchronous transactions that do not allow a transaction to commit on the source until the I/O has completed on the target. The locks held on the source system prevent the updates on the target from being applied out of order. Transaction based routing does not work well for asynchronously replicated transactions since the changes and commits can be applied out of order.

For example, assume the source issues two transactions. Transaction 1 (T1) sets JRH's balance to $10.00 and is immediately committed. Transaction 2 (T2) sets JRH's balance to $1,000,000 and is committed. The data gets transmitted to the router, where T1 is assigned to Consumer A and T2 is assigned to Consumer B. With asynchronously replicated data, depending on the loads of the consumers, the consumers could apply the transactions in the correct order or they could apply the transactions in the reverse order, resulting in the target database having a balance of $10.00 instead of $1,000,000.

In synchronous replication this cannot happen. After the first update on the source file of the balance to $10, the transaction at the source would not be committed until it had been written at the destination. Since both transactions modify the same record, the second could not start the update until the first committed. The locks on the source system are held until the data has been applied on the target, preventing data from being applied out of order.

The same problem can occur if the first transaction was committed asynchronously and the second synchronously. The transactions can get out of order. Note that this problem only occurs if the first transaction is asynchronous: if the first transaction is synchronous, the data will be applied at the replication destination in the correct order.

In a synchronous environment, a data for a source transaction will be replicated asynchronously in the following cases:
1) The application never registers the transaction. This is an application bug, but can occur either if the intercept library was not bound into one or more processes or if the application is using the callable library and misses a call to register the transaction.

2) The Metronome process is not used, and one disk process is significantly delayed in updating the audit trail, allowing some data to be written to the destination after the coordinator has voted to commit, 3) While processing the backlog of transaction data during a restart.

Restart processing is handled in Section 4.16. Cases 1 & 2 are of concern in this section.

4.8.2 Detection of Asynchronous Transactions

The detection of asynchronous transactions differs based upon whether or not the transaction was registered. If the transaction was not registered (case 1), the collector and router can only detect the problem at commit time. If the transaction was registered, the collector can identify the asynchronously replicated portion of the transaction and change its processing accordingly. Asynchronously replicated I/Os are those that are read from the log after the collector has replied to the coordinator's RTC request, allowing the source transaction to be committed.

The router can only identify (on its own) asynchronously replicated I/O at commit time. It can be told by the collector that data is asynchronously replicated

4.8.3 Processing of Asynchronous Transactions

In both cases, the transactions will be sequenced as described below. However, the two cases differ slightly in how they will be handled.

Case 1: In the first case (application problem), an error is logged at commit time. All of the data in the transaction will have been replicated asynchronously possibly without the collision detection functionality available in the second case (see below).

Case 2: In the second case, the I/Os that are being replicated asynchronously will be flagged by the collector as they are sent to the router and consumers. Those I/Os will include both the before and after image, allowing collisions to be detected and handled using the existing Shadowbase collision detection functionality.

4.8.4 Transaction Sequencing

In either case, when a transaction with asynchronously replicated data is identified, one needs to ensure that no conflicting data sent after the commit is written until the commit occurs. There are two methods for ensuring that this is case: the pessimistic approach and the optimistic approach.

4.8.4.1 Optimistic Application of I/O

The optimistic approach assumes there are no conflicts and continues processing updates for other transactions. However, all commits and responses to RTC's after the asynchronous transaction are delayed until the asynchronous transaction is committed. If a conflict occurs, the transactions will be deadlocked. In this case, both are rolled back and the I/O for the asynchronous transaction is applied and committed, and then the I/O for the subsequent transaction. If conflicts are very infrequent, this approach will yield the best performance.

In the above example, T1 (setting JRH's balance to $10) I/O gets queued to Consumer A. The next item in the log is the commit for T1, which is also queued. While those items are queued, T2's I/O is sent to Consumer B, which updates the record. T2's response to the RTC, however, is delayed because T1's commit has not completed. When Consumer A frees up and processes T1's I/O, it cannot because T2 has the record locked. Both transactions are rolled back, and then are re-applied in the correct order.

Note that if the T2's I/O was for a different record, T1 would have been processed without a problem. I/O's are applied in parallel, only commits are forced to be ordered.

It is possible, that when T1 is reapplied, it conflicts with another transaction. In that case, those two need to be rolled backed and T1 applied a third time. When a conflict occurs, one should stop applying I/Os until the asynchronous transaction has been successfully applied.

4.8.4.2 Pessimistic Application of I/O

The pessimistic approach is easier to implement but may have a significant impact on both latency and throughput. When a commit for an asynchronous transaction is reached in the log, processing of subsequent records is delayed until after the commit occurs. In the above example, T1's commit is queued to Consumer A, and nothing is done for T2. When T1 finally commits, T2 is released to a consumer.

The pessimistic approach significantly reduces the parallelism possible when there are a large number of asynchronous transactions replicated. However, if there are only a few transactions replicated asynchronously it significantly reduces the complexity of processing. Phase I will implement the pessimistic approach.

4.8.5 Multiple Routers and Asynchronous Transactions

Running multiple routers in the same replication environment poses additional problems. In this configuration, each router only sees a subset of transactions and may not be able to tell if a previous transaction has been committed or not.

There are several architectures that can support multiple routers, all with significant overheads. Either a centralized coordinator can be used, or the commit logic can be distributed among the routers. Optimistic mode is better suited for multiple routers because of the overhead of determining which transactions have been committed—in pessimistic mode, the advantages of multiple routers may be more than offset by coordination required.

When multiple collectors are reading the audit trail, the assignment of transaction to collector is done based upon a well-known algorithm. It may be CPU based (e.g., collector 1 processes transactions from CPUs 1 & 2; collector 2 processes transactions from CPUs 3 & 4, etc). It may be based upon calculating a hash code from the transaction id. Regardless of the specific algorithm, given a transaction id it is possible to determine the collector, and hence the router that is handling the transaction.

If all routers see all commits, they can determine both when they need to block waiting for the outcome of a transaction and which router is processing the transaction they are waiting for. Suppose, for example, Transactions A, B, and C are committed on the source system in that order; and that router 1 is handling transactions A and B, while router 2 is handling transaction C. When router 2 sees the commit for C, it knows that A & B must be committed first (optimistic mode, commit ordering). It queries router 1 for transaction B, waiting until it is committed. Note that since A must have been committed for B to be committed, it only has to query router 1 about B. This is true in the general case—the routers only care about the immediately preceding commit when blocking.

This means each router will be queried at most once for each transaction it is processing in optimistic mode. If the commits are randomly distributed among the routers (so that the odds of the commit occurring in a router is $1/r$, where $r$ is the number of routers), then the number of messages required for $n$ transactions is $n(1-1/r)$. $1/r$ is the probability of two consecutive commits being processed in the same router; $1-1/r$ is the probability of the commits being in two different routers.

Of course, the simplest approach is not to allow transactions with post-RTC data. This can be achieved either by using the Metronome process or by extending the time period to encompass 100% of the transactions.

4.8.6 Mostly Asynchronous Transaction Processing

The application may want to mix both synchronous and asynchronous transactions. For most transactions, asynchronous transactions against the database may be sufficient, however, for some important updates, the application may want to replicate the data synchronously to insure the state is replicated to the target system. The transactions replicated asynchronously would not incur the synchronous replication latency and would have much better response time.

For example, consider a batch application that is updating a database, perhaps updating account balances with the daily transaction. This may involve a number of intermediate steps that can proceed with asynchronous replication. However, at certain key points, the application may want to make sure all of the changes have been replicated prior to proceeding. The source can force this by making the last transaction synchronous.

As noted above, this type of processing is problematical if replication is configured to be synchronous with routing to the consumer based upon source transaction. However, if transaction independence and transaction consistency is not important, the mixing asynchronous and synchronous replication can be accomplished relatively easily. The application only registers the selected transactions with the coordinator, so only the selected transactions are processed synchronously. As long as the data is being routed based upon DBS (semi-synchronously) and not based upon source transaction, the issues discussed in the preceding sections are moot and data will be applied in the correct order.

In this architecture, the collector is sending the data to a router as it would in a fully synchronous environment. However, instead of routing the data to consumers by transaction, so that each consumer is processing all data for a single transaction, the router sends the data based upon it's DBS, ie, by it's source location. Each consumer is applying all data from a specific set of files, tables, or partitions. This insures that I/Os against a specific table, file, or partition are applied on the target in the same order they are applied on the source, just as in the existing Shadowbase Architecture.

The application controls which transactions are replicated synchronously vs asynchronously by identifying those that are to be replicated synchronously. There are several techniques for identifying synchronous transactions: the application can simply not register transactions that are to be replicated asynchronously, or it can register all transactions and flag those that are to be replicated synchronously. There are advantages to both approaches: the first has considerably less overhead since only a small subset of transactions are registered and track. However, by registering all transactions with a flag, the replication subsystem can identify transactions that were never registered, identifying potential application bugs.

For those transactions that are identified as being synchronous, the standard coordinated commit processing will be applied: the commit will not be allowed on the source system until the target system applies the changes. Not only does this insure that the changes in the synchronous transaction have been applied on the target system, it also insures that all I/Os from asynchronous transactions previously committed have been applied.

4.8.6.1 Transaction Consistency

The current Shadowbase architecture does not support transactional consistency, where for each source transaction replicated, there is one and only one target transaction except in simple, single threaded architectures. High performance replication requires that data be applied on the target system in parallel to get the required throughput. Parallelism is inherent in the multi-cpu Nonstop architecture. Data for a single transaction may be routed to multiple consumers, based upon the source location of the update (DBS routing). Thus, a transaction that updates three tables (or even three different partitions of the same table) may have each update routed to a different consumer that is handling I/O for that specific table or partition. In this case, the single source transaction may result in three transactions on the target system. This is called transaction fanout, and has several disadvantages:

1) In a high volume environment, TMF may need to be reconfigured on the Target system to support more simultaneous active transactions.
2) If one of the target transactions fail, it is difficult to properly backout the other target side transactions, resulting an inconsistent database.

Using the router, the parallelism of the current asynchronous architecture may be maintained while providing transaction consistency. The router, by routing data updates to consumer by DBS or disk, instead of routing by transaction as it would in a fully synchronous environment, can maintain the parallelism and sequencing of asynchronous replication. However, since all data is flowing through the router and it is on the target system, it can be responsible for starting and committing target transactions, allowing for the 1-1 correspondence between target side and source side transactions required for transactional consistency.

Using the previous example of three updates to three different source tables, the data would be applied on the target side in one transaction as follows:

1 The router receives the update to the first table. Since this is the first update for the source transaction, it starts a transaction on the target for the source transaction.
2 The router sends the update, along with the target transaction id it started, to Consumer 1.
3 Consumer 1 joins the transaction and applies the change.
4 The router receives the second update for the transaction. Since it already has started a target transaction for the update, it just sends the update with the transaction id to Consumer 2.
5 Consumer 2 joins the transaction and applies the update.
6 The router receives the third update and sends it and the transaction id to Consumer 3, which joins the same transaction and applies the data.
7 Finally, the router receives the commit record for the source transaction. It commits the target transaction.

Note that this algorithm is not without costs. The consumers must join the transaction for each I/O. Moreover, the number of transactions the router can have active simultaneously is limited. When it reaches the limit, it will need to suspend and activate transactions, adding additional overhead. While the transaction is suspended, no process is controlling the transaction. If the router fails, the suspended transactions will not be automatically aborted by TMF—additional code will be required to identify and abort the hung transactions.

4.9 Request to Sync (RTS)/Partial Commits in One Preferred Embodiment

4.9.1 Overview

The target system, when it receives an RTC request for a transaction, insures that it has received and can apply all I/Os to date for the transaction. Before it allows a commit to complete, Shadowbase Plus SR sends one or more RTC requests messages to insure that the target can apply all of the data for the transaction.

The application can also use a similar approach prior to the commit to insure a portion of the transaction has been replicated by sending a Request To Sync (RTS) request. The application initiates the RTS request (through a call to the Shadowbase Plus SR library); alternatively, this can be configured to be done internally by Shadowbase when some threshold has been reached, for example perhaps every 10,000 events in a long batch transaction. The call will not complete until the target acknowledges the RTS request and all I/Os to date have been replicated (note that the calling application is not necessarily blocked while the call is in progress). Unlike an RTC request, the transaction is not committed when the response is received. The RTS serves as a checkpoint to insure the source and target systems are synchronized at a point during the middle of a transaction. This feature can be used to replicate locks (via an update to the data to be locked that does not change the data) for Intelligent Locking Protocols (ILPs) as described below.

Issuing a RTS from the application may significantly increase the application latency for the transaction, as it adds at least a round trip to the target system to the latency. It also does not eliminate deadlocks when used to replicate locks in an ILP. Since the application of the I/O lags by at least one transit time, applications still can obtain local locks on the same data element while the lock is in transit. See Section 4.14 for more information.

4.9.2 Shadowbase Plus SR Implementation

FIG. 60 shows the data and event flow within the Shadowbase architecture for an application generated RTS. The basic steps in processing are as follows:

1. The application starts a transaction. Note that this transaction may be registered with the coordinator (if it is supposed to be replicated as a synchronous transaction) as described earlier in this specification (this step is not shown, but would typically follow the same path as Step 5).
2. The application then modifies some data (Step 1).
3. The modifications are eventually written by TMF to the Audit Trail (Steps 2 & 3) where they become available to the collector for replication.
4. The application, through the library, generates a RTS message and sends it to the coordinator (Step 5). This call to the library can be synchronous (waited) or asynchronous (nowaited). If done synchronously, the operation will not complete until Shadowbase has replicated the modifications. The coordinator forwards the RTS to one or more collectors (Step 6).
5. The collector needs to integrate the RTS message in flow of replicated data and send it to the router (Step 7). The processing is similar to that done for an RTC message when the transaction is being committed (See Section 4.4 for more information). As with the RTC processing, the collector may issue multiple RTS requests to the router if it finds additional data in the audit trail for the transaction. The collector can also use the data embedded in the audit trail by the metronome process (Step 13) to synchronize the RTS with all of the modifications.
6. The collector sends the modifications from the Audit Trail followed by the RTS to the router (Step 7). The router forwards the modifications to a consumer, which applies them (Steps 8, 9).
7. The router responds back to the collector after the consumer has completed applying the modifications (Step 10). The collector then responds back to the coordinator after monitoring the log to insure that all modifications have been applied (Step 11).
8. Finally, when the coordinator has received messages from all collectors originally sent the RTS, it responds back to the application (Step 12), which completes the RTS operation (or call back from the library to the application).

4.9.2.1 Virtual RTS

Note that the same techniques for virtual RTC's described in Section 4.3.2.4 can be used to eliminate the physical RTS messaging between the source and target system. In this case, instead of embedding an RTS message for the transaction in the stream, the collector notes the last data update that must be applied for the transaction to be synchronized, and then waits for an acknowledgement from the target system that the data has been applied.

4.9.3 Replicated Locks

Some applications use an intelligent locking protocol (ILP) to gain exclusive access to a group of related data items such as an order or an account. However, Shadowbase does not presently replicate lock-only operations. As a result, the ILP may break down in an active/active architecture. Solutions to this problem are described in Section 3.4.5.

4.10 Application Library in One Preferred Embodiment

There will be two versions of the library—the callable version, which will be linked in to the process during the build process, and the intercept library, which will intercept the TMF BEGINTRANSACTION and TMF_TXBEGIN_ calls. Additional procedures may be intercepted as required. The intercept library will be a user library, meaning that it can be specified in the run command. Both versions will be available in non-native, native for the S Series (TNS-R) and native (TNS-E) for the H series flavors.

4.10.1 Design Restrictions

There are a number of restrictions on the design of the libraries due to their nature and requirements:
1) No I/O's can escape from the library.
2) All I/O's need to be timed.
3) No messages can come in via $RECEIVE for the library.
4) Stack utilization needs to be kept at a minimum.
5) No functions requiring the Common Runtime Environment (CRE) can be used, at least in the intercept library.
6) The common library functions (which are to be in a user library), cannot access global or static data.
7) The intercept library cannot retrieve environmental PARAM or ASSIGN messages. The intercept library can be used with any program. PARAM and ASSIGN messages are read at startup by the Common Runtime Environment (CRE), but not all programs use the CRE.

The intercept library must be designed so that it can be used with an application without modification to the application's source code. It must be able to function with only the intercepted procedures being called and with only the parameters normally specified for the procedures. The application cannot be required to call an initialization procedure or to pass additional parameters on the calls to the intercept library.

4.10.2 Initialization

There are a number of configurable parameters to the libraries: which coordinator to use, what to do if replication is not started, etc. Given the above limitations, the library must be able to read the configuration from a well-known place—either a well-known process or a well-known file.

Our approach uses a well-known process (AUDCFG). Using a well-known process is slightly more complicated to implement, but allows the overhead and complication of configuration parsing to be eliminated from the user's application.

4.10.2.1 Configuration Process

The AUDCFG will be a persistent process for fault-tolerance running either under the control of AUDMON or as a generic process under control of the Guardian process monitor. The configuration information will be maintained in a file that is read by the configuration process at startup and whenever the configuration changes.

4.10.2.2 Name Resolution

The name of the AUDCFG is determined by the library following these steps:

1) The process name can be passed in a call to initialize the library. If the name is passed, it is used. Both passing the name and calling the initialization procedure are optional.
2) Next, the library will check to see if there is a DEFINE specifying the process name. If there is, it is used.
3) Finally, if the name has not been passed in and there is no DEFINE for the process name, the library will try to open the default configuration process ($AUDCF).

4.10.2.2.1 Online Configuration Changes

Configuration changes to the library need to be published in a roundabout manner. AUDCFG cannot write to the applications nor can the library maintain an outstanding read on the AUDCFG to be notified of changes. Instead, the library will be notified by the coordinator (AUDCOOR) in the reply to register transaction requests.

This works as follows:

1) Internally, in messages, each configuration file is identified by its modification timestamp. When the application reads the configuration from AUDCFG, it is also sent the timestamp, which it records in memory.
2) When AUDCOOR starts, it opens AUDCFG and gets the current configuration's timestamp from AUDCFG. It then posts another read on AUDCFG to be notified when the configuration changes.
3) AUDCFG includes the timestamp of the current configuration in every reply to the library's requests to register transactions.
4) When the library receives the response, it compares its version of the configuration timestamp against that of AUDCOOR's. If it is different, the configuration is reloaded from AUDCFG.

4.10.2.3 Configuration File Maintenance

Configuration File Maintenance will be done using AUDCOM. Changes to the configuration will not take affect until they have been published or committed and successfully loaded by AUDCFG. One approach is as follows:

1) Three copies of the configuration file are maintained: the previous version, the current version, and the working copy.
2) Changes are made to a working copy of the current configuration.
3) When those changes are to be published, AUDCOM sends a message to AUDCFG.
4) AUDCFG loads the working file and validates the new configuration.
5) Once validated, AUDCFG purges old previous version (since it is now the penultimate version), renames the current version to the previous version, and then duplicates the working copy to the current version.
6) When that has successfully completed, AUDCFG replies to all of the AUDCOOR processes notifying them of the changes to the configuration.

4.10.3 Verifying Library Usage

Synchronous replication can be enabled by simply binding the intercept library with the process. The process will successfully run whether or not the library is bound and the data will be replicated if the library is not bound—it just will not be replicated with the protection synchronous replication affords. In short, it is difficult with a cursory inspection to determine whether an application is using the intercept library or not.

Customers require some mechanism to insure that the library is bound for all of their production code requiring synchronous replication. There are two options: a standalone utility that checks executables and reports those that are not configured for synchronous replication, and an online validation utility that prevents executables from starting when they do not have the library. Users would typically run the standalone utility as part of the installation process when a new release of application software is installed in production and would use the online validation to guarantee that no software is running without synchronous support.

Both utilities share some common functionality. The set of files to be scanned needs to be specifiable using multiple file patterns. Each executable must be checked to see if it uses TMF (looking for one of the intercepted calls in either the program or its associated libraries/DLLS). If it does, the validation needs to make sure it is also using either the intercept or the callable library.

The standalone utility will, by default, report any executable that uses TMF but does not use one of the libraries. It can also optionally display:

1. All programs using TMF that are using the library, along with the library type and version.
2. All programs that don't use TMF.

The online validation will be integrated with Safeguard on HP Nonstop systems and will monitor process creation requests. It will reject any process creation request where the process matches the file name specifications, uses TMF and doesn't have one of the synchronous libraries installed, stopping the executable from being run.

4.11 Latency Tracking in One Preferred Embodiment

A good understanding of the latency added by using synchronous replication is needed. Synchronous replication can add latency to the application's transaction at two points: while the transaction is being registered and during the commit request.

4.11.1 Latency while Registering the Transaction

FIG. 61 shows the latency added while registering a transaction for synchronous replication (see Section 4.6). The total latency T has of three major components:

T1, the time between the begin transaction and when the coordinator issues the request to TMF;

T2, the time between the request to TMF and TMF's response; and

T3, the time between the response and returning control to the application. All three times need to be tracked.

Similarly, FIG. 62 shows the latency due to an asynchronous registration. Here the latency is the sum of two major components: the delay due to requesting the registration (T1) just after the transaction is begun, and the delay due to verifying that the transaction has been registered (T2) just before the commit.

4.11.2 Latency while Committing

FIG. 63 shows a high-level view of the components contributing to additional latency at commit time (T in the diagram). Note that some of the component times may not be directly measurable, either because of clock differences or because no access exists to one of the endpoints.

The total time an application is delayed while committing for synchronous replication has two components: the time the application is delayed due to TMF overhead (TO in the diagram) and the additional delay created by the replication (T in the diagram). TO occurs with or without synchronous replication and can only be determined by measuring the commit delay without synchronous replication.

The delay due to synchronous replication consists of the following subcomponents:

T1: The time the coordinator takes to send the ready to commit (RTC) token to the collector. Note that this time may include a delay to allow the disk processes to flush.

T2, the time it takes the collector to prepare the RTC for transmission to the consumer.

T3, the transit time over the network to the consumer (not directly measurable).

T4, the time spent processing the RTC in the router.

T5, the transit time back to the collector (again, not directly measurable)

T6, the time it takes coordinator to receive the response and to issue the prepared signal.

T7, the time it takes TMF to process the prepared response. T7 is not directly measurable.

The total transit time (T3+T5) can be derived by taking the time between the collector sending the message (the start of T3) and the time it received the message, and subtracting T4. T7 can be estimated by taking the total time of the ENDTRANSACTION call and subtracting the overhead time estimate (TO) and the totals of T1 through T6.

Note that T1 (which includes delay to allow the disk to flush) and the transit time T3-T5 will be the major factors in the latency equation.

4.12 Configuration of One Preferred Embodiment

This section discusses, at a high level, some of the configuration options specific to synchronous replication. It is not intended to be a comprehensive list of the options available; that will come from the detail design phase. Rather, it is intended as an overview of the major configuration options available. A number of the configuration options are discussed in detail in other parts of the description herein; this section tries to pull a summary of the options together.

The design of the configuration options for a complex system is frequently a tradeoff between flexibility and complexity. The architecture favors flexibility. The diverse requirements and architecture of the applications that will use synchronous replication predicate against a more restrictive approach.

4.12.1 Connection Configuration

All of the communication paths between the replication system elements need to be defined by the configuration. In general, each path needs the following elements specified:

1. How to establish communications: the addresses and ports to use for TCP/IP communications, the process name and system for Expand communications.
2. How to communicate: what size the blocks are, how much blocking is done, when partial blocks should be sent, what the windowing factor is (how many messages can be outstanding), and any other protocol related parameter such as timeouts, retries, etc.
3. How to handle failures.

For TCP/IP communications, either process on each end of the communication path should be able to publish or connect, regardless of how the data will flow. For example, the system must support configurations where:

4. AUDRTR publishes a TCP/IP port and AUDCOLL issues the connect request, or
5. AUDCOLL publishes the TCP/IP port and AUDRTR issues the connect request.

4.12.1.1 Application to AUDCOOR Connections

Significant flexibility in mapping applications to coordinators is needed. The mapping needs to be hierarchical (the mapping rules are ordered and the first match is used). It needs to be based upon several application process attributes, including:

1. process name (wild carded)
2. program file name (wild carded)
3. CPUs
4. user id of the process.

One may also want to include:

1. priority
2. parent process name.

Of the options listed above, assigning applications to coordinators based upon CPU (so that the applications are communicating with an AUDCOOR in the same CPU) is probably the most critical. This reduces the number of transactions affected by a CPU failure to a minimum.

4.12.2 Failure Processing Configuration

One major change to the configuration that affects most parts of the Shadowbase replication system is how the system handles failures. There are two sets of parameters that affect failure processing: how the system tries to recover from transient failures, and how the application and replication system handle non-transient failures.

The replication system can be configured to be recoverable or non-recoverable. In the recoverable mode, the application is paused for a short period of time while replication attempts to restart and switch back into synchronous mode. The length of time to pause while the system is recovering is configurable. If the recovery time is exceeded, or if it is configured not to be recoverable, the application will switch to the appropriate failure mode (see below).

The replication system can be configured to operate in one of three modes when a non-recoverable failure occurs. It can be in Max Availability mode, in which case the application continues to operate and changes will be replicated asynchronously when replication becomes available. It can be in Max Reliability mode, in which case the application is blocked until replication becomes available, or it can be in Split Brain Protection mode. In Split Brain Protection mode, the application is paused if it appears that the failure is a network failure, but is allowed to continue if it is a node failure.

4.12.3 RTC Processing Configuration

There are several important parameters for RTC processing that need to be set:

1. How long to wait before AUDCOLL sends the first RTC request to the router.
2. Whether or not the Metronome is used.
3. How long to wait before AUDCOLL sends the response back to AUDRTR.

These parameters help to determine the application's latency and can have a significant effect on the total length of time for a transaction as well as resource utilization.

4.12.4 Metronome Configuration

The Metronome's configuration is relatively simple: it needs to know the list of disks to touch (update) and how often to perform the updates. Note that unlike most processes, the Metronome's configuration may want to be file-based so that it can be started outside of a Shadowbase environment.

Slow disk detection by AUDCOLL is also possible using the Metronome. Since all updates are done almost simultaneously, if one disk's audit data is significantly delayed after the others, AUDCOLL can issue a warning message. The amount of the delay should be configurable.

Both the disks used and the update frequency should be changeable online.

4.12.5 Consumer Pool Configuration

The consumer pool is a new concept to Shadowbase. It is akin to Pathway's SERVERCLASS concept. The pool needs to be configured with the number of static and number of dynamic consumers, along with parameters for managing the pool, including:

1. The CPUs the consumers can be started in.
2. The names the consumers can be assigned.
3. How long a dynamic consumer should be allowed to be idle before stopping.
4. The DBS group assigned to the consumer pool.

4.12.5.1 DBS Group/DBS Configuration

Since every consumer needs to be able to handle I/O to any file or table that is being replicated synchronously, every consumer needs to know all of the DBS information for the replicated target. However, during a restart, AUDRTR needs to be able to route based upon a low-level DBS for a file or even just a partition of a file. The user will need to specify the DBS (as is done now), and then those DBS's need to be grouped and assigned to a consumer pool. As part of the DBS specification, the user should also be able to restrict the processing of that specific DBS to a specific CPU or set of CPUs during a restart. The router will select a consumer in the specified CPUs to process the DBS while replicating transactions asynchronously during a restart.

4.13 Fault Tolerance and Failure Analysis in One Preferred Embodiment

Synchronous replication must survive a single point of failure. The replication architecture builds on the features provided by the NonStop architecture to provide the fault tolerance There are a number of failure modes that need to be analyzed when designing for fault tolerance. These include:
1. transaction failure (transaction was aborted)
   a. by the application
   b. by the system
   c. by Shadowbase
2. dead lock and data collision between transactions
3. process failure:
   a. application
   b. coordinator (AUDCOOR)
   c. collector (AUDCOLL)
   d. router (AUDRTR)
   e. consumer (AUDCONS)
   f. application configuration process (AUDCFG)
   g. metronome
4. processor failure
5. node failure
   a. primary (unidirectional replication)
   b. backup (unidirectional replication)
   c. active-active node
6. network failure
   a. unidirectional replication
   b. active-active replication These are discussed in the following subsections. Other hardware failures, such as the failure of a disk drive or communication controller, are handled by the NonStop architecture and are not discussed herein.

4.13.1 Recovery Modes

The action to be taken on a major failure is dependent on the application requirements. Shadowbase's synchronous replication will support the following modes of operation when an outage occurs:
1. Maximum reliability: all transactions are forced to be synchronous. This mode significantly reduces the availability of the system, as transactions are blocked or aborted when synchronous replication is not available.
2. Maximum availability: transactions are allowed to proceed when replication is not available and will be replicated asynchronously when replication becomes available and is restarted. See Section 4.16 for more details on restart processing
3. Split brain Protection: This mode balances availability with the protection against the "split brain syndrome" that can occur in active/active systems when the network fails. 'Split brain syndrome' occurs when a network failure isolates both sides of a redundant system and both sides continue processing independently Split brain protection will allow transactions to proceed asynchronously in the event of node failure, but will block and abort transactions in cases where the failure may be caused by a network failure. Note that it is not always possible to distinguish between a remote node's failure and a network failure—both can cause complete loss of communications.

Since the goal is to eliminate collisions when the network recovers and the nodes are re-synchronized, one node can be designated as the survivor and can be allowed to continue processing. When a network failure occurs, the designated survivor node will continue processing and will replicate asynchronously to the other nodes. The other nodes will remain blocked from processing.

In addition, the system needs to handle minor recoverable outages such as when a process fails and is restarted with minimum impact to the application.

Commands to change the current processing state allow the operator or a watchdog process to control the recovery. A synchronous replication system can be in one of four states:
1. blocked—no transactions are allowed,
2. replicating synchronously—the normal state,
3. replicating asynchronously—transactions are not being registered for synchronous replication, causing the data to be replicated asynchronously.
4. recovering—the application is temporarily blocked to allow recovery to take place when the router or collector is restarted.

When the target node is unavailable, the system will automatically enter either the replicating asynchronously or blocked state depending on the type failure and the operational mode. When replication becomes available, the system will return to the replicating synchronously state by going through the restart steps documented in Section 4.16. In the event of a router or collector failure or transient network outage, the system will enter the recovering state. During this state, the application is temporary blocked while the system attempts to get synchronous replication restored. If it succeeds, the application is unblocked and replication proceeds. If synchronous replication cannot be restored in a timely fashion, the system will revert to either the blocked or replicating asynchronously mode. FIG. 64 shows the logic for determining which mode is entered after a failure. At any time, it can be commanded to enter either the blocked or replicating asynchronously state.

Normally, state change commands are used after a failure to control processing. For example, if a network failure occurs with the system in split brain protection mode, both sides of target will enter the blocked mode. A watchdog process or operator can pick one of the nodes to survive, and switch it into replicating asynchronous mode, allowing it to continue processing. The other node will remain blocked, and its users switched over to the active node.

The commands can also be used in emergencies while in the replicating synchronously state. If, for example, the collector falls behind in reading the audit trail and the commit times became too long, the replication system can be switched into replicating asynchronously state, eliminating the application latency. If the system is commanded into either blocked or replicating asynchronously from synchronous replication, it will remain in that state until commanded back—it will not automatically switch back.

FIG. 65 shows the relationship among the modes.

4.13.1.1 Blocked Mode Processing

When the replication system is in blocked mode, the library and coordinator are responsible for blocking all transactional activity for the synchronously replicated transactions. The coordinator will abort all transactions in progress. The library will block new requests to register transactions if the coordinator is not available. The coordinator will block the registration requests when it does becomes available.

The length of time the registration call at the application will block prior to returning is configurable from not waiting at all to waiting until synchronous replication is available. The library will return an error if the time limit is exceeded before synchronous replication is restored. If the transaction was started as part of the same library call (such as when BEGINTRANSACTION is intercepted), it is aborted prior to the return.

Internally, if the coordinator is not available, the library procedure will periodically (also configurable) try to open the coordinator until it becomes available. Once opened, the library procedure will periodically try to register the transaction with the coordinator. The coordinator will reply with a status indicating that synchronous replication is not available.

4.13.1.2 Recovering Mode

Recovering mode is similar to blocked mode—the application is blocked from creating new transactions and committing existing transactions. The pause is temporary, however, until the system can recover from the transient outage. Unlike blocked mode, existing transactions are not aborted by the coordinator. Instead, the coordinator will also delay voting on any existing transaction for a configurable amount of time, to give replication a chance to be re-established. If synchronous replication cannot be restored within the configurable time limit, the system will enter either blocked or asynchronously replicating mode, depending on whether max availability or max reliability is selected.

In recovering mode, the only transactional data being replicated should either be for active, synchronous transactions and committed or aborted transactions. If TIDFILE processing is enabled, allowing committed transactions to be skipped on the target side, the router should be able to go immediately into semi-synchronous mode.

4.13.2 Failure Determination

The action taken when a failure occurs often depends on the type of failure. For example, if the system is configured with active/active replication, split brain protection, when the network fails, the replication system should go into blocked mode, to prevent updates from occurring on both systems independently. However, if it is a node failure instead of a network failure, the replication system should go into replicating asynchronously mode. In addition, if it is a process or processor failure, the system should go into recovery mode to attempt to recover from the issue.

Unfortunately, network, node, processor, and process failures all share the same basic symptom: loss of communications with a remote process. Additional monitoring tools are required to make the determination. FIG. 66 shows the basic connection between the collector and the router. Anywhere the connection crosses a border of an entity indicates that a failure of that entity will cause a loss of connection. For example, a failure of the network, \TARGET, \TARGET's CPU 0, or AUDRTR will cause a loss of connection at AUDCOLL. Similarly, a failure of the network, \SRC, \SRC's CPU 1, or AUDCOLL will cause a loss of connection at AUDRTR. Adding a monitor process, running in a different CPU, as shown FIG. 67, allows the system to distinguish between network and node failures, on the one hand, and process and processor failures on the other. Since the monitor is running in a separate CPU and has a different connection through the network, a process or process failure still leaves a communication path between the \SRC and \TARGET system to get status. Further, the monitor can distinguish between a CPU failure and a process failure, if that information is required for recovery. However, in that configuration, one still cannot distinguish between a node and network failure. Both cause loss of connection for both the replication process and the monitor.

Determining if the failure is a node or network failure matters most for split-brain protection. In an active/active configuration, you may not be able to tolerate two nodes running independently, particularly if the data is not partitioned. There are two basic methods of resolving the issue—adding a second, completely independent path between the systems, or adding a third observer outside of the two nodes.

FIG. 68 shows one configuration with two networks—one for replication and one for monitoring. If the replication network fails, each system can still determine the status of the other through the monitoring network. If the node fails, all communication is lost. Note that the monitoring network must be highly reliable (to prevent a double network failure from appearing as a node failure), but can have relatively low bandwidth.

Adding an independent observer can help determine whether the failure is a node or network failure. FIG. 69 shows a configuration with two watchdog systems collocated with the NonStop systems. If \SRC loses contact with \TARGET, but maintains contact with \TARGET's watchdog, and the watchdog loses contact with \TARGET, then one can be sure that it is a node failure. Otherwise, it is likely to be a network failure.

While FIG. 69 shows the watchdog as a dedicated system, it could also be a third replication system in a three node active/active configuration. In this configuration, if a node loses the connection with one node but not the other, it assumes the node failed. If it loses contact with both nodes, it assumes a network failure. This algorithm can obviously be extended to any N node active/active configuration, where N>2.

Chapter 5 of the book by B. D. Holenstein, W. H. Highleyman, P. J. Holenstein, entitled "Breaking the Availability Barrier II—Achieving Century Uptimes with Active/Active Systems," AuthorHouse; 2007, further describes failure detection and analysis that covers additional variations of the basic patterns discussed here.

4.13.3 Source Transaction Failure

Transaction failures (aborted transactions) on the source are already handled by Shadowbase: when the transaction is aborted on the source system, an indication is written to the transaction log, where the collector will replicate it to the target system. When the target system sees an abort record for a source transaction, it will abort the corresponding destination transaction(s). AUDCOOR will receive an aborted signal from TMF, indicating that the transaction has been aborted. Caveats:

1. Normally, there is a one to one correspondence between the source and destination transactions. However, when the router is in asynchronous mode at startup, there may be multiple destination transactions for a single source transaction. The router must send the abort record to all consumers involved in the transaction.
2. The coordinator must be able to handle an aborted signal at any time during the transaction's lifecycle. It is conceivable that the signal may even be received before the registration has completed with TMF.

Note: when a transaction aborts on a NonStop system, the rollback data is written to the log. Instead of aborting the target transaction, the consumer can be configured to play back the rollback data and commit the transaction.

4.13.4 Target Transaction Aborts

The source transaction will not be applied until all I/Os associated with the transaction have been applied to the target. If the transaction fails at the target during the application of the I/Os, the RTC requests will be NAK'd and the coordinator will vote to abort the source transaction. The source and target databases will remain in sync. TMF notifies the application of the abort by returning an error from the commit call. It can then take the appropriate action such as retrying the transaction or notifying the user.

There is a small window between the source commit and the destination commit where the databases may get out of sync. If the target commit(s) cannot be applied, the replication system should be reset (as if it is being restarted) so that the source transaction can be reapplied.

4.13.4.1 Early Aborts for Batch Transactions

If the target aborts the transaction earlier, the router will send a message to the collector indicating that the transactions has been aborted on the target. If the collector has received an RTC, it can respond immediately to have the coordinator abort the transaction. If the collector hasn't received an RTC, it does not know which coordinator has joined the transaction. The collector can, however, cause the source transaction to be aborted by:

a. Waiting until a Request To Sync (RTS) or RTC request is received and responding with a NAK.
b. Broadcasting the abort to every coordinator. If the coordinator is controlling the transaction, it will then vote to abort it.
c. Commanding TMF to abort the transaction through TMFCOM or SPI or any other programatic interface.

In some cases, a target side abort may want to be treated as a replication failure, similar to the target going down. In this case, replication may switch states as if the collector failed.

4.13.5 Process Failures

4.13.5.1 User Application

If the user application fails, all non-committed transactions owned by it will be aborted. These can be handled by the replication system in the same way it handles any other transaction aborts. The coordinator will be notified (via a close message) of the application failure. Caveats:

1. The coordinator needs to be able to handle the notification of an application failure at any point.
2. The coordinator cannot assume that all of the transactions associated with the application will be aborted. If the transaction is in the process of committing, it may not be aborted.
3. The coordinator cannot assume any ordering of notifications of aborted transactions and application failures. It needs to handle transactions that have no associated application.

How the application is restarted and recovered after a failure is application dependent. For a standard Pathway server, the process will be restarted by PATHMON.

4.13.5.2 Coordinator

TMF aborts all of the active transactions registered by the coordinator when it fails. The source transaction aborts will flow through the replication system as described above. The coordinator will be monitored and restarted by AUDMON, the Shadowbase monitor.

The application can be configured to use a backup coordinator when its primary becomes unavailable. This will avoid the delay inherent in waiting for the failed coordinator to be restarted.

Caveats:
1. The application library should block while re-connecting to the coordinator after a failure.
2. The application library needs to be able to re-connect to the coordinator (or to its backup coordinator) on any call, since the only notification the library will receive will be on an I/O to the coordinator.
3. If a backup coordinator is configured, a method is needed to switch back to the primary. The backup coordinator can embed a command to switch back in a reply or the library can check for the primary's availability periodically and automatically switch
4. The collector needs to be able to handle the loss of the coordinator, essentially ignoring any RTC responses for the failed coordinator's RTCs.

4.13.5.3 Collector

The collector is monitored by AUDMON, the Shadowbase monitor. If it fails, it will be restarted. However, when it fails, replication to the target system stops and needs to be restarted. At restart, the collector will resend data in the audit trail from the last restart point. The router will go through the three standard modes at startup: replicating asynchronously, semi-synchronously, and then synchronously. See Section 4.18—Recovery Processing for more information.

Caveats:
1. On a collector failure, the target system should abort all active transactions and clear all buffered data. The data will be resent.
2. If recovery is configured, the application will be paused until synchronous replication can be re-established (i.e., until the router goes into semi-synchronous mode). If synchronous replication cannot be established in a timely fashion, replication will go into either blocked mode (maximum reliability) or replicating asynchronously (maximum availability).
3. If recovery is not configured, replication will immediately go into blocked mode or replicating asynchronously.

4.13.5.4 Router

The router is monitored by AUDMON, which will restart it if it fails. However, when it fails, replication needs to be restarted as the data it had buffered is lost and needs to be retransmitted. Once the router is restarted and the collector has re-established the connection, it needs to send all of the audit trail data from the last restart point to the router again. This data will be processed by the router in asynchronous mode until the resend is mostly completed. The router will go through the three standard modes at start: replicating asynchronously, semi-synchronously, and then synchronously. See Section 4.18—Recovery Processing for more information.

Caveats:
1. On a router failure, the consumers in the consumer pool need to abort all active transactions and clear all of their buffers. They should remain running.
2. The collector can fail and restart or it can reset itself to the startup state.
3. In a future implementation, the router may be made fault tolerant, either by safe storing data or by being converted into a process-pair. In this case, replication will be able to continue without resending all data.
4. If recovery is configured, the application will be paused until synchronous replication can be re-established (i.e., until the router goes into semi-synchronous mode). If synchronous replication cannot be established in a timely fashion, replication will go either into blocked mode (maximum reliability) or into replicating asynchronously (maximum availability).

5. If recovery is not configured, replication will immediately go into blocked mode or replicating asynchronously.

4.13.5.5 Consumer

When a consumer fails, the active transactions in the consumer are aborted. When the RTC is received for the aborted transactions, the router will reply with an indication that the data could not be applied and the source transaction will be aborted.

The consumer is monitored by AUDMON and will be restarted. While it is down, other consumers in the pool will be used to process new transactions.

If the transactions are relatively small, one may be able to buffer the I/O at the router for each transaction. In that case, the consumer's I/O can be reapplied by a different consumer, allowing the transaction to be committed. One possibility is that a configurable pool size be provided for saving transaction I/Os at the router. If the transaction's I/O records are fully contained in the pool, the I/O is reapplied and the transaction is allowed to proceed. If the pool has been filled and the I/O removed, the transaction is aborted.

4.13.5.6 Application Configuration Process

The Application Configuration Process is a persistent process managed by AUDMON. It may also be managed as a Generic Process by the NonStop kernel. Since the configuration is file based, it is simply restarted.

The coordinators will have the configuration process open to report configuration changes to the application. When they detect the restart, they will re-open the process.

The application only needs to communicate with the configuration process when it is first initialized and when the configuration changes. If it is unavailable, the library should retry until it is successful.

4.13.5.7 Metronome

The metronome runs as a persistent process, either under the supervision of AUDMON or under the NonStop Persistent Processor Monitor. It is simply restarted with no other effect.

4.13.6 Processor Failure

In general, a processor failure translates to process failures for the processes running in the failed processor. If, for example, the processor had a coordinator and a collector running in it when it failed, the coordinator would be restarted in a different CPU as described above, and the collector failure would be handled as described in Section 4.13.5.3 above. AUDMON is responsible for restarting the processes in a different CPU when the assigned primary CPU fails.

4.13.7 Node Failure

Node failures are serious failures. Data replication stops and may be unavailable for a significant period. The action taken depends on the node that failed, the replication system's configuration, and whether the application is configured for unidirectional replication or is operating in an active/active mode.

In unidirectional replication, one node, the primary, is actively updated by the application while the other node, the backup, is in a quiescent state receiving the updated data. Replication is one way, from primary to backup.

4.13.7.1 Primary Node Failure (Unidirectional Replication)

When the primary node fails, the backup node becomes active as the application is switched to use it. The router and collector pool will abort all transactions in progress that have not had an RTC request received. The disposition of transactions that have not been committed but have had an RTC reply sent (hung transactions) is configurable. In the default configuration, the transactions will be aborted since there is no confirmation that they have been committed on the primary node (or even if all of the data has been received for the transaction). Replication can also be configured to apply the transactions, since the RTC request implies that a commit request was generated for the transaction. The transactions in question will be logged so that they can be reviewed or reapplied manually.

As part of the application switchover, the replication system will be shutdown. Recovery back to the primary system is application dependent and requires significant coordination. Steps to recovering include:

1. The database on the primary must be synchronized with the changes from the backup made while the primary was down by starting replication in the reverse direction; using a data loader such as SOLV, or by manually copying the data.
2. The application must be stopped on the backup.
3. Replication from the primary to the backup must be restarted.
4. Finally, the application must be restarted on the primary.

4.13.7.2 Backup Node Failure (Unidirectional Replication)

When a backup node fails, the replication system on the primary node will enter replicating asynchronously mode (max availability or split-brain protection configured) or blocked mode (max reliability configured). In replicating asynchronously mode, all transactions are allowed to commit, even those in progress. When the backup is restored, the transactions' data will be sent and processed asynchronously as part of the restart. In blocked mode, in progress transactions are aborted, and the application is blocked from starting new transactions during transaction registration. See Section 4.13.1 Recovery Modes for more information on the modes.

4.13.7.3 Active-Active Node

An active/active node functions as both a target and source for replication. The actions performed for an active/active node failure are a combination of those discussed in the primary and backup node failure sections, above.

Targets of the failed node will behave largely as the backup node does when the primary node fails. The router and collector pool will abort any active transactions where it has not received an RTC request.. Those that have had an RTC reply issued but have not been committed will either be applied or aborted, depending on the configuration. Finally, the router and collector pool will be returned to their initial state (all buffers cleared, no transactions active) in preparation for when the node is restored.

Sources to the failed node will either enter the replicating asynchronously mode (max availability or split-brain protection configured) or blocked mode (max reliability configured), as described above.

When the failed node is ready to be restored to service, its database must be synchronized. As noted above, the database may be synchronized by using an online loading utility such as SOLV, by replicating the queued transactions asynchronously, or by manual copying of the files. If transactions are replicated asynchronously, coordinated manual review of the data in the hung transactions may be required to insure that both systems are synchronized.

Once the database on the failed node is restored:

1. Replication into the failed node is started and allowed to run until data is being replicated synchronously.

2. Replication from the node is started and allowed to run. There should be nothing to replicate, so synchronized replication back to the running node should be available almost immediately.
3. The application is started on the failed node. Finally, users are switched back over to the failed node.

4.13.8 Network Failure

4.13.8.1 Transient Errors

If the replication system is configured to try to recover from a failure, the system will attempt to reconnect after a network failure. If successful within a configurable time and number of attempts, the system will enter recovery mode to recover from the error. The application will be paused during the reconnection and recovery periods.

If the replication cannot re-establish the connection, the failure is handled as described below.

4.13.8.2 Unidirectional Replication

In unidirectional replication, a network failure is treated as an opposing node failure at each node. At the primary node, the network failure is treated as if the backup node went down (Section 4.13.7.2); at the backup node, the failure is tread as if the primary failed (Section 4.13.7.1). Depending on the type of network failure and the user's access to the application and database, the application may either continue to run on the primary node or failover to the backup node.

Recovery is as described in the above sections as well, depending on which node the application was running on after the failure.

4.13.8.3 Active-Active Replication

In active-active replication with spit-brain protection enabled, a network failure puts all affected nodes into blocked mode to prevent each isolated node from independently updating data. The operator can decide which node or nodes should be active, and switch them to replicating asynchronously mode, allow the application to continue running.

If split-brain protection is not enabled, a network failure at a node is treated as if all the other nodes have failed, as described in Section 4.13.7.3, above.

Recovery follows the steps described in Section 4.13.7.3 as well.

4.14 Deadlock Issues in One Preferred Embodiment

Deadlocks can occur when the same data is requested under multiple transactions—if transaction A locks record 1 and then requests a lock on record 2 while transaction B locks record 2 and then requests a lock on record 1, both transactions may end up blocked waiting for the other to complete. In this case, one usually times out and aborts, allowing the other transaction to continue. See Chapters 9 and 10 of the book by W. H. Highleyman, P. J. Holenstein, B. D. Holenstein, entitled "Breaking the Availability Barrier: Survivable Systems for Enterprise Computing," AuthorHouse; 2004, for more information on deadlocks.

With synchronous replication, when a dead lock occurs on the target, the source transaction will always be aborted as well. The coordinator will not vote to commit until it receives confirmation that the consumer has completed the I/Os associated with the transaction. If a deadlock occurs and the I/Os time out on the target system, the coordinator will abort the source transaction. The databases will remain consistent.

4.14.1 Synchronous Replication Deadlocks

Synchronous replication can increase the number and severity of deadlocks in an Active/Active configuration if the database is not partitioned or a global locking scheme is not enforced. The normal method of deadlock avoidance when using a single database—ensuring that transactions acquire the locks in the same order—does not work. In fact, with active/active synchronous replication, transactions that update a single row in a single table can become deadlocked. Assume, for example, that an application is running without replication that only updates one table. If two transactions update the same row, one transaction will lock the row first and the second will queue. As soon as the first transaction commits, the second transaction will proceed. There is no deadlock and no possibility of a deadlock. FIG. 70 illustrates the flow.

FIG. 71 shows the same example in an active/active replication situation. This time, transaction 1 originates in one system and transaction 2 in the other. Note that both are successful in locking and updating their local row. However, when the updates from the two transactions replicate, neither can be applied since both queue behind the local updates. Neither transaction can complete the commit request until the remote update applies, and neither remote update completes until the local transaction commits. The two transactions are deadlocked.

Without additional intelligence, both transactions fail and abort when the remote updates time out.

The following sections describe some methods of either preventing or recovering from synchronous replication deadlocks.

4.14.2 Database Partitioning

Partitioning the application and database so that each node is updating a unique set of rows eliminates synchronous replication deadlocks. There are many examples of partitioning, including:

1. Geographic partitioning—records are partitioned based upon geographical access and are updated by the system that is closest. For example, if one node is located in New York and the other in California, the New York node could handle customers with east coast phone exchanges and the California node could handle customers with west coast exchanges.
2. Key partitioning—records are partitioned based upon the key. For example, node 1 could handle odd numbered customer ids and node 2 could handle even numbered ids.
3. Node ownership—records are processed by the node that originally created the record. The creating or owner node can be embedded in the key, allowing the ownership to be easily determined.

Since each node is updating its own distinct set of rows, there is no possibility of a synchronous replication deadlock. Transactions originating on different nodes cannot interact.

4.14.3 Global Locks

Implementing a global lock or mutex to serialize updates to a single row across nodes also eliminates synchronous replication deadlocks. Prior to updating its local copy of the database, the application acquires a global lock on a common object. The lock grants exclusive access to the row or rows for modification across all nodes. Once the lock is granted, the application updates its data, which is replicated to the other nodes. Other transactions accessing the same data queue on the lock until the first transaction commits.

FIG. 72 illustrates replication with a global lock.

An intelligent locking protocol (ILP) can reduce the amount of global locking that is required. For example, an application can lock the order header while updating the line items for the order. By locking the order header, the application can have exclusive update access to all of the items within the order and does not need to obtain global locks on each individual item.

The application can implement global locks by designating one of the copies of the database as the master. All nodes obtain their global locks on the master copy, but update the local copy. If the master copy fails, one of the other copies becomes the new master copy.

4.14.3.1 Global Lock Manager

Shadowbase Plus SR may also implement a global lock manager. Instead of using the file system for locking, one or more processes serve as lock managers. The concept is straight-forward: the manager maintains a list of locks and lock requests. When an application requires a lock, it sends a request to a manager. If the requested object is not in the lock manager's table, it is added and the lock is granted. If some other process has the object locked already, the lock manager queues the lock request until it can be granted. When the transaction is completed, the associated lock is removed and the next process in the queue is granted the lock.

Multiple lock managers can be used for scalability by partitioning the lock objects and assigning each manager a different partition of the database to manage. Objects are specified by a type and value. The table name and primary key value can be used to specify the lock, for example. Alternatively, an order application could lock an order/order id, or a customer/customer id combination. FIG. 73 shows an example lock request where the objects being locked are partitioned among four lock managers. Note that the lock request goes through the coordinator. The coordinator is responsible for routing the request, and, since it knows when the transaction has been committed, can also release the lock without any additional application involvement.

4.14.3.2 Distributed Lock Manager

FIG. 74 shows a variation on the Global Lock Manager architecture. In this architecture, the locks are managed locally on each node, and the lock managers on each node coordinate the locks globally. This architecture can provide better utilization of the communication bandwidth through blocking and can provide better application performance if optimistic locking is used.

The distributed lock manager can either be optimistic or pessimistic in granting locks. In the pessimistic mode, the manager will verify and lock on the remote system before granting the lock to the application. In the optimistic mode, the manager assumes that there is no lock on the remote system and grants it immediately if there is no other local lock. It then requests the remote lock, and, if it can't get the lock because the remote site has already granted the lock, instructs the coordinator to abort the transaction.

4.14.4 Designated Winner

In the synchronous replication deadlock example, both transactions failed when the locks on the replicated data timed out. Recovery from a timeout is application dependent; one possibility is for the application to retry the failed transaction. If the application retries both transactions at the same time after they failed, it is likely that they will deadlock and fail again. In a single node deadlock situation, when one transaction times out, the other is likely to be released and succeed. Retrying the failed transaction in this case should succeed since the deadlock has been resolved.

A winner can be designated by providing variable timeouts on a transaction basis, essentially designating a winner by forcing the other transaction to timeout first. This will allow the winner to proceed and eventually commit. The application can retry the losing transaction, which should then succeed as in the single node case.

There are a number of ways of varying the timeouts to insure the winner. All regard that the difference between the timeouts on the transactions be greater than the variation in transaction latency (transaction latency is the time between the update on the source system and the update on the target). One method is to extend the source transaction's time by the maximum latency on the source system but not on the target so that the timeouts on both sides happen at approximately the same time. This algorithm is shown below. Assume, for example, that the latency time is 0.1 seconds, the designated winner's nominal timeout is 1.2 second and the loser's nominal timeout is 1.0 seconds. The following table provides a timeline for two transactions started at the same time.

TABLE 3

| Time | Node 1 (Winner) | Node 2 (Loser) |
|---|---|---|
| 0.0 | Local record updated and locked by application. Will timeout at 1.3 seconds (1.2 seconds nominal + 0.1 seconds latency) | Local record updated and locked by application. Will timeout at 1.1 seconds. (1.0 seconds nominal + 0.1. latency) |
| 0.1 | Replication from Node 2 received. Will timeout in 1 second at 1.1. Queued behind local update | Replication from Node 1 received. Will timeout in 1.2 seconds at 1.3. Queued behind local update. |
| 1.1 | Remote update times out for the designate loser transaction. | Local update times out for the designated loser. |
| 1.1+ | | Remote update of designated winner succeeds. Node 1 notification sent. Application retries failed transaction. Local update succeeds. |
| 1.2 | Commit for designated winner completes after notification from of update from Node 2. Replication from Node 2 received and applied. | |
| 1.3 | | Commit for retried transaction completes after notification from remote system. |

The designated winner may be determined by the originating node, by the application, by a combination of the two or some other algorithm. In the first case, one node is picked to be the winner and is given the longest timeout. If there are multiple nodes, each node can be given a different timeout to establish a hierarchy for timeouts. Alternatively, the application may assign a timeout based upon some transaction criteria. For example, a banking application may always process transactions from an ATM but will allow operator initiated transactions to timeout. Transactions from ATMs would have the longer timeout. Judicious use of timeout values can allow a combination of factors to be used. In all cases, the difference between any two timeouts must be greater than the replication latency. Shadowbase Plus SR will provide an API to allow the application to set the timeout. In addition, if the application uses one of the calls that starts the transaction, Shadowbase Plus SR will support configurable timeouts assigned by the application process or by the collector.

4.14.5 Replicating Read Locks

Lock information is not typically available to replication engines such as Shadowbase. Locks are typically not logged to audit trails for audit trail based replication and are not necessarily available as a trigger for triggered based replication. This is not an issue in many, if not most, applications. If the locked record or row is updated on the source, the update will be replicated, causing the record to be locked on the target as part of the update. However, if the application relies on locks for rows that will not be updated (read locks), the lock must be simulated and replicated as described in Section 3.4.5.

4.15 NonStop Replication Issues with One Preferred Embodiment 4.15.1 Issues with Unique Alternate Keys In most cases, a failed I/O does not appear in the audit trail. For example, if the application tries to write a duplicate record into a key-sequence file, the file system will return a duplicate key error and no data will appear in the audit trail for replication.

There are cases with alternate keys where the I/O on the base file succeeds and is written to the audit trail, but the corresponding I/O to update the alternate key fails, causing the base file I/O to be reversed. In this case, the audit trail will contain an insert record for the base file followed by a delete to back the change out.

This behavior occurs on the NonStop system with unique alternate keys. If the application tries to insert a record with a duplicate alternate key, the insert into the base file will succeed but the insert into the alternate key file will fail. The application will get a duplicate key error and the audit trail will contain the insert and delete records.

Note that the errors do not cause the transaction to be aborted. The recovery from the error is up to the application. It can change the alternate key fields, insert the record again, and commit the transaction. Alternatively, it could simply rollback the transaction.

This behavior, the replication of both the original I/O to the base file and the I/O to back out the change, can cause a number of issues for synchronous replication.

4.15.1.1 Terminology

To simplify the discussion, the following terminology is used when describing the situation. Each record in the example will be represented by a tuple (m,n), where m is the primary key value and n is the alternate key value. For example, (1,2) represents a record with a primary key of 1 and an alternate key of 2. An operation is represented Tn:Op(m,n), where Tn represents the transaction id, Op is the operation (U=update, I=insert, D=delete) and (m,n) is the record. For example, the insert of the above record under transaction id 1 would be represented as T1:I(1,2).

4.15.1.2 I/O Errors

If the application issues an insert on file with a duplicate alternate key, the target will also get a duplicate key error on the insert, and a record not found error on the delete. To illustrate, assume the files (source and target) contain (1,1). If the application issues an insert of (2,1), the audit trail will contain:

T1:I(2,1)
T1:D(2,1)

The insert on the base file succeeds; the alternate key file insert fails since there is already an alternate key value of 1. The base file insert is backed out. When the transaction is replayed on the target system, the insert is tried first and fails. The file system backs out the (2,1) record in the base file. The replicated file still just contains (1,1). When T1:D(2,1) is replayed, there is no record with a 2 key value, so replication receives a record not found error.

An update can cause replication to receive a duplicate key error. Assume the file contains:

(1,1)
(2,2).

If the application updates (2,2), changing it to (2,1), it will receive a duplicate key error. Since the I/O on the base file succeeds and is then backed out, the log will have:

T1:U(2,1)
T1:U(2,2)

When replication replays T1:U(2,1), it also gets the duplicate key error, so the record in the replicated file remains unchanged. When it replays T1:U(2,2), the operation succeeds, since the record is essentially unchanged.

Normally a failure of an I/O on the target system will cause the source transaction to be aborted. Synchronous replication must be able to detect these special cases, allowing the application to make the determination of the outcome of the transaction.

4.15.1.3 Deadlocks

This behavior can cause deadlocks in synchronous replication that would not normally occur without replication. For example, assume the file is empty. Application 1 starts transaction 1 and issues an insert of (1,1). The log contains:

T1:I(1,1)

Application 2 starts transaction 2 and issues an insert of (2,1). The insert in the base file succeeds, but the operation is held up by application 1's lock on the (1,1) record in the alternate key file. The log contains

T1:I(1,1)
T2:I(2,1)

On the source system, application 2 is blocked by application 1. These two records are shipped to the router, which sends T1 to Consumer 1 (C1) and T2 to Consumer 2 (C2). C2 applies first, the file now contains (2,1). C1 attempts to insert (1,1) but blocks, because C2 has the alternate key record locked.

Application 1 issues a commit for T1, causing an RTC request to be sent to C1. C1 is blocked and cannot reply, waiting for C2 to complete. C2 cannot complete until application 2 issues a commit, and application is blocked on application 1: deadlock. One or both transactions will time out, resolving the deadlock at the cost of rolling back one or both of the transactions.

There are a couple of solutions for resolving this issue. One solution is for the router to have the intelligence to recognize this situation and to serialize I/O on files with unique alternate keys. In this case, the router would not release the second I/O to C2 until the first had completed in C1. The router would only serialize I/Os for records that matched alternate key values. For example, if application 1 inserted (1,1) and application 2 inserted (2,2), there is no conflict and the I/Os can be processed in parallel. Even this solution does not provide complete protection against deadlocks: If the base table is partitioned with (1,1) in a different partition from (2,1), the base table I/Os could be recorded in the audit trail out of order by TMF. The deadlock could still occur.

This can be eliminated if the router receives the database change records for both the base table and the unique alternate key file. The router could then delay any I/Os to the base table until the corresponding I/O for the alternate key has been received, ensuring that the data was applied in the same order on the target as on the source.

Alternatively, the router can route the I/Os for tables with unique alternative keys to consumers based upon the DBS instead of the transaction id. The router, in this case, would send all I/Os for a file with a unique alternate key to the same consumer, serializing them and preventing deadlocks. The consumer can apply the I/Os under a separate transaction or under the same target transaction by having the consumer join the transaction in progress. Again, this only works if the base table is not partitioned. Otherwise, the I/Os from the partition can be received out of order, causing a deadlock.

4.15.2 Nondeterministic Transaction Ordering

If a transaction spans multiple disks, the I/Os in the TMF audit trail are not guaranteed to be ordered in the same order as they were applied to the source database. Additionally, there is presently no way to reorder the events in the audit trail to match the same order as they were applied to the source database.

When a disk process receives a request to modify an audited file, it buffers the log information for the modification in its own local cache. Each disk process's cache is separate and contains only the records for files on its disk. When the application commits the transaction, each disk process flushes its log data in a batch to the Audit Disk Process (ADP). ADP then writes the log information to the audit trail in the order in which it received the buffers from the disk processes. TMF insures that all I/O's to the same disk process always appear in the audit trails in the order in which they were applied, and that all I/O's for a transaction precede the transaction's commit event in the audit trail. Additionally, TMF guarantees that the commit events are recorded in the audit trail in the order they completed.

FIG. 76 shows a simple example of how I/Os can be logged into the TMF audit trails out of order. In this example, the application is changing the key for a record in a table from 100 to 200. The table is partitioned so that records 1-100 are on disk process $DATA1 and records 101-200 are on disk process $DATA2. The application deletes record 100. Since the record is on $DATA1's partition, $DATA1 logs the delete I/O in its cache. The application then inserts record 200, which is written to $DATA2's cache. The application then commits the transaction, causing both $DATA1 and $DATA2 to flush their audit trail cache to the audit disk process ($AUDIT). $DATA2's cache is received first, so its I/Os are logged first.

Reordering the I/Os within a transaction may not matter. After all, in the above example, record 100 is deleted and record 200 is inserted regardless of the order. However, in certain situations, the order does matter and replication to the target may fail.

4.15.2.1 Referential Integrity

If referential integrity is enabled on the target, replication may fail. FIG. 77 shows a similar example to the previous. In this case, the application is deleting a set of records with a parent/child relationship. On the source, the children are deleted first to preserve referential integrity. The parent record is then deleted. As before, the records can be written to the log out of order, resulting in replication attempting to delete the parent first, followed by the children.

If the target has referential integrity rules that prevent the parent from being deleted while there are still children records in the database, replication will fail. Unless the target database checks referential integrity at commit time, referential integrity needs to be disabled on the target.

4.15.2.2 Partitioned Tables with Unique Alternate Keys

Going back to the original example (FIG. 76), if the table in question had a unique alternate key (or index) that did not change when the primary key was changed (by a delete/insert sequence), replication on the target will fail when the delete/insert combination is received out of order by the target system. When the target goes to insert the record, the insert will fail due to a duplicate key error.

There are a number of workarounds for this problem:
1. you can remove the unique constraint on the alternate key. If needed, the application can check it instead.
2. when the insert fails, replication could be configured to delete the alternate key record and then to retry the insert.
3. the application could use two transactions, one for the delete (which is committed first) and one for the insert (which is committed second).
4. when the insert fails, replication could buffer further I/Os for the transaction looking for the delete. If the delete is received, it could then issue the delete and retry the insert.

The last two solutions only work with synchronous replication. At the present time, asynchronous replication with Shadowbase replicates based on partitions and may not maintain transactional integrity across multiple replication threads (target appliers). The delete could be sent down one thread to one consumer, while the insert goes down a different thread to a different consumer. Even if the application used two transactions, the insert could still occur before the delete depending on which target consumer applied the I/O first (in other words, under some configurations, there is no cross-consumer coordination to replay all source transaction events on the target under one transaction). This issue, and a solution, are discussed below.

4.15.3 Network Transactions

Programs using the HP supplied libraries (ARLIB and ARLIB2) for reading Audit Trail data must run on the same system as the audit trail—the read routines do not span different nodes in an Expand network. As a result, multiple collectors are required to read data for a network transaction that spans multiple nodes. As long as the data for each node can be applied independently, the current asynchronous architecture for Shadowbase can replicate the data. However, the current architecture is not sufficient if the updates must be coordinated.

For synchronous replication, the coordinator can query collectors across the nodes. In this case, replication occurs much as it does now: each node has its own collector that sends data to its own router. The data flows from each node independently. At commit time, the coordinator queries the coordinator in each node and can only vote to commit when all coordinators have responded.

In some cases, coordination is required in asynchronous replication. In this case, every collector shares a common router (which is routing based upon disk/file, not by transaction) which is responsible for merging the data from the collectors. The target commits do not occur until every collector had sent a commit request to the target.

4.15.4 Integration with AutoTMF

AutoTMF uses procedure intercept technology on Non-stop Systems, to allow non-TMF applications to use TMF without requiring any modification to the code. AutoTMF intercepts Enscribe I/O calls to start and commit transactions automatically. The intercept technology will be compatible with AutoTMF, allowing AutoTMF applications to replicate data synchronously.

AutoTMF assumes that the commit will complete normally and that the transaction will not be aborted during the call to commit. Any error committing the transaction results in the application process abending. Normally, synchronous replication will abort source side transactions during commit if the changes cannot be applied on the target. However, to prevent the application from failing due to a target issue, one may optionally elect to commit the transaction. In this case, replication needs to switch into asynchronous mode and the log replayed from the oldest outstanding data element.

4.16 Restart Processing in One Preferred Embodiment

Assuming that the replication is not configured for maximum reliability (synchronous replication stops when the target is unavailable), transactions that occur while the system is down will have to be replicated asynchronously, since they will have been committed on the source while the target is unavailable. Depending on how long the target is unavailable, the system may have to work through a significant backlog of transactions asynchronously prior to switching to synchronous mode. The problem is further complicated by the application continuing to add to the replication backlog while the restart is occurring.

There are two problems to be addressed:
1) How is backlog processing optimized to quickly work through the transactions and switch to synchronous mode?
2) How does one know when to do the switch, and how is the switch performed?

4.16.1 Backlog Processing

In the normal processing, asynchronous transactions cause synchronous replication to block at the router until the asynchronous transaction has committed. Section 4.8 provides more detail on this issue.

At startup, this would essentially cause all queued transactions to be processed sequentially. Replication, in this case, may never catch up. A better algorithm that allows parallel processing of transactions is required. Fortunately, such an algorithm exists and is already in use by Shadowbase for asynchronous replication. In asynchronous replication, Shadowbase partitions transactions by file/partitions for parallel processing. Instead of all I/Os for a specific transactions being routed to a specific consumer, all I/Os for a set of files or partitions are routed to the same consumer. This insures that the I/Os and commits for a specific file or partition are executed sequentially. I/Os for other disks/files can be processed in parallel.

The same strategy will be used for restarts for synchronous replication. The router will have two modes for distributing transactions to the consumers. In pure synchronous mode (the normal mode), the router will assign all I/O for a given transaction to a single consumer. In asynchronous/semi-synchronous mode, the router will assign the I/O based upon the database specification (DBS), so that I/O for a given partition/table are applied sequentially. In this mode, the system is emulating the existing asynchronous replication functionality.

When synchronous replication is being restarted, the collector will send the router a command to switch to asynchronous mode. It will then send the queued transactions from the restart point, as it does now. When it is caught up, the router will be switched backed to synchronous mode and subsequent transactions will be processed synchronously.

4.16.2 Switching Modes

When switching modes, replication must prevent I/Os on the same data element from being applied out of order. Asynchronous replication guarantees this by serially applying I/Os in a single thread based disk or partition. Synchronous replication, on the other hand, uses source system locking to guarantee I/O ordering. Since the source system lock is held until all the data for the transaction has been applied on the target, the target must have applied the first update prior to the source committing, releasing the lock, and performing the second update. Ordering is guaranteed, allowing data to be routed on a transaction basis.

There are two choices when switching between synchronous and asynchronous replication: either you block new transactions until all existing transactions have been applied, and only then allow transactions to be started and replicated in the new mode, or you must support a mix of asynchronous and synchronously replicated data without losing the I/O ordering. Blocking until all existing transactions have been applied can cause significant downtime and may be unacceptable. The following sections describe a method for transitioning while still allowing the application to run.

4.16.2.1 Synchronous to Asynchronous

If the transition to asynchronous replication needs to be done immediately, the router aborts all active target transactions. Source transactions are unaffected and are allowed to commit. All new I/Os sent to the router are routed based upon DBS, not on transaction. Source commits are not delayed waiting for target system I/Os to be applied; replication votes to commit immediately. The collector resends all data from the last restart point, effectively replaying all transactions that were in progress when the switch occurred.

If the switch does not have to occur immediately, a more graceful switch to asynchronous mode can be used that does not require the target transactions to be aborted or the collector to reposition back to the last restart point. Instead, the router begins routing data based upon DBS and not on transaction while still delaying the source commit until the target I/Os have been applied. Eventually, all of the transactions that had data routed based upon on transaction id will complete and all I/Os will have been routed based upon DBS. When that occurs, replication can begin voting immediately to commit, essentially causing the data to be replicated asynchronously.

4.16.2.2 Asynchronous to Synchronous

When switching back to synchronous mode, however, the situation is more complex. The router performs the cutover in three phases: asynchronous only, semi-synchronous mode, and fully synchronous.

During asynchronous mode, the router distributes I/Os to consumers based upon the DBS, not upon the transaction id. A single source transaction may result in multiple target transactions. Either the consumer will not receive an RTC request for a transaction (because the coordinator or collector intercepted the request and did not pass it along), or the router has too much outstanding I/O when the RTC request is received, so it votes to commit immediately.

Eventually the router will catch up and it will receive an RTC request for a transaction that it can properly vote on. At that point, the router will enter the semi-synchronous mode. During semi-synchronous mode processing, the router is handling all new RTC requests synchronously: it is delaying voting until the consumer has applied all I/O for the transaction. However, the router is still distributing data based upon the DBS. Each source transaction may still have multiple target transactions applied against it. At this point, the router has a mix of transactions, both asynchronous and synchronous.

Eventually, since it is treating all new RTC request requests as synchronous transactions, the router will only have synchronous transactions to be processed when it has received the commit or abort for all transactions processed asynchronously. When all of the asynchronous transactions have been processed, the router switches into fully synchronous mode: new transactions are routed to the consumers on a transaction basis so transaction integrity is maintained. Note that the router will have distributed existing transactions on DBS basis and may have I/O outstanding in multiple consumers. The router will select one of the consumers as the destination for any subsequent I/Os.

4.16.3 Commit Processing During Restart

At the application, the transition between modes happens seamlessly. During the time the target system was unavailable and during the restart processing, the application still has been registering transactions. At commit time, however, what happens depends on where one is in the restart process:

1. If the collector is unavailable (down), the coordinator votes to commit immediately. If collector is available, the coordinator sends the request to the collector.
2. If the collector is replaying the log for restart and has not reached end of file, the collector replies immediately to commit the transaction. Once the collector reaches EOF, it sends a command to tell the router to switch to synchronous mode and sends an RTC request on to the consumer. Thereafter the collector processes transactions as if they are synchronous.
3. When the router receives an RTC request during startup, it checks to see how much work is queued. If the queue is short enough, it switches into semi-synchronous mode and votes on the on the commit based upon the outcome of the I/O. Thereafter, the consumer treats all transaction as synchronous. If the queue is large, it treats the transaction as an asynchronous transaction and votes immediately.

4.16.4 Status Checking During Restart

In some replication modes, new transactions and commits for synchronous transactions must be blocked until the router can process the transactions synchronously (that is, until the router can actually vote on commit—the router may still be in semi-synchronous mode, not synchronous mode). While in this state, the coordinator polls the collector for the replication status. The collector in turn polls the router for its status when the router becomes available. The coordinator blocks RTC requests until replication, either synchronous or asynchronous, has resumed. Once replication has resumed, the coordinator sends the RTC requests to the collector with a flag indicating that they must be processed synchronously. The commit is delayed until the router (through the consumer pool) has applied all of the I/Os associated with the transaction.

The coordinator also blocks requests to register a new transaction until the routers are in synchronous or semi-synchronous mode.

4.17 Startup Processing in One Preferred Embodiment

Starting replication and the application from scratch requires the following steps:

1. The target database needs to be synchronized with the source.
2. Replication needs to be started.
3. The application needs to be started.

While all three steps are required, Shadowbase does not require that they be performed in the order above.

4.17.1 Target Database Synchronization

The target database can be synchronized either offline or online. Offline options include backup/restore and manually copying and loading tables using an ETL process. Shadowbase supports two online database loading solutions: SOLV (Section 4.19.2) and Autoloader (Section 4.19.1). Both options can be used online, while the application is running.

4.17.2 Replication Startup

If offline database synchronization is used, the databases must be synchronized before replication is started. For online synchronization, replication must be started prior to the synchronization process.

The replication startup will go through the same sequence of events as with a restart; starting in asynchronous mode; transitioning to semi-synchronous, and then finally switching into fully synchronous mode. Online synchronization can be started at any time after replication, however, if it is started prior to replication stabilizing in fully synchronous mode it will significantly delay when that switch will occur.

The actual startup and monitoring of processes is controlled by the monitor process, AUDMON. It starts the consumers in the consumer pool, the router, the collectors, the coordinators, and the metronome process. It may also start the application configuration process (AUDCFG) if it has not already been started. It also coordinates the start of replication.

4.17.3 Application Startup

There is one dependency at application startup: the configuration process (AUDCFG) must be running prior to application starting and attempting to register a transaction for synchronous replication. AUDCFG can be started as part of the replication subsystem startup, or it can be started and monitored by the NonStop Persistence Monitor. If it is monitored by NonStop, it will automatically be started when the system is cold loaded and will continue to run while the rest of replication is shutdown. If AUDCFG is not available when the application makes a call that requires a transaction to be registered, the library will return an error and the transaction will be aborted, if possible. There is also an explicit call to initialize the library that allows the application to change this behavior and continue normally without registering transactions, essentially replicating the data asynchronously.

The library, through AUDCFG, can be configured in several different ways to handle replication failures and unavailability. If replication has not been started, the library can:

1. pause the application indefinitely until synchronous replication becomes available,
2. pause the application for a specified period of time and then return an error if synchronous replication is not available within that time period,
3. pause the application for a specified period of time and then allow the application to continue, essentially replicating asynchronously until replication becomes available,
4. immediately return with an error and continuing return with an error until synchronous replication becomes available, or
5. immediately return with no error, allowing the application to continue.

Once replication has become available, the application's behavior when replication fails is determined by its mode: max availability or max reliability, and whether recovery mode is configured. Max reliability can be further configured to:

1. Pause the application until synchronous replication becomes available again and then resume.

2. Pause for a specified period of time waiting for synchronous replication to become available. If synchronous replication is not available within the time period, the library will then abort the transaction (if any) and return an error.
3. To abort the transaction and return an error.

4.18 Recovery Processing in One Preferred Embodiment

When the AUDRTR or AUDCOLL process fails, either due to a software fault or CPU failure, it is restarted. However, such a failure stops replication to the target system for a short period requiring that the system be recovered. The recovery mode is configurable; the user has the option of either trying to perform a fast recovery, or to treat the process failure as a node failure. In the latter case, the system will restart according Section 4.16—Restart Processing.

In the fast recovery mode, the system will block all synchronous transactions on the source system until they can be processed synchronously. All new transactions will be blocked at registration, all existing transactions during commit while RTC processing is in effect.

The audit trail processing from the restart point is the same as in restart processing. The audit trail data is sent to the router, where it is parceled out based upon DBS. Since the application is blocked, the collector should quickly catch up. When it is caught up sufficiently so that new RTC requests will be processed synchronously (semi-synchronous mode), the collectors will resume the application by completing the registration requests and by releasing the RTC requests to the collector and router.

If the collector does not catch up within a configurable time period, the process failure will be treated as a major failure and the system will either switch into the blocked or asynchronous replication modes, depending on the configuration.

Note that the processing is largely the same as a restart— the only difference is that the application is blocked during the initial restart process. The router goes through the same three modes: asynchronous, semi-synchronous, and finally, synchronous.

4.19 Data Loading in One Preferred Embodiment

Shadowbase has two methods of doing the initial target load online—while replication is occurring. Both methods will be integrated with synchronous replication to allow online loading of synchronously replicated data.

4.19.1 Autoloader Integration

Autoloader replicates data by forcing a copy of each row in the source data to be inserted in the audit trail. Once in the audit trail, it flows through the collector to the consumer like any other replicated change. Conceptually, it loops; performing the following actions until all data has been replicated:
1. It starts a transaction;
2. Reads and locks a set of rows;
3. Updates the rows with the data just read (performing an update, but leaving the data unchanged); and
4. Commits the transaction.

Autoloader will work with synchronous replication with only a minor change: when running in synchronous mode, it needs to register the transaction with the coordinator to allow its transactions to be replicated synchronously. With that change, it looks like any other application to the replication system. It can either register the transaction explicitly, using the callable library, or implicitly, using the intercept library.

4.19.2 SOLV Integration

SOLV bypasses the audit trail by sending the data directly to the consumer, significantly reducing both the overall load on the source system and reducing the audit trail usage. Conceptually, it loops; performing the following actions until all data has been replicated:
1. It starts a transaction;
2. Reads and locks a set of rows;
3. Sends the rows to the consumer;
4. Writes a single record to a tracking file; and
5. Commits the transaction.

The consumer receives and buffers the data while processing the audit trail data from the collector. When the consumer sees the tracking file's record and the commit, it writes the buffered data to the target tables and files.

SOLV can be integrated with synchronous replication as follows:
1) Like Autoloader, SOLV needs to be modified to register transactions with the coordinator when in synchronous mode.
2) SOLV also needs to be modified to send data, along with the transaction identifier, to the Router in synchronous mode, instead of directly to the Consumer. The remainder of SOLV's processing remains unchanged.
3) The router, when it receives data from SOLV, will assign the I/Os to a consumer just as if it was being read from the audit trail. The data can be written as it is received, rather than waiting for a commit, since it is being sent under a synchronous transaction.

Note that the tracking file does not have to be replicated under synchronous replication. Prevention of data conflicts is guaranteed by the source locking—the source transaction will remain active until the target is committed.

SOLV may need to be enhanced to work more efficiently with the longer commit times required by synchronous replication by allowing multiple simultaneous active transactions.

4.20 Transactions without Log Records in One Preferred Embodiment

TMF does not write any data to the log for transactions that do not update data. If there are no inserts, updates, or deletes during a transaction, nothing is written to the log. The collector needs to track synchronous transactions from the time it receives an RTC to when it is committed—this way it can tell if any data was received after it responded to the RTC. Once it knows the transaction has been committed, it can remove the transaction from its memory.

The coordinator registers for every transaction, since there is no way of knowing a priori that this is a read-only transaction. It will receive a prepare signal from OpenTMF and will send an RTC to the coordinator for a read-only transaction. However, the coordinator will not receive a commit record in the log, so it will not be triggered to remove the transaction from its memory.

To prevent this memory leak, the coordinator will tell the collector when it receives the commit signal from OpenTMF, which it receives for all transactions, including read-only. (OpenTMF is an HP extension to TMF, the HP Transaction Management Facility, that allows user processes such as the Shadowbase Plus SR synchronous replication engine to join a transaction and to vote on its outcome as to whether to commit or to abort the transaction). The collector will free up memory for the transaction when it knows it is passed the commit in the log —it can't use wall clock time since it may be behind in reading the log.

The commit notification is not time sensitive, since it only is used to notify the collector to free memory. The commits can be batched and sent with other IPCs, reducing the message load.

4.21 Implicit Transactions in One Preferred Embodiment

Some SQL databases support implicit transactions—transactions that are begun by the SQL engine whenever a data manipulation operation is performed. The application does not make a call to BEGINTRANSACTION, BEGIN WORK or any other function to explicitly start the transaction. The transaction only spans the lifetime of the SQL statement. This makes registering the transaction for replication difficult, particularly if the source application cannot be modified.

Note that if the application had a transaction active when the statement was invoked, SQL would have used the active transaction and would not generate a new transaction.

The following sections present several strategies to deal with implicit transactions.

4.21.1 Intercept the Generated Code

If the implicit transactions are started using a call generated at the application level, instead of at the database engine level, the call to start the transaction can be intercepted by the intercept library to allow the transaction to be registered.

The call that generates the transaction may be to a multi-function procedure, which will require some additional processing. For example, in NonStop MP, all SQL statements are executed by calling the EXECSQL system call. The same procedure is called to start a transaction ("EXEC SQL BEGIN WORK"), to select data ("EXEC SQL SELECT . . . "), or to update a table ("EXEC SQL UPDATE . . . "). The registration of the transaction should only be done when a transaction is created.

In that case, in may be possible to determine the type of the statement from the data passed as parameters. If so, that can be used to determine when the new transaction should be registered. Alternatively, the library can check for a transaction before the call and after the call. If a new transaction is created, it is registered; otherwise, no additional processing is performed.

Note that the above discussion also applies to transactions started by the application explicitly that flow through a general purpose method such as EXECSQL.

4.21.2 Make the Transaction Explicit

If the application can be modified, the SQL statements can be surrounded with calls to explicitly start and commit the transaction. The transaction can then be registered normally, either through the callable library or by the intercept library.

If the application cannot be modified, this technique may still be possible using the intercept library. The calls to execute the SQL are intercepted and the parameters examined by the library. If the call can cause an implicit transaction to be generated, the library can start a transaction, call the intercepted procedure, and then commit the transaction (if it is still active) after the call.

4.21.3 Register the Transaction via a Database Trigger

Some databases support triggers on tables that are invoked when the table is modified by an update, delete, or insert. If the trigger functionality allows capturing the transaction information and providing it to the coordinator for registration, triggers can be added to tables that are replicated to allow any transactions involving the table to be registered.

4.22 Scalability and Performance in One Preferred Embodiment

4.22.1 Overview

Parts of synchronous replication architecture are inherently scalable; other areas require careful consideration when scaling. The strategy taken for scaling is highly dependent on the bottleneck. This section examines the potential software bottlenecks and the strategy for their removal. The potential software bottlenecks are:

1. the application
2. AUDCOOR, the coordinator process
3. AUDCOLL, the collector process
4. AUDRTR, the router process
5. AUDCONS, the consumer process.

As one bottleneck is addressed, another will appear (there is always at least one limiting component). The scalability solutions are independent—scaling one component does not preclude scaling any other component. A large system may require all bottlenecks to be addressed to get the required throughput. For example, the coordinator may be the original bottleneck, so additional coordinators are added to the configuration. The additional coordinators raise the throughput to where the collector cannot keep up reading the audit trails, so an additional collector is added. This allows data to be fed faster than the consumers can write the data, so additional consumers are added to the consumer pool. Now that the consumers can handle the additional throughput, the router becomes the bottleneck, requiring an additional router to be added.

4.22.2 Application

The application may become a bottleneck, as synchronous replication will significantly extend the commit time. Transactions will take longer and there will be more transactions simultaneously active. The throughput can be restored simply by adding more servers if the application is designed using the classic NonStop architecture of single threaded Pathway servers, If the application is multi-threaded using nowait I/O for the commit call, it may be able to handle synchronous replication with little to no changes, assuming it does not exceed the limit for active transactions in a process.

The longer transaction time does not mean that the transaction requires significantly more processing. There is little difference in the amount of processing power required between a transaction that is replicated asynchronously and a transaction that is replicated synchronously.

4.22.3 AUDCOOR

AUDCOOR is inherently scalable. The architecture is designed to support multiple AUDCOOR instances (the default configuration is one per CPU). If transaction coordination becomes a bottleneck, additional instances of AUDCOOR can be added to further distribute the load.

4.22.4 AUDCONS

The consumer is also inherently scalable. Each router is assigned a pool of consumers to use. That pool can be expanded as required to increase the target I/O throughput. Note that since a single transaction cannot be split among multiple consumers, expanding the number of consumers beyond the maximum number of simultaneously active transactions will have no effect on throughput during normal running.

During restart, I/O is distributed to the consumer based upon Database Specifications (DBS), not by transaction. The maximum number of consumers that will be used is the maximum number of DBSs. The number of consumers in the pool should be the larger of the number of active transactions compared to the number of DBSs to get the maximum throughput for both restart and normal processing. If there are more DBS's than active transactions, the consumer pool should be configured to have static consumers sufficient to handle the active transactions, and dynamic consumers to support the additional load imposed by the restart to get optimum throughput.

4.22.5 AUDCOLL

4.22.5.1 Multiple Collectors, Processing All Audit Trails

AUDCOLL can be scaled by running multiple instances of the collector. In this mode, each instance is processing a subset of the transactions in the audit trail. The transactions are assigned based upon a well-known algorithm that maps the transaction id (or one of its related attributes) for a transaction to the collector. Examples of well-known algorithms include (but are not limited to):

1. Assigning transactions based upon CPU (e.g., collector 1 gets the transactions originating in odd CPUs, collector 2 gets the transactions originating in the even CPUS).
2. Generating a hash key based upon the transaction id and assigning the transaction based upon the hash key.
3. Assign the transaction based upon the transaction id modulo the number of collectors.

The key attribute of the well know algorithm is that any process can determine the transaction assignment given the transaction id or one of its related attributes. Thus, each collector can implicitly determine which transactions it is handling without explicit coordination with the other collectors, and the coordinators can determine which collector should be sent the RTC.

In FIG. 78 there are two collectors. AUDCOLL #1 is processing the odd numbered transactions, AUDCOLL #2, the even numbered transactions. Note that coordinator also can route the RTCs to the correct collector, since it also knows the rule for assigning transactions to collectors. Both collectors send their data to the router, which directs them to appropriate consumers based upon transaction id.

This mode is similar to the multiple routers mode described below, and has the same restart requirements and restrictions (also described below).

4.22.5.2 One Collector Per Audit Trail

Instead of having multiple collectors running in parallel reading all of the audit trails, the collectors can be configured so that each collector is running against a single audit trail—there is one collector for the MAT, one for AUX01, and so on. Each collector filters based upon the DBS and only sends the records from its audit trail that match the DBS.

In this configuration, the router(s) are responsible for integrating and sequencing the data from the collectors. However, synchronization is relatively simple: the collectors/router just need to insure that all of the data is received and applied prior to committing on the target. The router can use the RBA's in the MAT for the AUX trail pointers to determine how far along each collector must be prior to committing. Since there is no guarantee of the order of I/Os between disks, there is no need to sequence the data further.

Note, however, that for synchronous replication the coordinator needs to send an RTC to every collector for processing since it has no apriori method of determining which disks (and hence audit trails) will be involved in each transaction.

See FIG. 79 for an illustration of one collector per audit trail.

4.22.6 AUDRTR

If the router becomes a bottleneck, additional routers can be added. Since a collector will communicate with at most one router, an additional collector must be added for each router. The architecture, shown in FIG. 80, is similar to that of multiple collectors described above. The collectors process transactions based upon a well-known algorithm. However, instead of sending the transaction data to a common router, each collector will send it to a different router. In the example shown below, router 1 is handling odd transactions (sent by collector 1) and router 2 is handling even transactions.

The Metronome process (see 4.4.3 Metronome Process) must be used when multiple routers are configured. Multiple routers have significant ramifications if there are transactions that have data that is replicated after the coordinator has voted to commit. This can occur if the disk process is severely delayed in sending its private audit trail data to the audit trail. If this occurs with a single router, it will delay processing additional I/Os until the commit is completed, thus preserving transaction ordering. To provide the same functionality with multiple routers, each router will have to see all commits and query other routers for the status of the commits for transactions it is not handling prior to proceeding. This level of coordination will eliminate any performance gains from having multiple routers. Therefore, one must ensure that all transactions are fully processed synchronously and can have no data that is applied after the vote to commit. The Metronome process provides this assurance.

4.22.7 Restarting With Multiple Collectors and Routers

The issues and basic sequence for restarting are documented in Section 4.16. During a restart, the replication system goes through three stages: asynchronous, semi-synchronous, and synchronous. During the initial asynchronous phase, the router is routing transactions based upon the Database Specification (DBS) instead of transaction id and the coordinator is voting to commit prior to all I/O being applied, to avoid delaying the application unduly. When the router is sufficiently caught up (which implies the collector is also caught up), it switches into semi-synchronous mode. In this mode, the coordinator does not vote to commit until all I/O has been applied, but the router is still routing data based upon DBS and not transaction id. When all active transactions are being voted on (all transactions that were applied without voted have committed), the router switches into synchronous mode and begins routing new transactions based upon the transaction id.

In both asynchronous and semi-synchronous mode, each table or partition (as specified by a DBS) is processed by a single consumer, insuring that the data is applied sequentially to partitions and tables in the same order it appeared in the log. Adding additional routers and collectors requires significant additional coordination to insure that the changes continue to be applied in the correct order.

The mode changes during the restart need to be coordinated not just at the routers but also at the collectors and coordinators. Until the routers switch to synchronous mode, the collectors need to route the data to the router based upon DBS and not based upon transaction. When startup switches to synchronous mode, the collectors need to send new transactions based upon the transaction id while completing existing transactions based upon DBS.

FIG. 81 shows the major players in the restart process. When the system is first restarted, the collectors send data to the routers based upon the DBS, not based upon the transaction id. Note that a single transaction could span multiple DBSs and could be processed in multiple collectors. The routers further distribute the data to consumers based upon the DBS.

There is little coordination required when the routers switch from asynchronous mode to semi-synchronous mode. The collectors continue to process audit trail records based upon DBS, not transaction id. Each router can switch independently when it is ready.

The switch from semi-synchronous to fully synchronous, however, needs to be tightly coordinated as the routing of data changes. The basic sequence of events for the switch is:

1) When the router is ready to switch, it notifies the restart coordinator. It remains in semi-synchronous mode.
2) When the restart coordinator has received notification from all routers, it embeds a switch mode command in the audit trail by writing to file under a transaction and committing it.
3) When the collector sees the commit in the audit trail, it processes new transactions based upon transaction id. Existing transactions are still processed based upon DBS. Note that the collector will have to be able to distinguish new transactions from existing, even if it did not process the existing transaction originally.

4) The router will begin routing based upon transaction id as well when it sees the commit in the log.

During the restart process, the coordinators must send the RTC queries to every collector, since any or all of the collectors may be processing data for the transaction. This continues until all of the transactions that were routed by DBS have been processed. Each collector, in its response to the RTC, will include a flag to indicate that it has completed processing all startup transactions routed by DBS. When the coordinator sees that flag, it will only send RTC queries to that collector for transactions that collector should be processing.

4.22.8 Database Specification Considerations

Restarting with multiple collectors adds another level of DBS specifications, since the individual specifications need to be grouped together and assigned to a collector if one allows the multiple collector/single router configuration. In the current architecture, the DBS flows from the consumer it is assigned to up to the collector that is connected to the consumer. The collector can communicate with multiple consumers, but each consumer only communicates with one collector. Similarly, the router may handle multiple collectors, but each collector sends to only one router. In synchronous replication, the DBS assignments must flow from the collector to the router.

If the relationship between collectors and routers is made to be one-to-one, eliminating the multiple collectors/single router mode, the DBS can flow from the router to the collector along the lines of the current architecture. However, this means that whenever multiple collectors are used, the Metronome process is required as well.

4.23 Router (AUDRTR) Algorithms in One Preferred Embodiment

This section addresses two issues:
1. how new transactions are allocated to a Consumer, and
2. when the router writes buffers to the Consumers in the pool.

Both of these issues have a significant impact on the overall performance and efficiency of synchronous replication.

When choosing a consumer to handle a transaction, the router must minimize the possibility of transaction interactions, where one transaction blocks an unrelated transaction. If the pool of consumers is larger than the maximum number of active transactions, this is easily accomplished—there will always be a free consumer who is not handling a transaction. However, when the pool of consumers is smaller than the number of active transactions, the router must choose a consumer that is already handling one or more transactions. How it makes that choice can have significant impact on the likelihood of transaction interactions.

The router must balance several conflicting goals when writing buffers to a consumer:
1. Communication efficiency—buffering messages to reduce the number of IPCs,
2. Transaction latency—responding as soon as possible to RTC requests,
3. Consumer efficiency—having several buffers queued on $RECEIVE so the consumer is always ready to process.

Decreasing the amount of data that is buffered before being sent to a consumer will decrease transaction latency, but will also increase the number of messages between the consumer and router, increasing system load on the target system.

4.23.1 Allocating Transactions

When assigning a new transaction to a consumer in the pool, the router will rank the consumers based upon several criteria. The ranking is designed to identify the consumer that has the lowest probability of having an existing transaction that will delay the new transaction. At the top of the list are consumers that have no active transaction assigned; at the bottom of the list are collectors that appear to have a blocked or hung transaction. The router will assign the transaction to a consumer following the steps below:

1) It will check for any free consumers—consumers without an active transaction assigned to them. If found, the router will select one of the available consumers. It may select the most recently used consumer (to reduce page faulting); it may round-robin between the consumers, essentially selecting the least recently used consumer, or it may round-robin between the CPUs.
2) It will check for a consumer that just has a commit request in progress. If found, the router will use that consumer.
3) It will check for any consumers that are just waiting for the commit: they have received an RTC for all of their transactions and there is no outstanding I/O for any of the transactions. If found, it will use the consumer with the oldest RTC.
4) It will check for any consumers that have no I/O outstanding. If found, it will use the consumer that has the fewest transactions assigned to it.
5) It will check for any consumers that are waiting for outstanding I/O to complete and the commit: they have received an RTC request for all transactions but haven't responded because there still is outstanding I/O. The router will check the length of time the I/O has been outstanding, if it exceeds a preset limit (configurable?), the consumer will not be used. If eligible, the consumer that has the lowest probability of being blocked is used.
6) It will use the consumer that has the lowest probability of being blocked.

4.23.1.1 Determining the Probability of Being Blocked

Based upon general I/O rates and the number of updates in a block, the router can generate an estimate how long a block should take to be processed. If it exceeds this time, it is likely to be blocked. The longer it exceeds the time, the more likely it is to be blocked.

The only factor the router has for blocks that haven't already exceeded the estimated time is the number of I/Os outstanding—the more I/Os, the more opportunity for being blocked. In general, the router will select the router with no over-due I/O and then with the fewest total I/Os outstanding.

4.23.1.2 Dynamic Consumer Pools

Shadowbase will use a dynamic pool of consumers to further reduce the possibility of transaction interaction while minimizing the impact on the system. The consumer pool configuration includes the following parameters:
1. num_static: the number of consumers always running and available to process transactions.
2. max_consumers: the maximum number of consumers that can be run simultaneously.
3. idle_time: the length of time a consumer must be idle prior to being shutdown.

When the system is started, the pool will start with the num_static number of consumers running. When the number of active transactions meets or exceeds the number of consumers, additional consumers will be started and added to the pool until there are max_ consumers running.

If the transaction load decreases, idle consumers will be shutdown to return their resources to the system. A consumer has to be idle for at least idle_time before it can be shutdown to minimize the number of process starts and stops.

Note: idle time needs to be calculated on the consumer pool basis—the idle time is the amount of time the consumer pool has had at least one consumer idle.

4.23.2 Transmitting Buffers

Each consumer will be open with a nowait depth of 15, meaning there can be 15 messages from the router to the consumer buffered by the operating system at a time. When more than 15 messages are buffered, the router will continue to buffer internally. Note that for large transactions, a significant amount of buffering may be required.

The router will have a parameter that provides the IPC rate target. This target specifies the number of IPCs per second the router should issue to the consumer. The target may be exceeded if router is busy and must send out blocks at a faster rate. If the router is not busy, it will send out partial blocks at the target rate.

The router follows the rules below in sending buffers to the consumers:

1) If the buffer is full, it is sent as soon as it can be. If there are less than 15 I/Os outstanding, it is sent immediately. Otherwise, as soon as an I/O completes, the next full buffer is sent.
2) If an RTC request is received for a transaction, the partial buffer queued for the consumer handling the transaction is sent. Possible enhancement: only send I/O for the transaction in question. The sending of the buffer is delayed slightly until all of the I/Os sent from the collector in the message containing the RTC request have been distributed, allowing additional I/Os to be included in the partial block.
3) When the router is otherwise idle (there is no more data to be processed from the collector), the router will compare the number of IPCs sent in the last second to the target rate. If the actual rate is below the target rate, the router will send partial blocks to consumers for processing. The router will pick the consumers with the fewest number of outstanding I/Os. If two consumers have the same number of I/Os outstanding, the router will pick the consumer with the most I/Os in the partial buffer.

Some care will have to be taken when dispatching partial buffers to keep from oscillating wildly above and below the rate. One probably wants to maintain a rolling average for IPCs sent in 1 & 2—this is the base rate. The difference between the base rate and the target rate provides the rate for releasing partial buffers.

4.24 Future Changes in One Preferred Embodiment

4.24.1 Audit Readers

The audit trail is non-cached (at least on S-Series NonStop systems)—each reader of the trail (through ARLIB or ARLIB2) actually performs physical I/O. The libraries do blocked reads, so a large amount of data is transferred at once, however, in systems that have multiple collectors, substantial savings could be realized by having a reader either distribute or cache data.

Two major architecture options exist: data can be pushed to the collector, or the collector can request the data.

In the first option, the reader is more intelligent and, based upon the configuration, knows which collector gets which records. It is continuously reading the audit trail, and as it encounters a record it determines which collector should receive the record and forwards it appropriately. If the collector falls behind (there will be substantial buffering in the readers so that this should be a rare occurrence), the readers stop processing for the collector and it has to read the audit trail itself to catch up—a slow collector should not block the other collectors from continuing.

The smart reader should provide a more efficient use of resources over the second alternative. Each collector is only seeing the data it needs to see—there is less data sent to each collector, the collector is not wading through records it does not need to see, and the collectors are not polling for data. The disadvantage is that the reader is much more complex and this will also require significant changes to the collector as it is more pull based.

The second alternative is to make the reader into specialized cache. The collector would request data from the readers. If the reader has it in its memory, it returns it. Otherwise either it would load it into memory and return it (particularly if the collector was request the latest audit data), or the collector would read it directly if the collector was requesting older data. This alternative is easier to implement, but may be less efficient than the first. Additional efficiencies can be gained by:

1. having the reader "know" what transactions/records the collector's are interested in and only returning those, and
2. having the reader read ahead for collectors. Once the collector's position has been established, it will read the log sequentially. The reader can be reading the log while the collector is processing the previous results.
   a. Other options include:
3. Having one reader for all audit trails (FIG. 82), or a dedicated reader for the MAT and AUX audit trails (FIG. 83 and FIG. 84).
4. if one selects a dedicated reader per audit trail, where is the audit trail data sequenced and merged?
   a. In the MAT audit trail reader (FIG. 83)
   b. At the collector (FIG. 84).

4.24.2 Expedited Transactions

Synchronous replication requires a balance between application latency, system load, and communication efficiency. Reducing the latency may increase the load on the system and reduce the effective communication bandwidth by sending smaller buffers more frequently. The transaction mix may be such that some transactions required a minimum latency, while, for others, the latency is not as significant.

Replication can flag the data associated with the transactions to be expedited if the low latency transactions are identified. When data for expedited transaction is encountered by any of the processes along the replication path, the data is moved to the head of the buffer and the buffer sent immediately, or on an accelerated schedule. For expedited transactions, all aspects of the communication path are optimized to minimize the time data or control messages spend in buffers waiting to be sent.

There are several ways expedited transactions can be identified:

1. The application can identify and flag a transaction as expedited when the transaction is started. For example, the new version of TMF has a set of user flags. The application set the flags to a specific value or values to identify the expedited transactions.
2. The application can identify the transaction as expedited when it registers the transaction with replication for synchronous replication.
3. Specific files, tables, or partitions can be identified for expediting. When the collector encounters a record for the expedited file, table or partition in the Audit Trail, it flags the associated transaction as expedited.

Note that, in addition to expediting the data associated with the transaction, the RTC requests and responses will also be expedited.

4.24.3 Schema Management

The schema maps source tables and fields to target tables and fields. In the current Shadowbase architecture, each consumer has its own, unique mapping for the layout of the source and target files. Since each consumer is managing a different set of files or partitions, each consumer's schema is different. Furthermore, each consumer's schema is a subset of its associated collector's schema. If there are multiple collectors in a replication system, each collector will have its own schema, which is again a subset of the schema for all the tables and files being replicated.

Reading a schema, particularly over Expand, can be slow. Schemas may also be memory intensive if there are many tables being replicated. Furthermore, in the synchronous replication architecture, there can be many more consumers in the pool and, since the data is being routed by transaction and not by table/file/partition, every consumer must have the schema for every replicated item available.

For synchronous replication, the router will be maintaining a pool consumers and will be routing data to them based upon transaction. Each consumer will now need a complete copy of all schemas, and each consumer's schemas will be the same.

Replicating the schema in each consumer can consume a significant amount of memory when there are a large number of consumers in the pool. In addition, it can add a significant amount of overhead when the consumers are started and the schemas are read. To alleviate both issues, all consumers running in the same CPU could share a memory segment containing the schema. One design is discussed below.

4.24.3.1 Schema Management Architecture

FIG. 85 shows the components involved in sharing the Schema array.

Schema Reader: The Schema Reader reads, upon request from the Schema managers, schemas from the dictionary. There are two readers, one running on the source system and one on the target system. The readers cache data, so the dictionary needs to be read only once, and also buffers the data to provide more efficient communication utilization.

Schema Manager: The Schema Manager manages the shared memory arrays of Schema. The Schema Manager is the only process allowed to write into the memory array. There is one manager running in each CPU on the target system for each Shadowbase Environment.

Shared Memory Schema Array: The Shared Memory Schema Array is the shared memory segment. It is essentially a large sequential buffer of schemas: schemas are appended to the array contiguously. The array has a short header section, which includes the number of schemas in the array and flags that let the consumers know when the buffer has been reloaded (optional, may not be required).

Note that the array can only be searched sequentially. However, once an element has been added to the array, its address is fixed. The consumers are responsible for maintaining trees or other data structures with pointers into the array to allow fast lookups.

4.24.3.1.1 Retrieving Schemas

FIG. 86 shows the steps involved in retrieving a schema that has not yet been loaded. The steps are as follows:

1) When the consumer needs a schema for a table, it checks its internal tables to see if it is already loaded. If it finds it, it retrieves the schema from the shared memory segment (not shown) using the stored pointer.
2) If the consumer didn't find it, it goes out to the shared memory segment and loads any data that has been added to the segment to its internal tables. Again, it is just saving a pointer to the data for each schema, not the data itself. If the required schema was found, it is used.
3) If the consumer did not find the schema in the new schemas, it sends a request to the manager for that specific schema.
4) The manager forwards the request to the appropriate reader(s). The readers read the schema from the dictionary if this is first request, or they return it from their internal memory if it is available.
5) The readers return the schema to the manager.
6) The manager adds the schema to the shared memory array. Note that the schemas have to be added in a thread safe manner—adding a schema should protect a consumer that is simultaneously loading data from a segment from getting bad data.
7) The manager replies to the consumer, indicating that the schema is available.
8) The consumer loads all new entries (including the requested entry) into its internal tables.
9) The consumer retrieves the appropriate schema.

4.24.3.1.2 Multithreading Considerations

To avoid a significant amount of complexity and overhead for coordination, the manager and consumers must follow certain basic rules when accessing data in the shared segment. The goal is to allow the consumers and the manager to access the data without synchronization.

When adding or modifying the data in the segment, the manager must not invalidate any reads the consumers may have in progress. In general, this means that the data structures must be very simple (sequential, contiguous elements) and that data must be added first, and then the pointers and counts updated. For example, if the manager updated the count of schemas first, and then added the schema, a consumer that interrupted the manager and read between the update of the count and the adding of the data would possibly get bad data or even a trap. If the manager adds the data and then updates the count, the consumer will never read beyond the end of valid data.

The consumer, on its side, needs to copy the data to its local space, and then validate that it is still valid. The section on reclaiming memory has more detail on this.

4.24.3.1.3 Modified Schemas

Once added, schema entries are generally not removed or modified (except when memory is reclaimed, as described below). When a schema is deleted, the entry is flagged as deleted and is available for reuse, for example using a classic least recently used algorithm. When a schema is modified, a new entry is added and the original entry is flagged as modified. Each schema entry will have a pointer to the next version of the schema. This pointer is null for unmodified schemas. When the consumer sees a non-null pointer, it will use the revised entry. Note that each entry needs to be checked, so a 'chain' of modifications may be traversed. This is particularly useful for when you need to process "old" audit and use schemas for the data that may be in a prior format.

As noted above, when the manager is adding a modified entry, it needs to add the entry first and then update the pointer.

4.24.3.1.4 Reclaiming Memory

This functionality is optional and may not be implemented. The shared memory segment will continue to grow while entries are deleted and modified. These entries can be reclaimed without stopping the consumers, but at a cost—the consumer's internal data structures need to be reloaded. Note that the memory is not released to the OS, the deleted and modified entries are removed and space for new entries becomes available at the end of the buffer.

A buffer version is added to the memory buffer header to allow the manager and consumers to coordinate reorganizations. When the consumer first reads an entry from the buffer, it saves the version number in its local variable. As long as the versions match, the pointers stored by the consumer are valid—if they differ, the pointers are invalid and need to be reloaded.

When the manager decides that entries need to be recaptured, it resets the number of entries and increments the version number. The number of entries is set to the number of contiguous, non-deleted entries at the beginning of the buffer. From the consumer's point of view, this is now the new end of the buffer. The manager then sequentially reads the rest of the entries. It moves each good entry to the new end of the buffer, and then increments the count, as if it were adding an entry from the reader. The deleted and modified entries will have been removed and the buffer will have unused (but allocated) space at the end for growth when all entries are checked.

On the consumer's side, when it is accessing a schema entry, it needs to copy it locally to its memory and then check the version number (this must be done in this order to prevent possible corruption). If the version number doesn't match, it needs to invalidate all of its pointers and then to reload them from the shared memory.

4.24.4 DBS Based Replication with a Single Target Transaction

In the current architecture for Shadowbase asynchronous replication, one source transaction can result in multiple target transactions. Data is sent to consumers based upon the source file or partition, so a single transaction can be sent to multiple consumers. Each consumer applies its specific I/O under a different transaction, resulting in transaction fan-out. It also means that the target database may not be consistent since some I/O for a transaction in a fast consumer may be applied and committed while other I/O is pending in a slow consumer.

An alternative architecture allows I/O to be distributed to multiple consumers based upon the source file or partition while still under a single transaction at the target. This has the advantage of maintaining a consistent view of the data since there is a one to one correspondence between source and target transactions.

FIG. 87 shows the base implementation for this architecture. The transactional data is sent to the router, which routes the data to the consumer based upon the table or partition. However, the router is responsible for managing the target transactions, and insures that all of the I/Os for a source transaction are performed under the same target transaction. The consumers join the transaction rather than originating the transaction. In the diagram, there are three transactions. The I/Os for source transaction 1 are applied by consumers 1 and 4 under the same target transaction (tx 1). When all I/O for the transaction has completed and the target commit record has been received from the collector, the router commits the target transaction.

4.24.4.1 Scaling DBS Based Replication

The base architecture may need to be scaled for higher performance. Adding additional consumers (providing the source database supports the more detailed partitioning) is not a problem. If additional collectors are added, so that several collectors are sending data to a single router, the router will have to coordinate the streams from the collectors to insure that all of the data has been received and applied from all of the collectors before committing the record. This can be done by sending all commits from all collectors—the router will not commit the target transaction until all of the collectors have sent the commit record for the source transaction.

If multiple routers are required, the transactions need to be coordinated among the routers to maintain the one-to-one correspondence. FIG. 88 shows one possible way of coordinating the transactions through the use of an external coordinator. The coordinator is responsible for managing the transactions. When a router receives data with a new source transaction, it sends a request to the coordinator for a target transaction for the I/Os. If the source transaction is new to the coordinator, it starts a new target transaction. If a target transaction has already been requested, it replies with that transaction. The coordinator is also responsible for managing the commit of the transaction.

In the example in FIG. 88, I/Os for table 1 and 2 are sent to router 1, and I/Os for table 4 are sent to router 2. Since the I/Os for tables 1 and 4 are done under the same source transaction, the target transaction for the I/Os is also shared between the routers.

Alternatively, the source transaction id can be used to determine which router is responsible for managing the transaction, eliminating the need for the target transaction coordinator. In this scheme, the router examines the source transaction id (or other attribute of the transaction) to map the responsibility for the transaction. If it is the responsible router, it starts and commits the target transaction. Otherwise, it contacts the responsible router to get the target transaction id.

In both cases, the responsible process (the transaction coordinator or the router) needs to track the state of the transaction as it is distributed among multiple appliers. The transaction can only be committed if all appliers have completed their work and have received the source commit record.

4.24.4.2 Semi-Synchronous Mode

Semi-synchronous mode replication combines DBS based routing with synchronous replication: the replication engine routes data to the consumer or applier based upon DBS while preventing the source transaction from completing until the target data has been applied. It sacrifices transactional independence, but allows the application to apply both asynchronous and synchronous transactions against the same data without loss or corruption of data.

Since semi-synchronous replication uses DBS routing, the same techniques discussed above can be used to provide transactional consistency and to prevent transaction fan-out. The architecture applies to all replication methods that route updates to consumers based upon source data location, not just asynchronous replication.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer readable media. The media has computer readable program code stored therein that is encoded with instructions for execution by a processor for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

While the present invention has been particularly shown and described with reference to one preferred embodiment thereof, it will be understood by those skilled in the art that various alterations in form and detail may be made therein without departing from the spirit and scope of the present invention.

What is claimed is:

1. An automated method of replicating a locking protocol in a database environment for performing I/O operations, the database environment including a plurality of databases, the method comprising:
   (a) performing a locking protocol that includes one or more explicit locking operations on objects in a first database of the database environment;
   (b) replicating the one or more explicit locking operations in one or more other databases in the database environment, wherein at least some of the explicit locking operations are performed asynchronously with respect to the explicit locking operations performed in the first database; and
   (c) performing I/O operations at the first database of the database environment that are associated with the one or more explicit locking operations implemented in the first database.

2. The method of claim 1 further comprising:
   (d) performing at least some of the I/O operations at one or more of the other databases.

3. The method of claim 2 wherein steps (b) and (d) are performed by a database replication system.

4. The method of claim 3 wherein step (b) is performed using one or more tokens.

5. The method of claim 2 wherein step (d) is performed by a database replication system and step (b) is performed outside of the database replication system.

6. The method of claim 1 wherein one or more of the explicit locking operations is a no change update performed on one or more of the objects in the first database.

7. The method of claim 1 wherein one or more of the I/O operations are part of a database transaction.

8. The method of claim 1 wherein one or more of the explicit locking operations are read locks.

9. The method of claim 1 wherein the objects in step (a) are header rows, and the I/O operations are applied to detail rows.

10. The method of claim 1 wherein the objects in step (a) are parent rows, and the I/O operations are applied to child rows, and the one or more explicit locking operations in step (c) are performed on the parent rows.

11. The method of claim 1 wherein a referential integrity relationship exists between the objects in step (a) and the I/O operations in step (c).

12. An automated method of replicating a locking protocol in a database environment for performing I/O operations, the database environment including a plurality of databases, the method comprising:
   (a) performing a locking protocol that includes one or more explicit locking operations on objects in a first database of the database environment;
   (b) replicating the one or more explicit locking operations in one or more other databases in the database environment;
   (c) performing I/O operations at the first database of the database environment that are associated with the one or more explicit locking operations implemented in the first database; and
   (d) performing at least some of the I/O operations at one or more of the other databases, wherein at least some of the I/O operations are performed asynchronously with respect to the I/O operations performed at the first database.

13. The method of claim 12 wherein steps (b) and (d) are performed by a database replication system.

14. The method of claim 13 wherein step (b) is performed using one or more tokens.

15. The method of claim 12 wherein one or more of the explicit locking operations is a no change update performed on one or more of the objects in the first database.

16. The method of claim 12 wherein step (d) is performed by a database replication system and step (b) is performed outside of the database replication system.

17. The method of claim 12 wherein one or more of the I/O operations are part of a database transaction.

18. The method of claim 12 wherein one or more of the explicit locking operations are read locks.

19. The method of claim 12 wherein the objects in step (a) are header rows, and the I/O operations performed in steps (c) and (d) are applied to detail rows.

20. The method of claim 12 wherein the objects in step (a) are parent rows, and the I/O operations are applied to child rows, and the one or more explicit locking operations in step (c) are performed on the parent rows.

21. The method of claim 12 wherein a referential integrity relationship exists between the objects in step (a) and the I/O operations in step (c).

22. An automated method of replicating a locking protocol in a database environment for performing I/O operations, the database environment including a plurality of databases, the method comprising:
   (a) performing a locking protocol that includes one or more explicit locking operations on objects in a first database of the database environment;
   (b) performing I/O operations at the first database of the database environment that are associated with the one or more explicit locking operations implemented in the first database;
   (c) replicating the I/O operations from the first database to one or more other databases in the database environment; and
   (d) performing the one or more explicit locking operations in the one or more other databases in the database environment when one or more of the I/O operations are received at the one or more other databases in the database environment, wherein at least some of the explicit locking operations are performed asynchronously with respect to the explicit locking operations performed in the first database.

23. The method of claim 22 further comprising:
   (e) performing at least some of the I/O operations at one or more of the other databases.

24. The method of claim 22 wherein steps (c) and (d) are performed by a database replication system.

25. The method of claim 22 wherein the objects in step (a) are header rows, and the I/O operations are applied to detail rows, and the one or more explicit locking operations in step (d) are performed on the header rows.

26. The method of claim 22 wherein one or more of the explicit locking operations are read locks.

27. The method of claim 22 wherein one or more of the I/O operations are part of a database transaction.

28. The method of claim 22 wherein the objects in step (a) are parent rows, and the I/O operations are applied to child rows, and the one or more explicit locking operations in step (b) are performed on the parent rows.

29. The method of claim 22 wherein a referential integrity relationship exists between the objects in step (a) and the I/O operations in step (b).

30. A computer program product for replicating a locking protocol in a database environment for performing I/O operations, the database environment including a plurality of databases, the computer program product comprising computer-readable media encoded with instructions for execution by a processor to perform a method comprising:
- (a) performing a locking protocol that includes one or more explicit locking operations on objects in a first database of the database environment;
- (b) replicating the one or more explicit locking operations in one or more other databases in the database environment, wherein at least some of the explicit locking operations are performed asynchronously with respect to the explicit locking operations performed in the first database; and
- (c) performing I/O operations at the first database of the database environment that are associated with the one or more explicit locking operations implemented in the first database.

31. The computer program product of claim 30 wherein the computer-readable media is encoded with instructions for execution by the processor to perform a method further comprising:
- (d) performing at least some of the I/O operations at one or more of the other databases.

32. The computer program product of claim 31 wherein steps (b) and (d) are performed by a database replication system.

33. The computer program product of claim 32 wherein step (b) is performed using one or more tokens.

34. The computer program product of claim 31 wherein step (d) is performed by a database replication system and step (b) is performed outside of the database replication system.

35. The computer program product of claim 30 wherein one or more of the explicit locking operations is a no change update performed on one or more of the objects in the first database.

36. The computer program product of claim 30 wherein one or more of the I/O operations are part of a database transaction.

37. The computer program product of claim 30 wherein one or more of the explicit locking operations are read locks.

38. The computer program product of claim 30 wherein the objects in step (a) are header rows, and the I/O operations are applied to detail rows.

39. The computer program product of claim 30 wherein the objects in step (a) are parent rows, and the I/O operations are applied to child rows, and the one or more explicit locking operations in step (c) are performed on the parent rows.

40. The computer program product of claim 30 wherein a referential integrity relationship exists between the objects in step (a) and the I/O operations in step (c).

41. A computer program product for replicating a locking protocol in a database environment for performing I/O operations, the database environment including a plurality of databases, the computer program product comprising computer-readable media encoded with instructions for execution by a processor to perform a method comprising:
- (a) performing a locking protocol that includes one or more explicit locking operations on objects in a first database of the database environment;
- (b) replicating the one or more explicit locking operations in one or more other databases in the database environment;
- (c) performing I/O operations at the first database of the database environment that are associated with the one or more explicit locking operations implemented in the first database; and
- (d) performing at least some of the I/O operations at one or more of the other databases, wherein at least some of the I/O operations are performed asynchronously with respect to the I/O operations performed at the first database.

42. The computer program product of claim 41 wherein steps (b) and (d) are performed by a database replication system.

43. The computer program product of claim 42 wherein step (b) is performed using one or more tokens.

44. The computer program product of claim 41 wherein one or more of the explicit locking operations is a no change update performed on one or more of the objects in the first database.

45. The computer program product of claim 41 wherein step (d) is performed by a database replication system and step (b) is performed outside of the database replication system.

46. The computer program product of claim 41 wherein one or more of the I/O operations are part of a database transaction.

47. The computer program product of claim 41 wherein one or more of the explicit locking operations are read locks.

48. The computer program product of claim 41 wherein the objects in step (a) are header rows, and the I/O operations performed in steps (c) and (d) are applied to detail rows.

49. The computer program product of claim 41 wherein the objects in step (a) are parent rows, and the I/O operations are applied to child rows, and the one or more explicit locking operations in step (c) are performed on the parent rows.

50. The computer program product of claim 41 wherein a referential integrity relationship exists between the objects in step (a) and the I/O operations in step (c).

51. A computer program product for replicating a locking protocol in a database environment for performing I/O operations, the database environment including a plurality of databases, the computer program product comprising computer-readable media encoded with instructions for execution by a processor to perform a method comprising:
- (a) performing a locking protocol that includes one or more explicit locking operations on objects in a first database of the database environment;
- (b) performing I/O operations at the first database of the database environment that are associated with the one or more explicit locking operations implemented in the first database;
- (c) replicating the I/O operations from the first database to one or more other databases in the database environment; and
- (d) performing the one or more explicit locking operations in the one or more other databases in the database environment when one or more of the I/O operations are received at the one or more other databases in the database environment, wherein at least some of the explicit locking operations are performed asynchronously with respect to the explicit locking operations performed in the first database.

52. The computer program product of claim 51 wherein the computer-readable media is encoded with instructions for execution by the processor to perform a method further comprising:
- (e) performing at least some of the I/O operations at one or more of the other databases.

53. The computer program product of claim 51 wherein steps (c) and (d) are performed by a database replication system.

54. The computer program product of claim 51 wherein the objects in step (a) are header rows, and the I/O operations are applied to detail rows, and the one or more explicit locking operations in step (d) are performed on the header rows.

55. The computer program product of claim 51 wherein one or more of the explicit locking operations are read locks.

56. The computer program product of claim 51 wherein one or more of the I/O operations are part of a database transaction.

57. The computer program product of claim 51 wherein the objects in step (a) are parent rows, and the I/O operations are applied to child rows, and the one or more explicit locking operations in step (b) are performed on the parent rows.

58. The computer program product of claim 51 wherein a referential integrity relationship exists between the objects in step (a) and the I/O operations in step (b).

* * * * *